US007884890B2

(12) United States Patent
Shimoshikiryoh et al.

(10) Patent No.: US 7,884,890 B2
(45) Date of Patent: Feb. 8, 2011

(54) LIQUID CRYSTAL DISPLAY DEVICE

(75) Inventors: Fumikazu Shimoshikiryoh, Matsusaka (JP); Masae Kitayama, Tsu (JP)

(73) Assignee: Sharp Kabushiki Kaisha, Osaka (JP)

(*) Notice: Subject to any disclaimer, the term of this patent is extended or adjusted under 35 U.S.C. 154(b) by 813 days.

(21) Appl. No.: 11/886,468

(22) PCT Filed: Mar. 17, 2006

(86) PCT No.: PCT/JP2006/305452

§ 371 (c)(1),
(2), (4) Date: Sep. 17, 2007

(87) PCT Pub. No.: WO2006/098449

PCT Pub. Date: Sep. 21, 2006

(65) Prior Publication Data

US 2009/0002585 A1 Jan. 1, 2009

(30) Foreign Application Priority Data

Mar. 18, 2005 (JP) ............................ 2005-080761

(51) Int. Cl.
*G02F 1/1343* (2006.01)

(52) U.S. Cl. ............................ 349/39; 349/38; 349/41; 349/139; 349/144

(58) Field of Classification Search .................. 349/38, 349/39, 41, 56, 77, 81, 82, 83, 108, 138, 349/139, 143, 144; 345/103

See application file for complete search history.

(56) References Cited

U.S. PATENT DOCUMENTS 4,345,249 A 8/1982 Togashi ...................... 340/784
5,610,739 A 3/1997 Uno et al. ..................... 349/39
6,229,516 B1 * 5/2001 Kim et al. ................... 345/103
6,724,452 B1 4/2004 Takeda et al. ............... 349/139
6,958,791 B2 10/2005 Shimoshikiryo ............. 349/85
7,079,214 B2 * 7/2006 Shimoshikiryo ............ 349/144

(Continued)

FOREIGN PATENT DOCUMENTS

JP 02-184816 7/1990 ............... 349/39 X (Continued)

OTHER PUBLICATIONS

Japanese Patent Gazette for Opposition 63-21907, published May 10, 1988.

*Primary Examiner*—Brian M Healy
(74) *Attorney, Agent, or Firm*—Harness, Dickey & Pierce, P.L.C.

(57) ABSTRACT

In one embodiment of the present invention, a large-screen or high-definition LCD is provided with its display quality improved significantly by reducing the viewing angle dependence of γ characteristic. Each pixel includes first and second subpixels, to which different voltages are applicable. The device further includes electrically independent storage capacitor trunks, each of which is electrically connected to the respective storage capacitor counter electrodes of either the first or second subpixels through storage capacitor lines. The pixels include pixels belonging to a first display area and pixels belonging to a second display area. The first and second display areas can be scanned independently of each other. And the storage capacitor trunks include a first storage capacitor trunk belonging to the first display area and a second storage capacitor trunk belonging to the second display area.

20 Claims, 112 Drawing Sheets

U.S. PATENT DOCUMENTS

| | | | | |
|---|---|---|---|---|
| 2001/0006410 | A1 | 7/2001 | Yamada et al. | 349/178 |
| 2001/0024257 | A1 | 9/2001 | Kubo et al. | 349/178 |
| 2003/0227429 | A1* | 12/2003 | Shimoshikiryo | 345/90 |
| 2003/0234904 | A1 | 12/2003 | Matsuda et al. | 349/152 |
| 2004/0001167 | A1 | 1/2004 | Takeuchi et al. | 349/38 |
| 2004/0196254 | A1 | 10/2004 | Mizumaki | 345/103 |
| 2004/0246216 | A1 | 12/2004 | Hosaka | 345/87 |
| 2005/0122441 | A1 | 6/2005 | Shimoshikiryoh | 349/38 |
| 2005/0162360 | A1 | 7/2005 | Ishihara et al. | 345/89 |
| 2005/0184944 | A1 | 8/2005 | Miyata et al. | 345/89 |
| 2008/0106657 | A1* | 5/2008 | Kitayama et al. | 349/37 |
| 2009/0002585 | A1* | 1/2009 | Shimoshikiryoh et al. | 349/39 |

FOREIGN PATENT DOCUMENTS

| | | | |
|---|---|---|---|
| JP | 8-201777 | 8/1996 | 349/39 X |
| JP | 10-048595 | 2/1998 | 349/39 X |
| JP | 10-186330 | 7/1998 | 349/39 X |
| JP | 11-24225 | 9/1999 | 349/39 X |
| JP | 2000-206492 | 7/2000 | 349/39 X |
| JP | 2002-055343 | 2/2002 | 349/39 X |
| JP | 2004-021069 | 1/2004 | 349/39 X |
| JP | 2004-062146 | 2/2004 | 349/39 X |
| JP | 2004-078157 | 3/2004 | 349/39 X |
| JP | 2004-117707 | 4/2004 | 349/39 X |
| JP | 2004-309657 | 11/2004 | 349/39 X |
| JP | 2004-317785 | 11/2004 | 349/39 X |
| JP | 2005-173573 | 6/2005 | 349/39 X |
| JP | 2005-189804 | 7/2005 | 349/39 X |
| JP | 2005-234552 | 9/2005 | 349/39 X |
| JP | 2005-250085 | 9/2005 | 349/39 X |
| JP | 2006-039130 | 2/2006 | 349/39 X |

* cited by examiner (a)

(b)

FIRST APPROXIMATION CIRCUIT OF
CS BUSLINE LOAD IMPEDANCE: CR LOW PASS FILTER

CS-PIXEL CONNECTION TYPE I

V-Total:803 V-Disp:768 CS 10 PHASES

■EXAMPLE #2 OF CS SIGNAL PROCESSING TO ALLOCATE H AND L LEVELS EVENLY

■EXAMPLE #3 OF CS SIGNAL PROCESSING TO ALLOCATE H AND L LEVELS EVENLY

■EXAMPLE #4 OF CS SIGNAL PROCESSING TO ALLOCATE H AND L LEVELS EVENLY

CS-PIXEL CONNECTION TYPE II

■EXAMPLE #4 OF CS SIGNAL PROCESSING TO ALLOCATE H AND L LEVELS EVENLY

CS-PIXEL CONNECTION Type II

V-Total:803 V-Disp:768 CS 10 PHASES

CS-PIXEL CONNECTION Type II

LIQUID CRYSTAL DISPLAY DEVICE

TECHNICAL FIELD

The present invention relates to a liquid crystal display device and a method for driving the device. More particularly, the present invention relates to a structure that can reduce the viewing angle dependence of the γ characteristic of a liquid crystal display device and a method for driving such a structure.

BACKGROUND ART

A liquid crystal display (LCD) is a flat-panel display that has a number of advantageous features including high resolution, drastically reduced thickness and weight, and low power dissipation. The LCD market has been rapidly expanding recently as a result of tremendous improvements in its display performance, significant increases in its productivity, and a noticeable rise in its cost effectiveness over competing technologies.

A twisted-nematic (TN) mode liquid crystal display device, which used to be used extensively in the past, is subjected to an alignment treatment such that the major axes of its liquid crystal molecules, exhibiting positive dielectric anisotropy, are substantially parallel to the respective principal surfaces of upper and lower substrates and are twisted by about 90 degrees in the thickness direction of the liquid crystal layer between the upper and lower substrates. When a voltage is applied to the liquid crystal layer, the liquid crystal molecules change their orientation directions into a direction that is parallel to the electric field applied. As a result, the twisted orientation disappears. The TN mode liquid crystal display device utilizes variation in the optical rotatory characteristic of its liquid crystal layer due to the change of orientation directions of the liquid crystal molecules in response to the voltage applied, thereby controlling the quantity of light transmitted.

The TN mode liquid crystal display device allows a broad enough manufacturing margin and achieves high productivity. However, the display performance (e.g., the viewing angle characteristic, in particular) thereof is not fully satisfactory. More specifically, when an image on the screen of the TN mode liquid crystal display device is viewed obliquely, the contrast ratio of the image decreases significantly. In that case, even an image, of which the grayscales ranging from black to white are clearly observable when the image is viewed straightforward, loses much of the difference in luminance between those grayscales when viewed obliquely. Furthermore, the grayscale characteristic of the image being displayed thereon may sometimes invert itself. That is to say, a portion of an image, which looks darker when viewed straight, may look brighter when viewed obliquely. This is a so-called "grayscale inversion phenomenon".

To improve the viewing angle characteristic of such a TN mode liquid crystal display device, an inplane switching (IPS) mode liquid crystal display device (see Patent Document No. 1), a multi-domain vertical aligned (MVA) mode liquid crystal display device (see Patent Document No. 2), an axisymmetric aligned (ASM) mode liquid crystal display device (see Patent Document No. 3), and a liquid crystal display device disclosed in Patent Document No. 4 were developed recently.

All of these were developed relatively recently as TN mode liquid crystal display devices with improved viewing angle characteristics. In a liquid crystal display device operating in each of these newly developed wide viewing angle modes, even when an image on the screen is viewed obliquely, the contrast ratio never decreases significantly or the grayscales never invert unlike the old-fashioned TN mode liquid crystal display devices.

Although the display qualities of LCDs have been further improved nowadays, a viewing angle characteristic problem in a different phase has surfaced just recently. Specifically, the γ characteristic of LCDs would vary with the viewing angle. That is to say, the γ characteristic when an image on the screen is viewed straight is different from the characteristic when it is viewed obliquely. As used herein, the "γ characteristic" refers to the grayscale dependence of display luminance. That is why if the γ characteristic when the image is viewed straight is different from the characteristic when the same image is viewed obliquely, then it means that the grayscale display state changes according to the viewing direction. This is a serious problem particularly when a still picture such as a photo is presented or when a TV program is displayed.

The viewing angle dependence of the γ characteristic is more significant in the MVA and ASM modes rather than in the IPS mode. According to the IPS mode, however, it is more difficult to make panels that realize a high contrast ratio when the image on the screen is viewed straight with good productivity rather than in the MVA and ASM modes. Taking these circumstances into consideration, it is particularly necessary to reduce the viewing angle dependence of the γ characteristic of MVA and ASM mode liquid crystal display devices, among other things.

To overcome such a problem, the applicant of the present application disclosed a liquid crystal display device that can reduce the viewing angle dependence of the γ characteristic (or an excessively high contrast ratio of white portions of an image, among other things) by dividing a single pixel into a number of subpixels, and a method for driving such a device. Such a display or drive mode will sometimes be referred to herein as "area-grayscale display", "area-grayscale drive", "multi-pixel display" or "multi-pixel drive".

Patent Document No. 5 discloses a liquid crystal display device in which storage capacitors Cs are provided for respective subpixels SP of a single pixel P. In the storage capacitors, the storage capacitor counter electrodes (which are connected to CS bus lines) are electrically independent of each other between the subpixels. And by varying the voltages applied to the storage capacitor counter electrodes (which will be referred to herein as "storage capacitor counter voltages"), mutually different effective voltages can be applied to the respective liquid crystal layers of multiple subpixels by utilizing a capacitance division technique.

Hereinafter, the pixel division structure of the liquid crystal display device 200 disclosed in Patent Document No. 5 will be described with reference to FIG. 73.

The pixel 10 is split into a subpixel 10*a* and another subpixel 10*b*. To the subpixels 10*a* and 10*b*, connected are their associated TFTs 16*a* and 16*b* and their associated storage capacitors (CS) 22*a* and 22*b*, respectively. The gate electrodes of the TFTs 16*a* and 16*b* are both connected to the same scan line 12. And the source electrodes of the TFTs 16*a* and 16*b* are connected to the same signal line 14. The storage capacitors 22*a* and 22*b* are connected to their associated storage capacitor lines (CS bus lines) 24*a* and 24*b*, respectively. The storage capacitor 22*a* includes a storage capacitor electrode that is electrically connected to the subpixel electrode 18*a*, a storage capacitor counter electrode that is electrically connected to the storage capacitor line 24*a*, and an insulating layer (not shown) arranged between the electrodes. The storage capacitor 22*b* includes a storage capacitor electrode that is electrically connected to the subpixel electrode 18*b*, a storage capacitor counter electrode that is electrically connected to the storage capacitor line 24*b*, and an insulating layer (not shown) arranged between the electrodes. The respective storage capacitor counter electrodes of the storage capacitors 22*a* and 22*b* are independent of each other and have such a structure as receiving mutually different storage capacitor counter voltages from the storage capacitor lines 24*a* and 24*b*, respectively.

Hereinafter, the principle on which mutually different effective voltages can be applied to the respective liquid crystal layers of the two subpixels 10*a* and 10*b* of the liquid crystal display device 200 will be described with reference to the accompanying drawings.

FIG. 74 schematically shows the equivalent circuit of one pixel of the liquid crystal display device 200. In this electrical equivalent circuit, the liquid crystal layers of the subpixels 10*a* and 10*b* are identified by the reference numerals 13*a* and 13*b*, respectively. A liquid crystal capacitor formed by the subpixel electrode 18*a*, the liquid crystal layer 13*a*, and the counter electrode 17 will be identified by Clca. On the other hand, a liquid crystal capacitor formed by the subpixel electrode 18*b*, the liquid crystal layer 13*b*, and the counter electrode 17 will be identified by Clcb. The same counter electrode 17 is shared by these two subpixels 10*a* and 10*b*.

The liquid crystal capacitors Clca and Clcb are supposed to have the same electrostatic capacitance CLC (V). The value of CLC (V) depends on the effective voltages (V) applied to the liquid crystal layers of the respective subpixels 10*a* and 10*b*. Also, the storage capacitors 22*a* and 22*b* that are connected independently of each other to the liquid crystal capacitors of the respective subpixels 10*a* and 10*b* will be identified herein by Ccsa and Ccsb, respectively, which are supposed to have the same electrostatic capacitance CCS.

In the subpixel 10*a*, one electrode of the liquid crystal capacitor Clca and one electrode of the storage capacitor Ccsa are connected to the drain electrode of the TFT 16*a*, which is provided to drive the subpixel 10*a*. The other electrode of the liquid crystal capacitor Clca is connected to the counter electrode. And the other electrode of the storage capacitor Ccsa is connected to the storage capacitor line 24*a*. In the subpixel 10*b*, one electrode of the liquid crystal capacitor Clcb and one electrode of the storage capacitor Ccsb are connected to the drain electrode of the TFT 16*b*, which is provided to drive the subpixel 10*b*. The other electrode of the liquid crystal capacitor Clcb is connected to the counter electrode. And the other electrode of the storage capacitor Ccsb is connected to the storage capacitor line 24*b*. The gate electrodes of the TFTs 16*a* and 16*b* are both connected to the scan line 12 and the source electrodes thereof are both connected to the signal line 14.

Portions (a) through (f) of FIG. 75 schematically show the timings of respective voltages that are applied to drive the liquid crystal display device 200.

Specifically, portion (a) of FIG. 75 shows the voltage waveform Vs of the signal line 14; portion (b) of FIG. 75 shows the voltage waveform Vcsa of the storage capacitor line 24*a*; portion (c) of FIG. 75 shows the voltage waveform Vcsb of the storage capacitor line 24*b*; portion (d) of FIG. 75 shows the voltage waveform Vg of the scan line 12; portion (e) of FIG. 75 shows the voltage waveform Vlca of the pixel electrode 18*a* of the subpixel 10*a*; and portion (f) of FIG. 75 shows the voltage waveform Vlcb of the pixel electrode 18*b* of the subpixel 10*b*. In FIG. 75, the dashed line indicates the voltage waveform COMMON (Vcom) of the counter electrode 17.

Hereinafter, it will be described with reference to portions (a) through (f) of FIG. 75 how the equivalent circuit shown in FIG. 74 operates.

First, at a time T1, the voltage Vg rises from VgL to VgH to turn the TFTs 16*a* and 16*b* ON simultaneously. As a result, the voltage Vs on the signal line 14 is transmitted to the subpixel electrodes 18*a* and 18*b* of the subpixels 10*a* and 10*b* to charge the subpixels 10*a* and 10*b* with the voltage Vs. In the same way, the storage capacitors Csa and Csb of the respective subpixels are also charged with the voltage on the signal line.

Next, at a time T2, the voltage Vg on the scan line 12 falls from VgH to VgL to turn the TFTs 16*a* and 16*b* OFF simultaneously and electrically isolate the subpixels 10*a* and 10*b* and the storage capacitors Csa and Csb from the signal line 14. It should be noted that immediately after that, due to the feedthrough phenomenon caused by a parasitic capacitance of the TFTs 16*a* and 16*b*, for example, the voltages Vlca and Vlcb applied to the respective subpixel electrodes decrease by approximately the same voltage Vd to:

$$Vlca=Vs-Vd$$

$$Vlcb=Vs-Vd$$

respectively. Also, in this case, the voltages Vcsa and Vcsb on the storage capacitor lines are:

$$Vcsa=Vcom-Vad$$

$$Vcsb=Vcom+Vad$$

respectively.

Next, at a time T3, the voltage Vcsa on the storage capacitor line 24*a* connected to the storage capacitor Csa rises from Vcom−Vad to Vcom+Vad and the voltage Vcsb on the storage capacitor line 24*b* connected to the storage capacitor Csb falls from Vcom+Vad to Vcom−Vad. That is to say, these voltages Vcsa and Vcsb both change twice as much as Vad. As the voltages on the storage capacitor lines 24*a* and 24*b* change in this manner, the voltages Vlca and Vlcb applied to the respective subpixel electrodes change into:

$$Vlca=Vs-Vd+2\times Kc\times Vad$$

$$Vlcb=Vs-Vd-2\times Kc\times Vad$$

respectively, where Kc=CCS/(CLC(V)+CCS).

Next, at a time T4, Vcsa falls from Vcom+Vad to Vcom−Vad and Vcsb rises from Vcom−Vad to Vcom+Vad. That is to say, these voltages Vcsa and Vcsb both change twice as much as Vad again. In this case, Vlca and Vlcb also change from $$Vlca=Vs-Vd+2\times Kc\times Vad$$

$$Vlcb=Vs-Vd-2\times Kc\times Vad$$

into $$Vlca=Vs-Vd$$

$$Vlcb=Vs-Vd$$

respectively.

Next, at a time T5, Vcsa rises from Vcom−Vad to Vcom+Vad and Vcsb falls from Vcom+Vad to Vcom−Vad. That is to say, these voltages Vcsa and Vcsb both change twice as much as Vad again. In this case, Vlca and Vlcb also change from $$Vlca=Vs-Vd$$

$$Vlcb=Vs-Vd$$

into $$Vlca=Vs-Vd+2\times Kc\times Vad$$

$$Vlcb=Vs-Vd-2\times Kc\times Vad$$

respectively.

After that, every time a period of time that is an integral number of times as long as one horizontal scanning period (or one horizontal write period) 1 H has passed, the voltages Vcsa, Vcsb, Vlca and Vlcb alternate their levels at the times T4 and T5. Consequently, the effective values of the voltages Vlca and Vlcb applied to the subpixel electrodes become:

$$Vlca=Vs-Vd+Kc\times Vad$$

$$Vlcb=Vs-Vd-Kc\times Vad$$

respectively.

Therefore, the effective voltages V1 and V2 applied to the liquid crystal layers 13_a_ and 13_b_ of the subpixels 10_a_ and 10_b_ become:

$$V1=Vlca-Vcom$$

$$V2=Vlcb-Vcom$$

That is to say, $$V1=Vs-Vd+Kc\times Vad-Vcom$$

$$V2=Vs-Vd-Kc\times Vad-Vcom$$

respectively.

As a result, the difference ΔV12 (=V1−V2) between the effective voltages applied to the liquid crystal layers 13_a_ and 13_b_ of the subpixels 10_a_ and 10_b_ becomes ΔV12=22×Kc×Vad (where Kc=CCS/(CLC(V)+CCS)). Thus, mutually different voltages can be applied to the liquid crystal layers 13_a_ and 13_b_.

FIG. 76 schematically shows the relation between V1 and V2. As can be seen from FIG. 76, the smaller the V1 value, the bigger ΔV12 in the liquid crystal display device 200. Since ΔV12 increases as the V1 value decreases in this manner, the excessively high contrast ratio can be reduced, among other things.

Patent Document No. 1: Japanese Patent Gazette for Opposition No. 63-21907

Patent Document No. 2: Japanese Patent Application Laid-Open Publication No. 11-242225

Patent Document No. 3: Japanese Patent Application Laid-Open Publication No. 10-186330

Patent Document No. 4: Japanese Patent Application Laid-Open Publication No. 2002-55343

Patent Document No. 5: Japanese Patent Application Laid-Open Publication No. 2004-62146 (corresponding to U.S. Pat. No. 6,958,791)

DISCLOSURE OF INVENTION

Problems to be Solved by the Invention

However, the present inventors discovered and confirmed via experiments that when the multi-pixel structure disclosed in Patent Document No. 5 was applied to either a high-definition LCD TV monitor or a large-screen LCD TV monitor, the viewing angle dependence of the Y characteristic could be certainly reduced but instead the following problem would arise. The entire disclosure of U.S. Pat. No. 6,958,791 is hereby incorporated by reference.

Specifically, if the oscillating voltage applied to the storage capacitor counter electrodes (through CS bus lines) has a short period of oscillation, then it would be increasingly difficult (and expensive) to make a circuit for generating the oscillating voltage, the power dissipation would increase too much, or the influence of waveform blunting due to the electrical impedance of the CS bus lines would be more and more significant. This is because as the definition or the size of a display panel increases, the oscillating voltage comes to have an even shorter period of oscillation. Furthermore, if a plurality of electrically independent CS trunks are arranged such that one period of oscillation of the oscillating voltage applied to the storage capacitor counter electrodes is extended so much as to overcome this problem, then it might debase the display quality as will be described later.

In order to overcome the problems described above, the present invention has an object of providing a liquid crystal display device and its driving method that can avoid the deterioration in display quality even if the oscillating voltage supplied to the CS bus lines has an extended period of oscillation when the area ratio gray scale display technology is applied to a large-screen or high-definition LCD panel.

Means for Solving the Problems

A liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. The first subpixel has higher luminance than the second subpixel at a particular gray scale. Each of the first and second subpixels includes: a liquid crystal capacitor formed by a counter electrode and a subpixel electrode that faces the counter electrode through the liquid crystal layer; and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other.

The storage capacitor counter electrode of the first subpixel of an arbitrary one of the pixels and the storage capacitor counter electrode of the second subpixel of a pixel that is adjacent to the arbitrary pixel in a column direction are also electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. A storage capacitor counter voltage supplied through each storage capacitor trunk has a first period (A) with a first waveform and a second period (B) with a second waveform within one vertical scanning period (V-Total) of an input video signal. The sum of the first and second periods is equal to one vertical scanning period (V-Total=A+B). The first waveform oscillates between first and second voltage levels in a first cycle time $P_A$, which is an integral number of times as long as, and at least twice as long as, one horizontal scanning period (H). The second waveform is defined such that the effective value of the storage capacitor counter voltage has a predetermined constant value every predetermined number of consecutive vertical scanning periods, the number being equal to or smaller than 20.

In one preferred embodiment, the predetermined number of vertical scanning periods is equal to or smaller than four.

In another preferred embodiment, the predetermined constant value is equal to the average of the first and second voltage levels of the first waveform.

In still another preferred embodiment, the storage capacitor trunks include an even number L of electrically independent storage capacitor trunks. The first cycle time $P_A$ is either L times (=L·H), or 2·K·L times, as long as one horizontal scanning period, where K is a positive integer. And a part of the first cycle time at the first voltage level is as long as the other part of the first cycle time at the second voltage level.

In yet another preferred embodiment, the second waveform is defined such that the second waveform for one vertical scanning period has an effective value that is equal to the average of the first and second voltage levels.

In this particular preferred embodiment, the second waveform oscillates between third and fourth voltage levels in a second cycle time, which is a positive integral number of times as long as one horizontal scanning period.

In a specific preferred embodiment, the third voltage level is equal to the first voltage level and the fourth voltage level is equal to the second voltage level.

Alternatively or additionally, the second period is an even number of times as long as one horizontal scanning period, and a part of the second period at the third voltage level is as long as the other part of the second period at the fourth voltage level.

In an alternative preferred embodiment, the second period is an odd number of times as long as one horizontal scanning period. In the second period of one vertical scanning period, part of the second period at the third voltage level is shorter than the other part of the second period at the fourth voltage level by one horizontal scanning period. In the second period of the next vertical scanning period, part of the second period at the third voltage level is also shorter than the other part of the second period at the fourth voltage level by one horizontal scanning period.

In yet another preferred embodiment, the first period is a half-integral (an integer plus a half) number of times as long as the first cycle time.

In this particular preferred embodiment, if the pixels form a number N of pixel rows, an effective display period (V-Disp) is N times as long as one horizontal scanning period (if V-Disp=N·H), and the first cycle time is identified by $P_A$, the first period (A) satisfies $A=[\mathrm{Int}\{(N \cdot H-P_A/2)/P_A\}+½]\cdot P_A+M\cdot P_A$, where Int(x) is an integral part of an arbitrary real number x and M is an integer that is equal to or greater than zero.

In an alternative preferred embodiment, if one vertical scanning period (V-Total) is Q times as long as one horizontal scanning period (if V-Total=Q·H) where Q is a positive integer and if the first cycle time is identified by $P_A$, the first period (A) satisfies $A=[\mathrm{Int}\{(Q\cdot H-P_A/2)/P_A\}+½]\cdot P_A$, where Int(x) is an integral part of an arbitrary real number x.

Still alternatively, if one vertical scanning period (V-Total) is Q times as long as one horizontal scanning period (if V-Total=Q·H) where Q is a positive integer and if the first cycle time is identified by $P_A$, the first period (A) satisfies $A=[\mathrm{Int}\{(Q\cdot H-3-P_A/2)/P_A\}+½]\cdot P_A$, where Int(x) is an integral part of an arbitrary real number x.

In yet another preferred embodiment, the storage capacitor counter voltage has its phase shifted by 180 degrees every vertical scanning period.

In yet another preferred embodiment, the storage capacitor trunks are an even number of storage capacitor trunks, which consist of multiple pairs of storage capacitor trunks, each pair supplying storage capacitor counter voltages, of which the oscillating phases are different from each other by 180 degrees.

A TV receiver according to the present invention includes a liquid crystal display device according to any of the preferred embodiments of the present invention described above.

An LCD driving method according to the present invention is a method for driving a liquid crystal display device, which includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. The first subpixel has higher luminance than the second subpixel at a particular gray scale. Each of the first and second subpixels includes: a liquid crystal capacitor formed by a counter electrode and a subpixel electrode that faces the counter electrode through the liquid crystal layer; and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The storage capacitor counter electrode of the first subpixel of an arbitrary one of the pixels and the storage capacitor counter electrode of the second subpixel of a pixel that is adjacent to the arbitrary pixel in a column direction are also electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. The method includes the step of providing storage capacitor counter voltages for the respective storage capacitor trunks. The storage capacitor counter voltage has a first period (A) with a first waveform and a second period (B) with a second waveform within one vertical scanning period (V-Total) of an input video signal. The sum of the first and second periods is equal to one vertical scanning period (V-Total=A+B). The first waveform oscillates between first and second voltage levels in a first cycle time $P_A$, which is an integral number of times as long as, and at least twice as long as, one horizontal scanning period (H). The second waveform is defined such that the effective value of the storage capacitor counter voltage has a predetermined constant value every predetermined number of consecutive vertical scanning periods, the number being equal to or smaller than 20.

In one preferred embodiment, the electrically independent storage capacitor trunks include an even number L of storage capacitor trunks. The step of providing storage capacitor counter voltages includes the steps of: calculating an integer Q, the product (Q·H) of which and one horizontal scanning period H is equal to one vertical scanning period (V-Total) of an input video signal; calculating A that satisfies either $A=[\mathrm{Int}\{(N-L/2)/L\}+½]\cdot L\cdot H+M\cdot L\cdot H$ or $A=[\mathrm{Int}\{(N-K\cdot L)/(2\cdot K\cdot L)\}+½]\cdot 2\cdot K\cdot L\cdot H+2\cdot M\cdot K\cdot L\cdot H$ (where Int(x) is an integral part of an arbitrary real number x, K is a positive integer, and M is an integer that is equal to or greater than zero) if the pixels form a number N of pixel rows, one horizontal scanning period is identified by H, and an effective display period (V-Disp) is N·H; calculating B that satisfies Q·H−A=B; and generating a storage capacitor counter voltage that has a first waveform in a first period with a length A and a second waveform in a second period with a length B. The first waveform oscillates between first and second voltage levels in a first cycle time $P_A$, which is either L·H or 2·K·L·H. The second waveform oscillates between third and fourth voltage levels. The average of the third and fourth voltage levels is equal to that of the first and second voltage levels. If B/H is an even number, the third voltage level last as long as the fourth voltage level. If B/H is an odd number, the third voltage level lasts shorter than the fourth voltage level by one horizontal scanning period in a vertical scanning period. And in the second period of the next vertical scanning period, the third voltage level also lasts shorter than the fourth voltage level by one horizontal scanning period.

In another preferred embodiment, the electrically independent storage capacitor trunks include an even number L of storage capacitor trunks. The step of providing storage capacitor counter voltages includes the steps of: calculating an integer Q, the product (Q·H) of which and one horizontal scanning period H is equal to one vertical scanning period (V-Total) of an input video signal; calculating A that satisfies either $A=[\mathrm{Int}\{(Q-L/2)/L\}+½]\cdot L\cdot H$ or $A=[\mathrm{Int}\{(Q-K\cdot L)/(2\cdot K\cdot L)\}+½]\cdot 2\cdot K\cdot L\cdot H$ (where Int(x) is an integral part of an arbitrary real number x and K is a positive integer); calculating B that satisfies Q·H−A=B; and generating a storage capacitor counter voltage that has a first waveform in a first period with a length A and a second waveform in a second period with a length B. The first waveform oscillates between first and second voltage levels in a first cycle time $P_A$, which is either L·H or 2·K·L·H. The second waveform oscillates between third and fourth voltage levels. The average of the third and fourth voltage levels is equal to that of the first and second voltage levels. If B/H is an even number, the third voltage level last as long as the fourth voltage level. If B/H is an odd number, the third voltage level lasts shorter than the fourth voltage level by one horizontal scanning period in a vertical scanning period. And in the second period of the next vertical scanning period, the third voltage level also lasts shorter than the fourth voltage level by one horizontal scanning period.

In still another preferred embodiment, the electrically independent storage capacitor trunks include an even number L of storage capacitor trunks. The step of providing storage capacitor counter voltages includes the steps of: calculating an integer Q, the product (Q·H) of which and one horizontal scanning period H is equal to one vertical scanning period (V-Total) of an input video signal; calculating A that satisfies either $A=[\mathrm{Int}\{(Q-3\cdot L/2)/L\}+½]\cdot L$ or $A=[\mathrm{Int}\{(Q-3\cdot K\cdot L)/(2\cdot K\cdot L)\}+½]\cdot 2\cdot K\cdot L\cdot H$ (where Int(x) is an integral part of an arbitrary real number x and K is a positive integer); calculating B that satisfies Q·H−A=B; and generating a storage capacitor counter voltage that has a first waveform in a first period with a length A and a second waveform in a second period with a length B. The first waveform oscillates between first and second voltage levels in a first cycle time $P_A$, which is either L·H or 2·K·L·H. The second waveform oscillates between third and fourth voltage levels. The average of the third and fourth voltage levels is equal to that of the first and second voltage levels. If B/H is an even number, the third voltage level last as long as the fourth voltage level. If B/H is an odd number, the third voltage level lasts shorter than the fourth voltage level by one horizontal scanning period in a vertical scanning period. And in the second period of the next vertical scanning period, the third voltage level also lasts shorter than the fourth voltage level by one horizontal scanning period.

In yet another preferred embodiment, the storage capacitor counter voltage has its phase shifted by 180 degrees every vertical scanning period.

In yet another preferred embodiment, the step of calculating an integer Q, the product (Q·H) of which and one horizontal scanning period H is equal to one vertical scanning period (V-Total) of an input video signal is performed on the period before the previous vertical scanning period.

Another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. One vertical scanning period (V-Total) of an input video signal is divided into at least two subframes, in each of which a display signal voltage is written on each pixel. Two consecutive vertical scanning periods of the input video signal include a sequence in which the display signal voltage is written at the same polarity in two consecutive subframes and then has its polarity (which will also be referred to herein as "write polarity") inverted in the next subframe. A storage capacitor counter voltage supplied through each storage capacitor trunk has, in each subframe, a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal. And between two subframes in which the polarity is inverted, the first waveforms of the storage capacitor counter voltages have a phase difference of 180 degrees.

The sequence includes a situation where one vertical scanning period (which will also be referred to herein as "one frame") of an input video signal includes two or more subframes, the subframes of the same frame have the same write polarity but two consecutive frames have different sets of write polarities (e.g., (+, +)→(−, −) or (+, +, +)→(−, −, −)) and a situation where the subframes of the same frame have different write polarities and two consecutive frames also have different sets of write polarities (e.g., (+, −)→(−, +) or (+, −, +)→(−, +, −)).

In one preferred embodiment, every vertical scanning period of the input video signal, the polarity of the display signal voltage (which will also be referred to herein as "write polarity") inverts and the first waveform of the storage capacitor voltage has its phase shifted by 180 degrees.

In another preferred embodiment, every vertical scanning period of the input video signal, the display signal voltage inverts its polarity. Every subframe in each vertical scanning period of the input video signal, the display signal voltage inverts its polarity and the first waveform of the storage capacitor counter voltage has its phase shifted by 180 degrees.

In still another preferred embodiment, if each vertical scanning period (V-Total) of the input video signal is represented as the sum of an effective display period (V-Disp) and a vertical blanking interval (V-Blank); and if each vertical scanning period of the input video signal is represented as the sum of a first subframe ($V_P$-Total (SF1)) and a second subframe ($V_P$-Total (SF2)); and if the first subframe ($V_P$-Total (SF1)) is represented as the sum of an effective display period ($V_P$-Disp (SF1)) and a vertical blanking interval ($V_P$-Blank (SF1)); and if the second subframe ($V_P$-Total (SF2)) is represented as the sum of an effective display period ($V_P$-Disp (SF2)) and a vertical blanking interval ($V_P$-Blank (SF2)), then V-Blank/2=$V_P$-Blank (SF1)=$V_P$-Blank (SF2) is satisfied.

In this particular preferred embodiment, the first subframe ($V_P$-Total (SF1)) is represented as the sum of a first period A1 with the first waveform and a period B1 with the second waveform. The second subframe ($V_P$-Total (SF2)) is represented as the sum of a first period A2 with the first waveform and a period B2 with the second waveform. And A1−A2=$P_A$/2 and B2−B1=$P_A$/2 are satisfied.

In still another preferred embodiment, if each vertical scanning period (V-Total) of the input video signal is represented as the sum of an effective display period (V-Disp) and a vertical blanking interval (V-Blank); and if each vertical scanning period of the input video signal is represented as the sum of a first subframe ($V_P$-Total (SF1)) and a second subframe ($V_P$-Total (SF2)); and if the first subframe ($V_P$-Total (SF1)) is represented as the sum of an effective display period ($V_P$-Disp (SF1)) and a vertical blanking interval ($V_P$-Blank (SF1)); and if the second subframe ($V_P$-Total (SF2)) is represented as the sum of an effective display period ($V_P$-Disp (SF2)) and a vertical blanking interval ($V_P$-Blank (SF2)), then the first subframe ($V_P$-Total (SF1)) is an integral number of times as long as the first cycle time.

In yet another preferred embodiment, if each vertical scanning period (V-Total) of the input video signal is represented as the sum of an effective display period (V-Disp) and a vertical blanking interval (V-Blank); and if each vertical scanning period of the input video signal is represented as the sum of a first subframe ($V_P$-Total (SF1)) and a second subframe ($V_P$-Total (SF2)); and if the first subframe ($V_P$-Total (SF1)) is represented as the sum of an effective display period ($V_P$-Disp (SF1)) and a vertical blanking interval ($V_P$-Blank (SF1)); and if the second subframe ($V_P$-Total (SF2)) is represented as the sum of an effective display period ($V_P$-Disp (SF2)) and a vertical blanking interval ($V_P$-Blank (SF2)), then the first subframe ($V_P$-Total (SF1)) is a half-integral number of times as long as the first cycle time.

In yet another preferred embodiment, the second waveform includes a waveform that oscillates between first and second levels in a cycle time that is equal to or shorter than one horizontal scanning period (1H). Or the second waveform includes a waveform that oscillates between first and second levels in a cycle time that is an integral number of times as short as one horizontal scanning period.

In yet another preferred embodiment, the storage capacitor trunks include an even number L of electrically independent storage capacitor trunks. The first cycle time $P_A$ is either L times (=L·H), or 2·K·L times, as long as one horizontal scanning period, where K is a positive integer. And a part of the first cycle time at the first voltage level is as long as the other part of the first cycle time at the second voltage level.

In yet another preferred embodiment, the storage capacitor trunks are an even number of storage capacitor trunks, which consist of multiple pairs of storage capacitor trunks, each pair supplying storage capacitor counter voltages, of which the oscillating phases are different from each other by 180 degrees.

In yet another preferred embodiment, if each vertical scanning period (V-Total) of the input video signal is represented as the sum of an effective display period (V-Disp) and a vertical blanking interval (V-Blank); and if each vertical scanning period of the input video signal is represented as the sum of a first subframe ($V_P$-Total (SF1)) and a second subframe ($V_P$-Total (SF2)); and if the luminance of the input video signal represents a half scale tone, then the display signal voltages applied to the pixel in the first and second subframes, respectively, are defined such that the average of the display luminances of the first and second subframes is equal to the luminance of the input video signal and that the respective display luminances of the first and second subframes are different from the luminance of the input video signal to mutually different degrees. The difference between the display luminances of the first and second subframes is preferably maximized.

In this particular preferred embodiment, in each vertical scanning period of the input video signal, the first subframe is anterior to the second subframe, and the display luminance of the first subframe is smaller than that of the second subframe.

In yet another preferred embodiment, the pixels include pixels belonging to a first display area and pixels belonging to a second display area. The first and second display areas are able to be scanned independently of each other. The storage capacitor trunks include a first storage capacitor trunk belonging to the first display area and a second storage capacitor trunk belonging to the second display area. Typically, the display area is divided into upper and lower halves. In that case, the number of storage capacitor trunks belonging to the upper display area is different by one from that of storage capacitor trunks belonging to the lower display area.

In this particular preferred embodiment, the phases of the respective first waveforms of the storage capacitor counter voltages supplied through the first and second storage capacitor trunks shift by 180 degrees at mutually different times.

Another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. The pixels include pixels belonging to a first display area and pixels belonging to a second display area. The first and second display areas are able to be scanned independently of each other. The storage capacitor trunks include a first group of storage capacitor trunks belonging to the first display area and a second group of storage capacitor trunks belonging to the second display area.

In one preferred embodiment, the storage capacitor trunks include a storage capacitor trunk that is electrically connected to both the pixels belonging to the first display area and the pixels belonging to the second display area.

In another preferred embodiment, a voltage applied to an arbitrary one of the storage capacitor trunks of the first group and a voltage applied to an arbitrary one of the storage capacitor trunks of the second group are voltages with the same waveform but different phases.

In this particular preferred embodiment, a phase difference between the waveform of the voltage applied to the arbitrary one of the storage capacitor trunks of the first group and that of the voltage applied to the arbitrary one of the storage capacitor trunks of the second group is greater than one horizontal scanning period but smaller than one vertical scanning period (V-Total) of a video signal.

Still another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. The storage capacitor counter voltage supplied through each of the storage capacitor trunks is generated by repeatedly combining first and second groups of rectangular waves a number of times. Each of those two groups of rectangular waves consists of multiple rectangular waves that are represented by first and second voltage levels and that have multiple cycle times. Each of the first group of rectangular waves (WI) and the second group of rectangular waves (WII) has a first period (WIA or WIIA) and a second period (WIB or WIIB). In the first period (WIA or WIIA), write scanning is performed on each pixel. The pixels include pixels belonging to a first display area and pixels belonging to a second display area. The first and second display areas are able to be scanned independently of each other. The storage capacitor trunks include a first storage capacitor trunk belonging to the first display area and a second storage capacitor trunk belonging to the second display area. The first period (WIA or WIIA) of the storage capacitor counter voltage supplied to the first storage capacitor trunk is a period in which the first display area is scanned. The first period (WIA or WIIA) of the storage capacitor counter voltage supplied to the second storage capacitor trunk is a period in which the second display area is scanned. The polarity of a display signal voltage written on the respective pixels being scanned during the first period of the first group of rectangular waves is different from that of a display signal voltage written on the respective pixels being scanned during the first period of the second group of rectangular waves. The waveform of the second group of rectangular waves during the first period is produced by changing the first voltage level of the waveform of the first group of rectangular waves during the first period into the second voltage level thereof and the second voltage level into the first voltage level. And a time at which the first and second groups of rectangular waves of a first storage capacitor counter voltage supplied through a first storage capacitor trunk are combined together is different from a time at which the first and second groups of rectangular waves of a second storage capacitor counter voltage supplied through a second storage capacitor trunk are combined together.

In one preferred embodiment, in a first group of storage capacitor counter voltages supplied through the first group of storage capacitor trunks, the first and second groups of rectangular waves are combined together all at the same time. In a second group of storage capacitor counter voltages supplied through the second group of storage capacitor trunks, the first and second groups of rectangular waves are also combined together all at the same time.

In another preferred embodiment, if a vertical scanning period on the first display area is $V_P$-Total (SFU) and if a vertical scanning period on the second display area is $V_P$-Total (SFL), one vertical scanning period (V-Total) of an input video signal satisfies V-Total=$V_P$-Total (SFU)=$V_P$-Total (SFL).

In still another preferred embodiment, each of the first and second groups of rectangular waves is as long as one vertical scanning period (V-Total) of the input video signal.

In yet another preferred embodiment, the liquid crystal display device presents a first subframe ($V_P$-Total (SF1)) and a second subframe ($V_P$-Total (SF2)) during one vertical scanning period (V-Total) of the input video signal. Supposing one vertical scanning period on the first display area in the first subframe is identified by $V_P$-Total (SFU1), one vertical scanning period on the second display area in the first subframe is identified by $V_P$-Total (SFL1), one vertical scanning period on the first display area in the second subframe is identified by $V_P$-Total (SFU2), and one vertical scanning period on the second display area in the second subframe is identified by $V_P$-Total (SFL2), $V_P$-Total (SF1)=$V_P$-Total (SFU1)=$V_P$-Total (SFL1) and $V_P$-Total (SF2)=$V_P$-Total (SFU2)=$V_P$-Total (SFL2) are satisfied, the first group of rectangular waves is as long as $V_P$-Total (SF1) and the second group of rectangular waves is as long as $V_P$-Total (SF2).

In yet another preferred embodiment, the liquid crystal display device presents a first subframe ($V_P$-Total (SF1)) and a second subframe ($V_P$-Total (SF2)) during one vertical scanning period (V-Total) of the input video signal. Supposing one vertical scanning period on the first display area in the first subframe is identified by $V_P$-Total (SFU1), one vertical scanning period on the second display area in the first subframe is identified by $V_P$-Total (SFL1), one vertical scanning period on the first display area in the second subframe is identified by $V_P$-Total (SFU2), and one vertical scanning period on the second display area in the second subframe is identified by $V_P$-Total (SFL2), $V_P$-Total (SF1)=$V_P$-Total (SFU1)=$V_P$-Total (SFL1) and $V_P$-Total (SF2)=$V_P$-Total (SFU2)=$V_P$-Total (SFL2) are satisfied, and each of the first and second groups of rectangular waves is as long as V-Total and includes two first periods.

Yet another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. The pixels include pixels belonging to a first display area and pixels belonging to a second display area. The first and second display areas are able to be scanned independently of each other. The storage capacitor trunks include a first storage capacitor trunk belonging to the first display area and a second storage capacitor trunk belonging to the second display area. A first storage capacitor voltage is supplied to the first storage capacitor trunk and a second storage capacitor voltage is supplied to the second storage capacitor trunk. The liquid crystal display device presents a first subframe ($V_P$-Total (SF1)) and a second subframe ($V_P$-Total (SF2)) during one vertical scanning period (V-Total) of an input video signal. Each of the first and second storage capacitor voltages has a first period (A) with a first waveform and a second period (B) with a second waveform in each of the first and second subframes ($V_P$-Total (SF1)) and ($V_P$-Total (SF2)). The sum of the first and second periods is as long as either the first subframe ($V_P$-Total (SF1)) or the second subframe ($V_P$-Total (SF2)). The first waveform oscillates between first and second voltage levels in a first cycle time $P_A$, which is an integral number of times as long as, and at least twice as long as, one horizontal scanning period (H). And the second waveform is defined so as to have a predetermined effective value every vertical scanning period (V-Total).

In one preferred embodiment, the second waveform includes a waveform that oscillates between the first and second levels in a cycle time that is equal to or shorter than one horizontal scanning period (1H). The second waveform includes a waveform that oscillates between the first and second levels in a cycle time that is an integral number of times as short as one horizontal scanning period.

In another preferred embodiment, if one vertical scanning period (V-Total) of the input video signal is represented as the sum of the first and second subframes ($V_P$-Total (SF1)) and ($V_P$-Total (SF2)) and if the luminance of the input video signal is a half scale tone, display signal voltages applied to the pixel in the first and second subframes are defined such that the average of the display luminances in the first and second subframes is equal to the luminance of the input video signal and that the first and second subframes have mutually different display luminances.

In still another preferred embodiment, in each vertical scanning period of the input video signal, the first subframe is located anterior to the second subframe and the display luminance in the first subframe is smaller than that in the second subframe.

Yet another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. One vertical scanning period (V-Total) of an input video signal is divided into at least two subframes, in each of which a display signal voltage is written on each pixel. Two consecutive vertical scanning periods of the input video signal include a sequence in which the display signal voltage is written at the same polarity in two consecutive subframes and then has its polarity inverted in the next subframe. A storage capacitor counter voltage supplied through each storage capacitor trunk has, in each subframe, a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal. And between two subframes in which the polarity is inverted, the first waveforms of the storage capacitor counter voltages have a phase difference of 180 degrees. The pixels include pixels belonging to a first display area and pixels belonging to a second display area. The first and second display areas are able to be scanned independently of each other. The storage capacitor trunks include a first storage capacitor trunk belonging to the first display area and a second storage capacitor trunk belonging to the second display area. The phases of the respective first waveforms of the first and second storage capacitor counter voltages supplied through the first and second storage capacitor trunks shift by 180 degrees at mutually different times.

In one preferred embodiment, in a first group of storage capacitor counter voltages supplied through the first group of storage capacitor trunks, the phases of the respective first waveforms shift by 180 degrees all at the same time. In a second group of storage capacitor counter voltages supplied through the second group of storage capacitor trunks, the phases of the respective first waveforms also shift by 180 degrees all at the same time.

In another preferred embodiment, if a vertical scanning period on the first display area is $V_P$-Total (SFU) and if a vertical scanning period on the second display area is $V_P$-Total (SFL), one vertical scanning period (V-Total) of an input video signal satisfies V-Total=$V_P$-Total (SFU)=$V_P$-Total (SFL).

Yet another liquid crystal display device according to the present invention includes a plurality of pixels that are arranged in columns and rows so as to form a matrix pattern. Each pixel includes a liquid crystal layer and a plurality of electrodes for applying a voltage to the liquid crystal layer. Each pixel includes a first subpixel and a second subpixel, having liquid crystal layers to which mutually different voltages are applicable. Each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels, while the storage capacitor counter electrodes of the first and second subpixels are electrically independent of each other. The device further includes a plurality of electrically independent storage capacitor trunks. Each storage capacitor trunk is electrically connected to the respective storage capacitor counter electrodes of either the first subpixels or the second subpixels of the pixels through storage capacitor lines. Every vertical scanning period (V-Total) of an input video signal has a sequence in which the display signal voltage has its polarity inverted. A storage capacitor counter voltage supplied through each storage capacitor trunk has, in each vertical scanning period (V-Total), a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal. As the polarity inverts, the first waveform of the storage capacitor counter voltage has a phase difference of 180 degrees. The pixels include pixels belonging to a first display area and pixels belonging to a second display area. The first and second display areas are able to be scanned independently of each other. The storage capacitor trunks include a first storage capacitor trunk belonging to the first display area and a second storage capacitor trunk belonging to the second display area. The phases of the respective first waveforms of the first and second storage capacitor counter voltages supplied through the first and second storage capacitor trunks shift by 180 degrees at mutually different times.

In one preferred embodiment, in a first group of storage capacitor counter voltages supplied through the first group of storage capacitor trunks, the phases of the respective first waveforms shift by 180 degrees all at the same time. In a second group of storage capacitor counter voltages supplied through the second group of storage capacitor trunks, the phases of the respective first waveforms also shift by 180 degrees all at the same time.

EFFECTS OF THE INVENTION

The present invention provides a liquid crystal display device and its driving method that can avoid the deterioration in display quality even if the oscillating voltage supplied to CS bus lines has an extended period of oscillation particularly when the area ratio gray scale display technology is applied to a large-screen or high-resolution LCD panel. Even when a so-called higher-speed drive method, a panel division drive method or a combination thereof is adopted, the display quality of the liquid crystal display device of the present invention never deteriorates.

Figure 6:
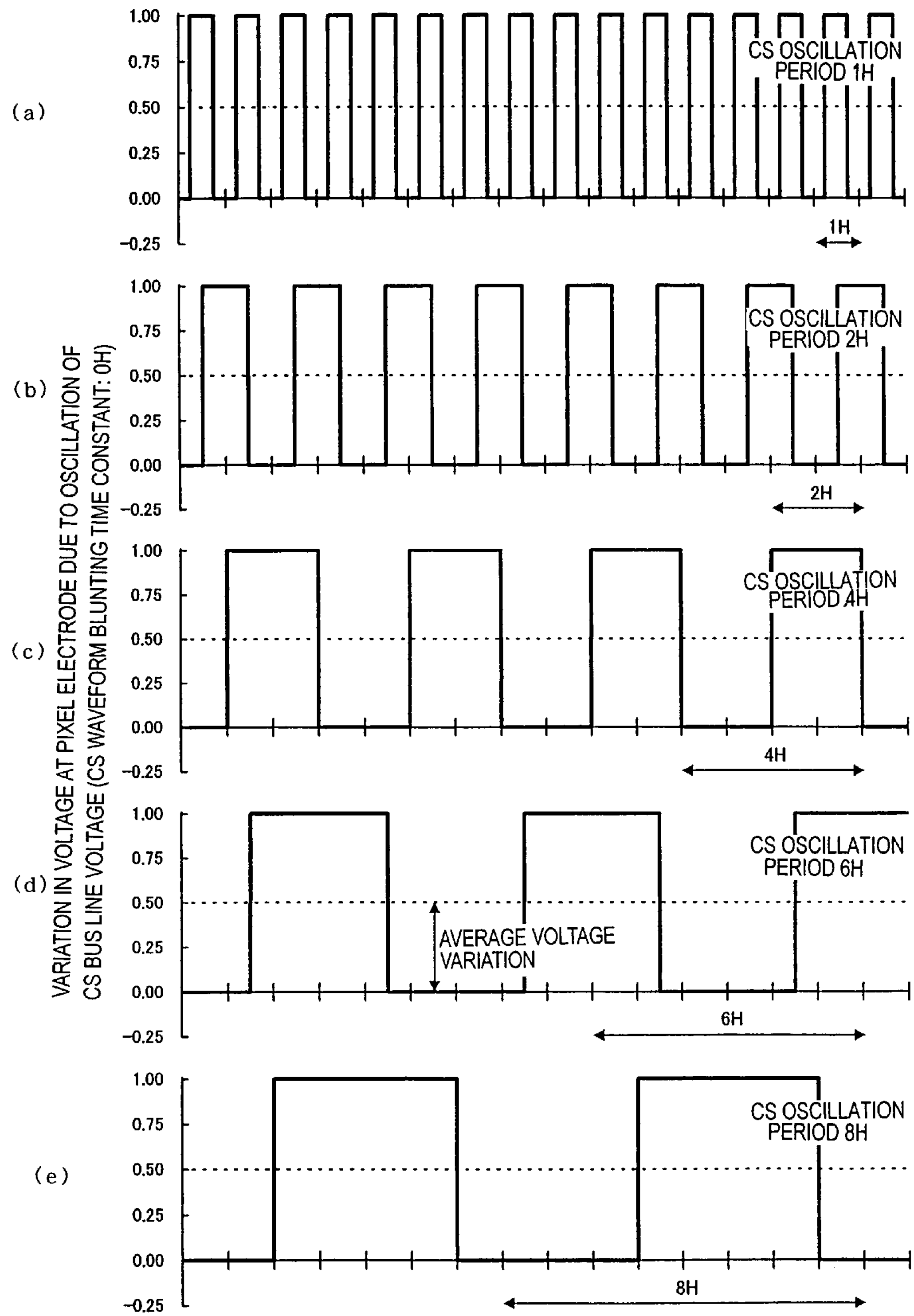

Portions (a) through (e) of FIG. 6 schematically show the waveforms of oscillating voltages to be applied to subpixel electrodes in a situation where there is no waveform blunting in the CS voltage.

Figure 7:
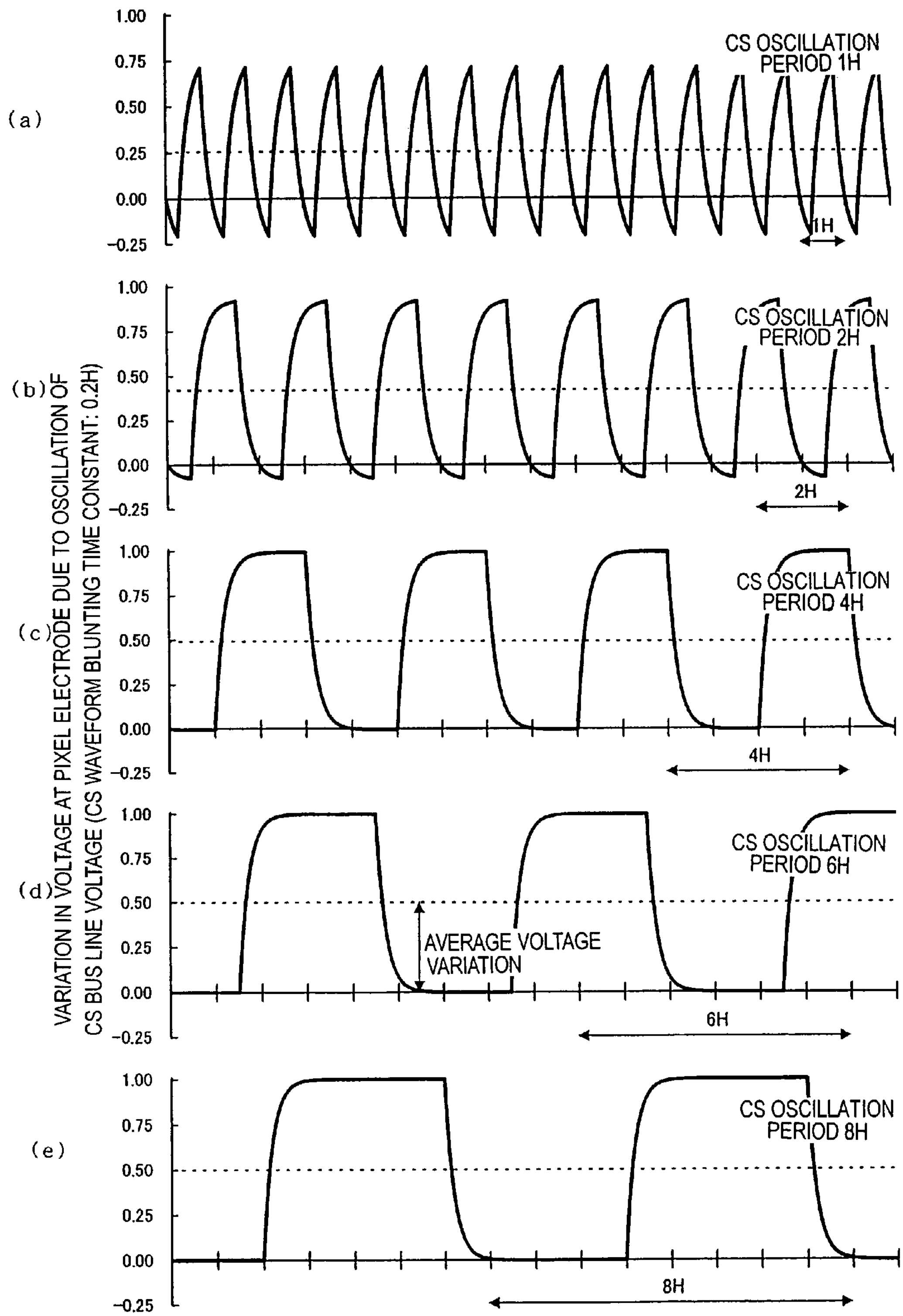

Portions (a) through (e) of FIG. 7 schematically show the waveforms of oscillating voltages to be applied to subpixel electrodes in a situation where waveform blunting has occurred when the CR time constant is 0.2 H.

Figure 8:
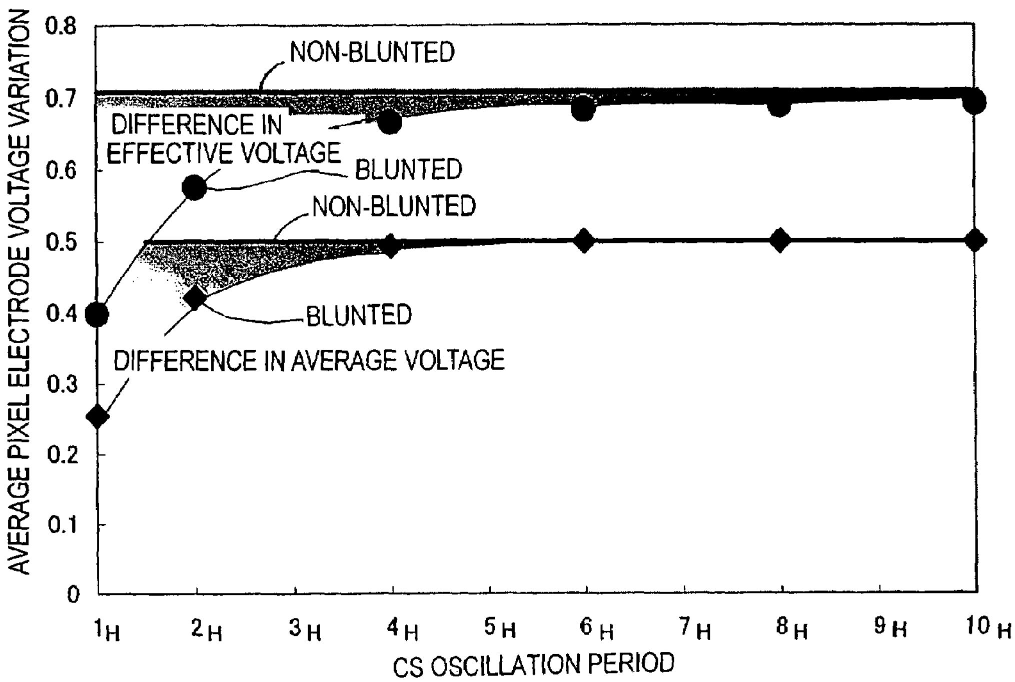

FIG. 8 shows how the average and effective values of the oscillating voltages, calculated based on the waveforms shown in FIGS. 6 and 7, change with one oscillation period of the CS bus line voltage.

Figure 9:
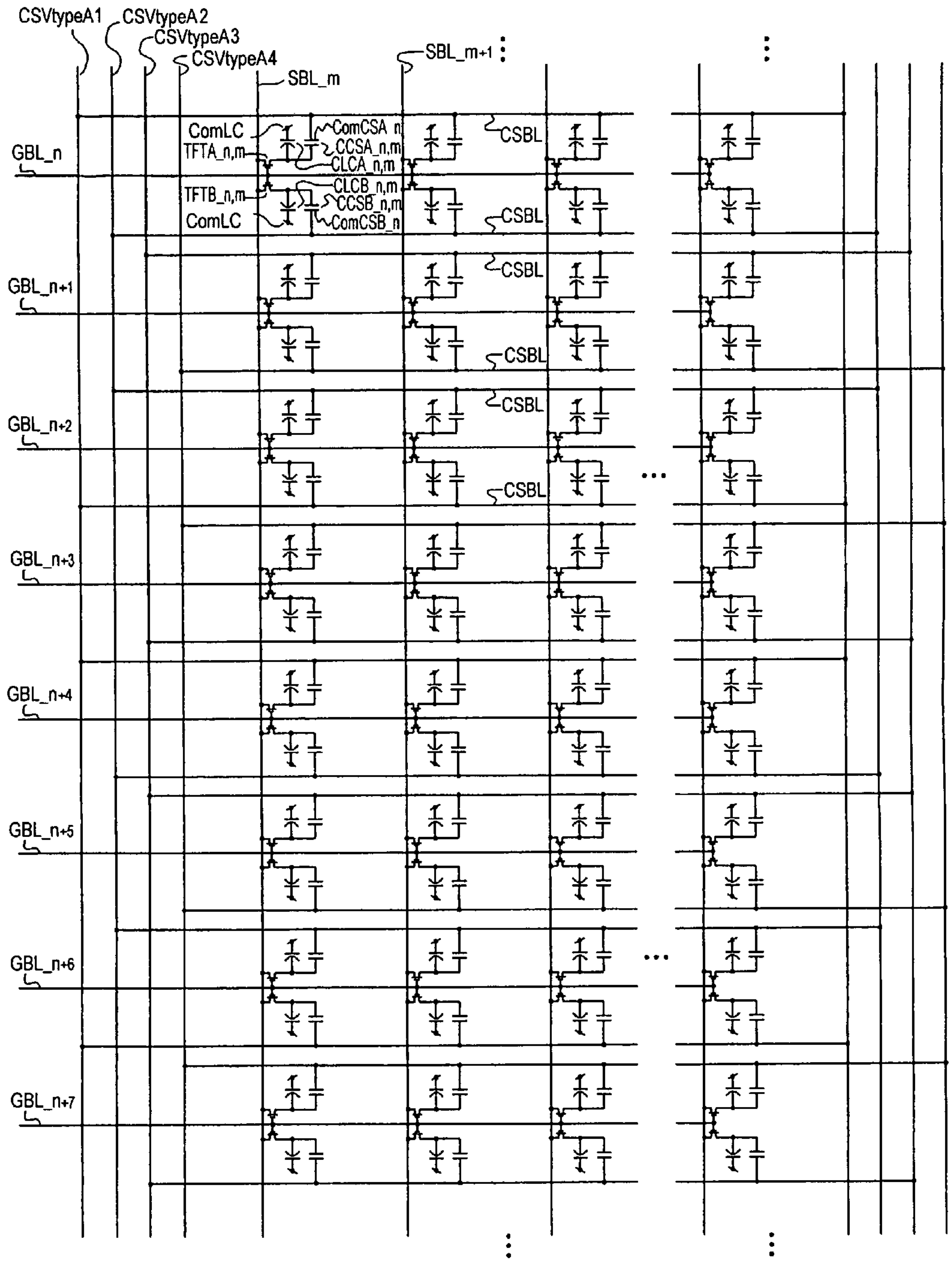

FIG. 9 schematically shows an equivalent circuit diagram of a liquid crystal display device with Type I arrangement according to a preferred embodiment of the present invention.

Figure 10A:
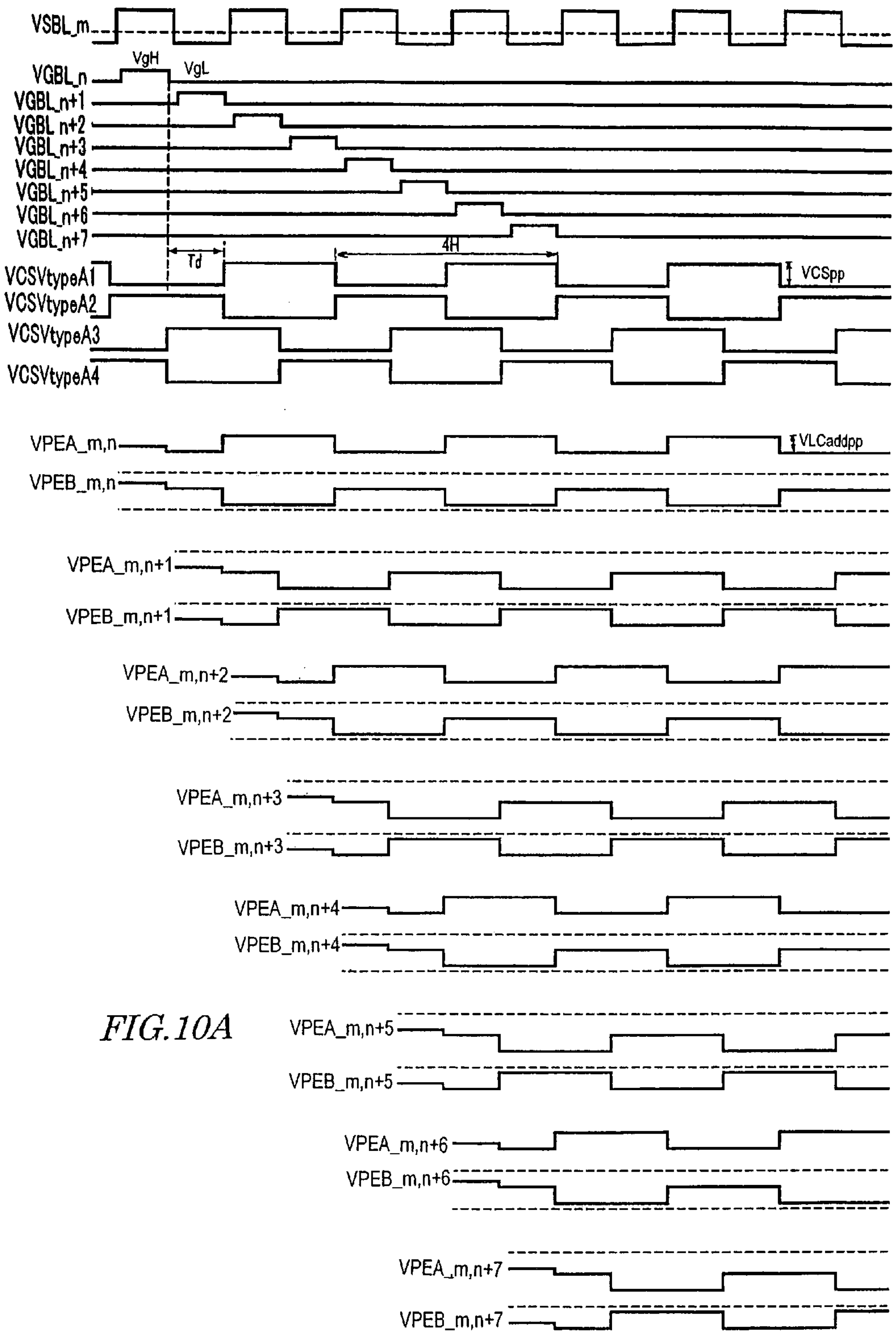

FIG. 10A shows the periods and phases of oscillation of oscillating voltages supplied to CS bus lines with respect to the voltage waveforms on gate bus lines and the voltages applied to subpixel electrodes in the liquid crystal display device shown in FIG. 9.

Figure 10B:
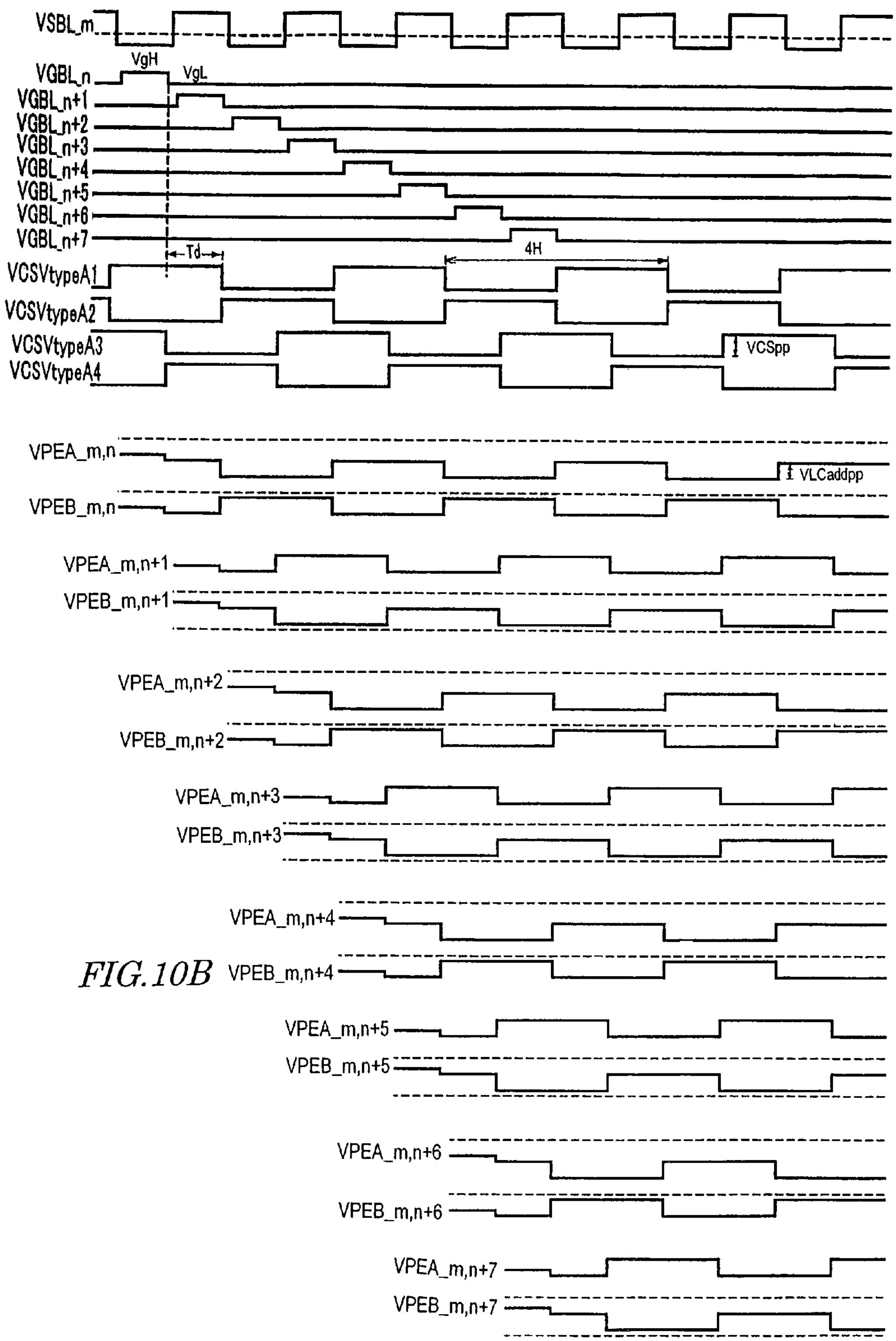

FIG. 10B shows the periods and phases of oscillation of oscillating voltages supplied to CS bus lines with respect to the voltage waveforms on gate bus lines and the voltages applied to subpixel electrodes in the liquid crystal display device shown in FIG. 9 (in which the voltage applied to the liquid crystal layer has its polarity inverted compared to FIG. 10A).

Figure 11A:
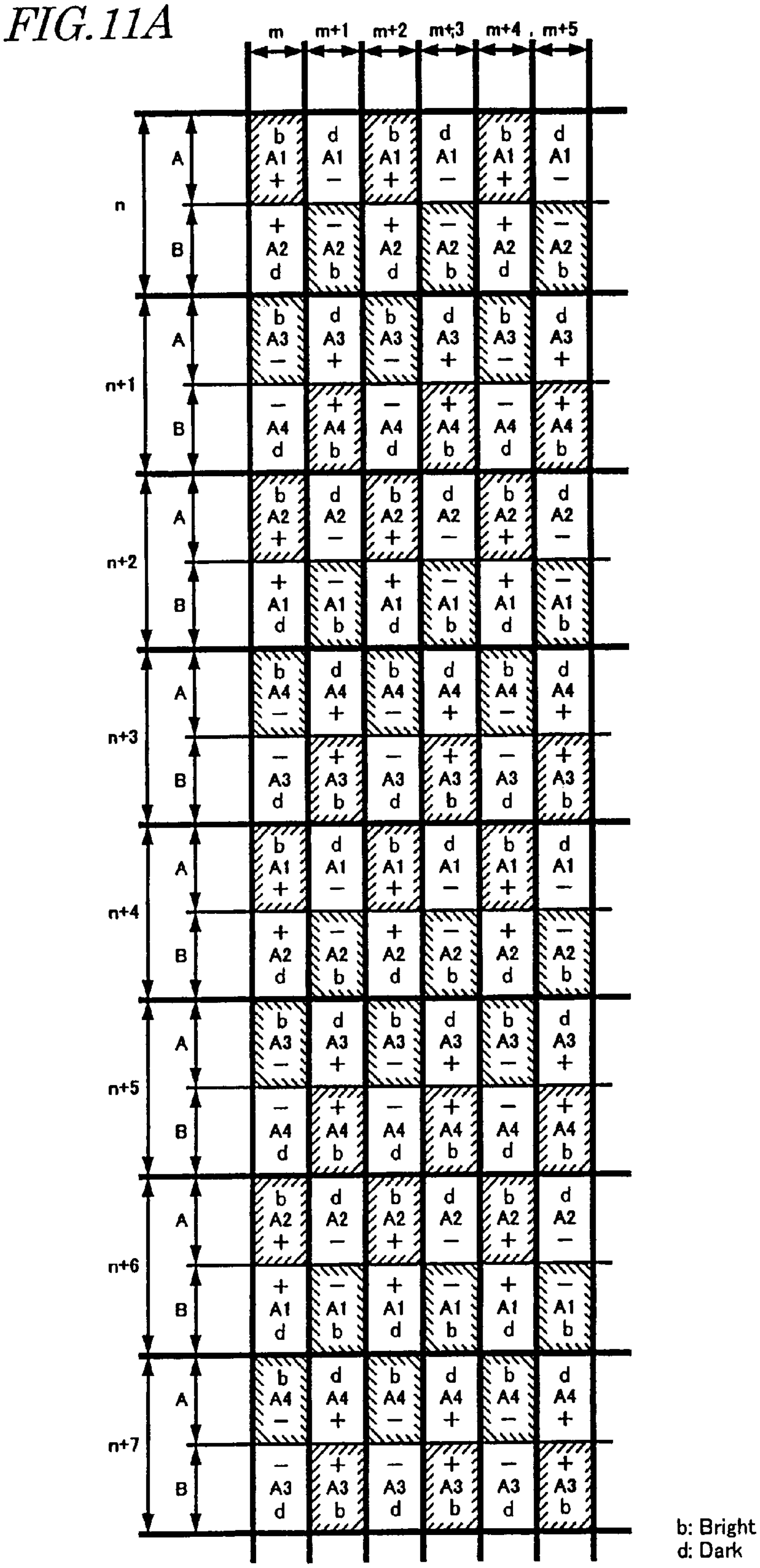

FIG. 11A is a schematic representation showing the drive state of the liquid crystal display device shown in FIG. 9 (in a situation where the voltages shown in FIG. 10A are used).

Figure 11B:
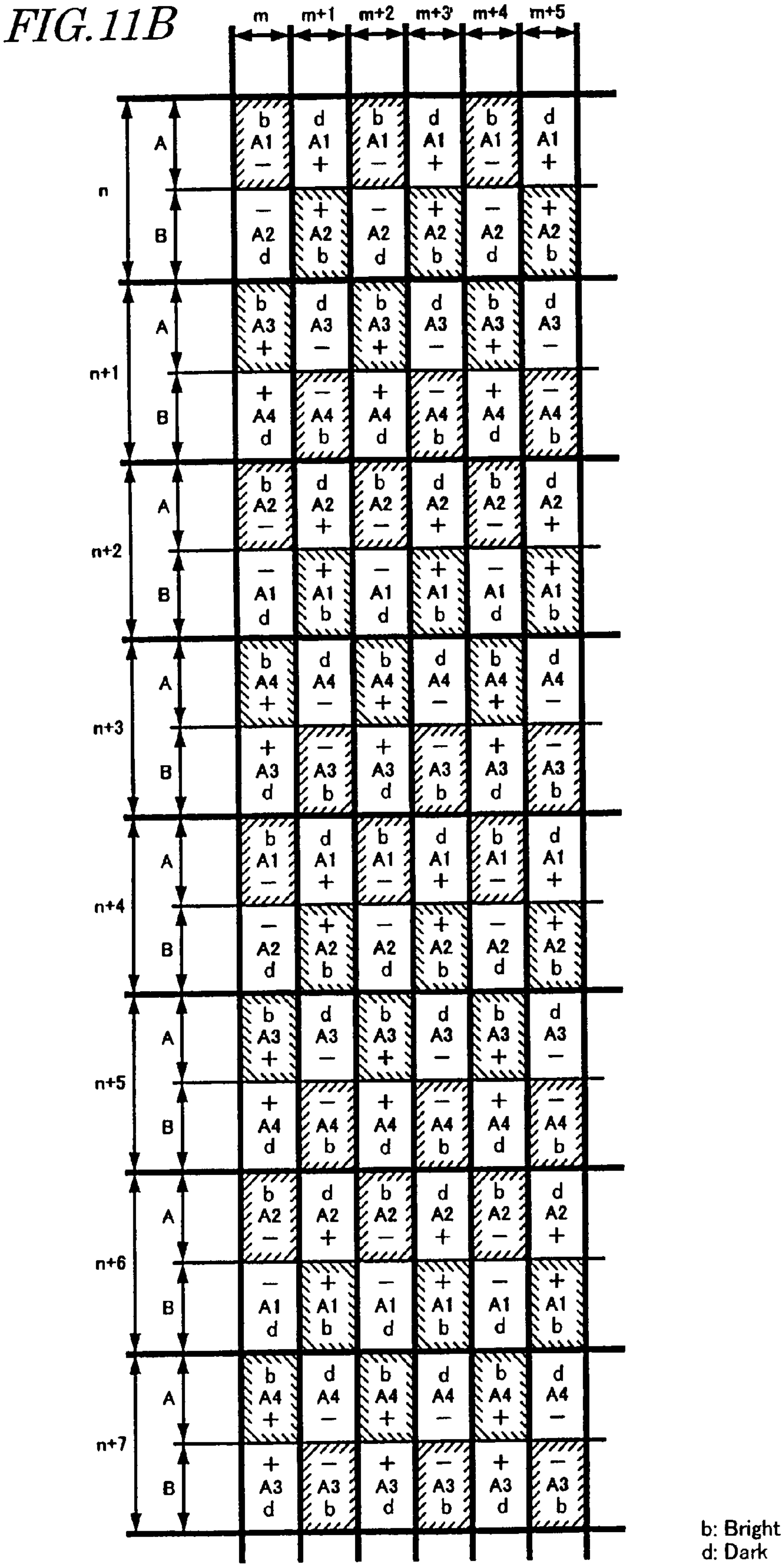

FIG. 11B is a schematic representation showing the drive state of the liquid crystal display device shown in FIG. 9 (in a situation where the voltages shown in FIG. 10B are used).

Figure 12:
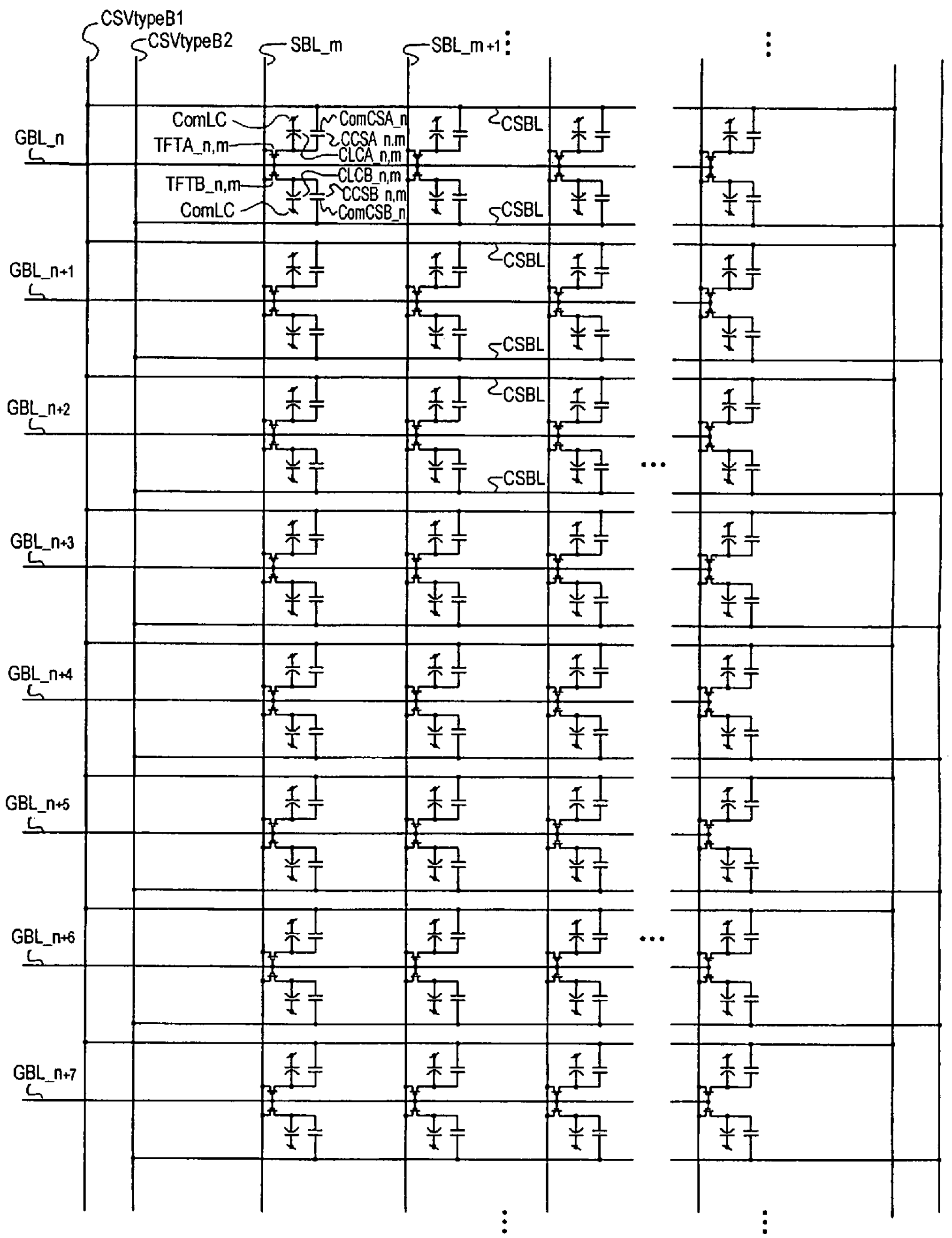

FIG. 12 schematically shows an equivalent circuit diagram of a liquid crystal display device with Type I arrangement according to another preferred embodiment of the present invention.

Figure 13A:
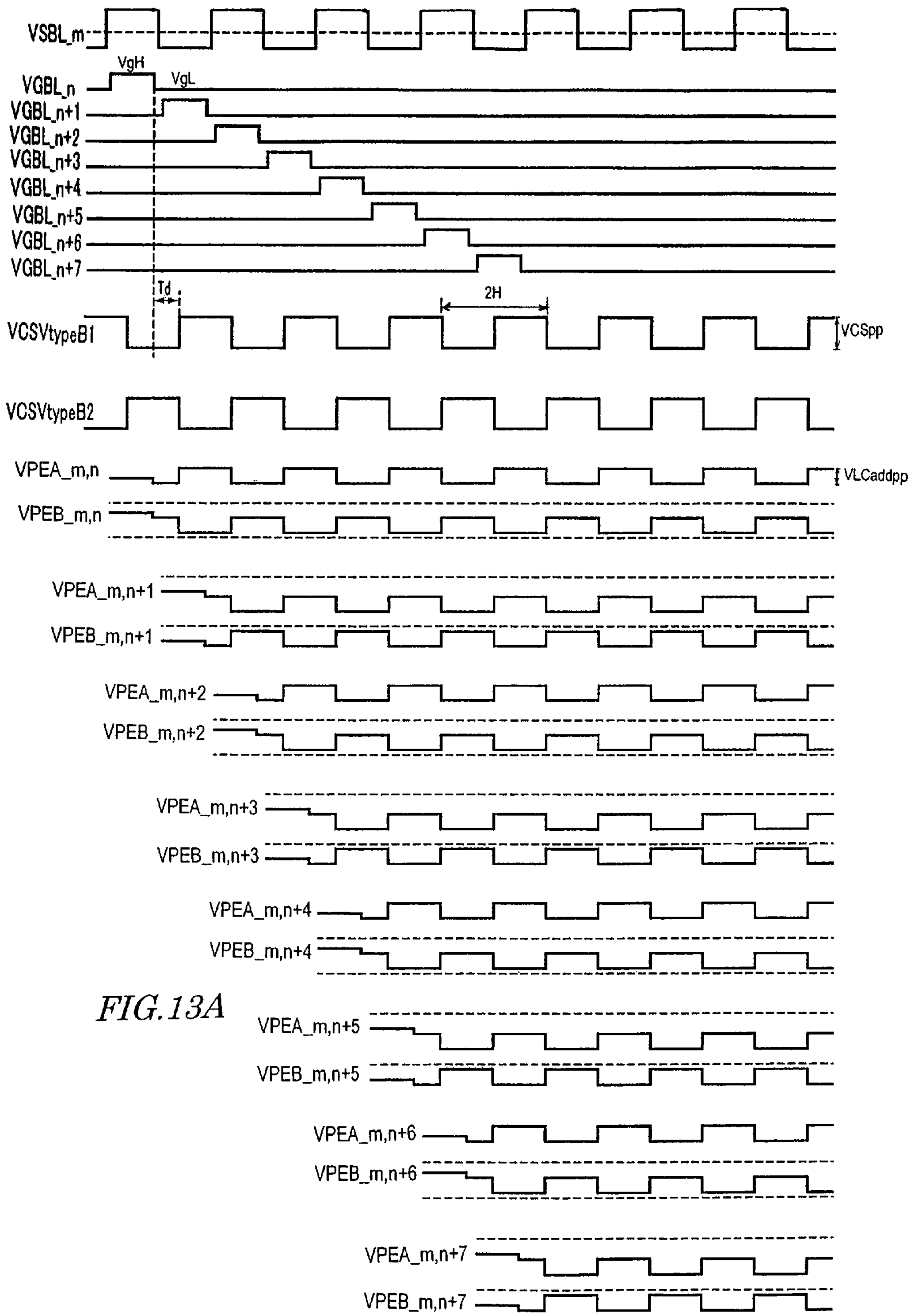

FIG. 13A shows the periods and phases of oscillation of oscillating voltages supplied to CS bus lines with respect to the voltage waveforms on gate bus lines and the voltages applied to subpixel electrodes in the liquid crystal display device shown in FIG. 12.

Figure 13B:
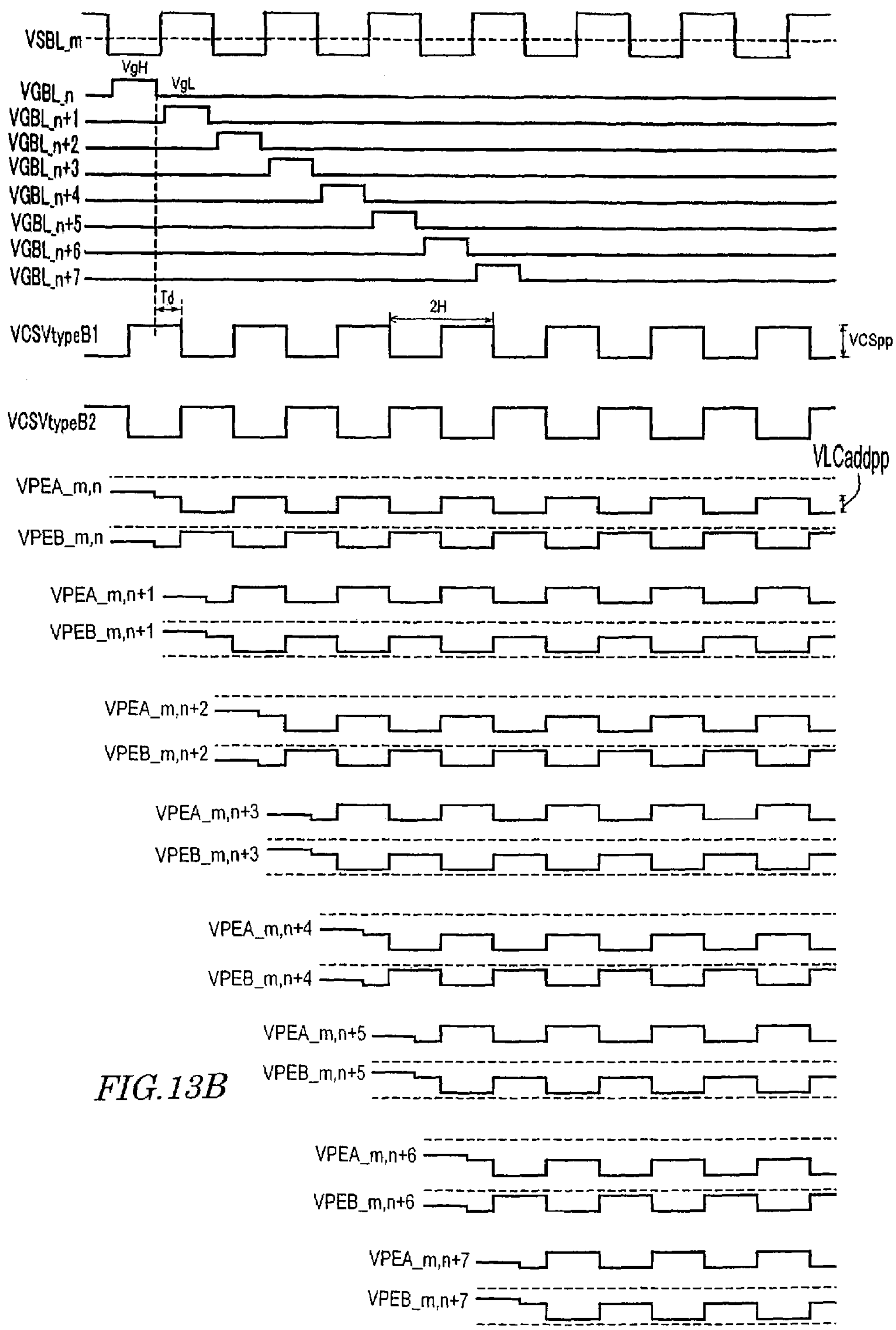

FIG. 13B shows the periods and phases of oscillation of oscillating voltages supplied to CS bus lines with respect to the voltage waveforms on gate bus lines and the voltages applied to subpixel electrodes in the liquid crystal display device shown in FIG. 12 (in which the voltage applied to the liquid crystal layer has its polarity inverted compared to FIG. 13A).

Figure 14A:
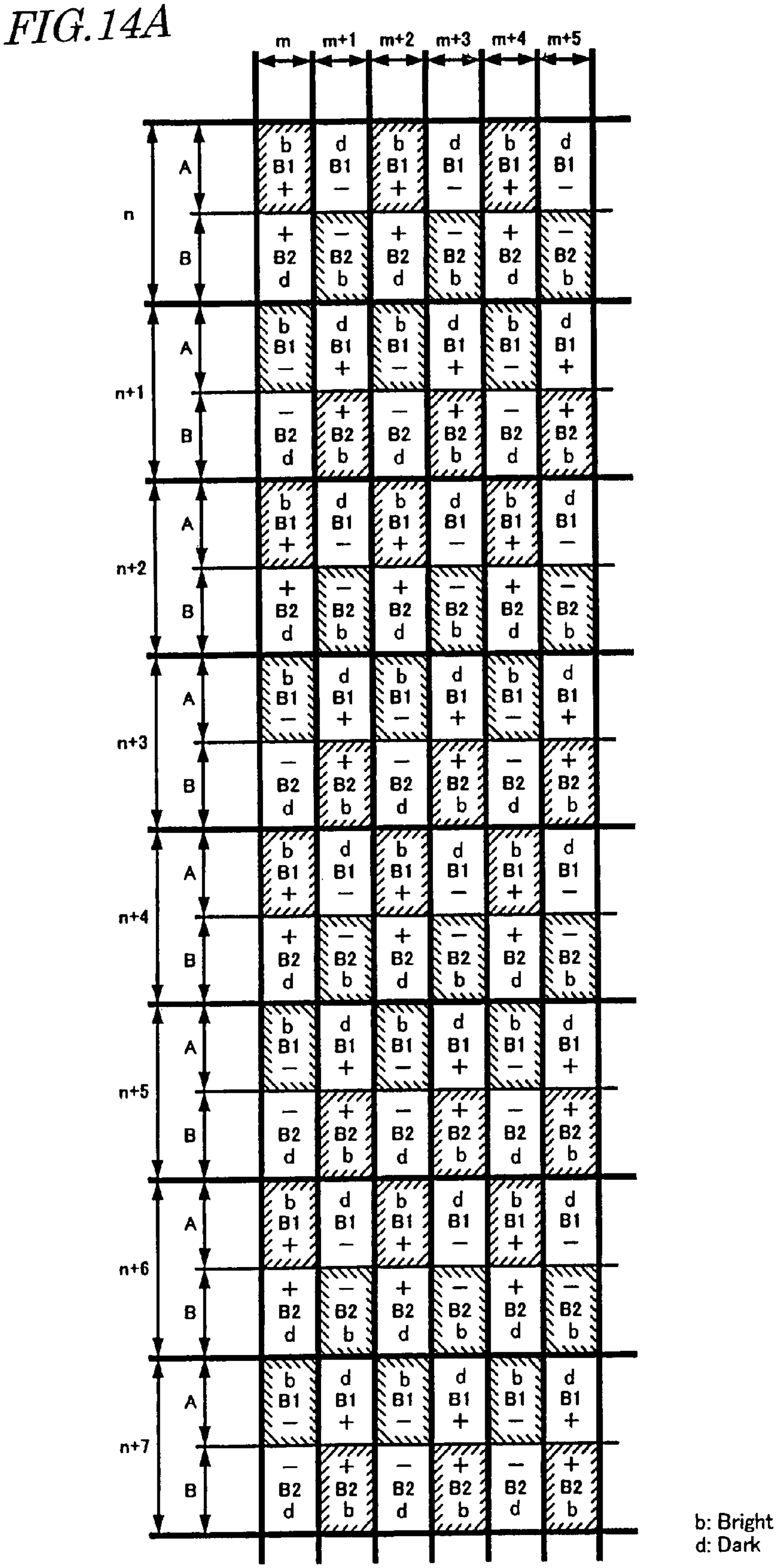

FIG. 14A is a schematic representation showing the drive state of the liquid crystal display device shown in FIG. 12 (in a situation where the voltages shown in FIG. 13A are used).

Figure 14B:
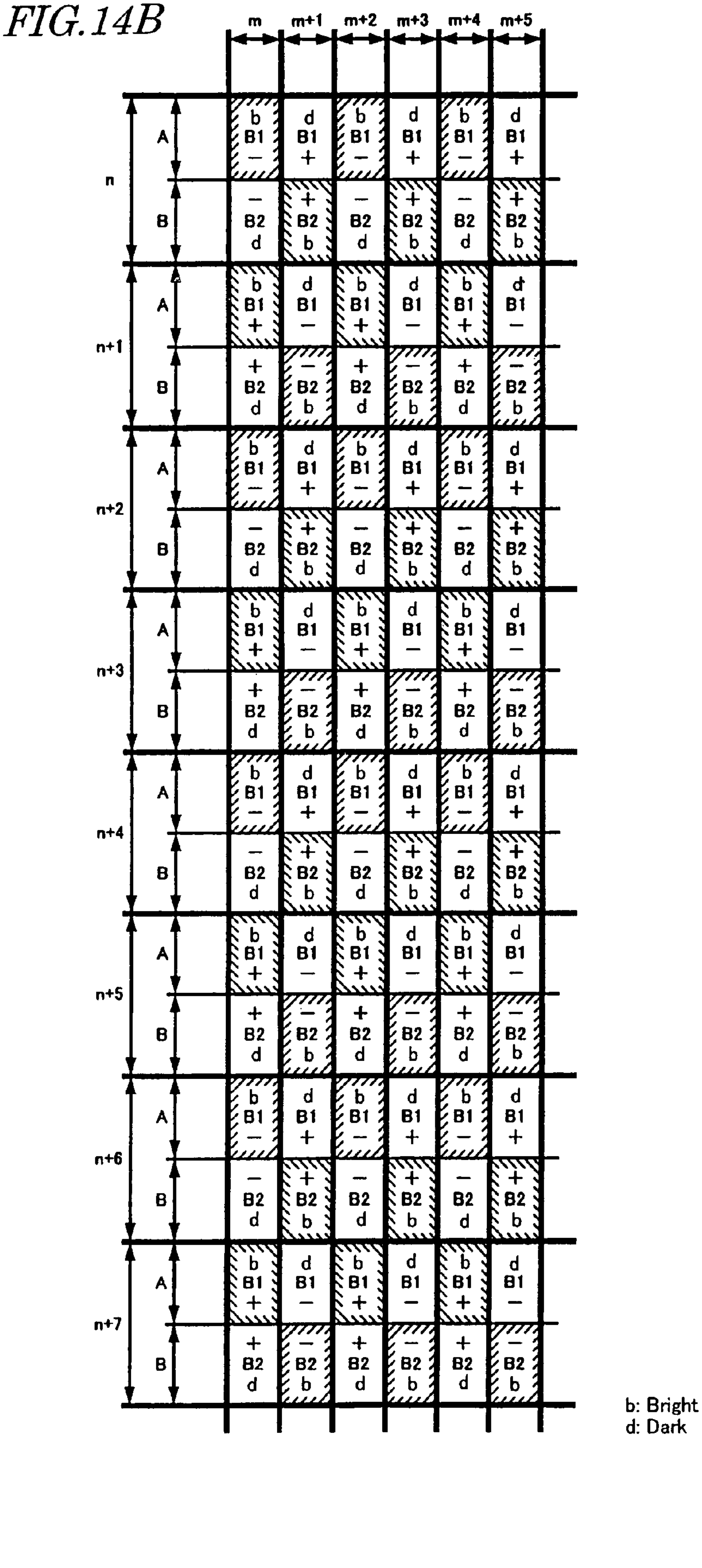

FIG. 14B is a schematic representation showing the drive state of the liquid crystal display device shown in FIG. 12 (in a situation where the voltages shown in FIG. 13B are used).

Figure 15:
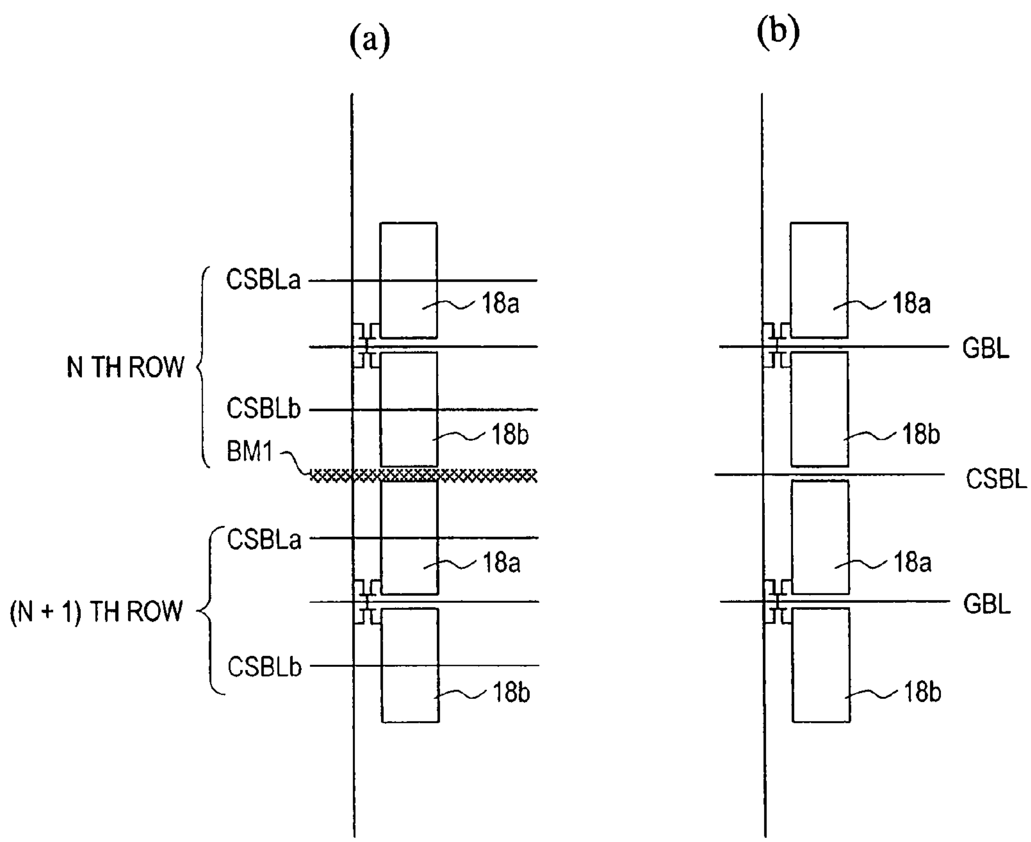

FIG. 15(*a*) schematically illustrates an exemplary arrangement of CS bus lines and an inter-pixel opaque layer in a liquid crystal display device with Type I arrangement according to a preferred embodiment of the present invention, and FIG. 15(*b*) schematically illustrates an exemplary arrangement of CS bus lines that function as an inter-pixel opaque layer in a liquid crystal display device with Type II arrangement according to a preferred embodiment of the present invention.

Figure 16A:
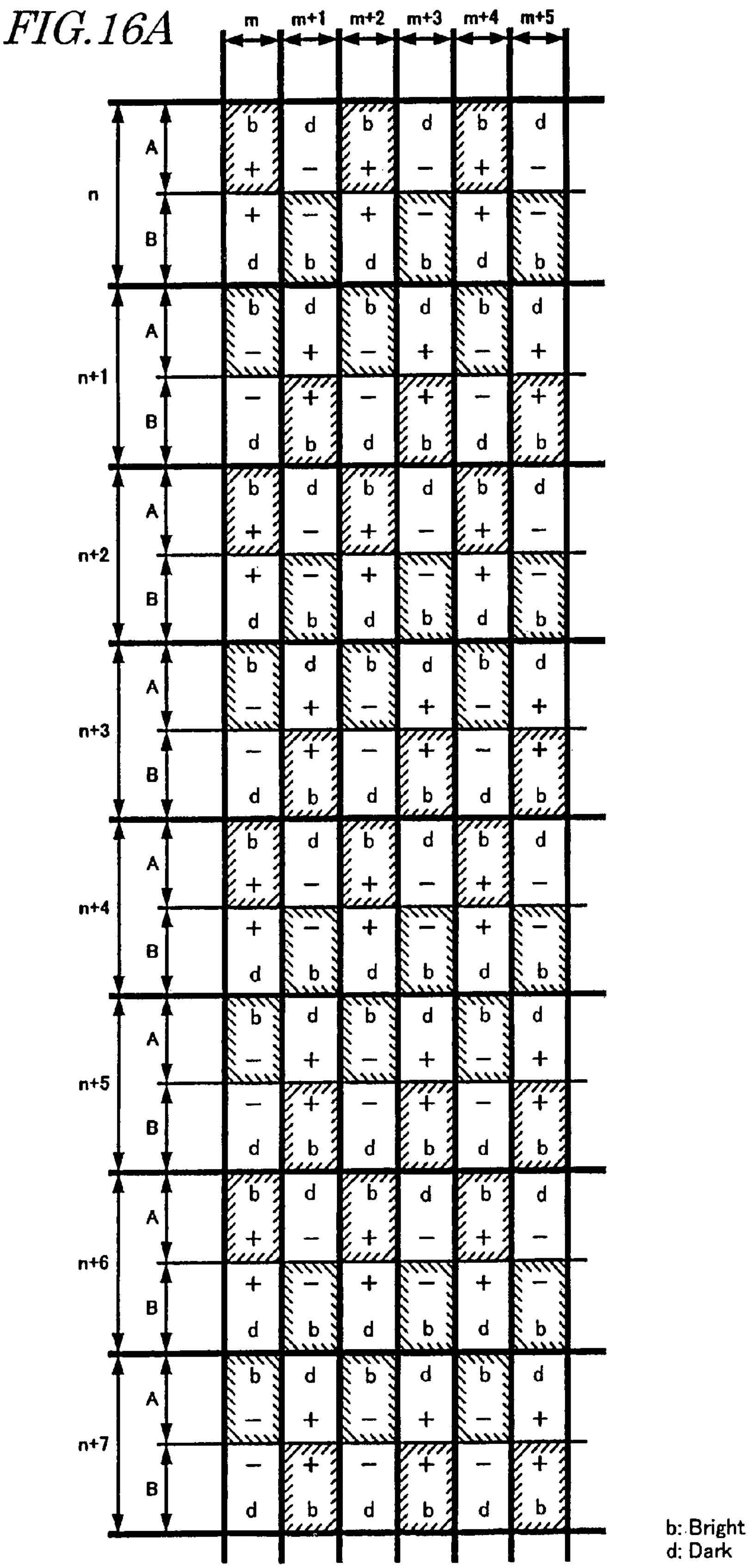

FIG. 16A schematically shows the drive state of a liquid crystal display device with Type II arrangement according to a preferred embodiment of the present invention.

Figure 16B:
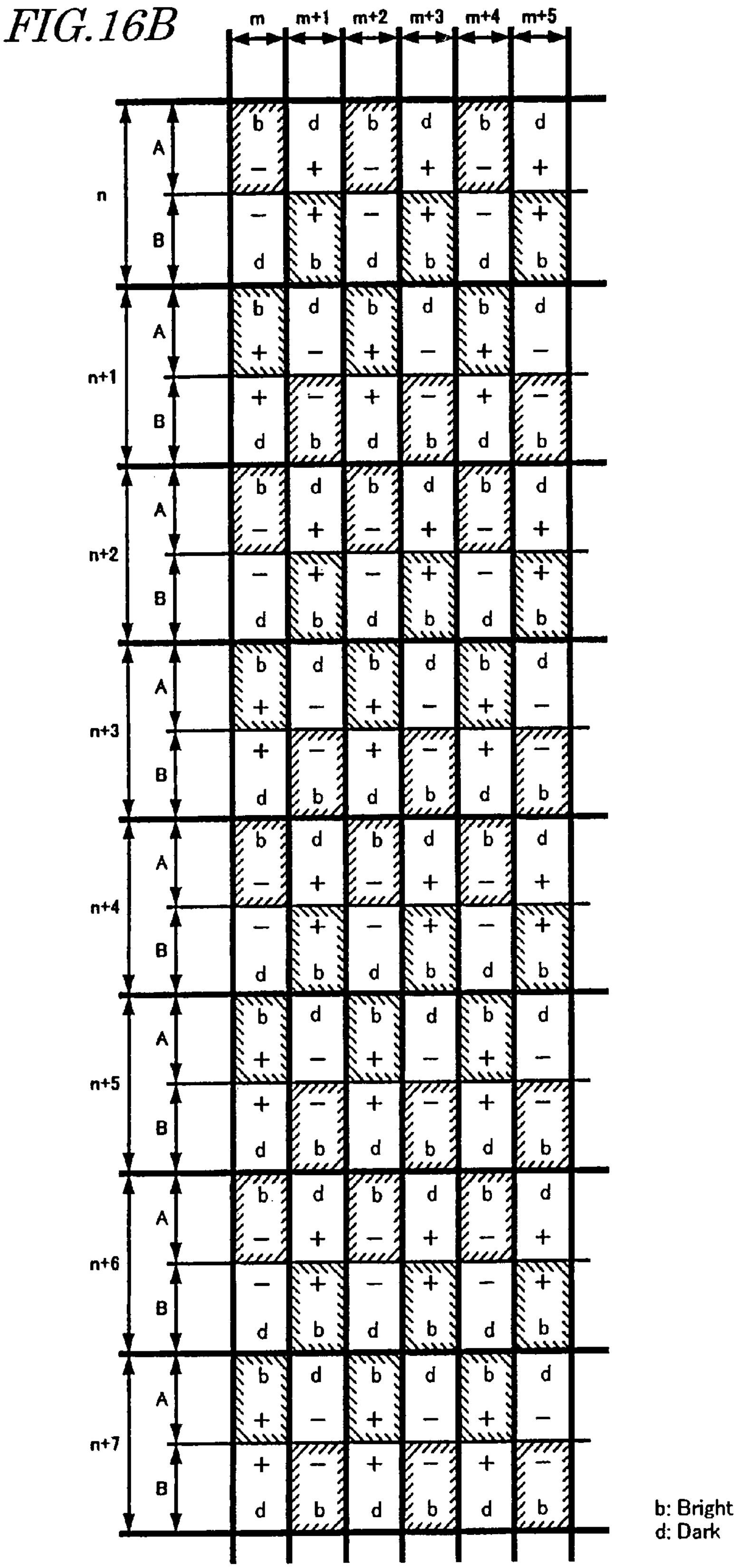

FIG. 16B schematically shows the drive state of a liquid crystal display device with Type II arrangement according to a preferred embodiment of the present invention (in which the electric field applied to the liquid crystal layer has its direction reversed compared to the drive state shown in FIG. 16A).

Figure 17:
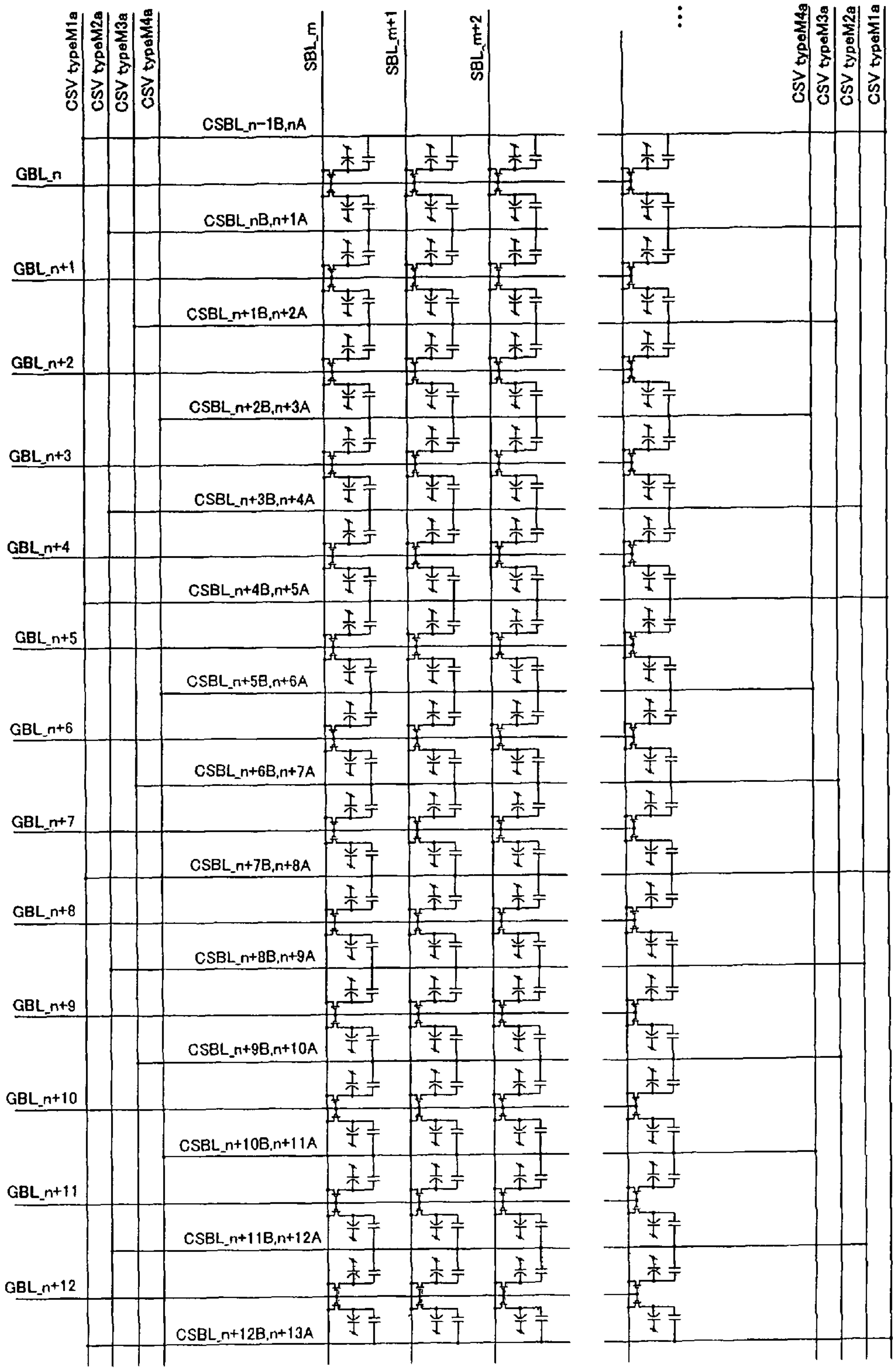

FIG. 17 schematically shows a matrix arrangement (including the connection pattern of CS bus lines) for a liquid crystal display device with Type II arrangement according to a preferred embodiment of the present invention.

Figure 18:
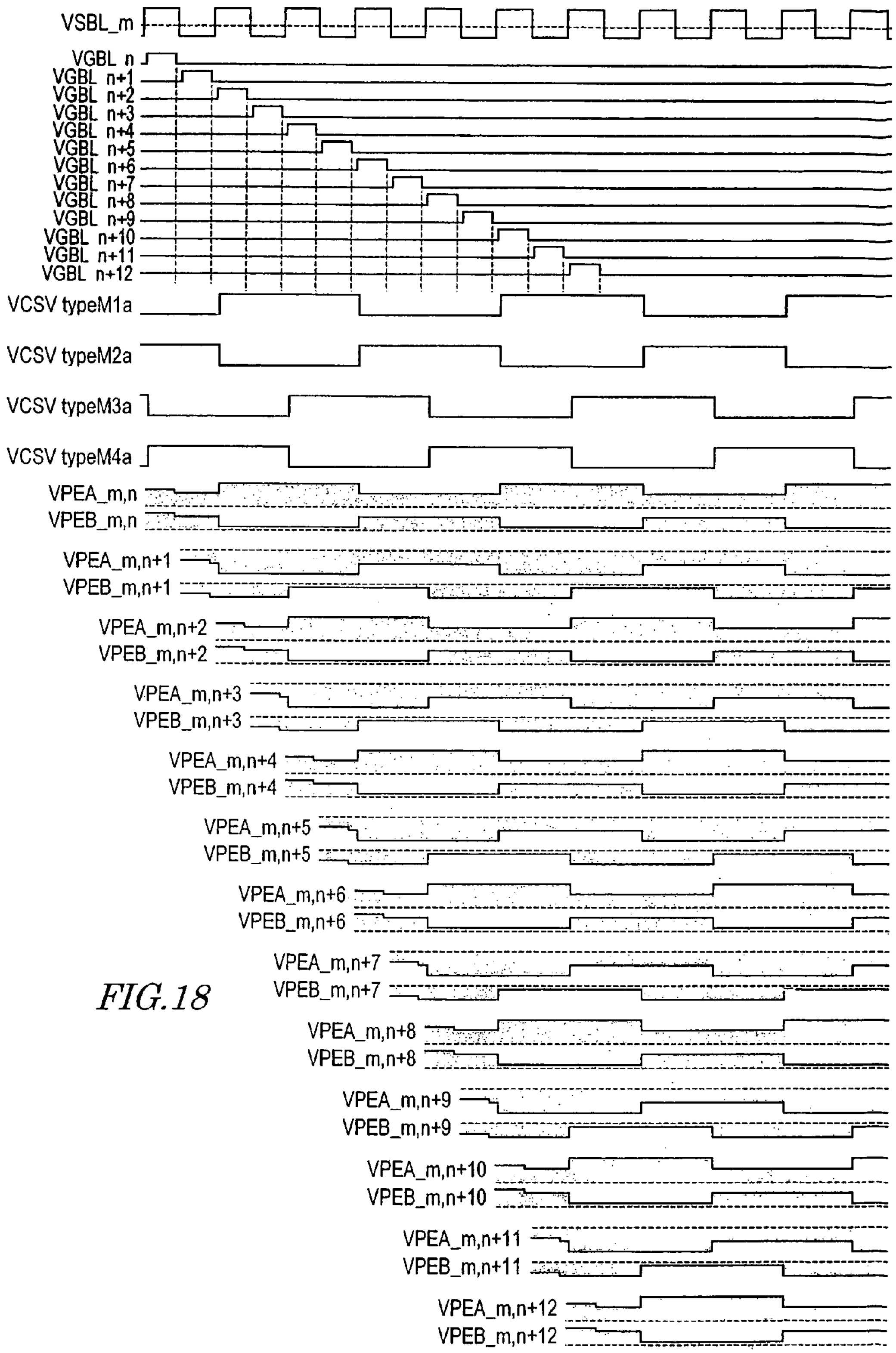

FIG. 18 schematically shows the waveforms of signals used to drive this liquid crystal display device shown in FIG. 17.

Figure 19:
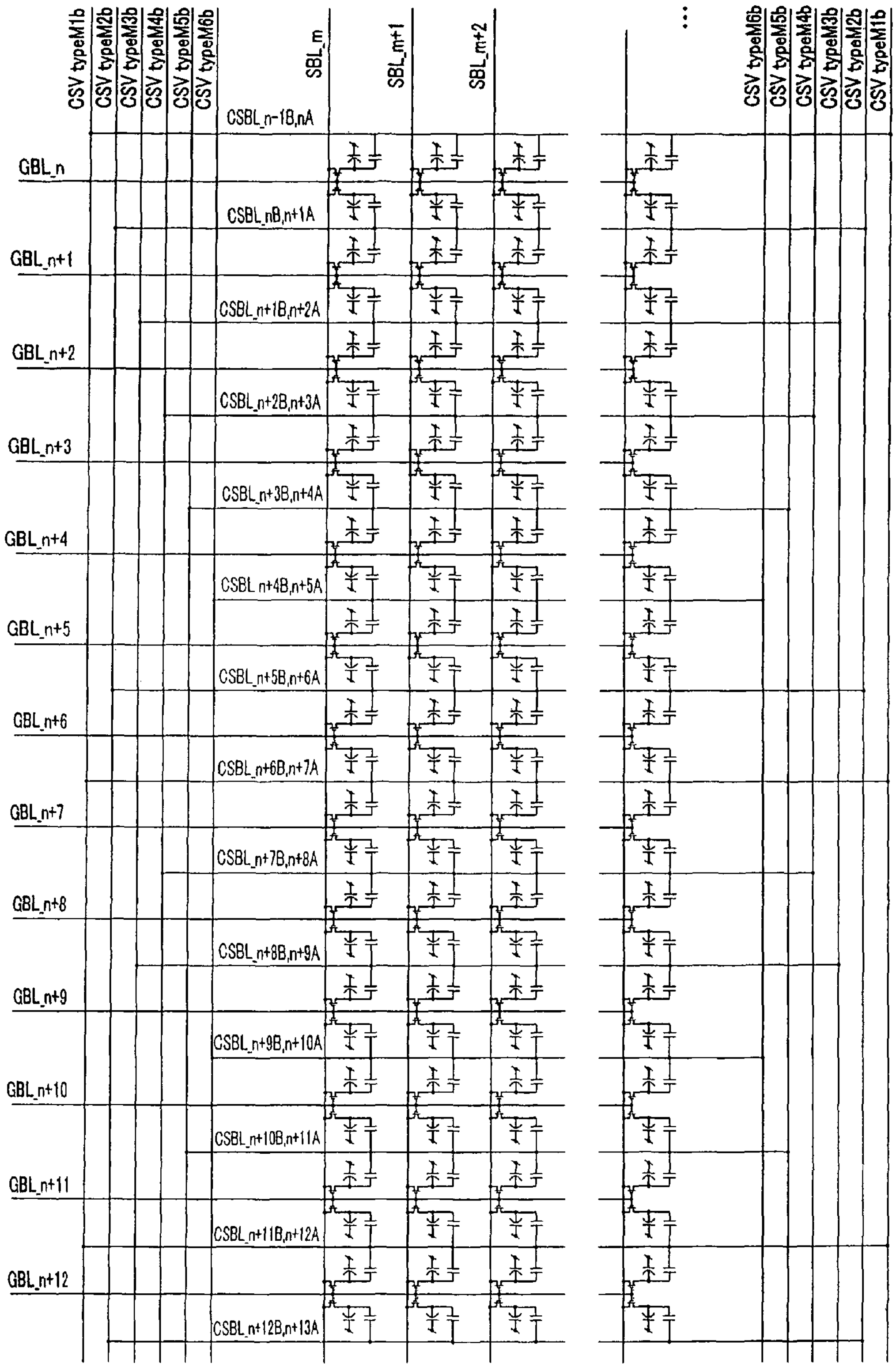

FIG. 19 schematically shows a matrix arrangement (including the connection pattern of CS bus lines) for a liquid crystal display device with Type II arrangement according to another preferred embodiment of the present invention.

Figure 20:
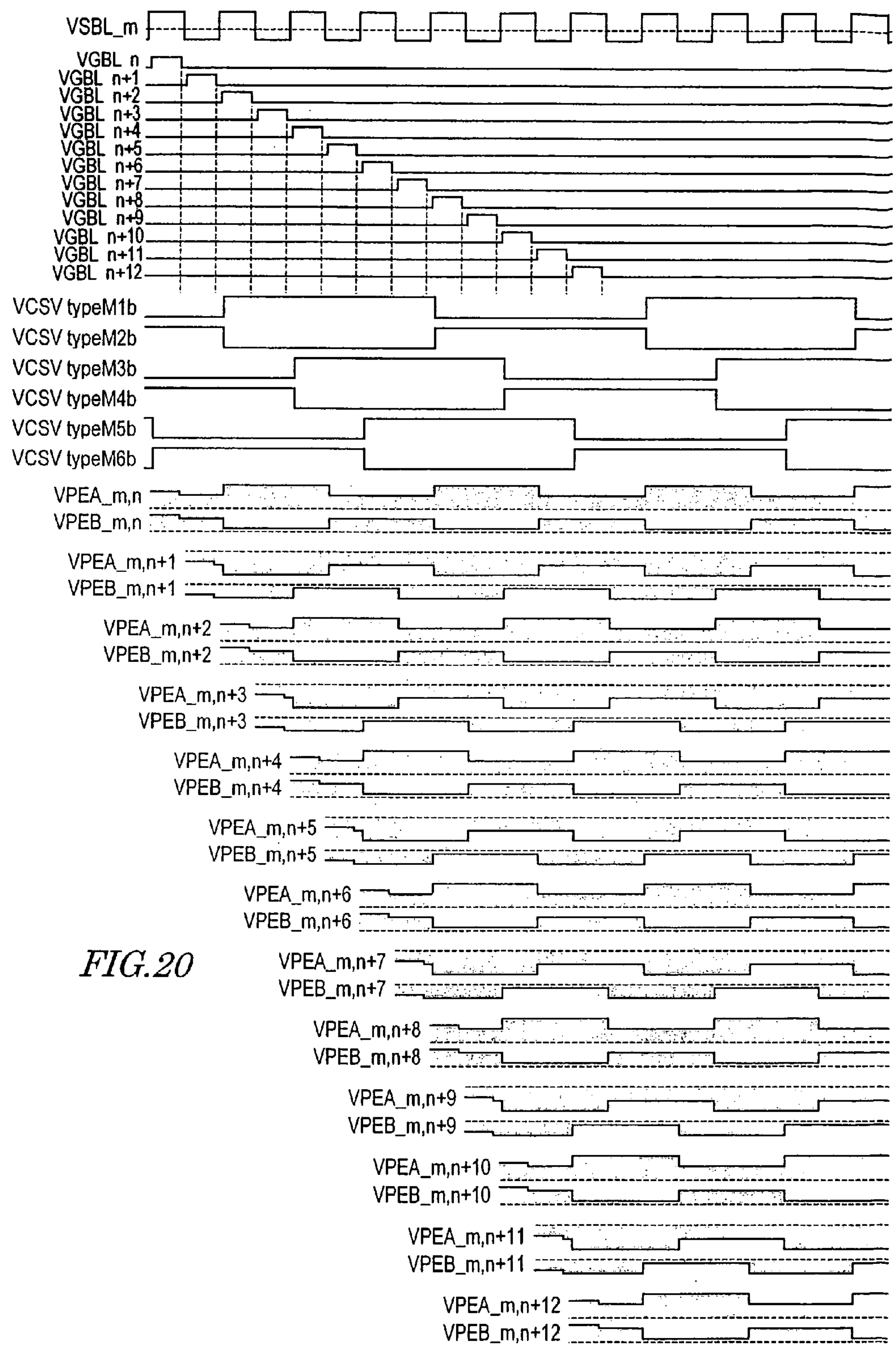

FIG. 20 schematically shows the waveforms of signals used to drive this liquid crystal display device shown in FIG. 19.

Figure 21:
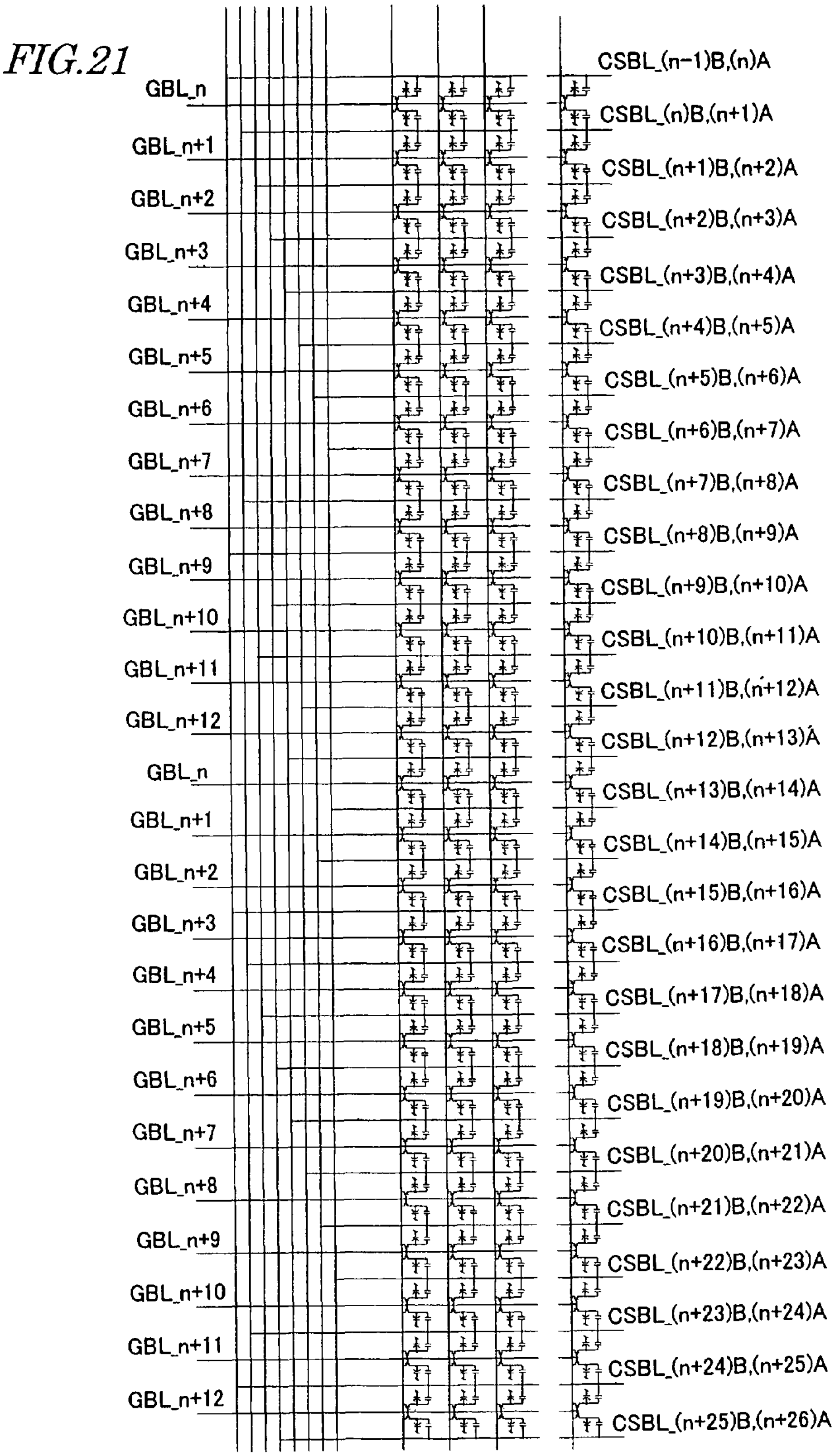

FIG. 21 schematically shows a matrix arrangement (including the connection pattern of CS bus lines) for a liquid crystal display device with Type II arrangement according to still another preferred embodiment of the present invention.

Figure 22:
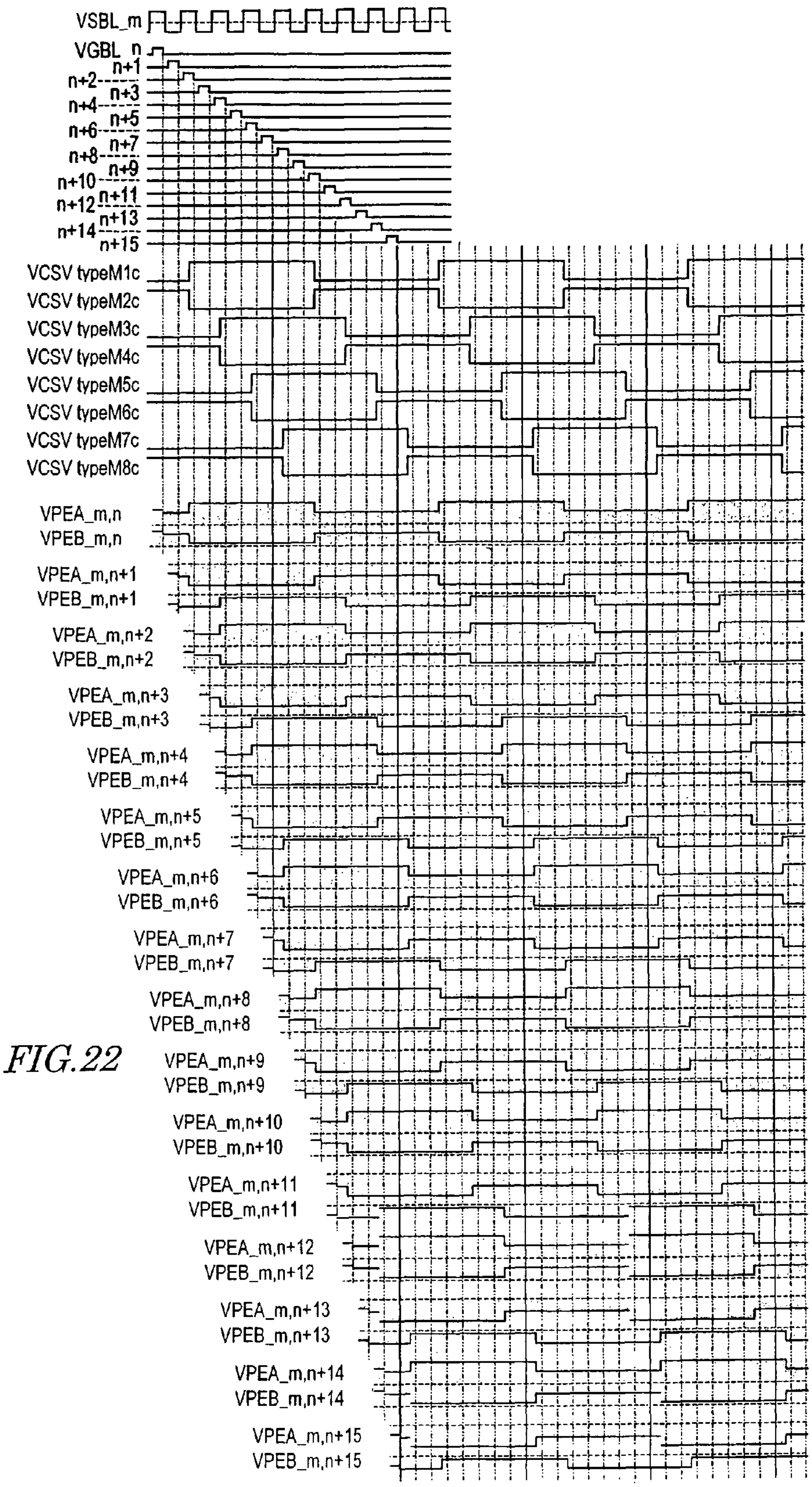

FIG. 22 schematically shows the waveforms of signals used to drive this liquid crystal display device shown in FIG. 21.

Figure 23:
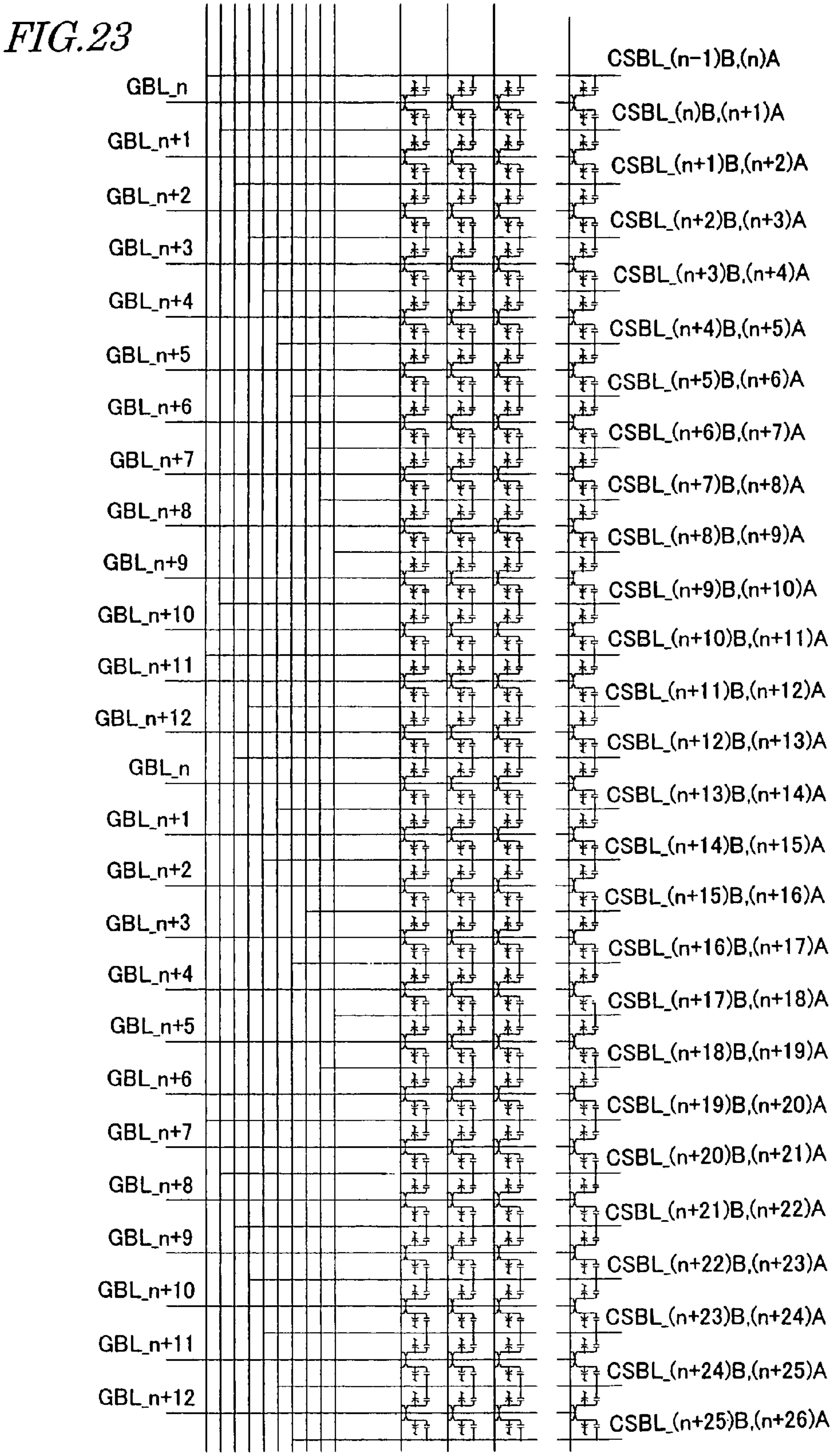

FIG. 23 schematically shows a matrix arrangement (including the connection pattern of CS bus lines) for a liquid crystal display device with Type II arrangement according to yet another preferred embodiment of the present invention.

Figure 24:
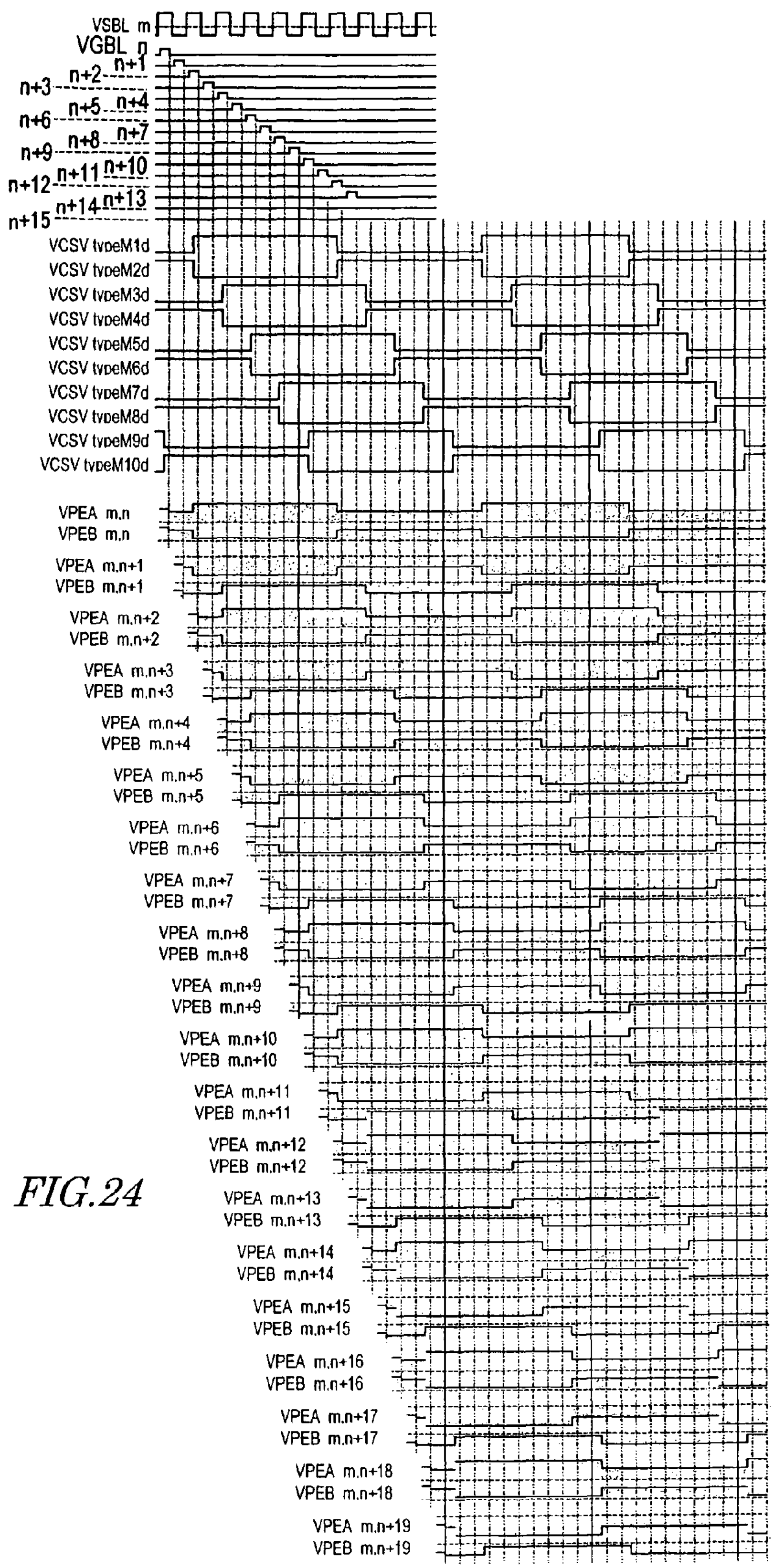

FIG. 24 schematically shows the waveforms of signals used to drive this liquid crystal display device shown in FIG. 23.

Figure 25:
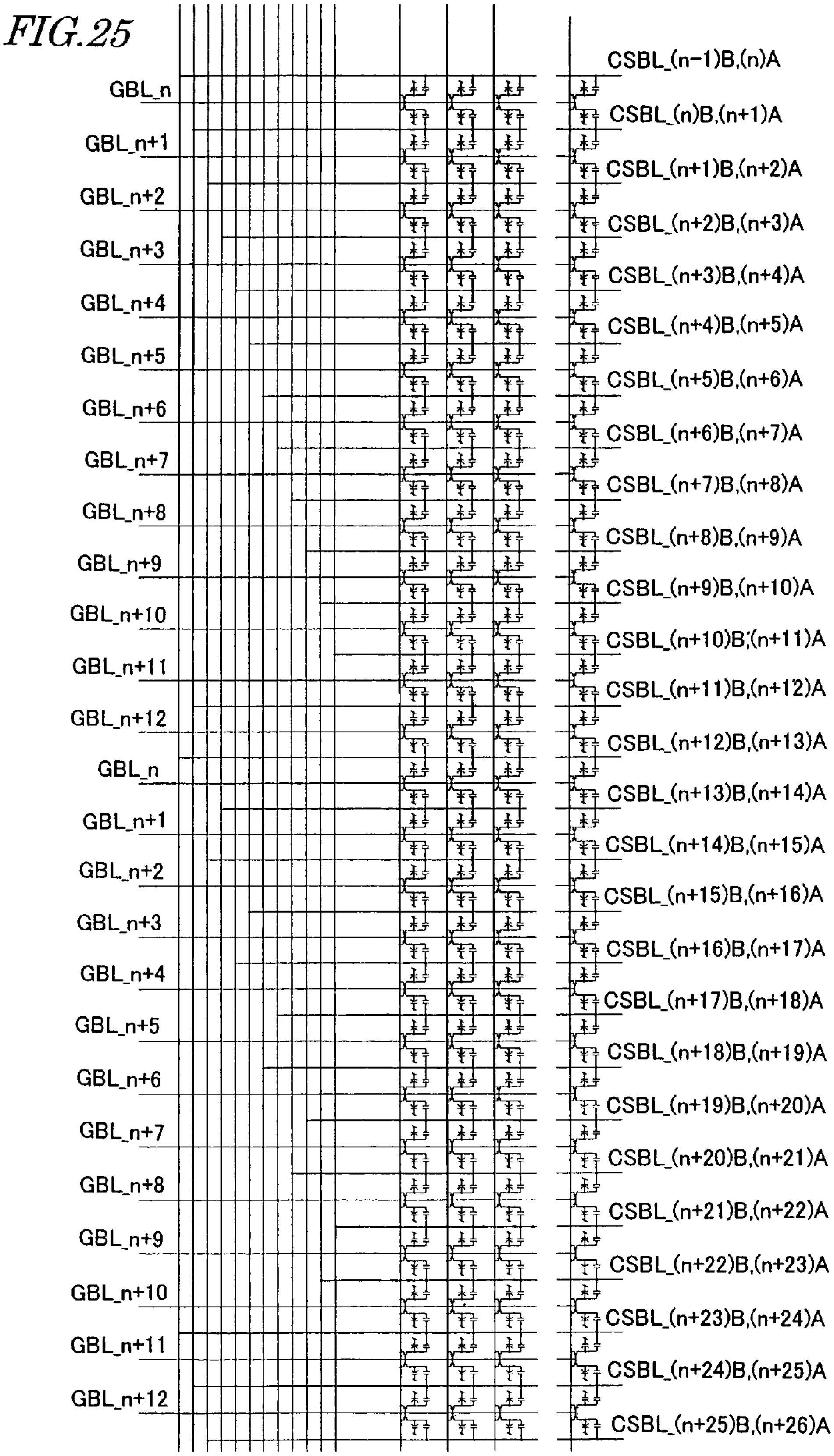

FIG. 25 schematically shows a matrix arrangement (including the connection pattern of CS bus lines) for a liquid crystal display device with Type II arrangement according to yet another preferred embodiment of the present invention.

Figure 26:
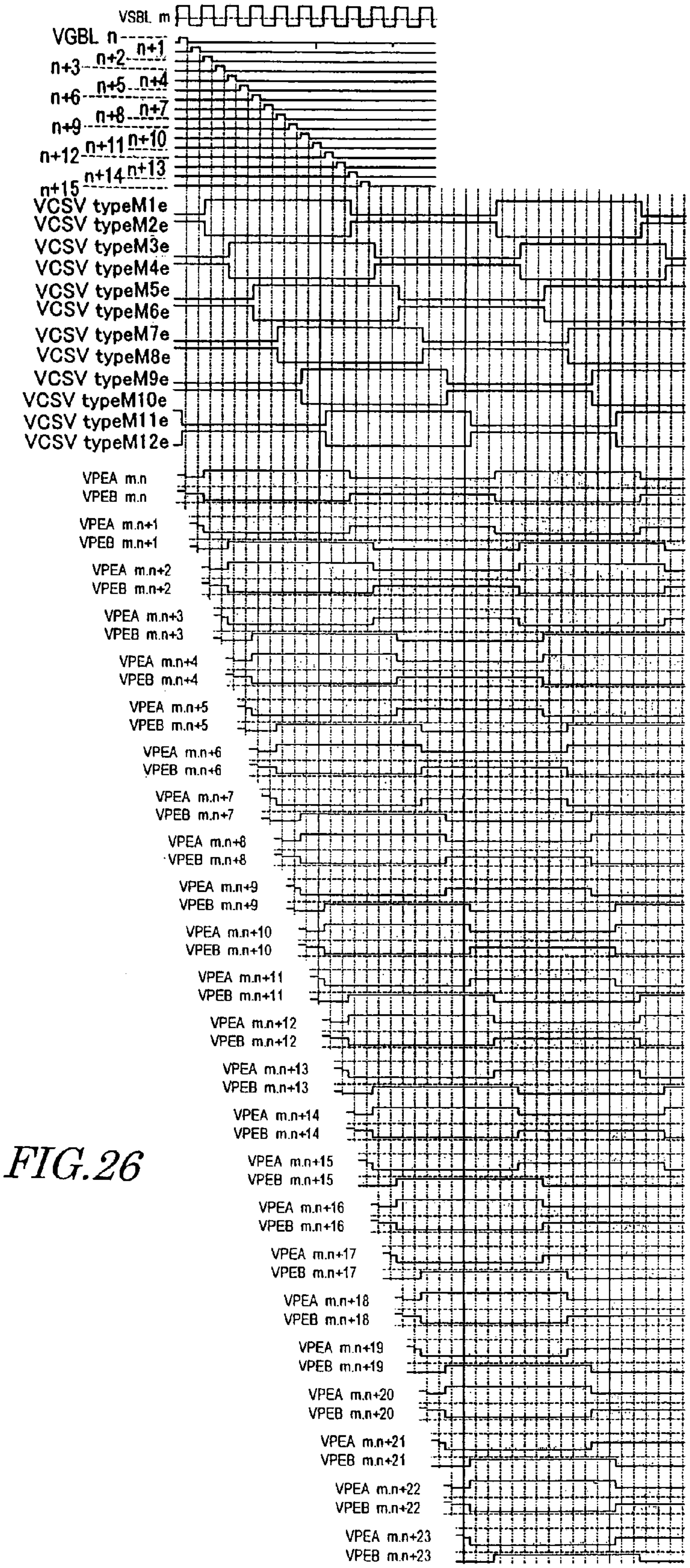

FIG. 26 schematically shows the waveforms of signals used to drive this liquid crystal display device shown in FIG. 25.

Figure 27:
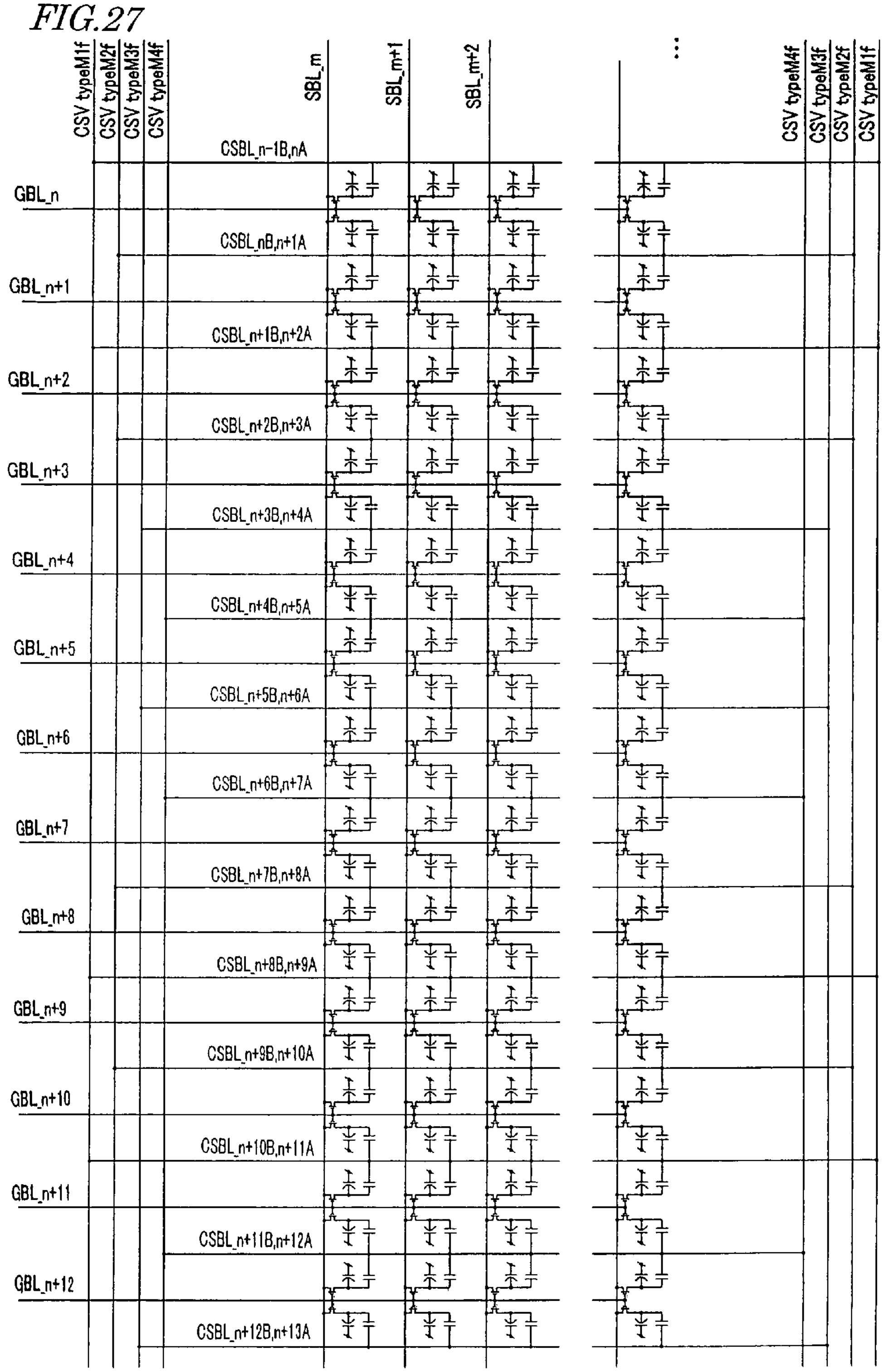

FIG. 27 schematically shows a matrix arrangement (including the connection pattern of CS bus lines) for a liquid crystal display device with Type II arrangement according to yet another preferred embodiment of the present invention.

Figure 28:
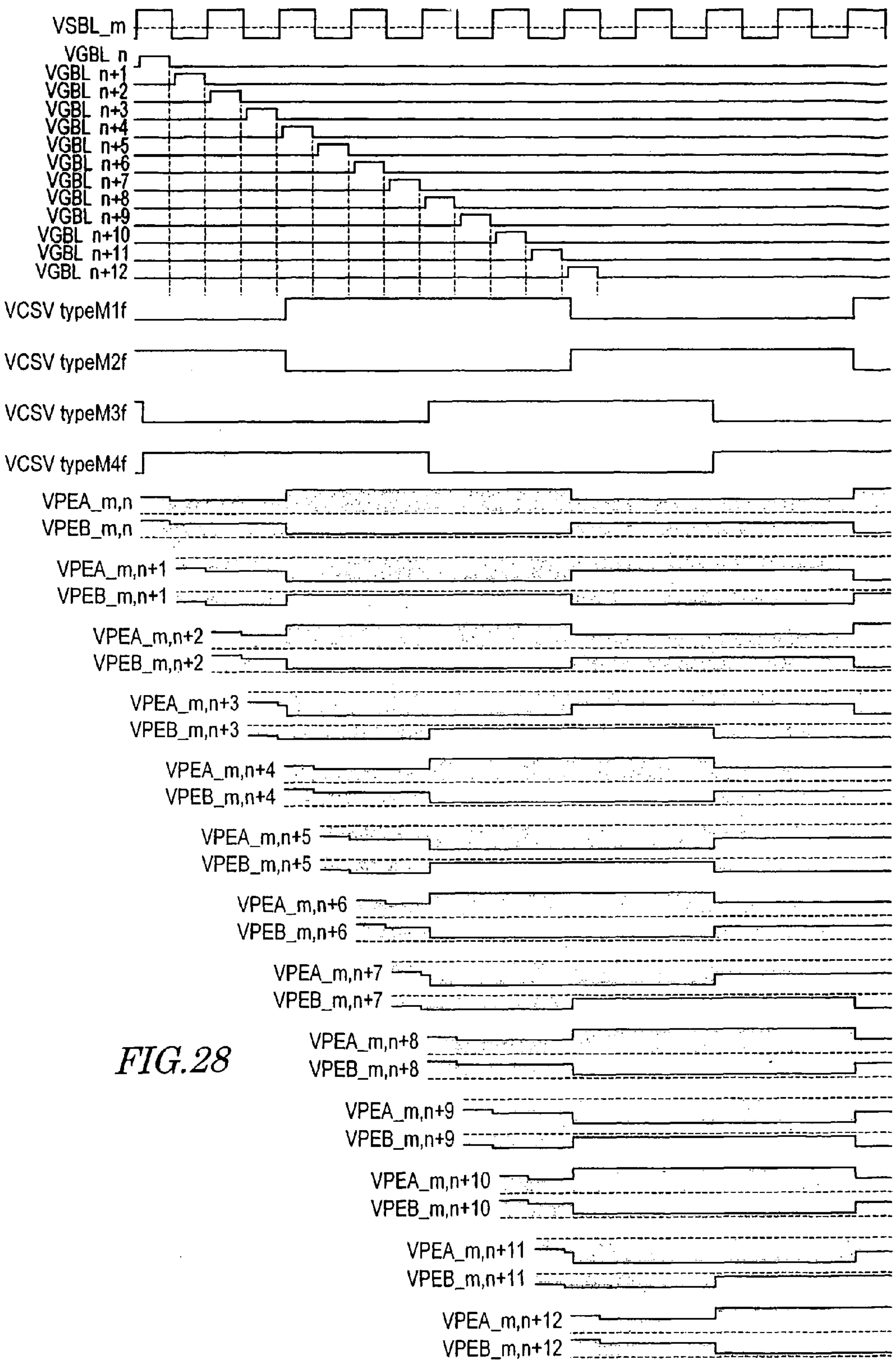

FIG. 28 schematically shows the waveforms of signals used to drive this liquid crystal display device shown in FIG. 27.

Figure 29:
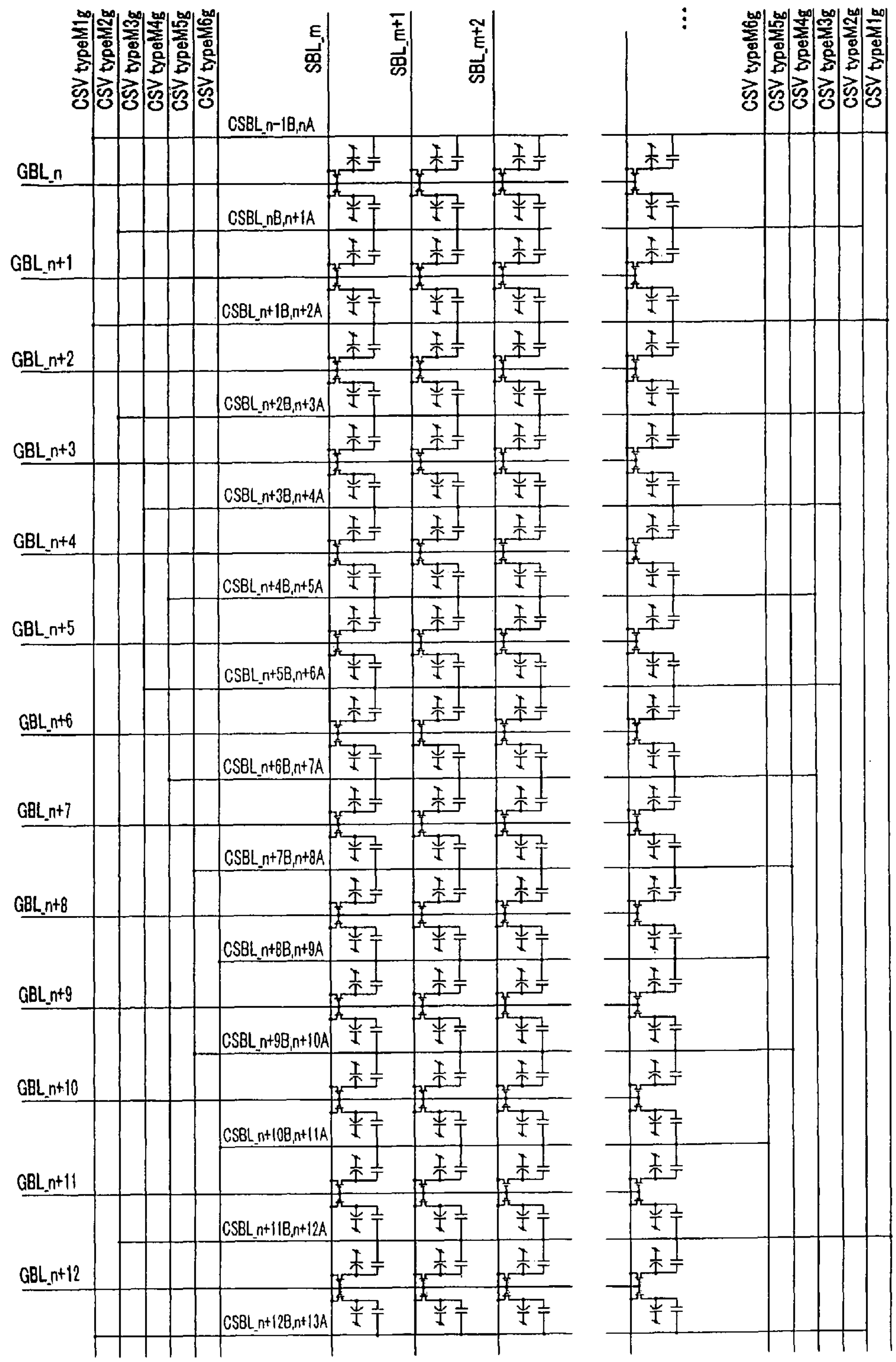

FIG. 29 schematically shows a matrix arrangement (including the connection pattern of CS bus lines) for a liquid crystal display device with Type II arrangement according to yet another preferred embodiment of the present invention.

Figure 30:
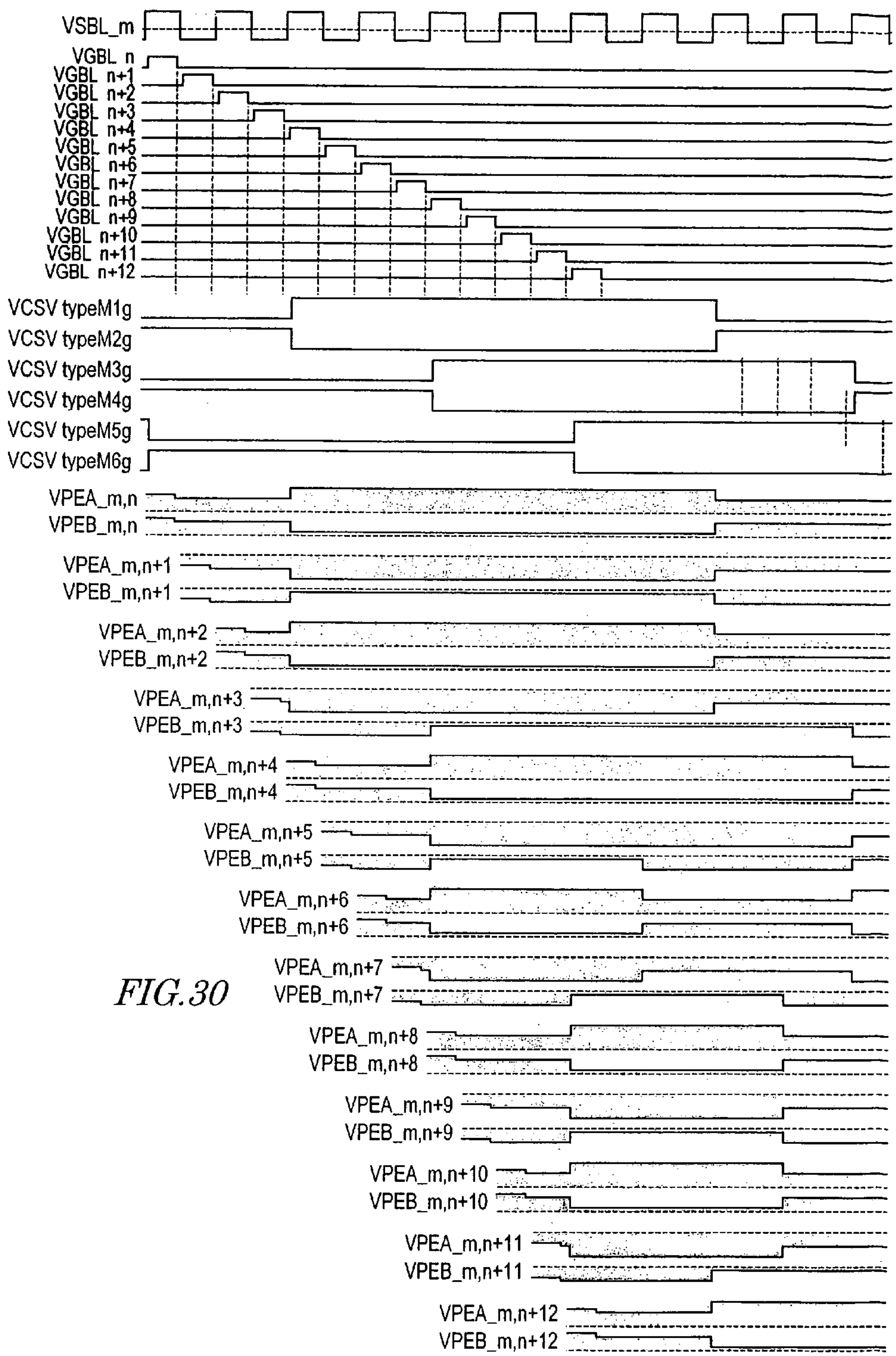

FIG. 30 schematically shows the waveforms of signals used to drive this liquid crystal display device shown in FIG. 29.

Figure 31:
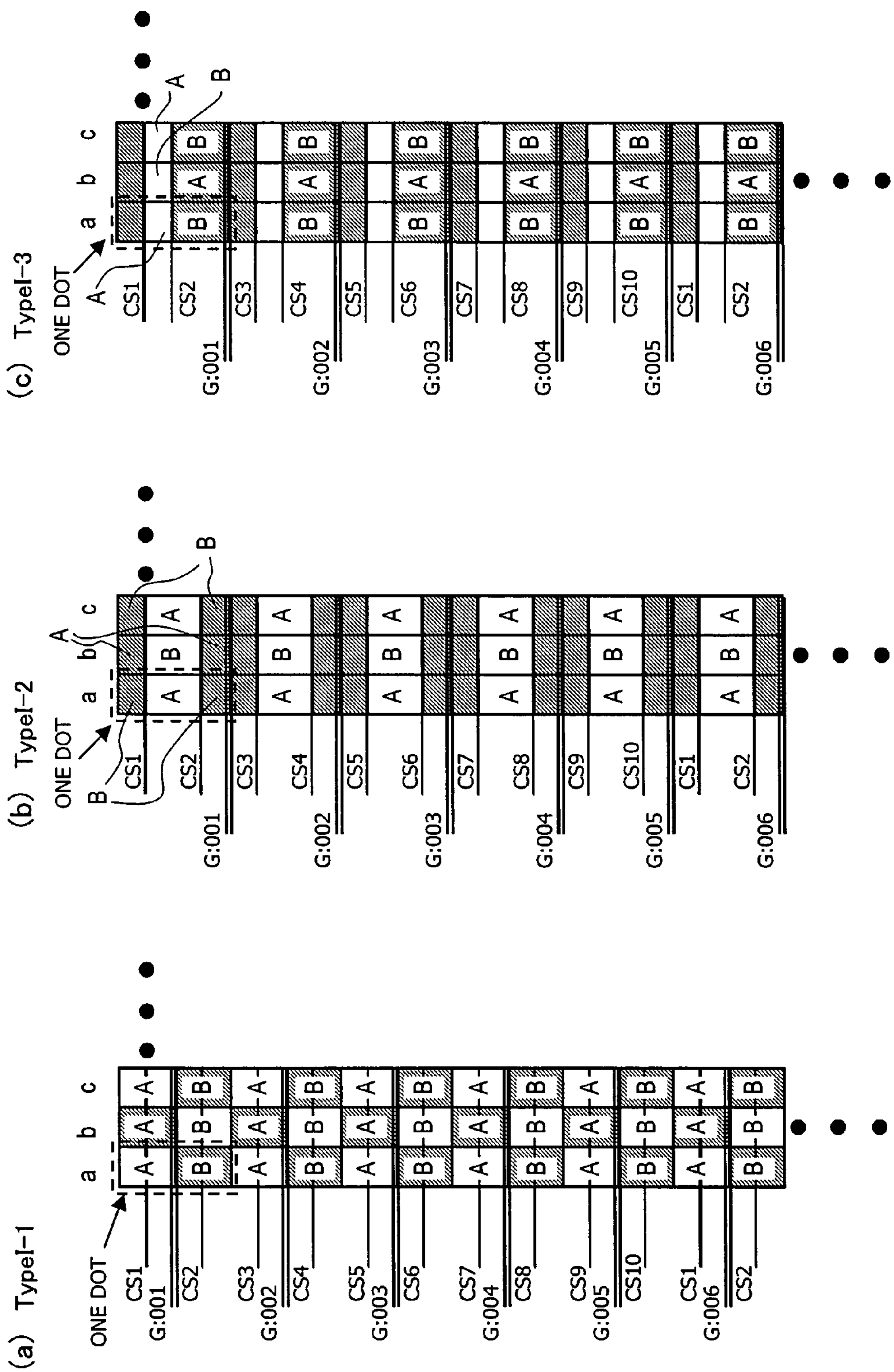

FIGS. 31(*a*), 31(*b*) and 31(*c*) schematically show three representative Type I arrangements for a liquid crystal display device according to a preferred embodiment of the present invention.

Figure 32:
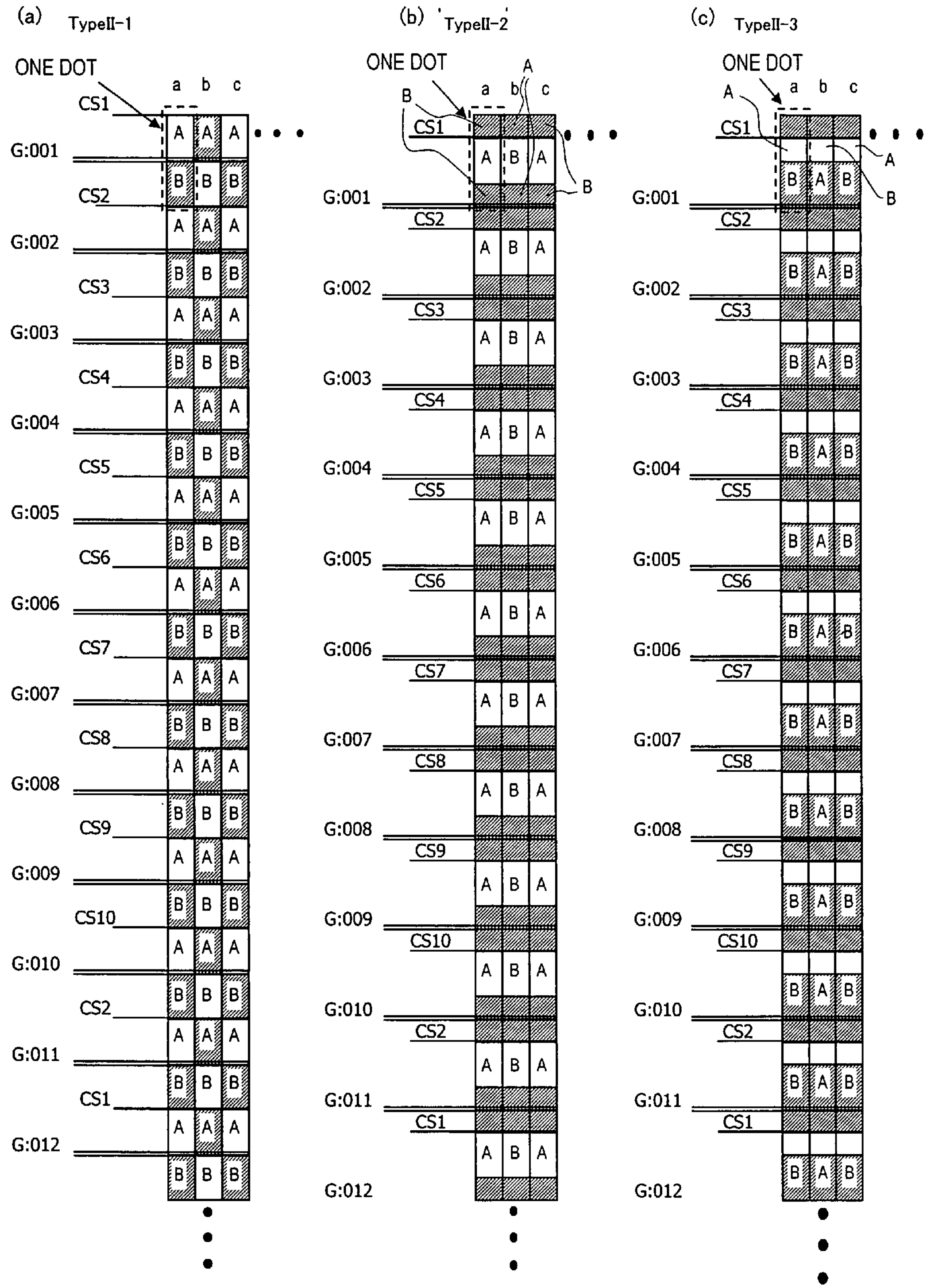

FIGS. 32(*a*), 32(*b*) and 32(*c*) schematically show three representative Type II arrangements for a liquid crystal display device according to a preferred embodiment of the present invention.

Figure 33A:
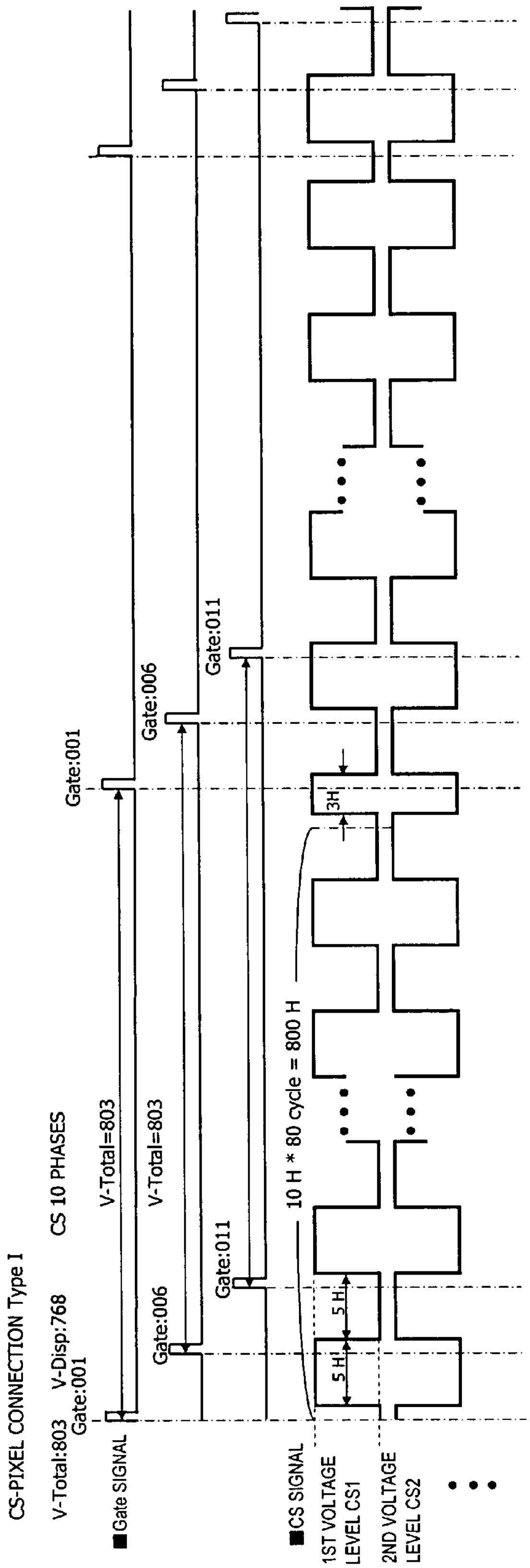

FIG. 33A shows the waveforms of gate voltages and CS voltages to explain the reason why stripes are generated on the Type I liquid crystal display device.

Figure 33B:
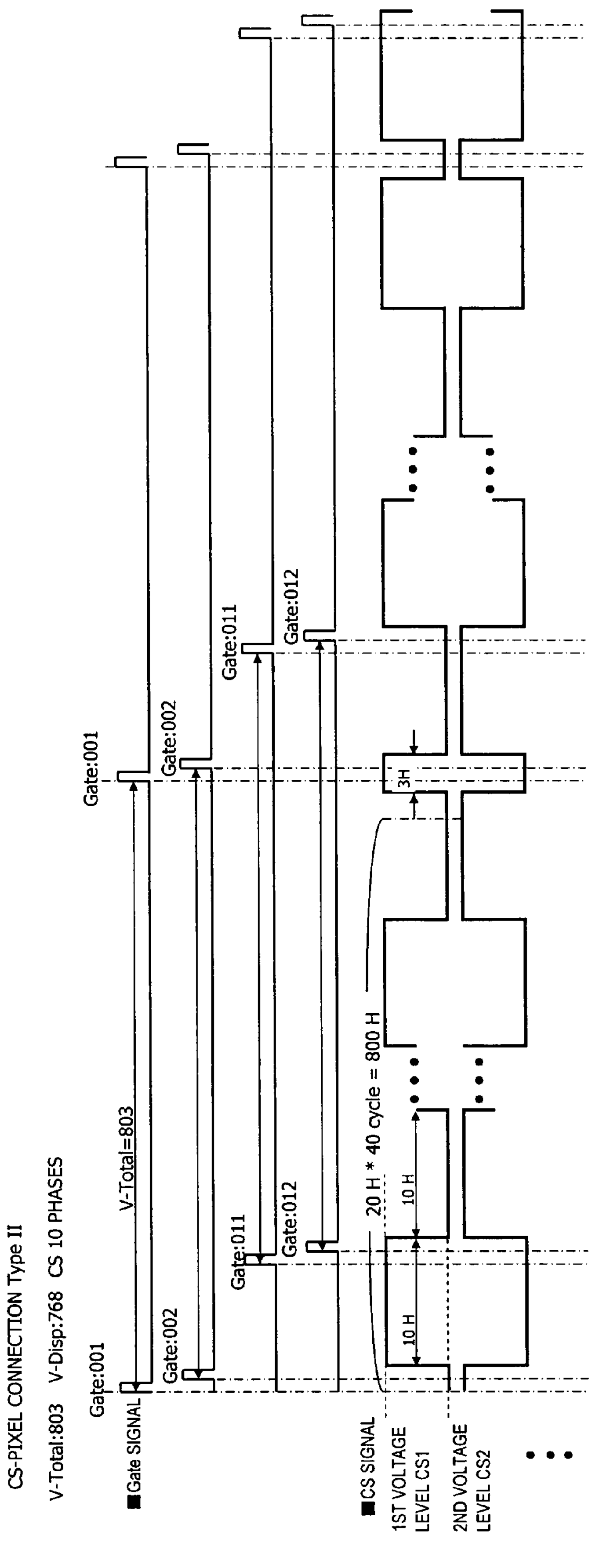

FIG. 33B shows the waveforms of gate voltages and CS voltages to explain the reason why stripes are generated on the Type II liquid crystal display device.

Figure 34:
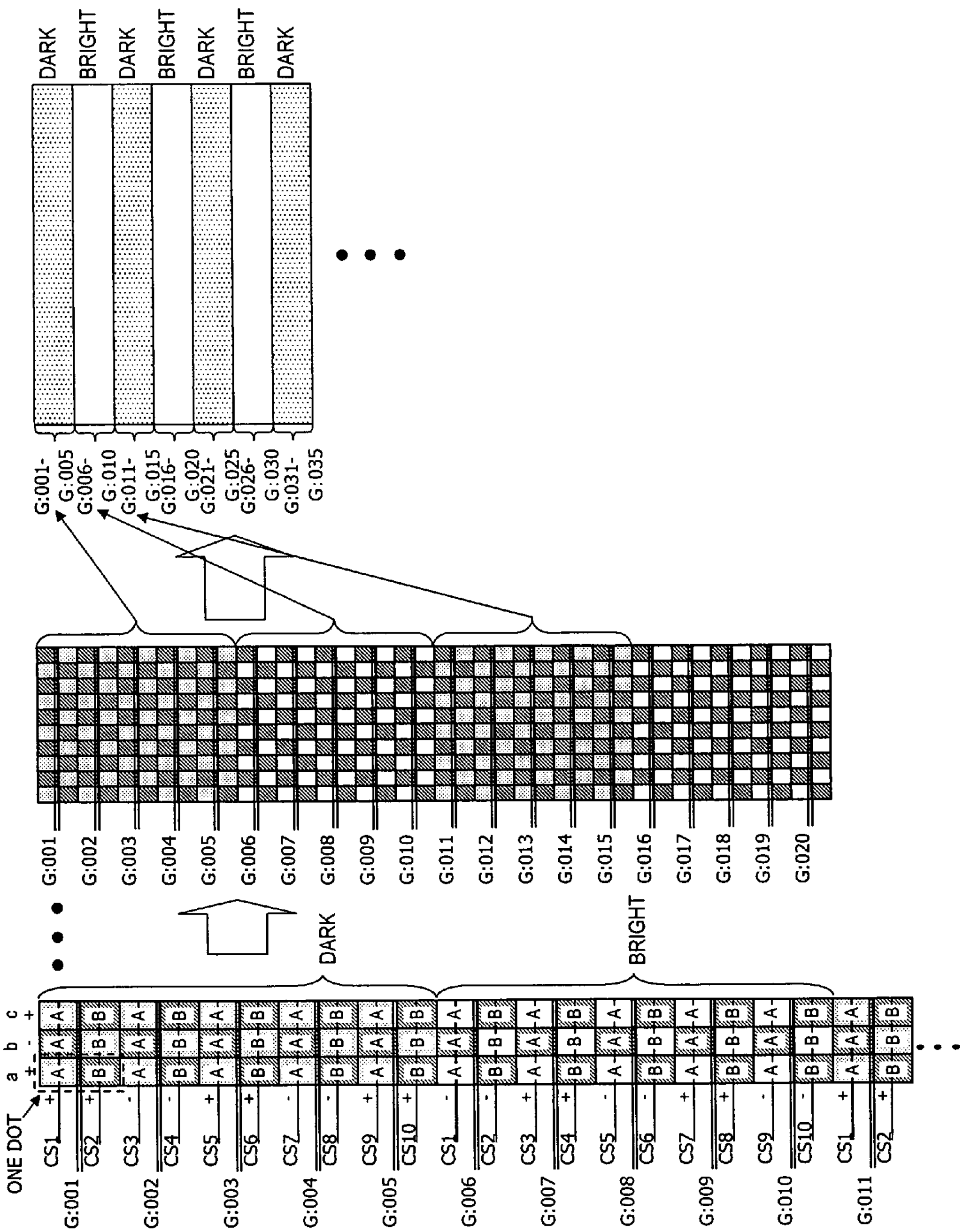

FIG. 34 schematically shows the stripes that have been generated on the Type I liquid crystal display device.

Figure 35A:
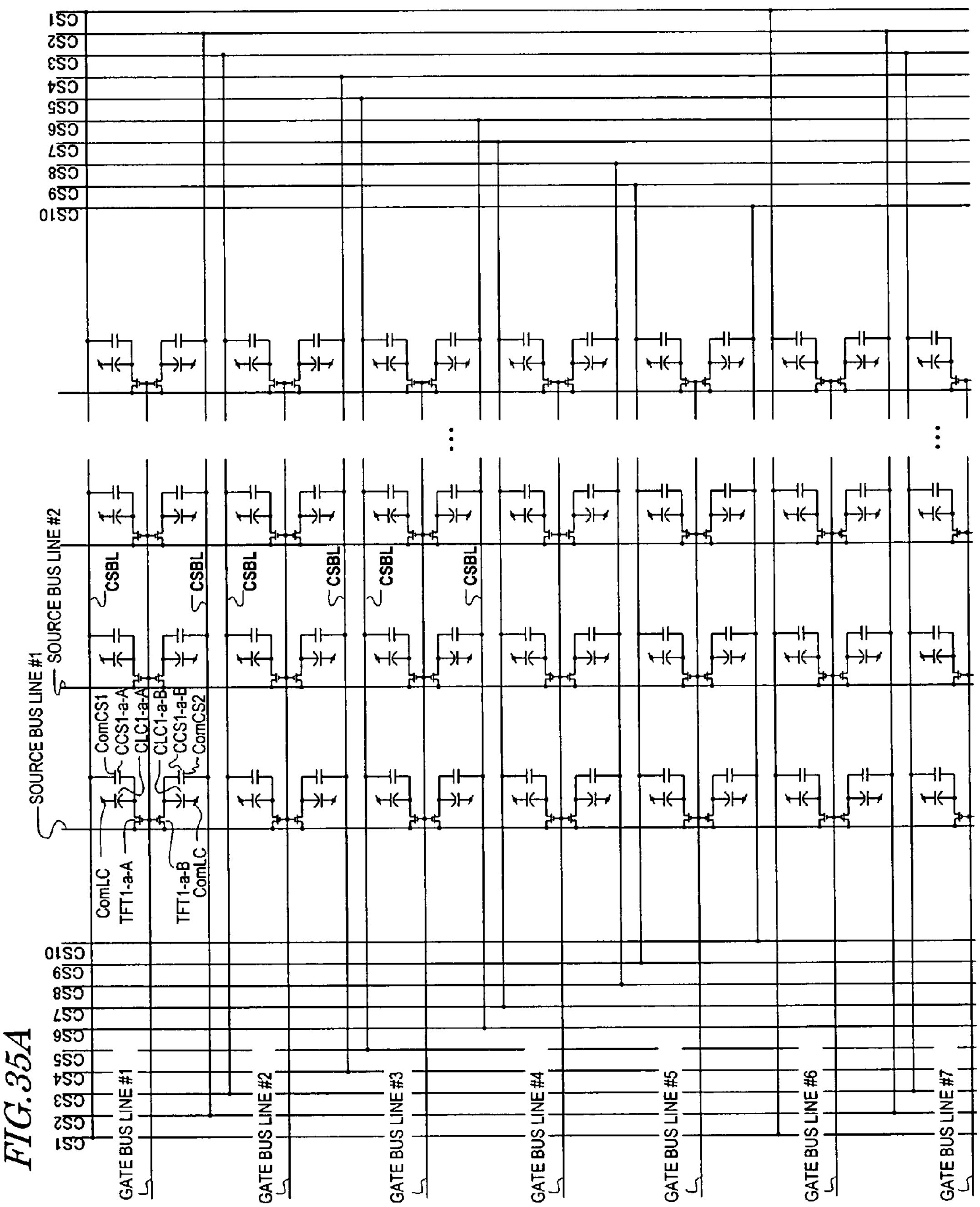
Figure 35B:
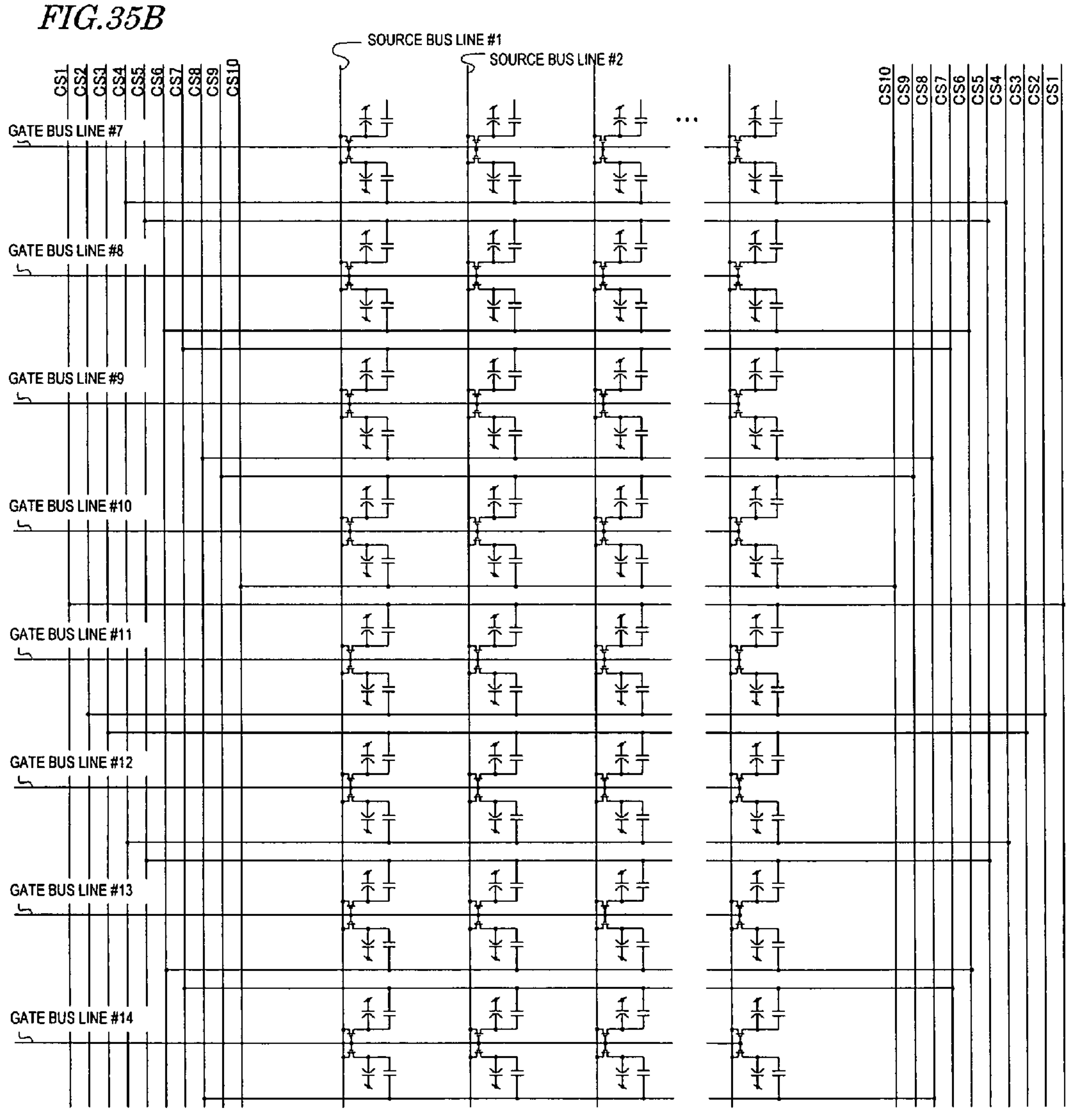

FIGS. 35A and 35B show an equivalent circuit of the Type I liquid crystal display device with a pattern of connection to the CS trunks.

Figure 36:
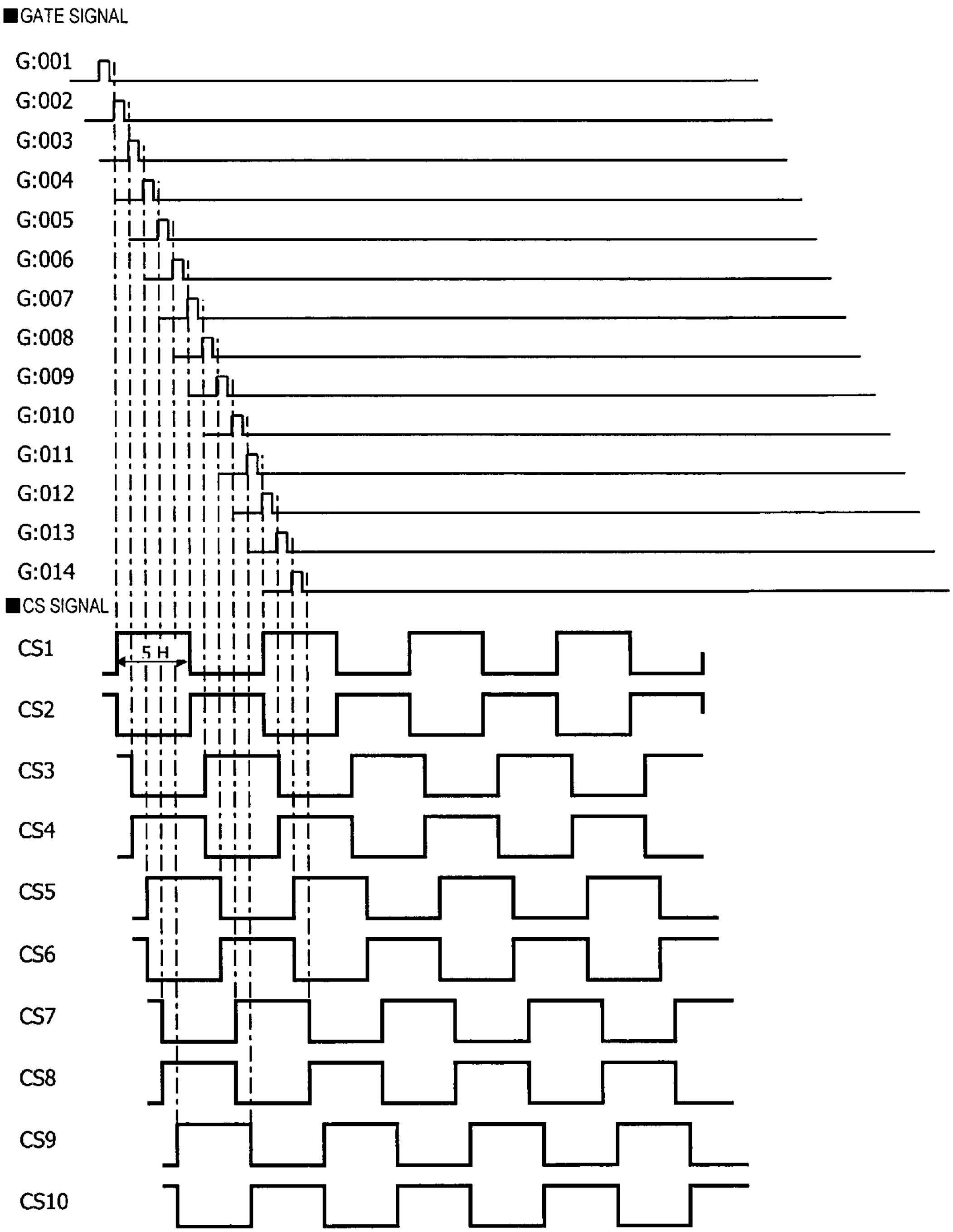

FIG. 36 shows timing relations between the CS voltages and the gate voltages in the liquid crystal display device shown in FIGS. 35A and 35B.

Figure 37:
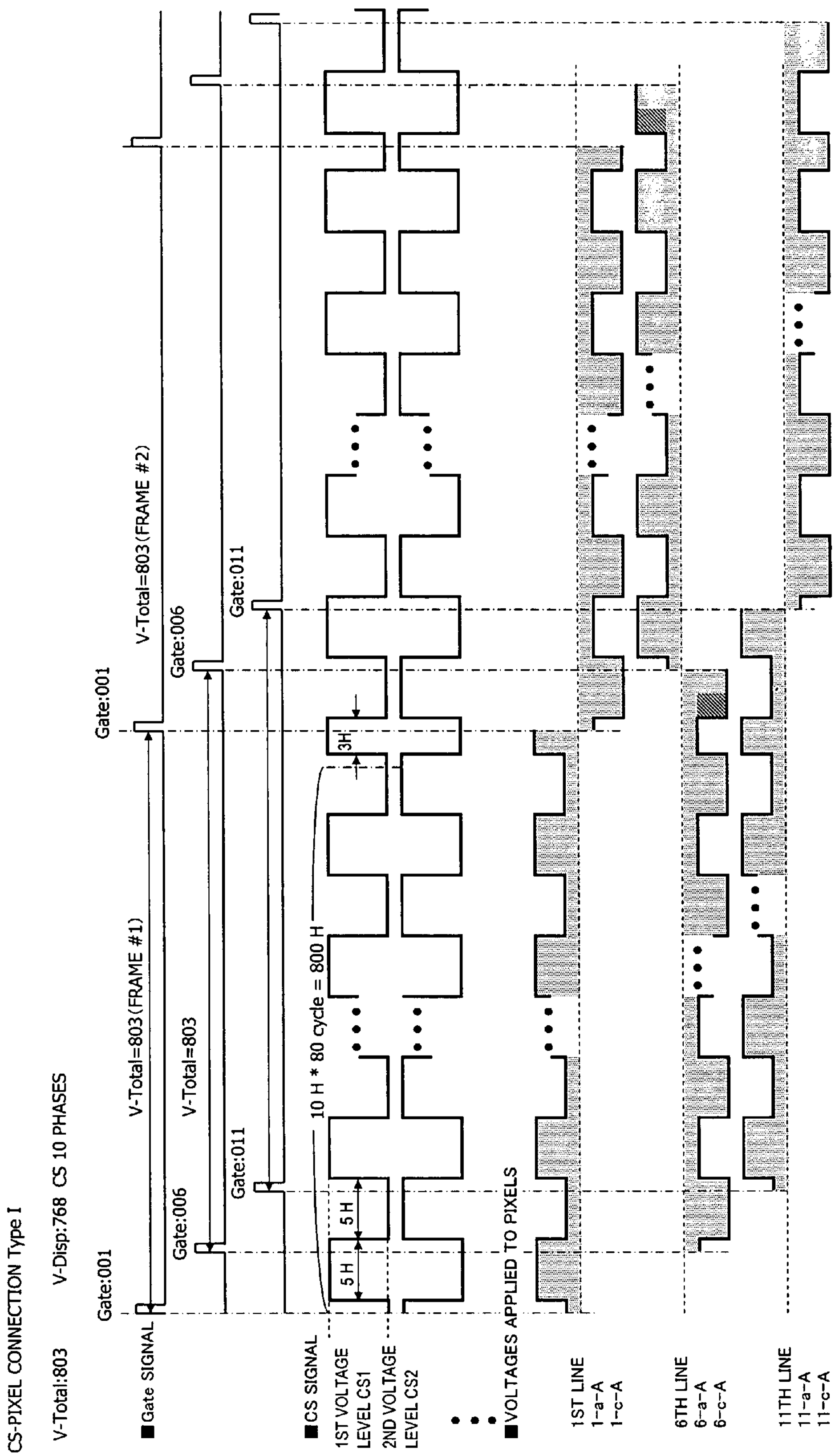

FIG. 37 shows the waveforms of gate voltages and CS voltages to explain the reason why stripes are generated on the liquid crystal display device shown in FIGS. 35A and 35B.

Figure 38:
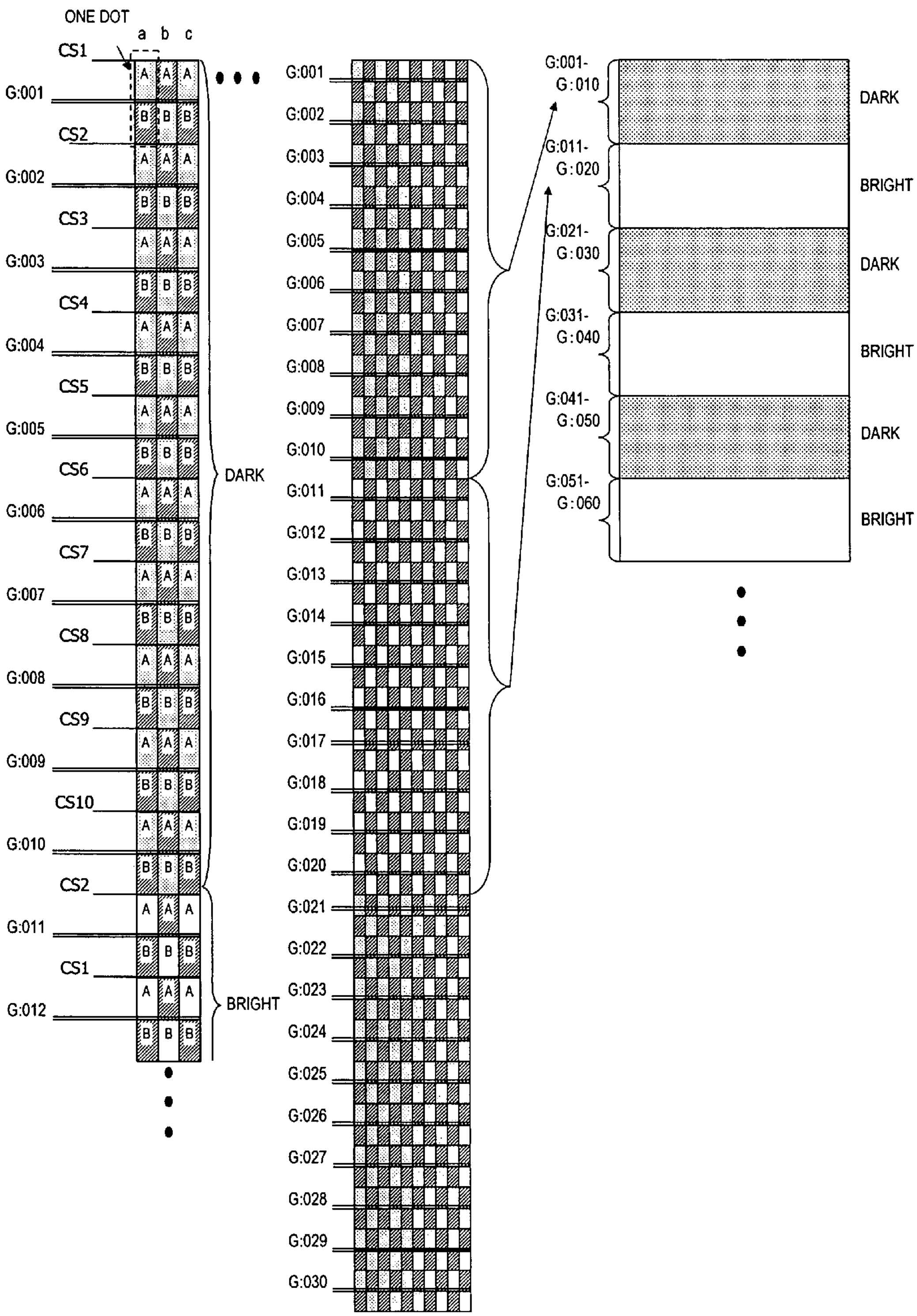

FIG. 38 schematically shows the stripes that have been generated on the Type II liquid crystal display device.

Figure 39A:
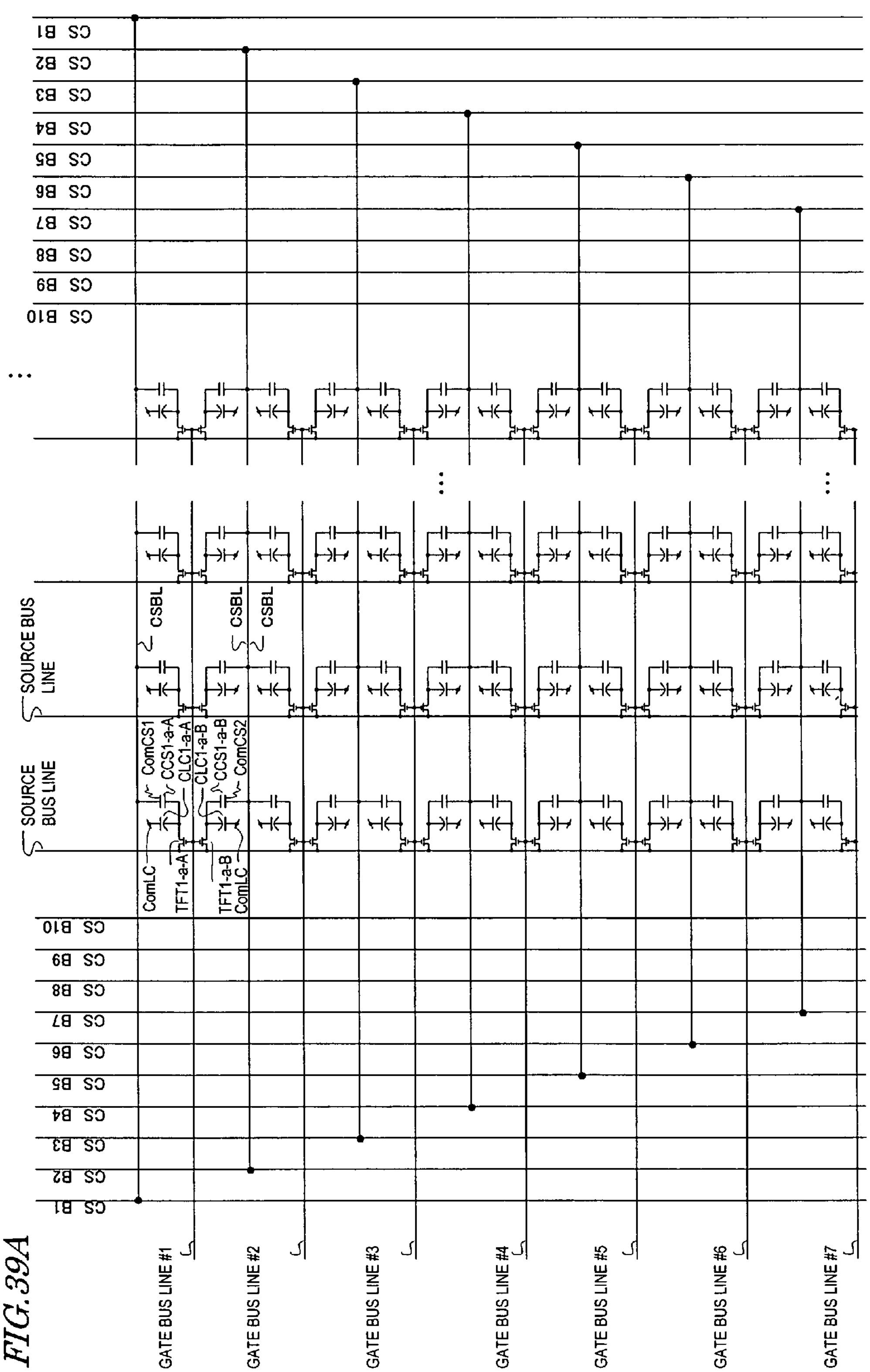
Figure 39B:
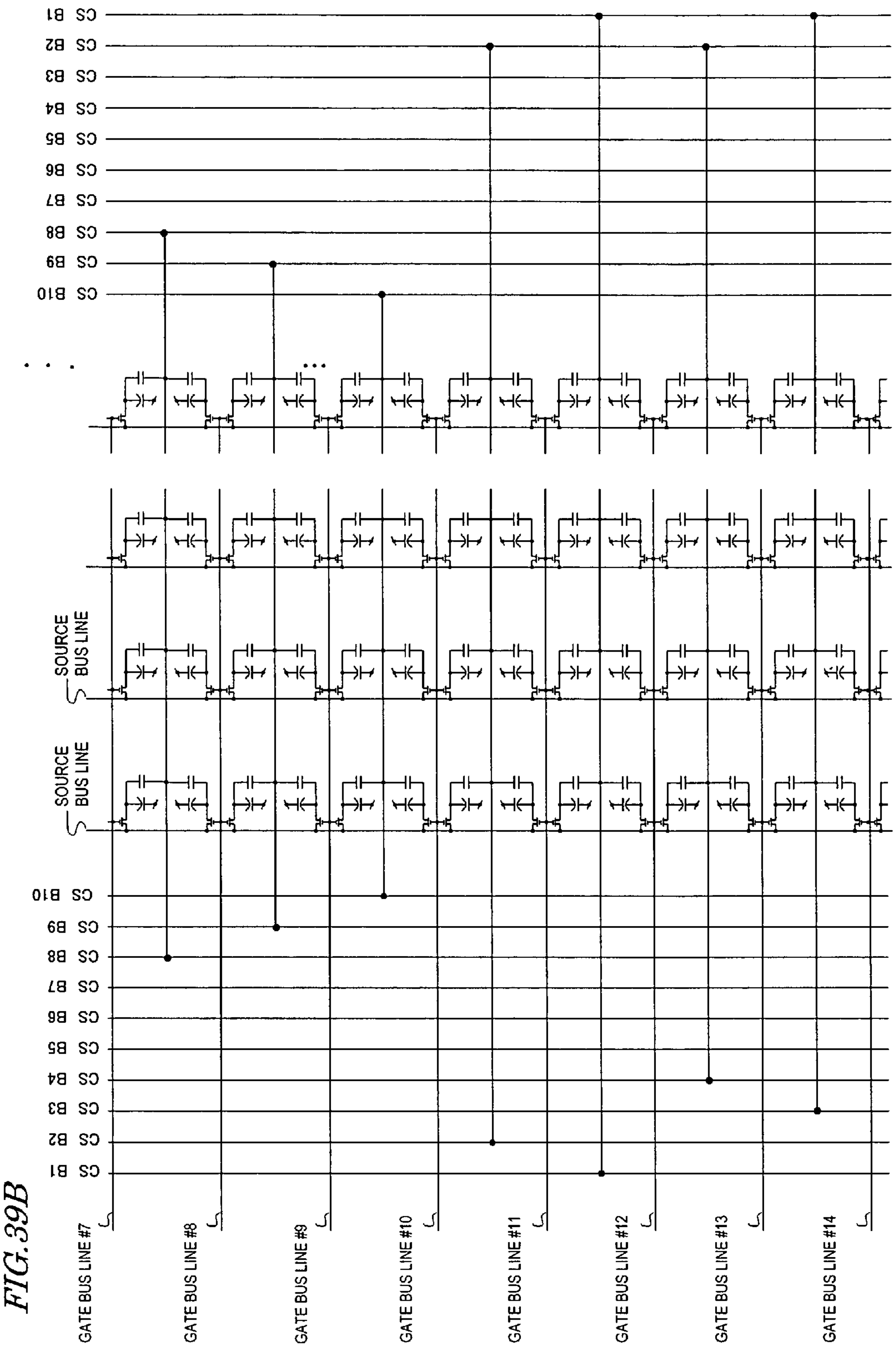
Figure 39C:
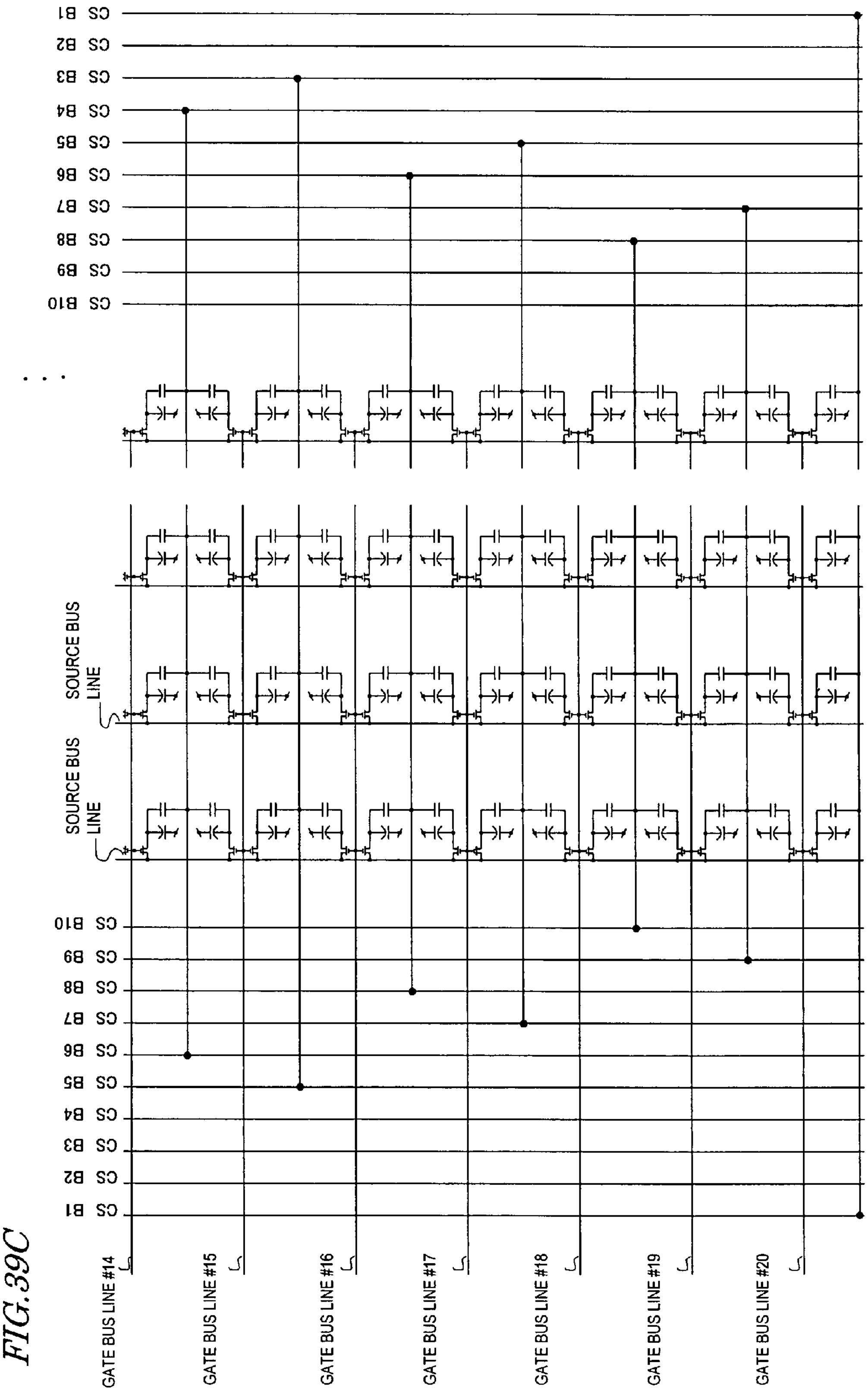

FIGS. 39A, 39B and 39C show an equivalent circuit of the Type I liquid crystal display device with a pattern of connection to the CS trunks.

Figure 40:
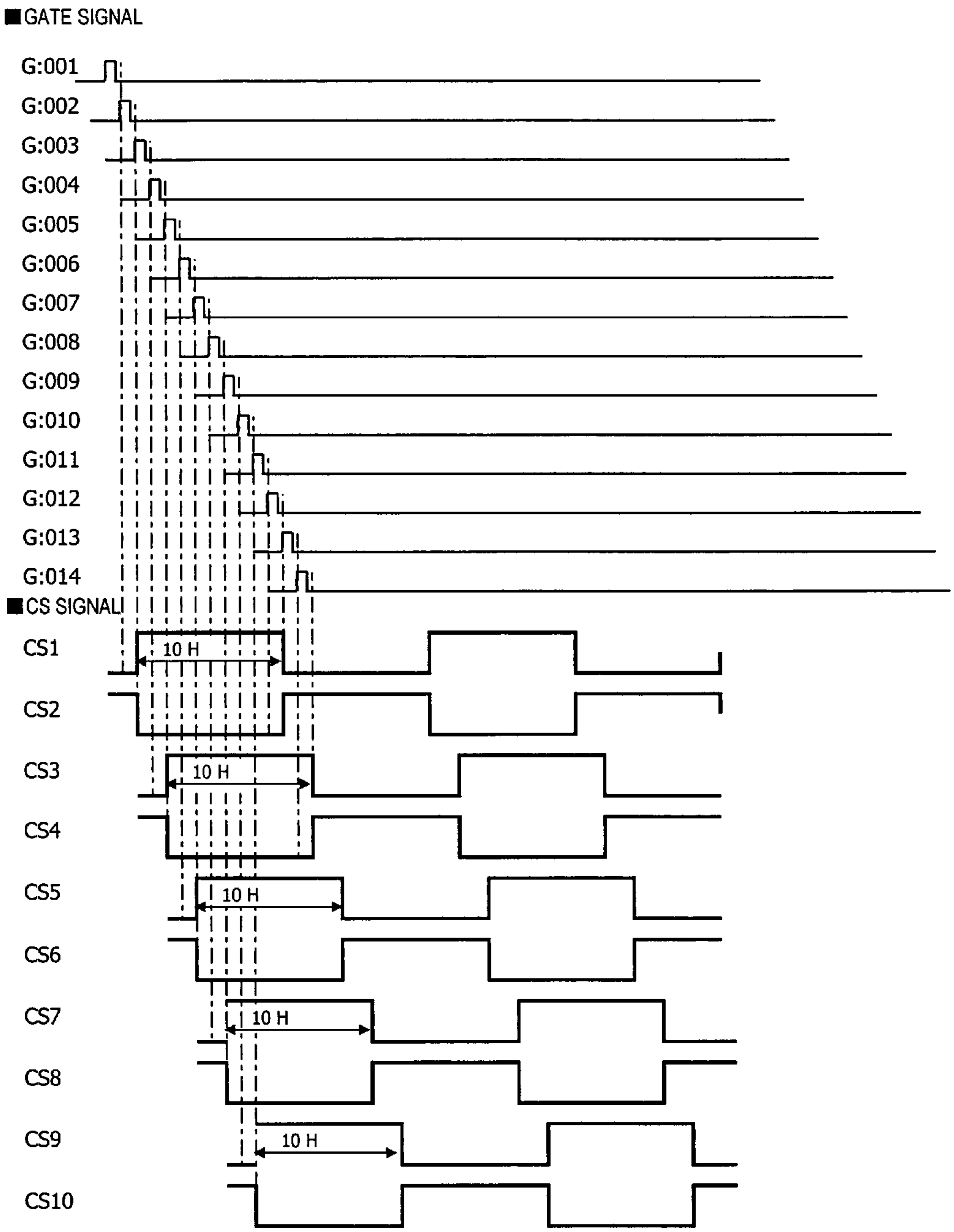

FIG. 40 shows timing relations between the CS voltages and the gate voltages in the liquid crystal display device shown in FIGS. 39A through 39C.

Figure 41A:
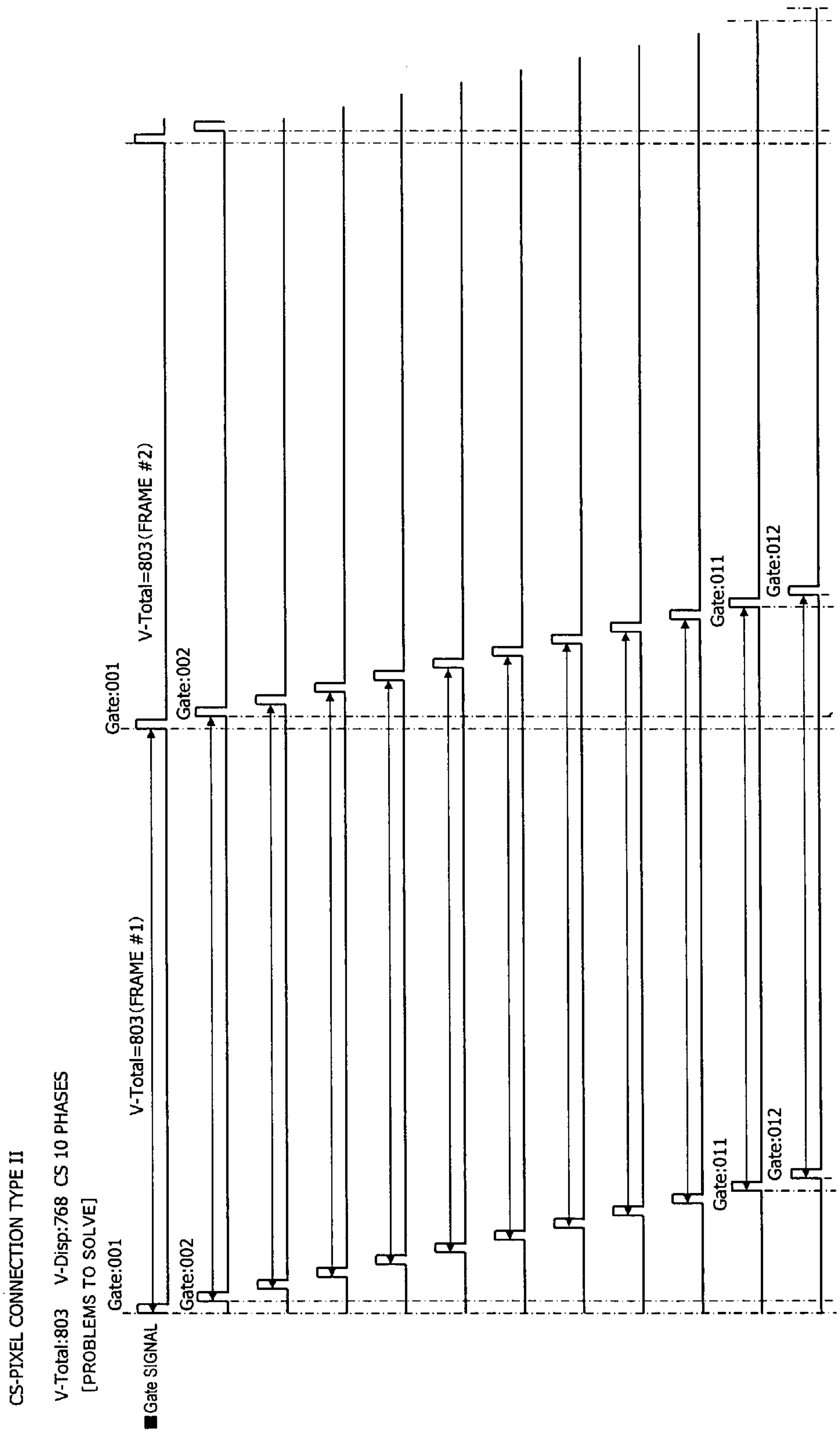

FIG. 41A shows the waveforms of gate voltages to explain the reason why the stripes are generated on the liquid crystal display device shown in FIGS. 39A through 39C.

Figure 41B:
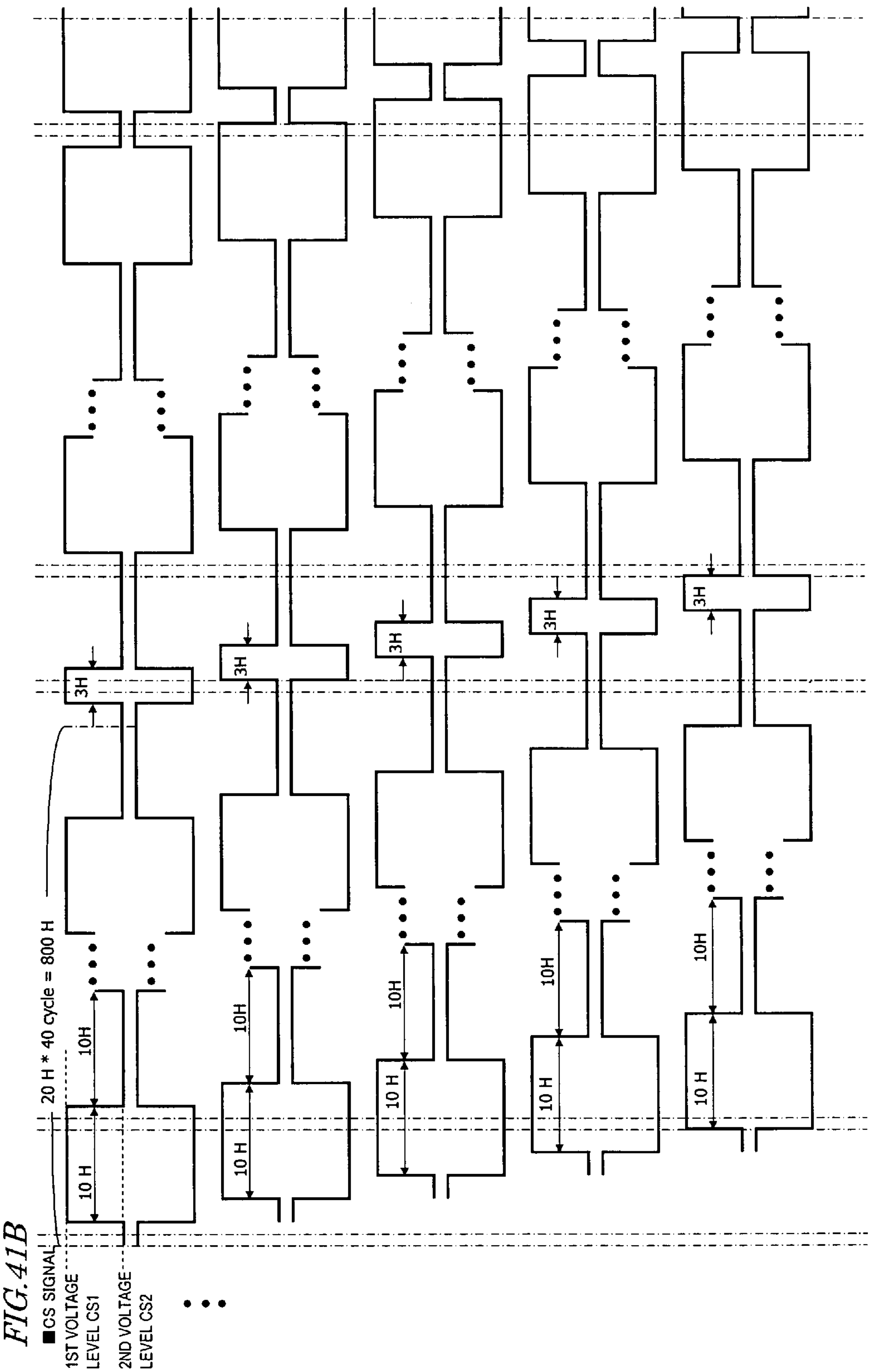

FIG. 41B shows the waveforms of CS voltages to explain the reason why the stripes are generated on the liquid crystal display device shown in FIGS. 39A through 39C.

Figure 41C:
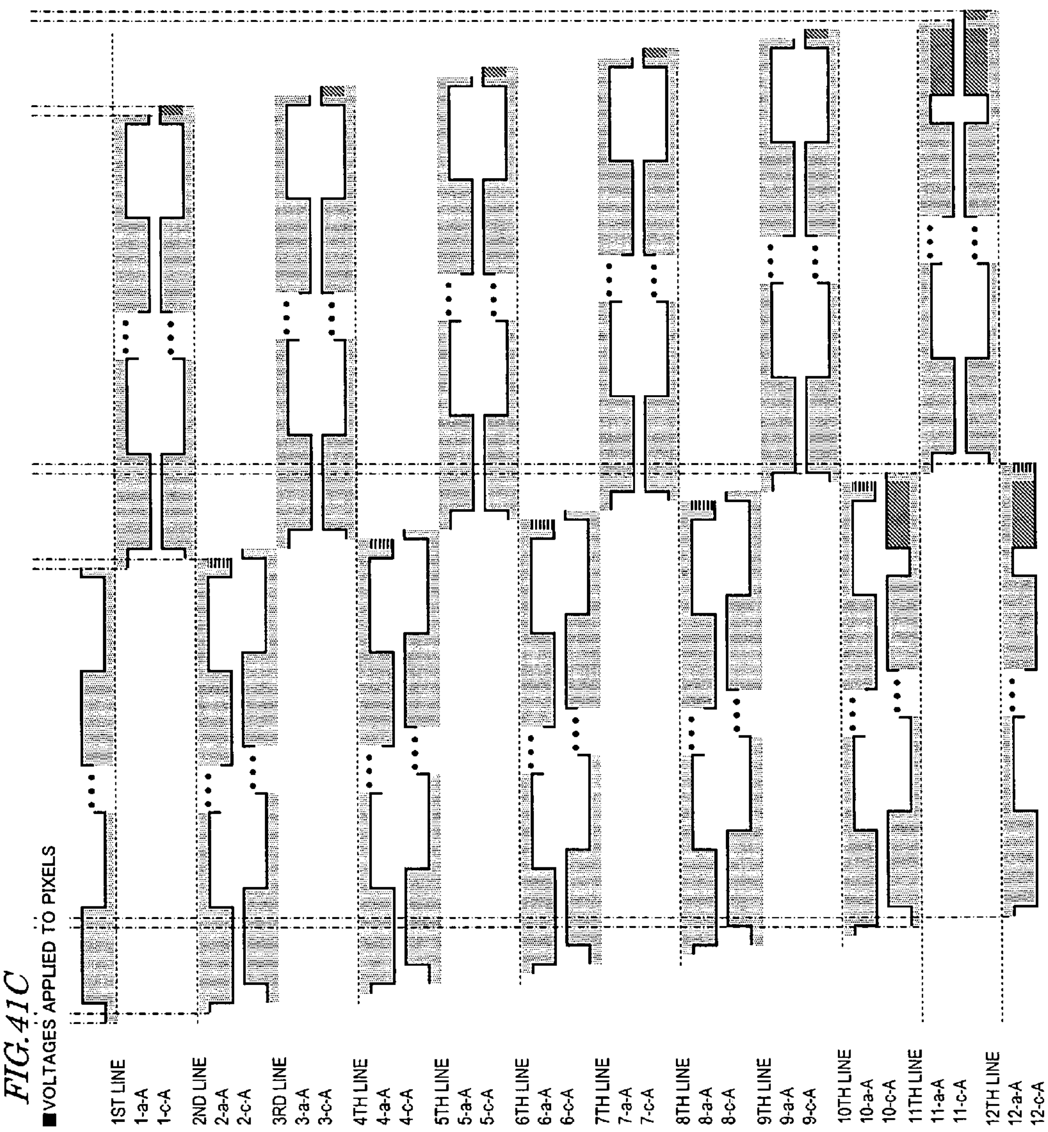

FIG. 41C shows the waveforms of voltages applied to the pixels to explain the reason why the stripes are generated on the liquid crystal display device shown in FIGS. 39A through 39C.

Figure 42A:
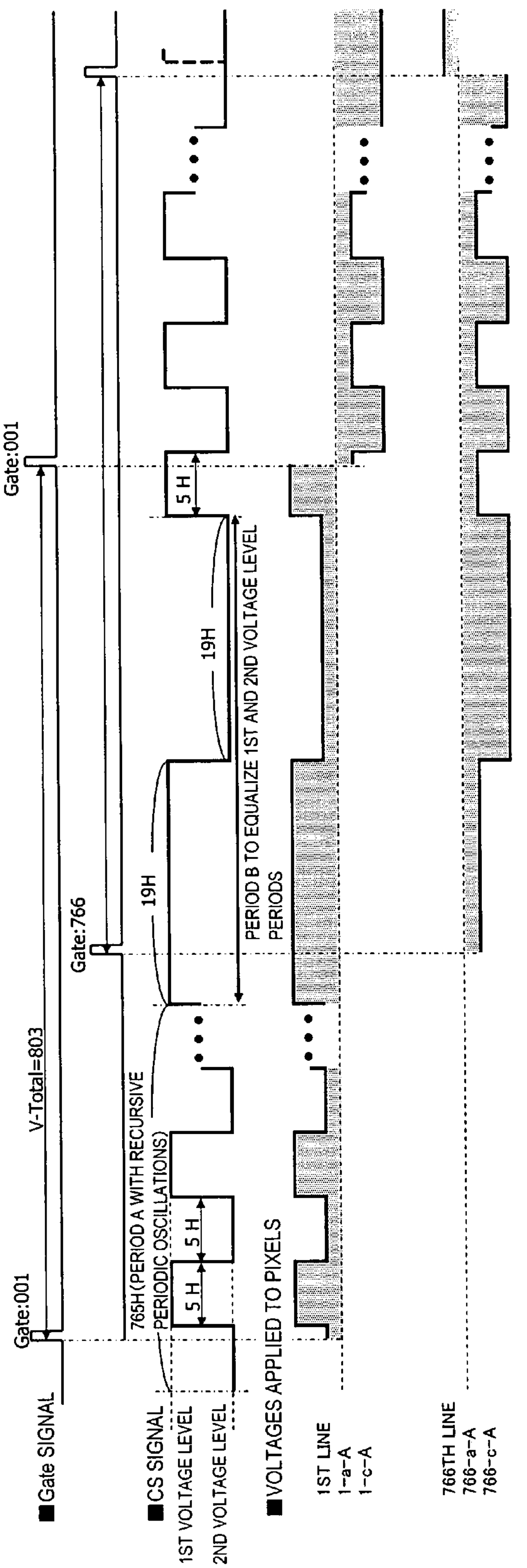

FIG. 42A shows the waveforms of a gate voltage, a CS voltage and the voltage applied to pixels to illustrate how to drive a Type I liquid crystal display device according to a first preferred embodiment of the present invention (representing Example #1).

Figure 42B:
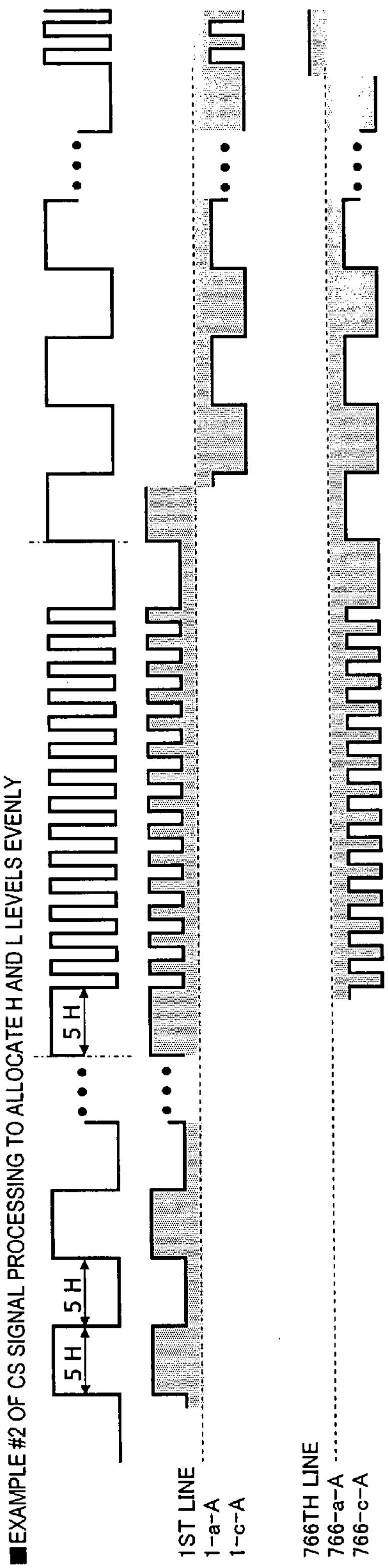

FIG. 42B shows the waveforms of a CS voltage and the voltage applied to pixels to illustrate how to drive the Type I liquid crystal display device of the first preferred embodiment of the present invention (representing Example #2).

Figure 42C:
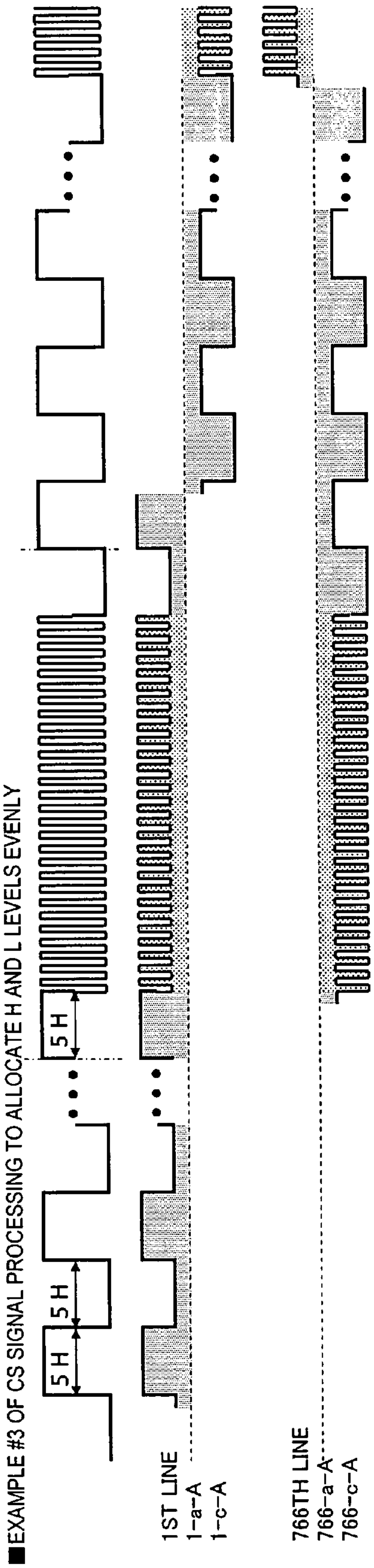

FIG. 42C shows the waveforms of a CS voltage and the voltage applied to pixels to illustrate how to drive the Type I liquid crystal display device of the first preferred embodiment of the present invention (representing Example #3).

Figure 42D:
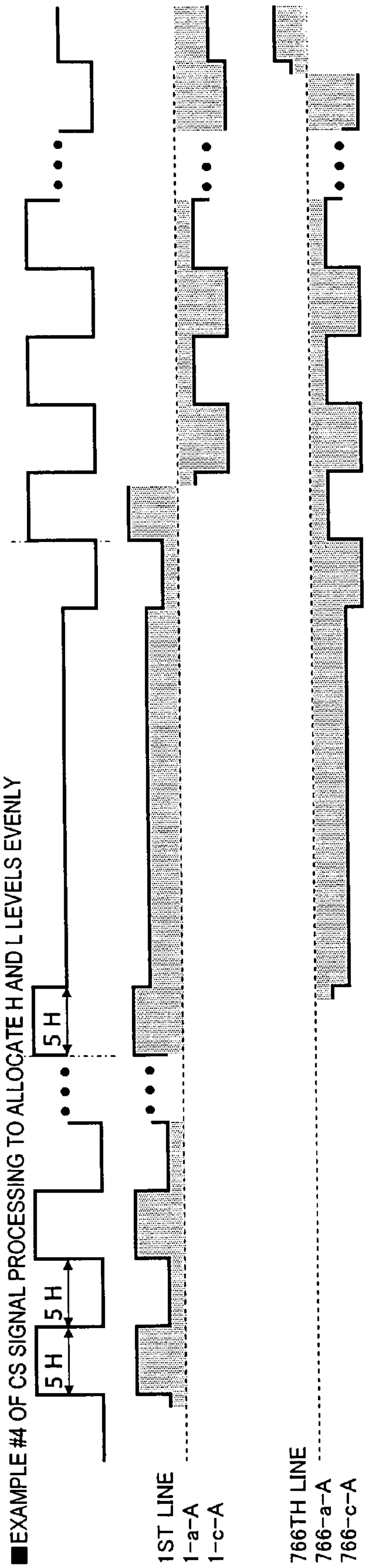

FIG. 42D shows the waveforms of a CS voltage and the voltage applied to pixels to illustrate how to drive the Type I liquid crystal display device of the first preferred embodiment of the present invention (representing Example #4).

Figure 43:
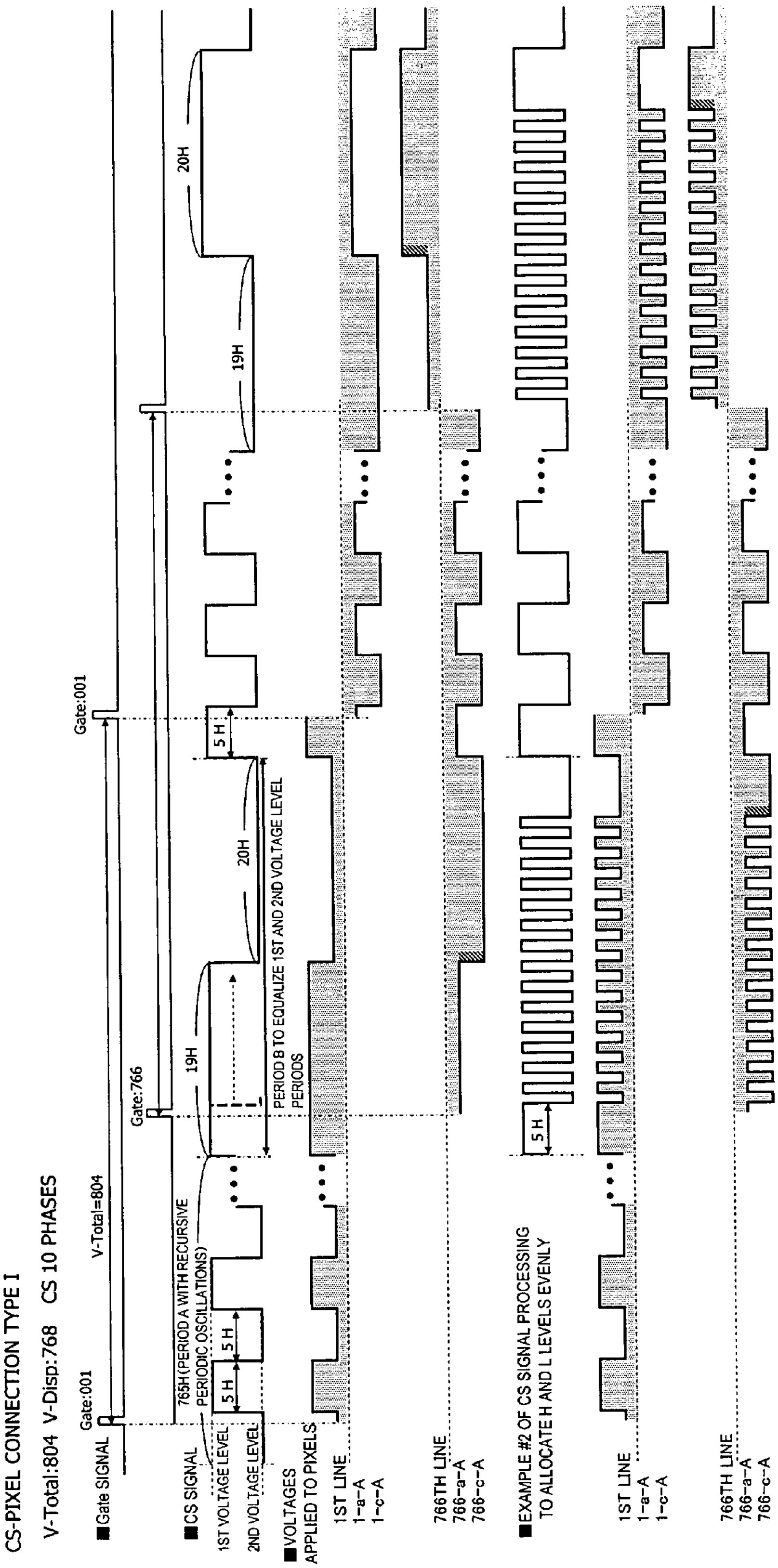

FIG. 43 shows the waveforms of a gate voltage, a CS voltage and the voltage applied to pixels to explain why the stripes are produced on another Type I liquid crystal display device.

Figure 44:
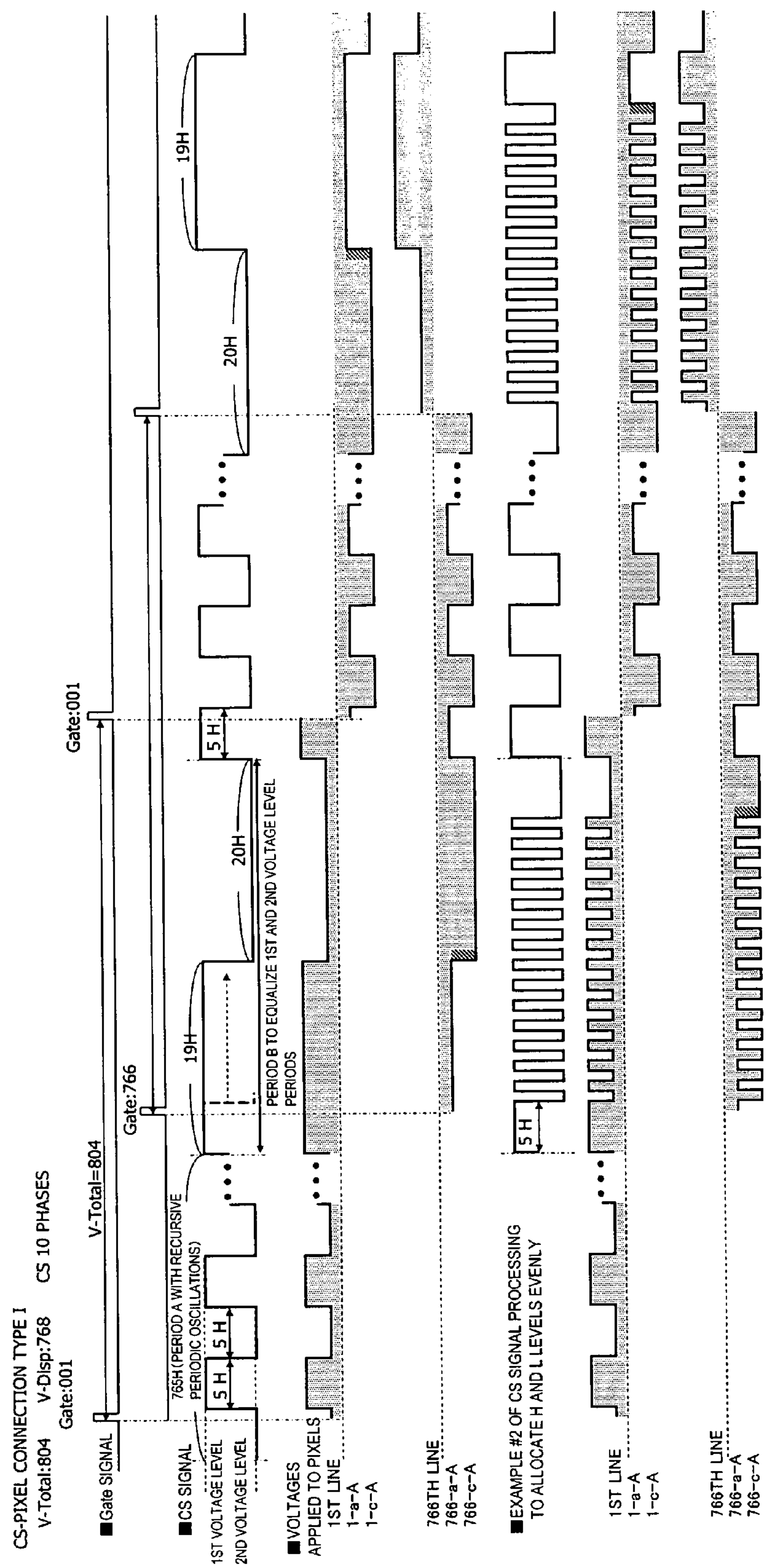

FIG. 44 shows the waveforms of a gate voltage, a CS voltage and the voltage applied to pixels to illustrate how to drive a Type I liquid crystal display device according to a second preferred embodiment of the present invention.

Figure 45A:
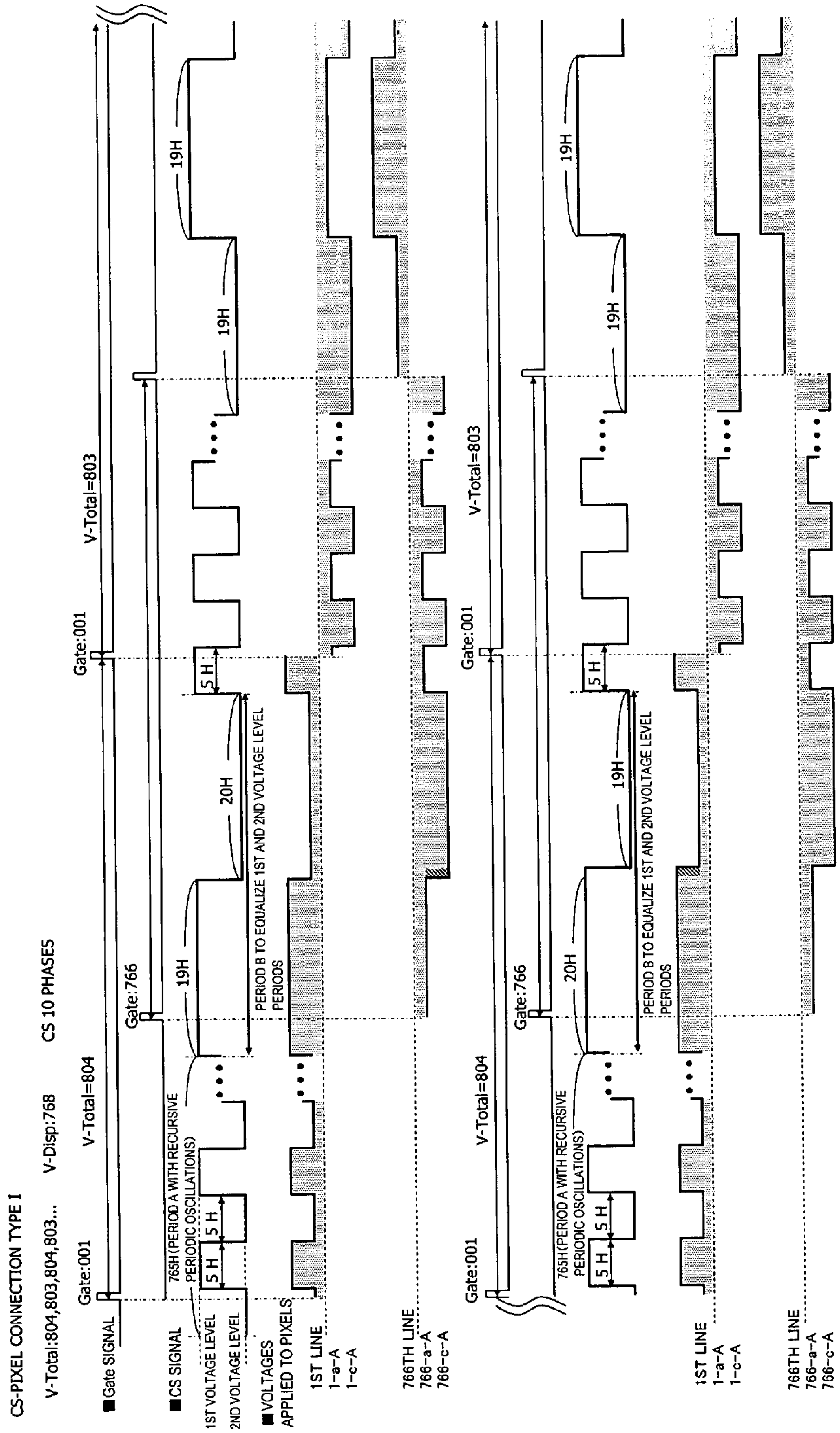

FIG. 45A shows the waveforms of a gate voltage, a CS voltage and the voltage applied to pixels to illustrate how to drive a Type I liquid crystal display device according to a third preferred embodiment of the present invention (representing Example #1).

Figure 45B:
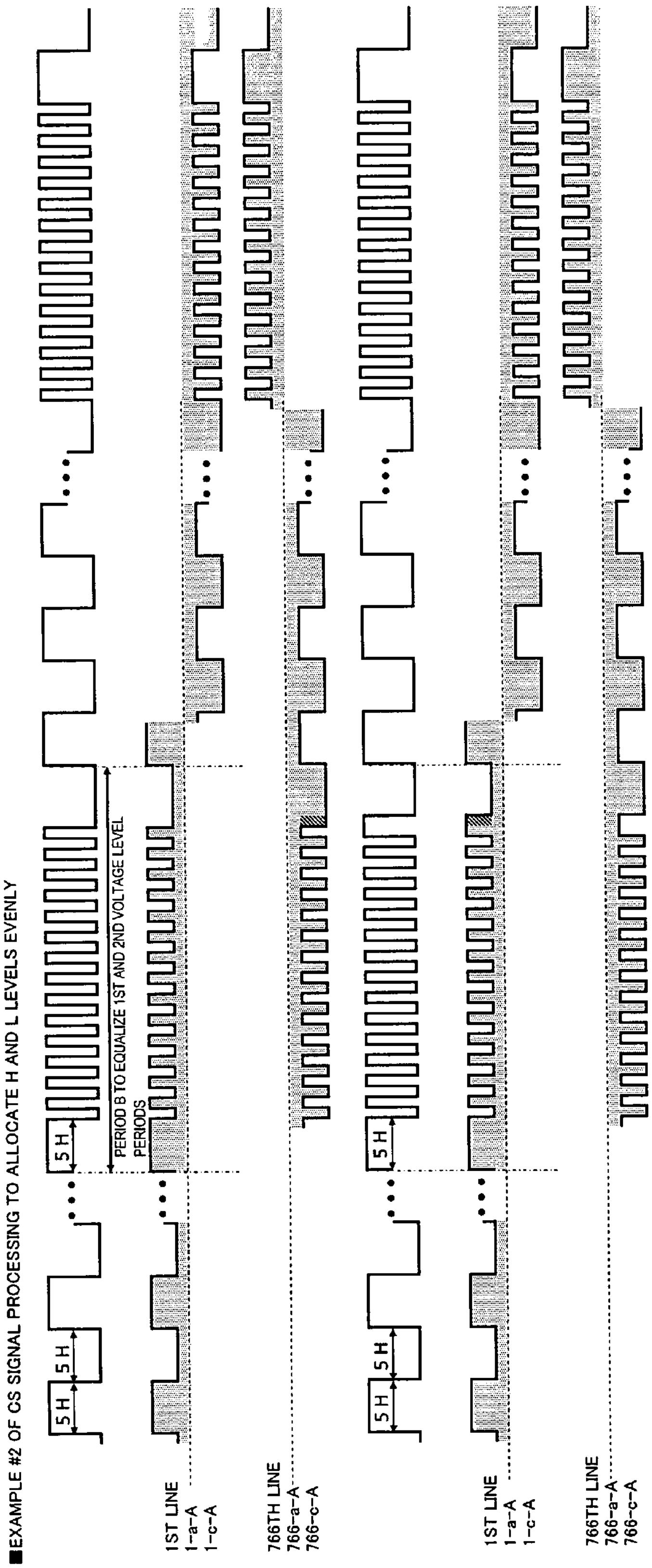

FIG. 45B shows the waveforms of a gate voltage, a CS voltage and the voltage applied to pixels to illustrate how to drive the Type I liquid crystal display device of the third preferred embodiment of the present invention (representing Example #2).

Figure 46A:
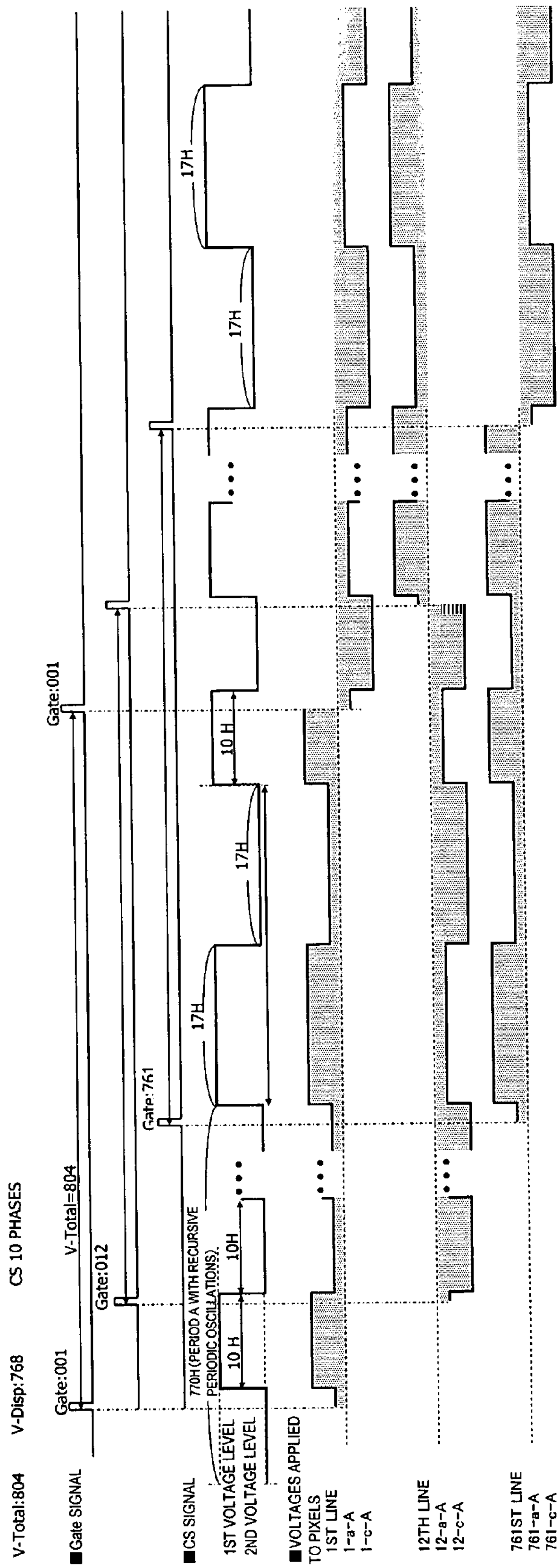

FIG. 46A shows the waveforms of a gate voltage, a CS voltage and the voltage applied to pixels to illustrate how to drive a Type II liquid crystal display device according to a fourth preferred embodiment of the present invention (representing Example #1).

Figure 46B:
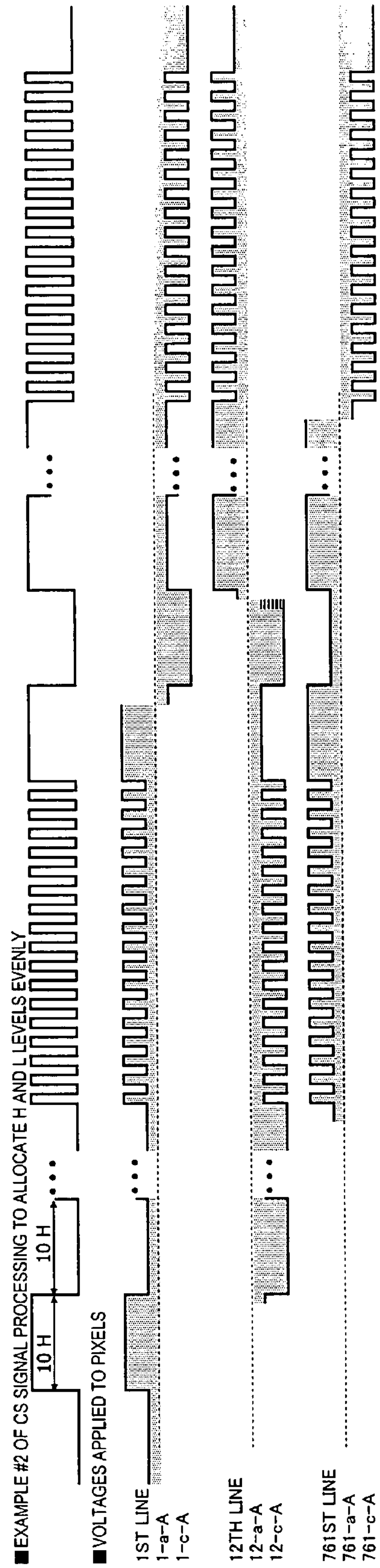

FIG. 46B shows the waveforms of a CS voltage and the voltage applied to pixels to illustrate how to drive the Type II liquid crystal display device of the fourth preferred embodiment of the present invention (representing Example #2).

Figure 46C:
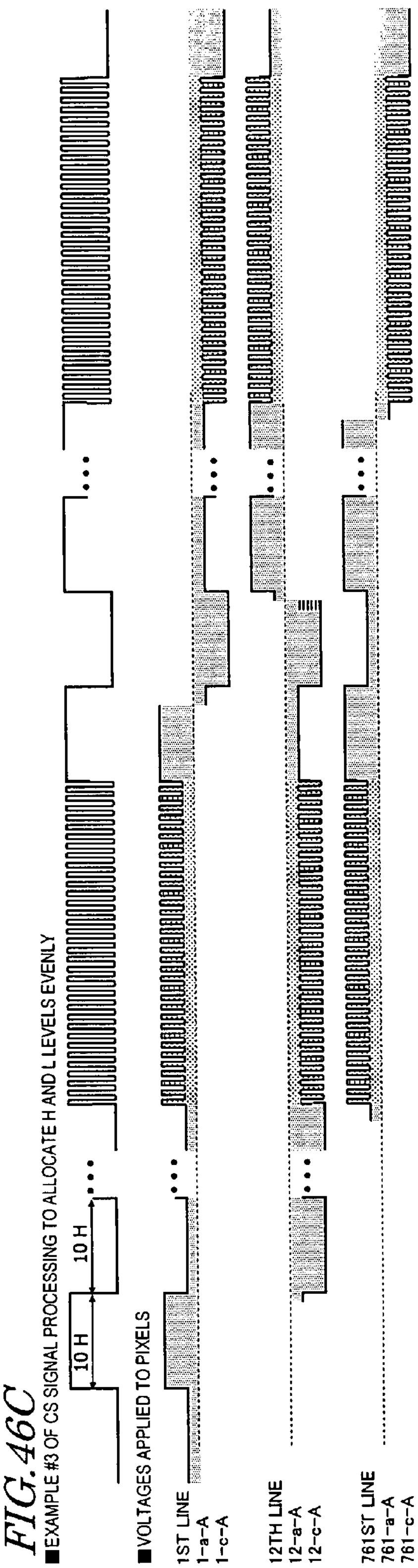

FIG. 46C shows the waveforms of a CS voltage and the voltage applied to pixels to illustrate how to drive the Type II liquid crystal display device of the fourth preferred embodiment of the present invention (representing Example #3).

Figure 46D:
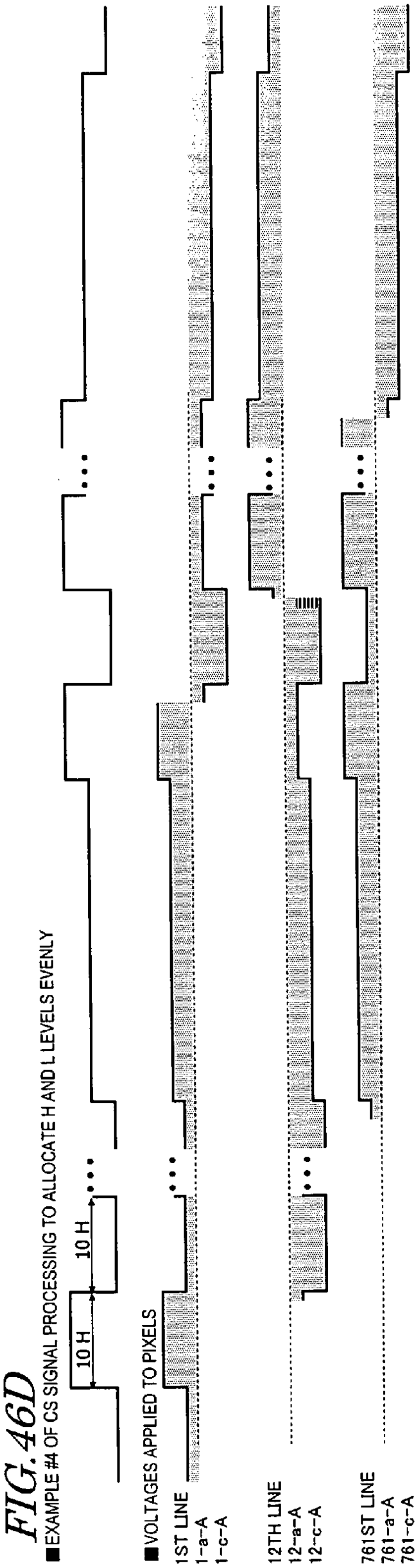

FIG. 46D shows the waveforms of a CS voltage and the voltage applied to pixels to illustrate how to drive the Type II liquid crystal display device of the fourth preferred embodiment of the present invention (representing Example #4).

Figure 47A:
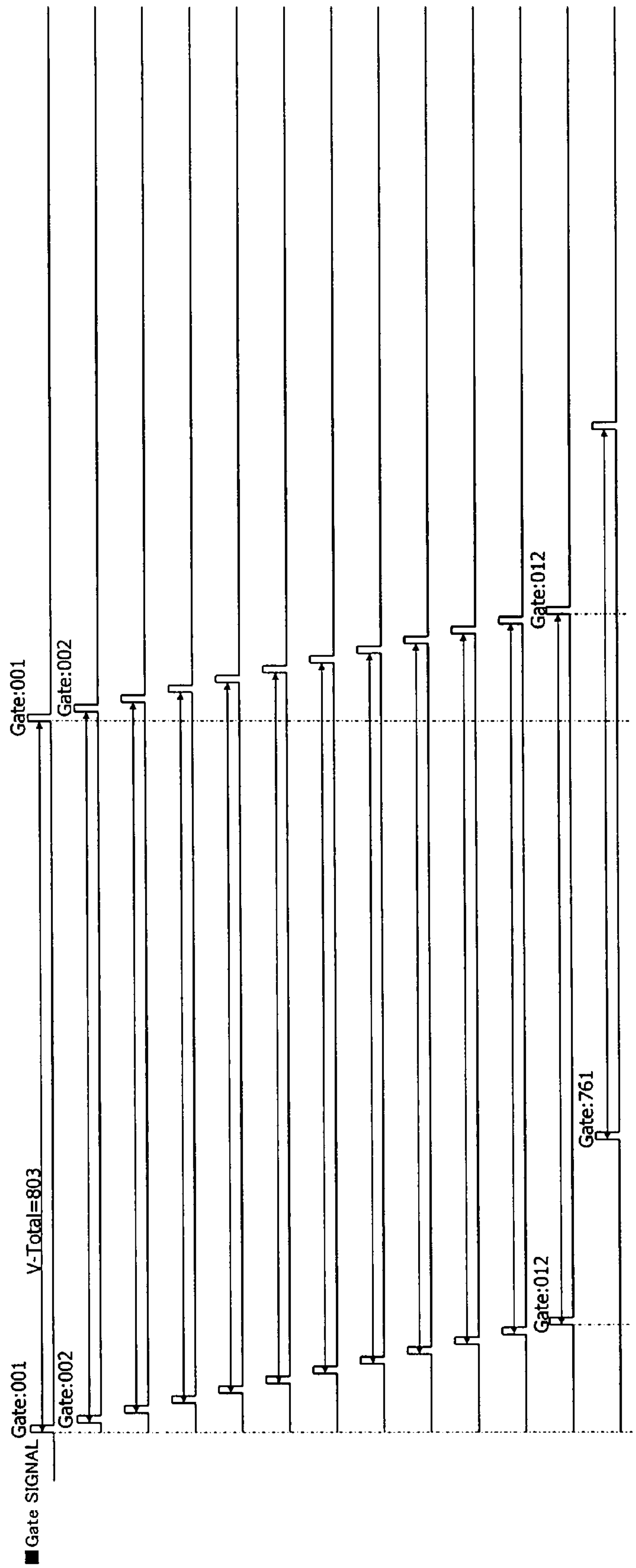

FIG. 47A shows the waveforms of gate voltages to illustrate why the stripes are produced on another Type II liquid crystal display device.

Figure 47B:
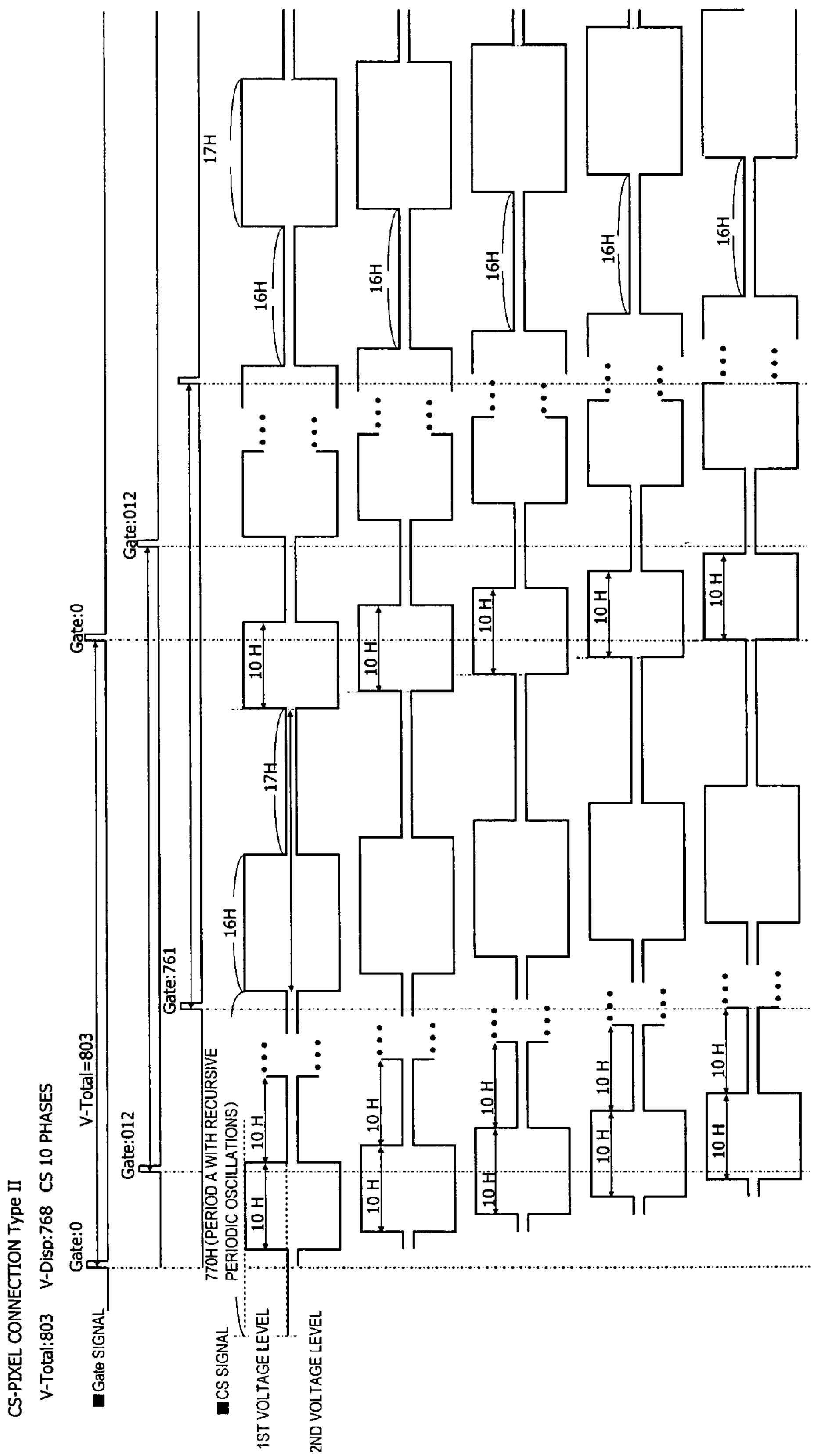

FIG. 47B shows the waveforms of a gate voltage and CS voltages to illustrate why the stripes are produced on that another Type II liquid crystal display device.

Figure 47C:
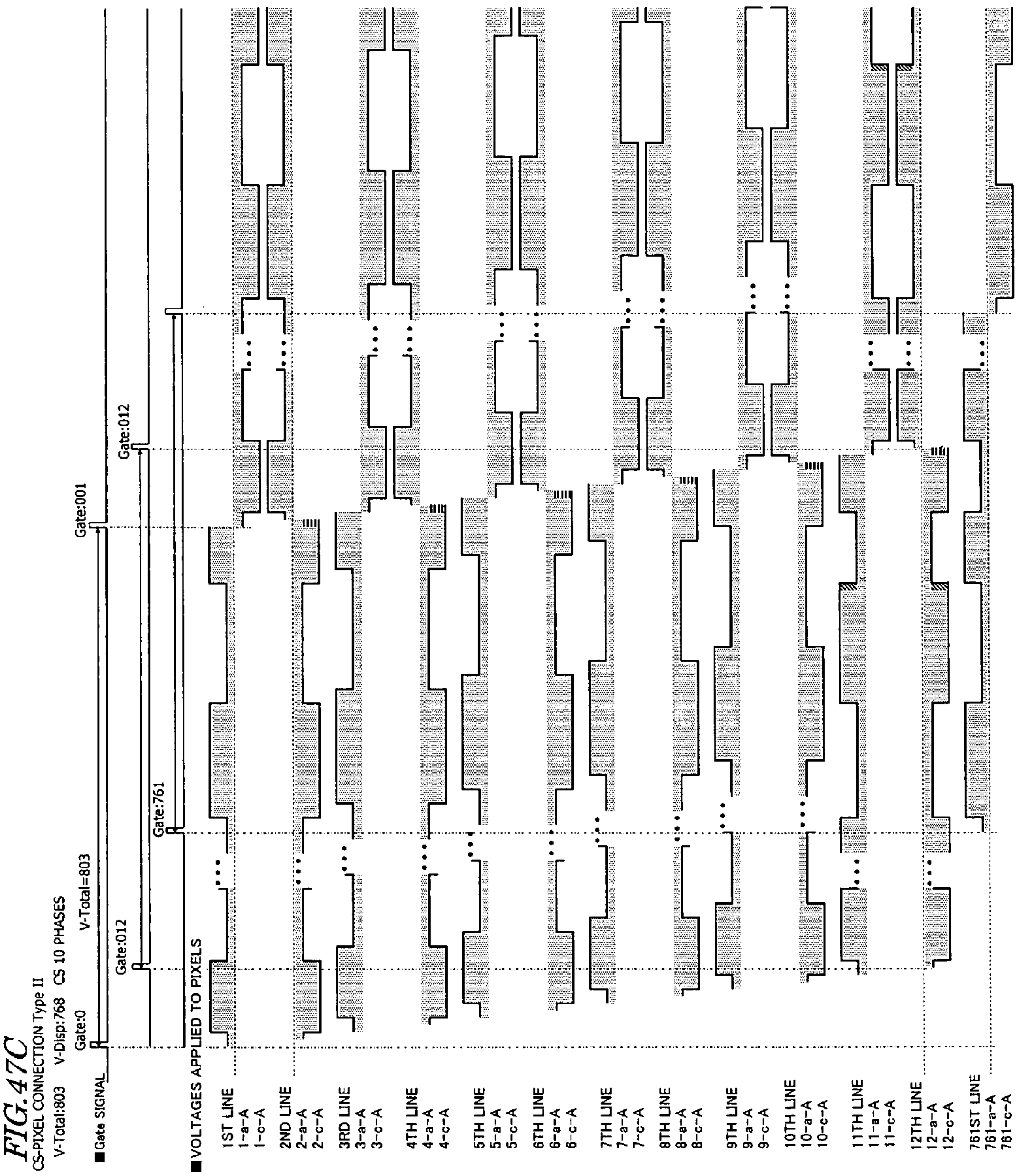

FIG. 47C shows the waveforms of a gate voltage and the voltages applied to pixels to illustrate why the stripes are produced on that another Type II liquid crystal display device.

Figure 47D:
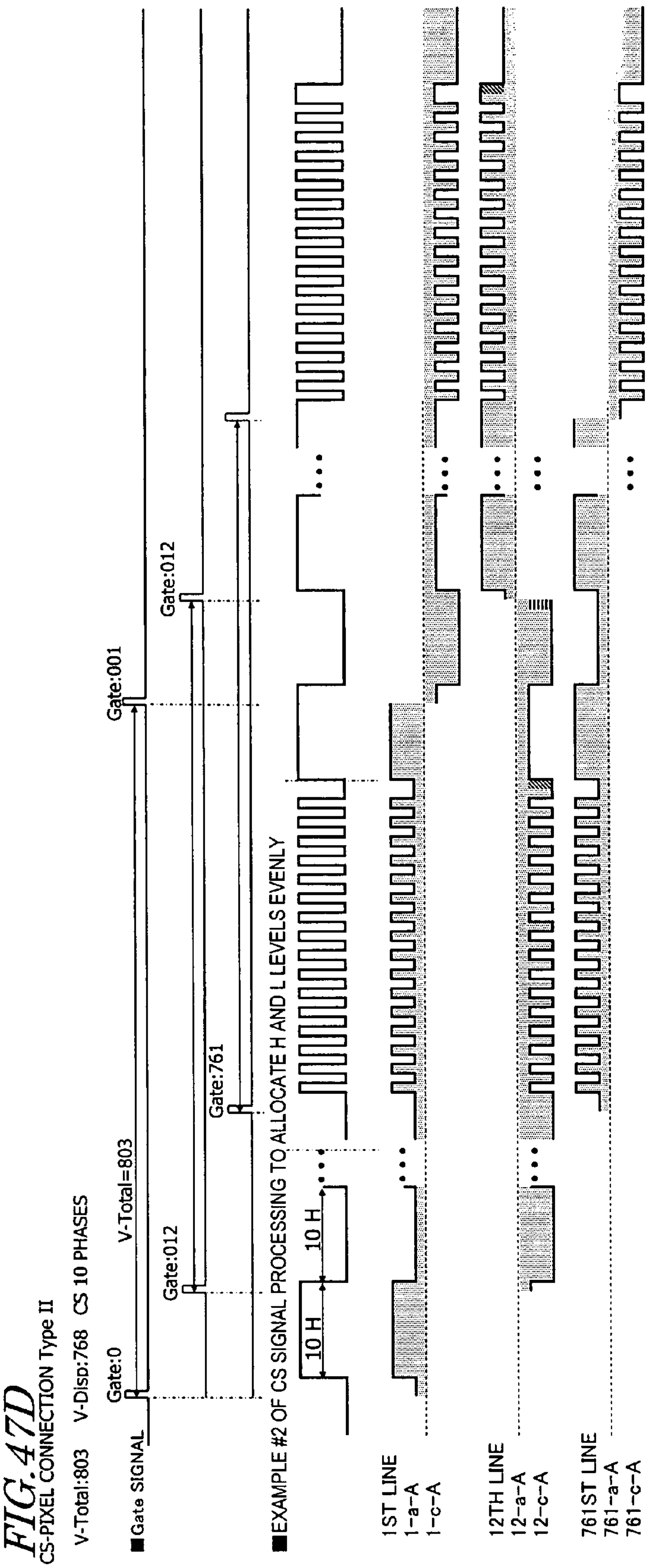

FIG. 47D shows the waveforms of a gate voltage, a CS voltage and the voltages applied to pixels to illustrate why the stripes are produced on that another Type II liquid crystal display device (representing Example #2).

Figure 48:
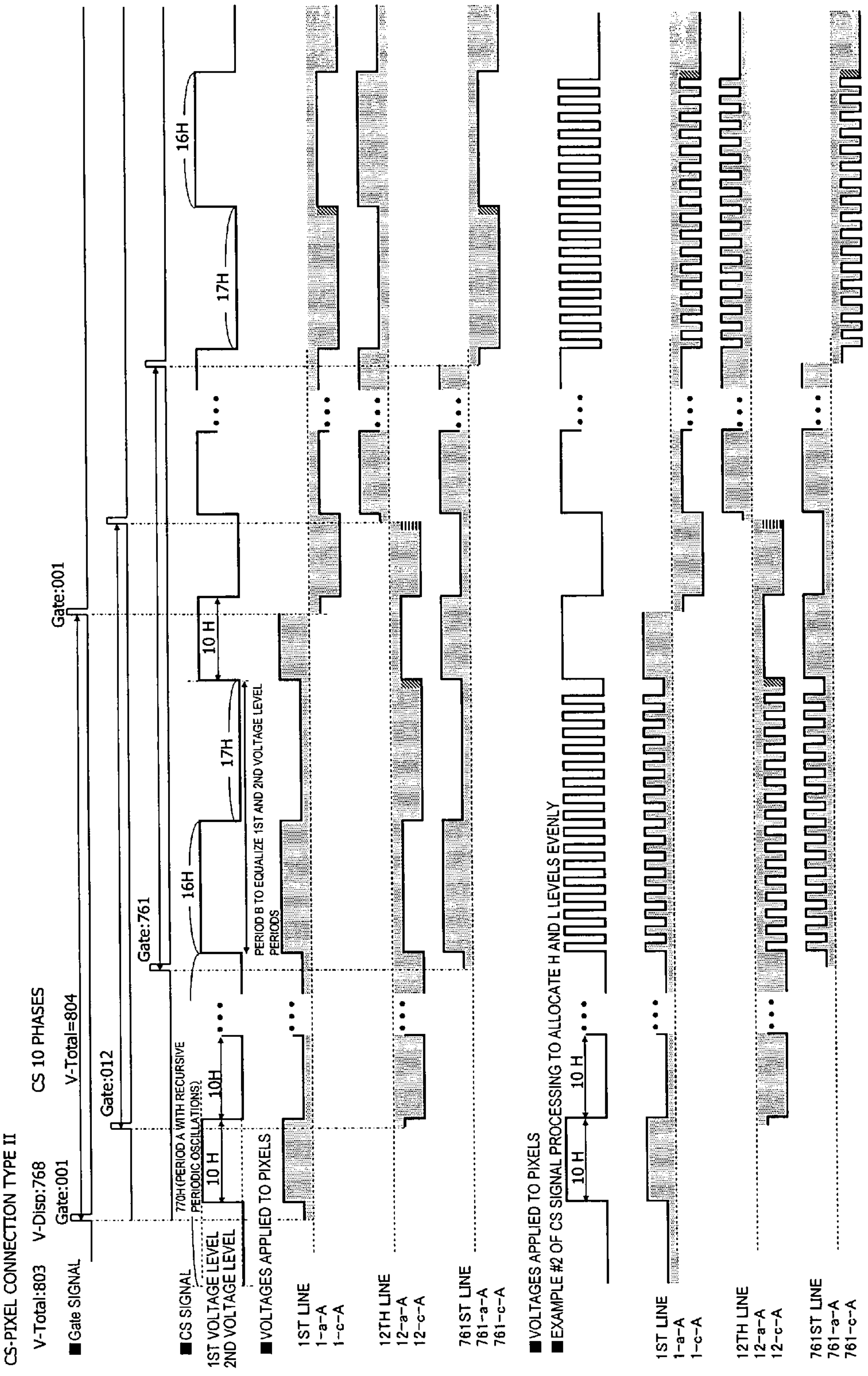

FIG. 48 shows the waveforms of a gate voltage, a CS voltage and the voltage applied to pixels to illustrate how to drive a Type II liquid crystal display device according to a fifth preferred embodiment of the present invention.

Figure 49A:
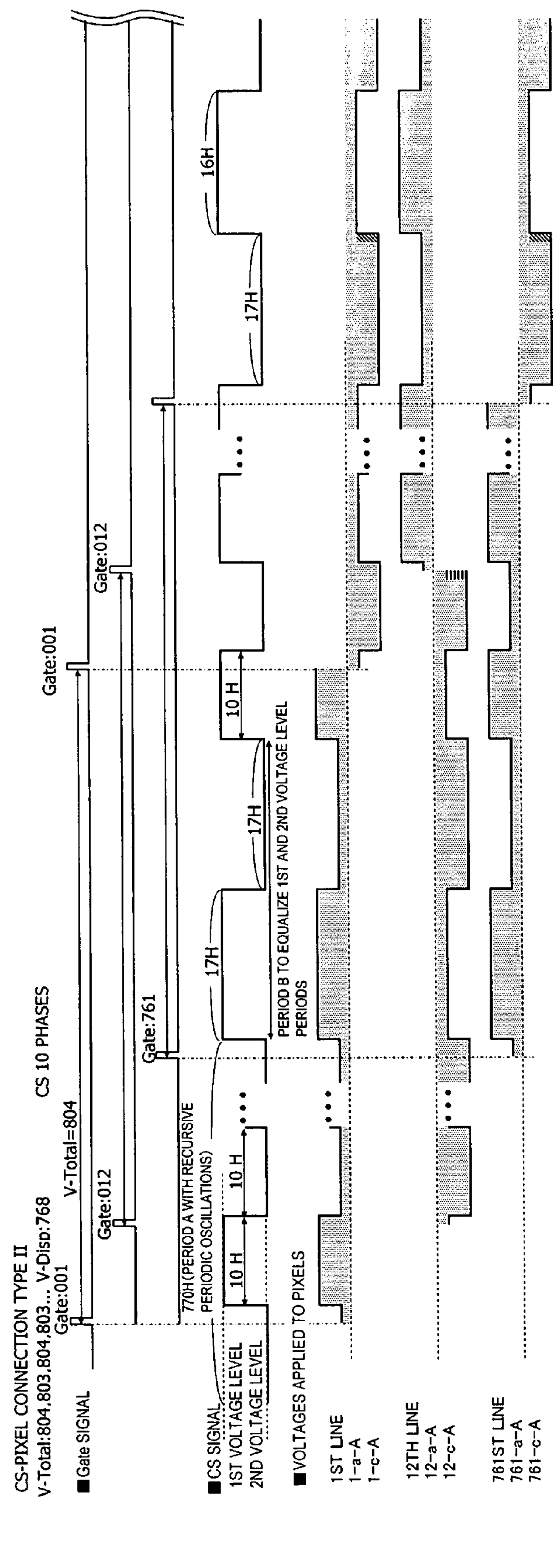

FIG. 49A shows the waveforms of a gate voltage, a CS voltage and the voltage applied to pixels to illustrate how to drive a Type II liquid crystal display device according to a sixth preferred embodiment of the present invention (representing Example #1).

Figure 49B:
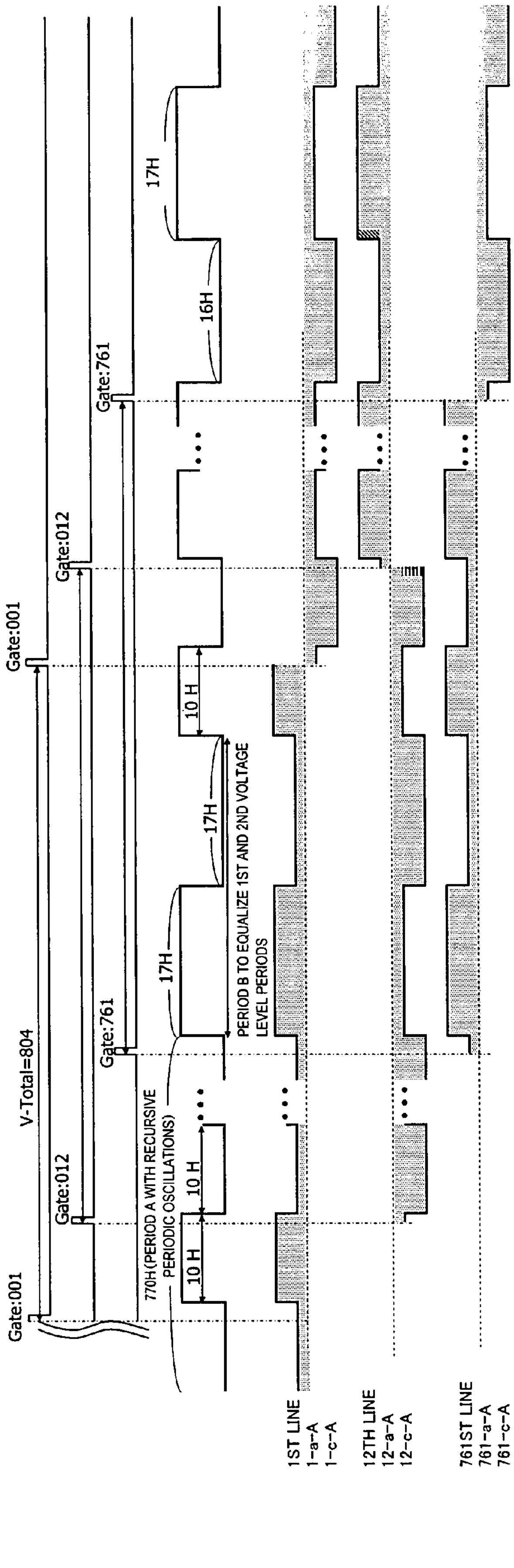

FIG. 49B shows the waveforms of a gate voltage, a CS voltage and the voltage applied to pixels to illustrate how to drive the Type II liquid crystal display device of the sixth preferred embodiment of the present invention (representing Example #1).

Figure 49C:
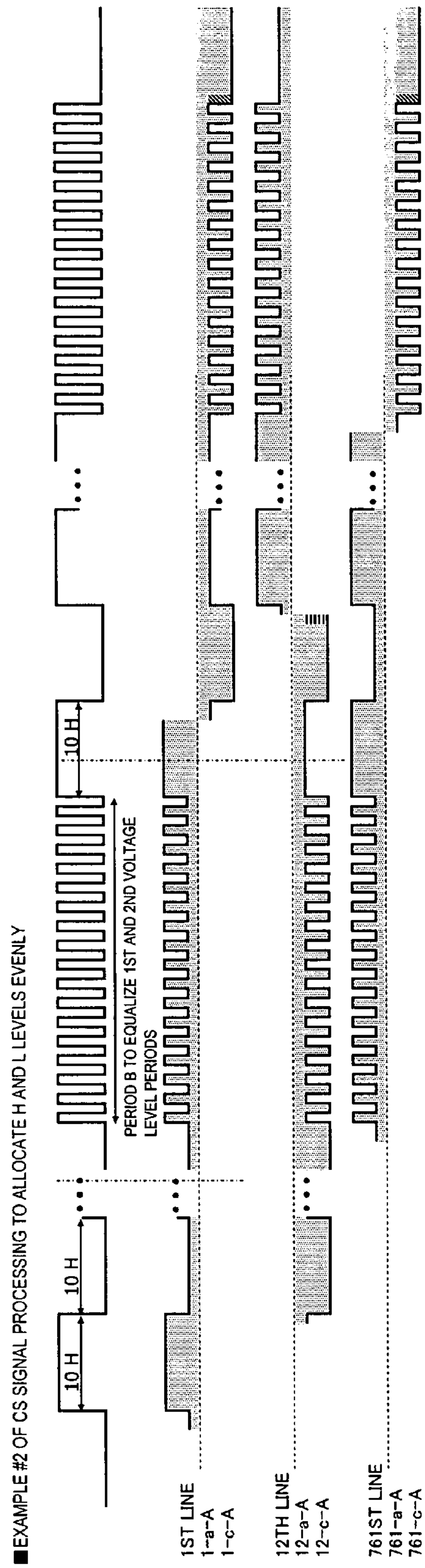

FIG. 49C shows the waveforms of a CS voltage and the voltage applied to pixels to illustrate how to drive the Type II liquid crystal display device of the sixth preferred embodiment of the present invention (representing Example #2).

Figure 49D:
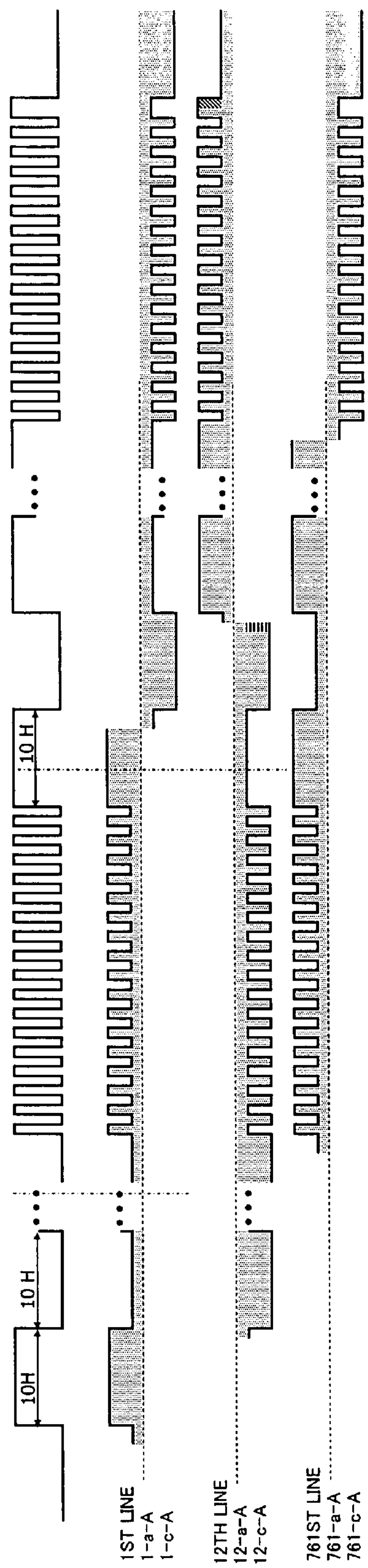

FIG. 49D shows the waveforms of a CS voltage and the voltage applied to pixels to illustrate how to drive the Type II liquid crystal display device of the sixth preferred embodiment of the present invention (representing Example #2).

Figure 50:
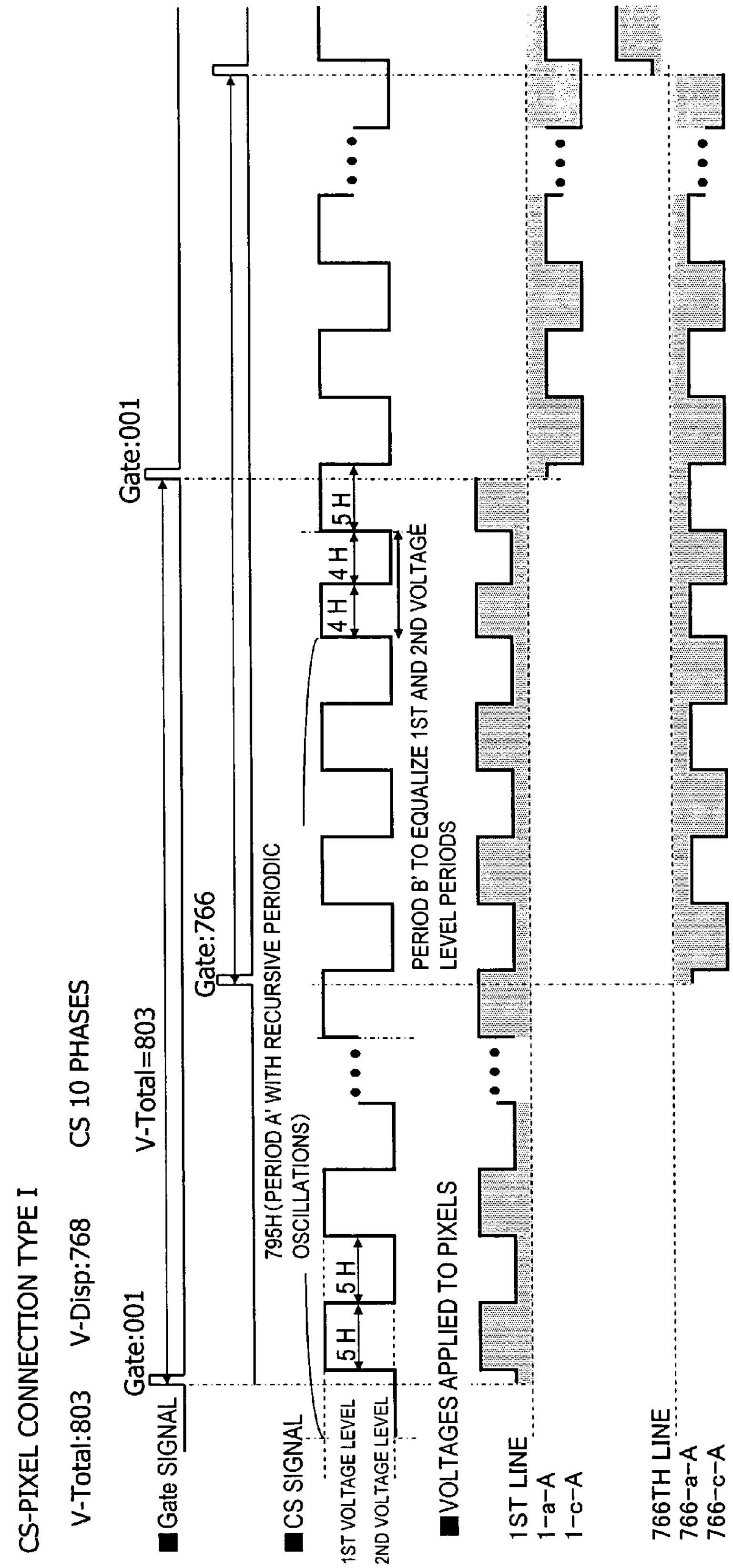

FIG. 50 shows the waveforms of a gate voltage, a CS voltage and the voltage applied to pixels to illustrate how to drive a Type I liquid crystal display device according to a seventh preferred embodiment of the present invention.

Figure 51:
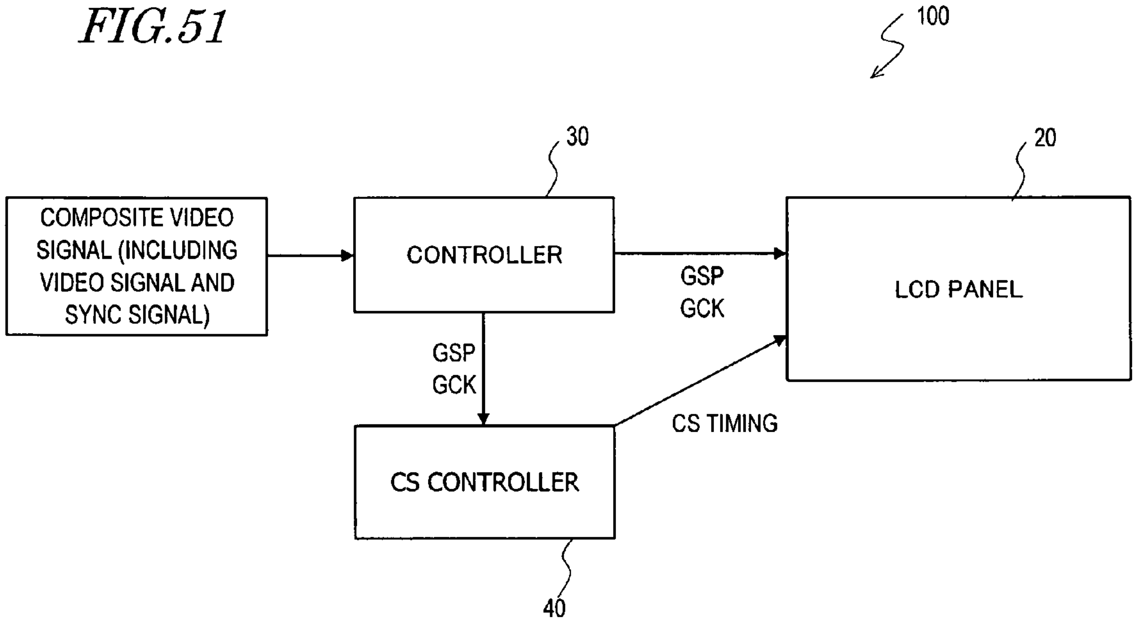

FIG. 51 schematically shows the configuration of a CS voltage generator for the liquid crystal display device 100 of the seventh preferred embodiment of the present invention.

Figure 52:
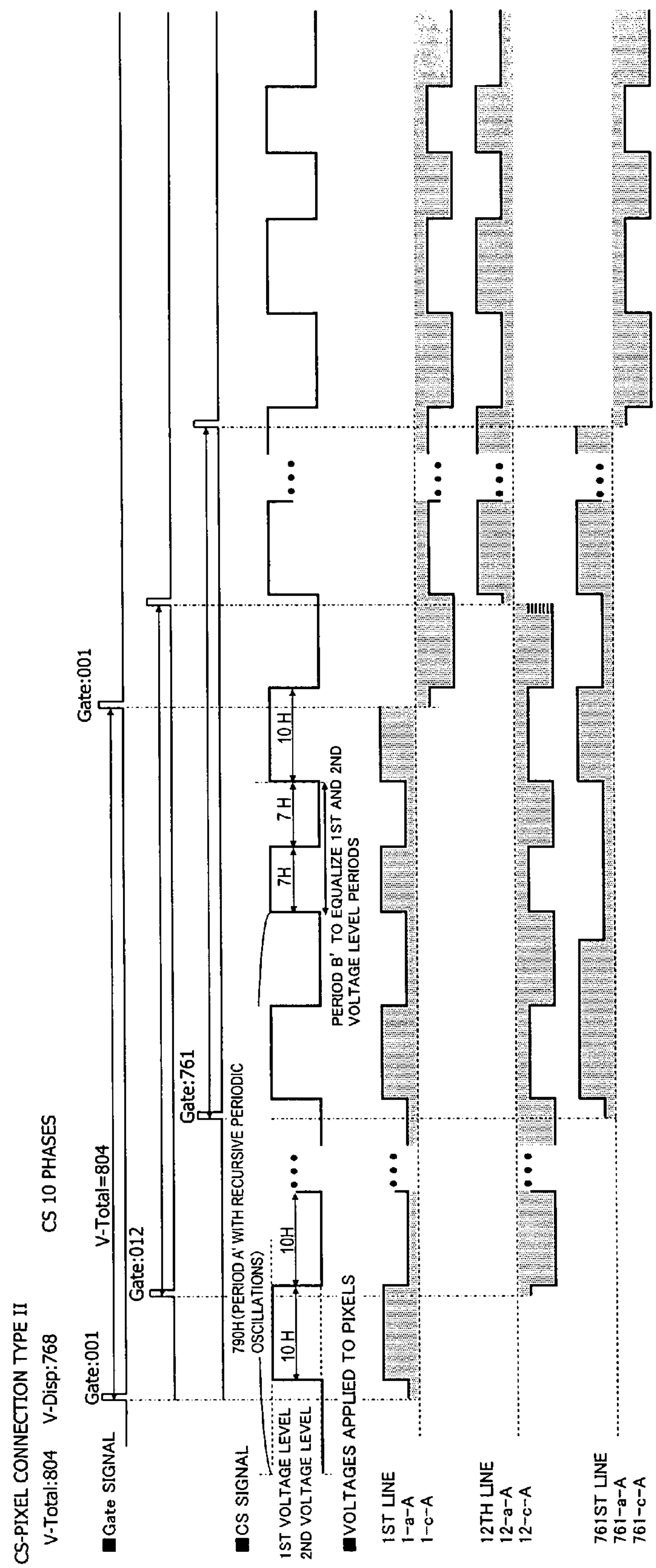

FIG. 52 shows the waveforms of a gate voltage, a CS voltage and the voltage applied to pixels to illustrate how to drive a Type II liquid crystal display device according to an eighth preferred embodiment of the present invention.

Figure 53:
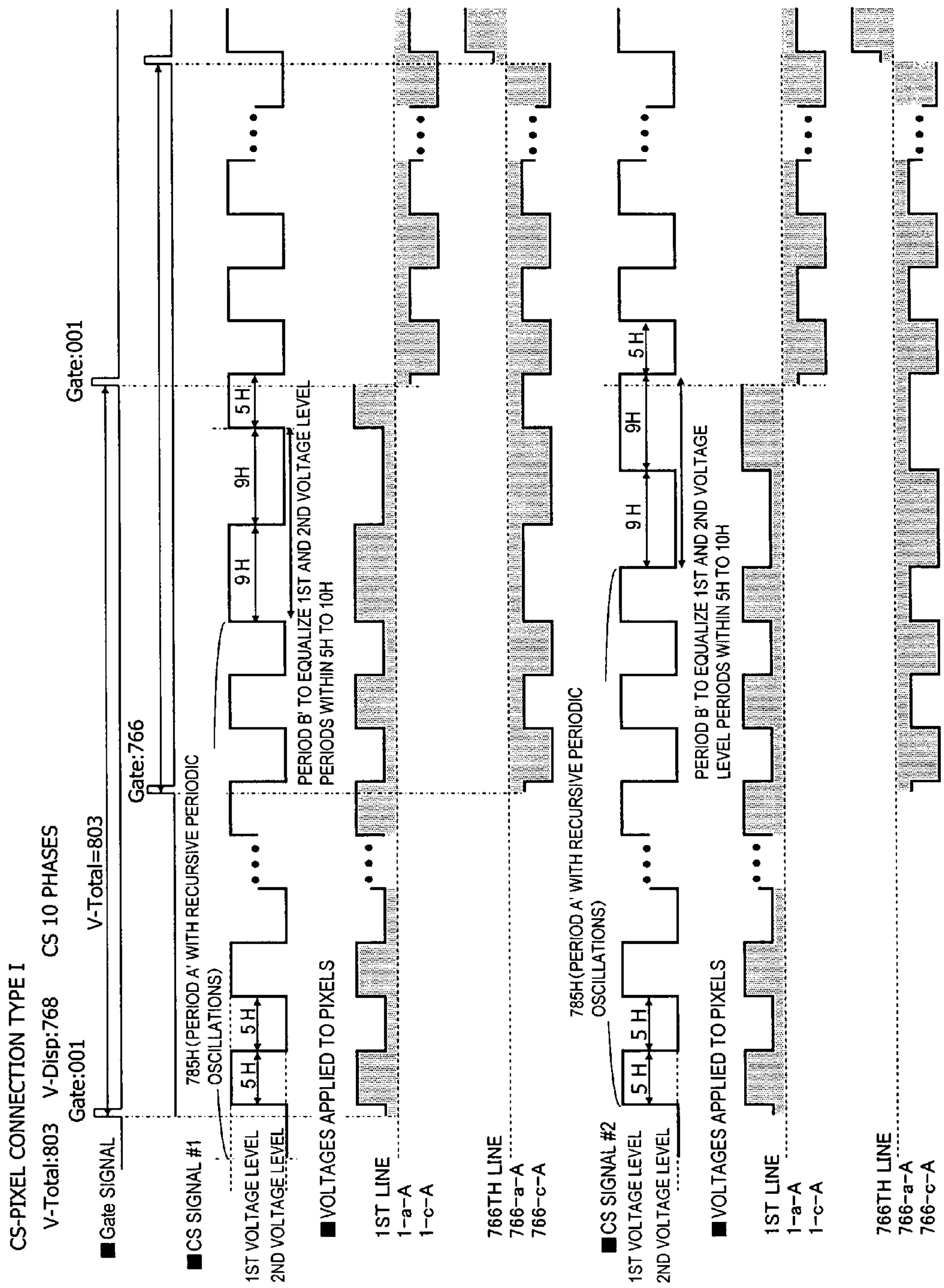

FIG. 53 shows the waveforms of a gate voltage, a CS voltage and the voltage applied to pixels to illustrate how to drive a Type I liquid crystal display device according to a ninth preferred embodiment of the present invention.

Figure 54:
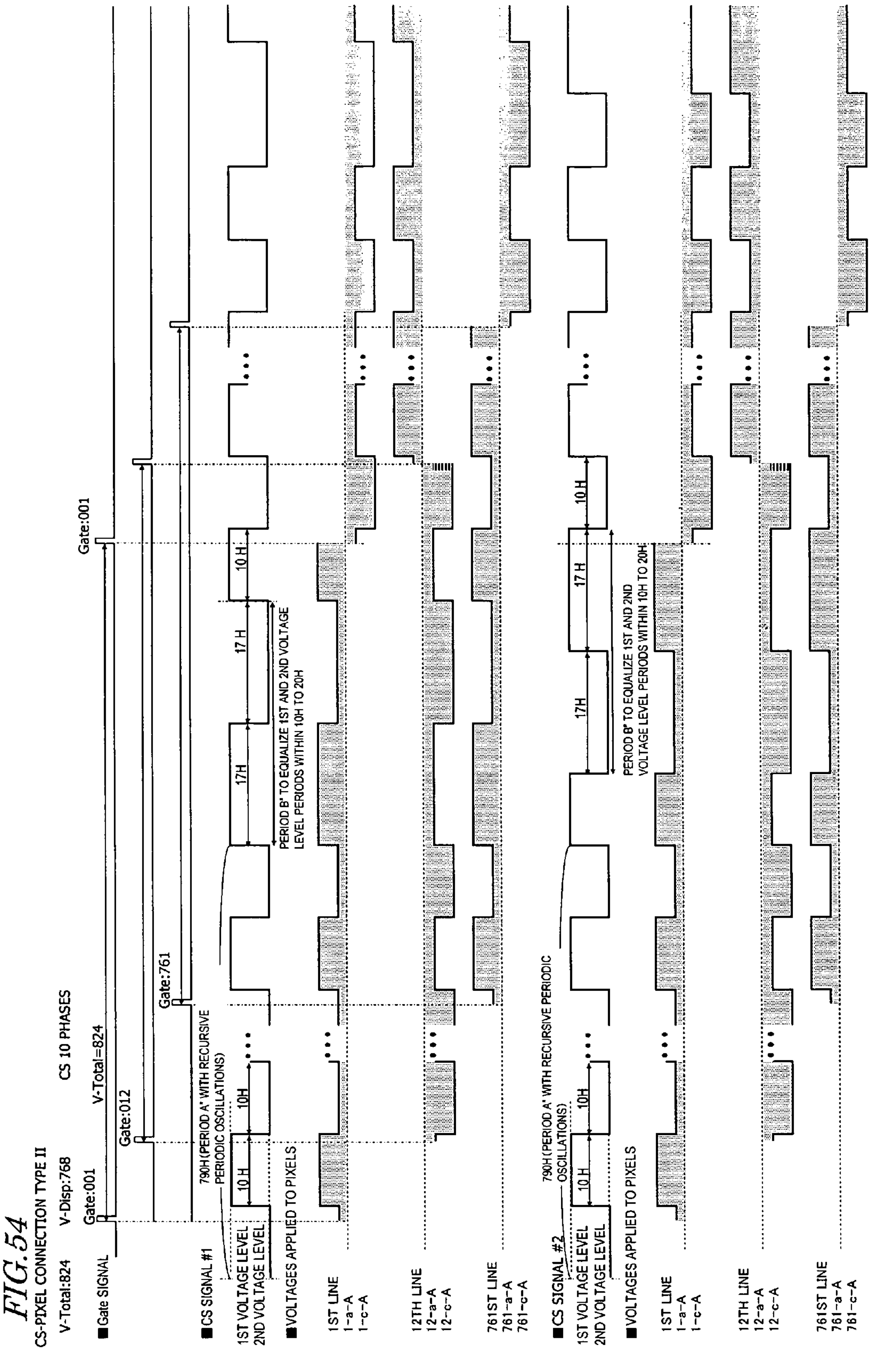

FIG. 54 shows the waveforms of a gate voltage, a CS voltage and the voltage applied to pixels to illustrate how to drive a Type II liquid crystal display device according to a tenth preferred embodiment of the present invention.

Figure 55:
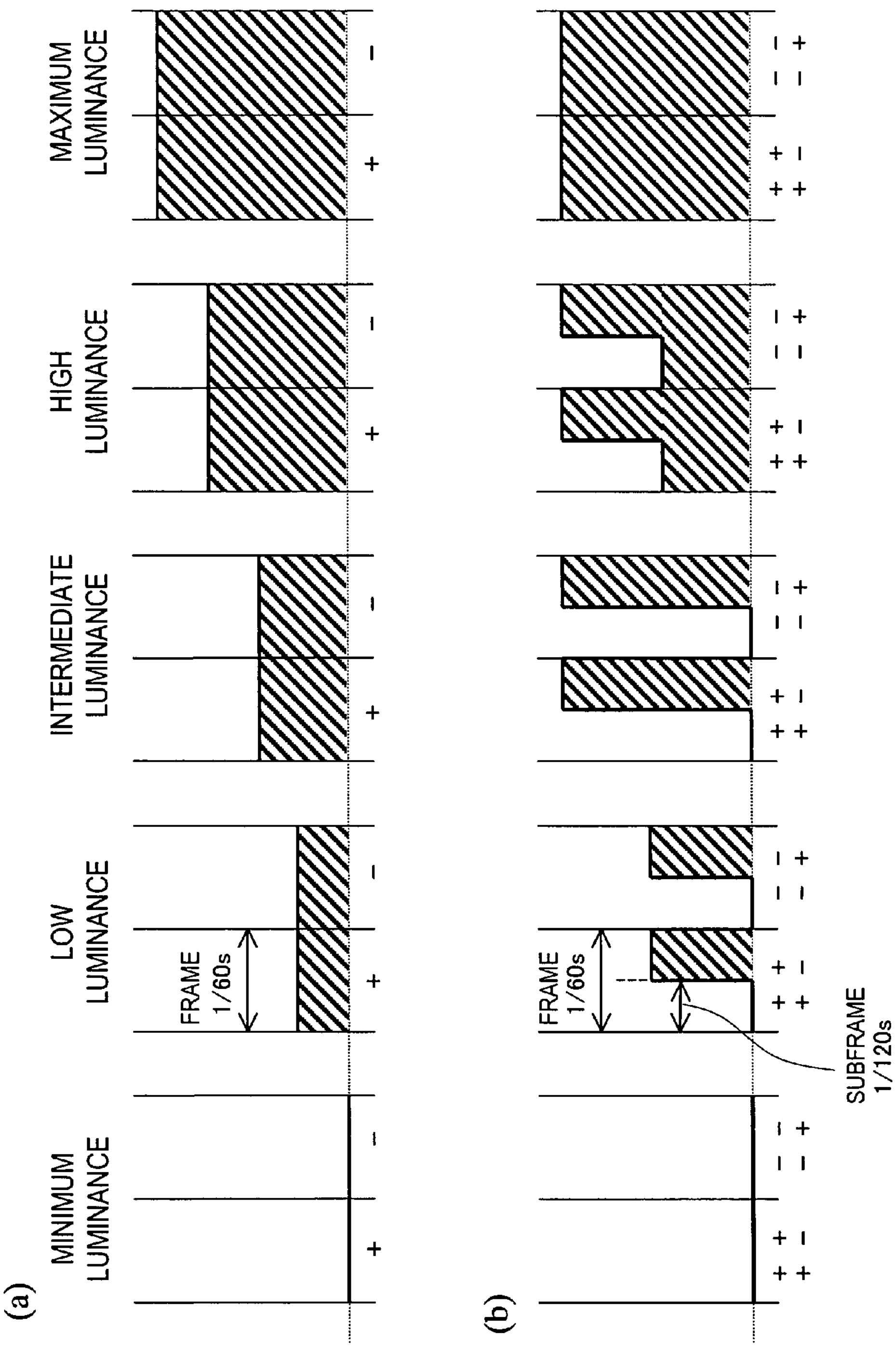

FIG. 55 is a schematic representation to illustrate a higher-speed drive method that can be used effectively in a liquid crystal display device according to a preferred embodiment of the present invention, wherein FIG. 55(*a*) shows a normal driving method and FIG. 55(*b*) shows the higher-speed drive method.

Figure 56A:
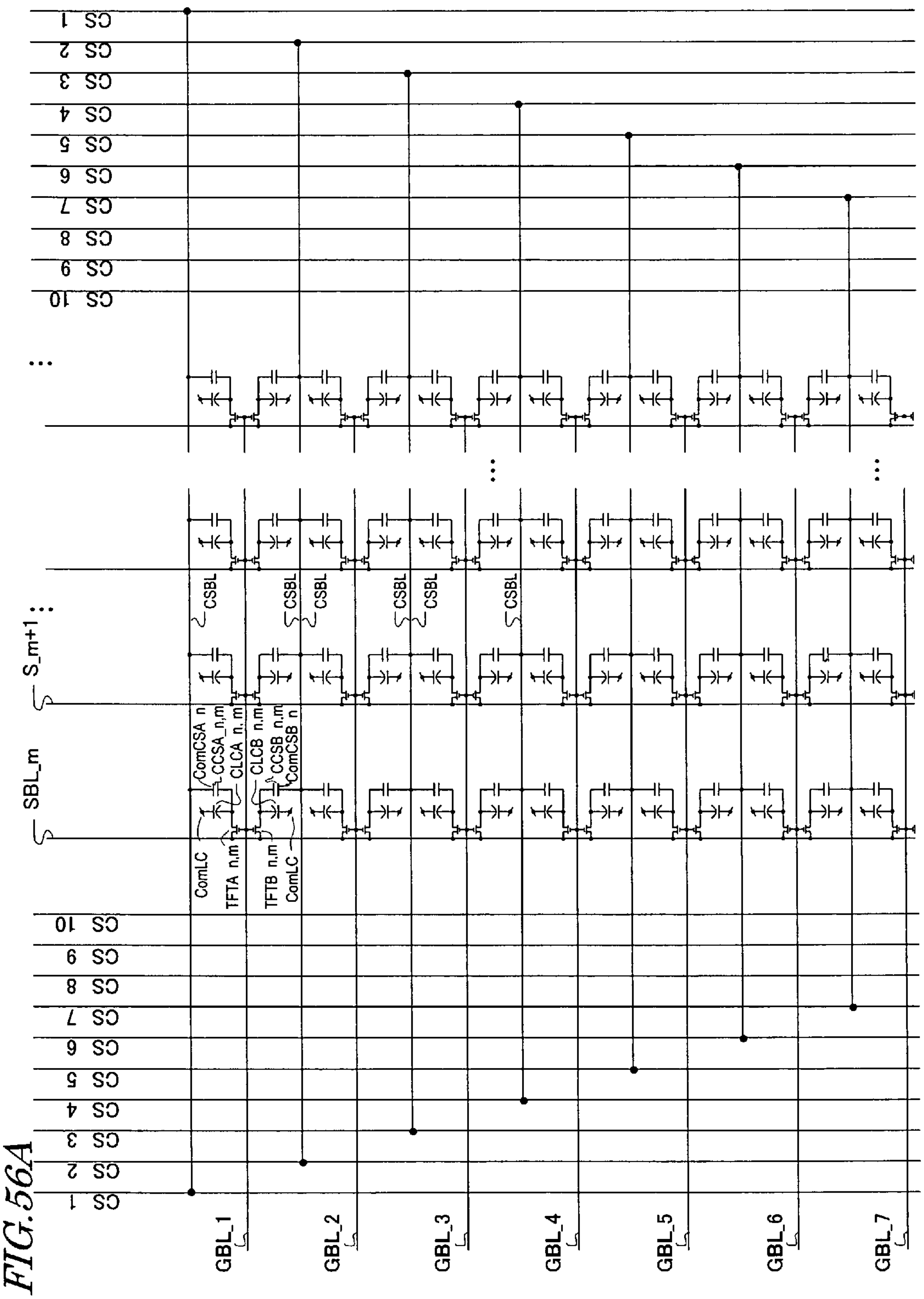
Figure 56B:
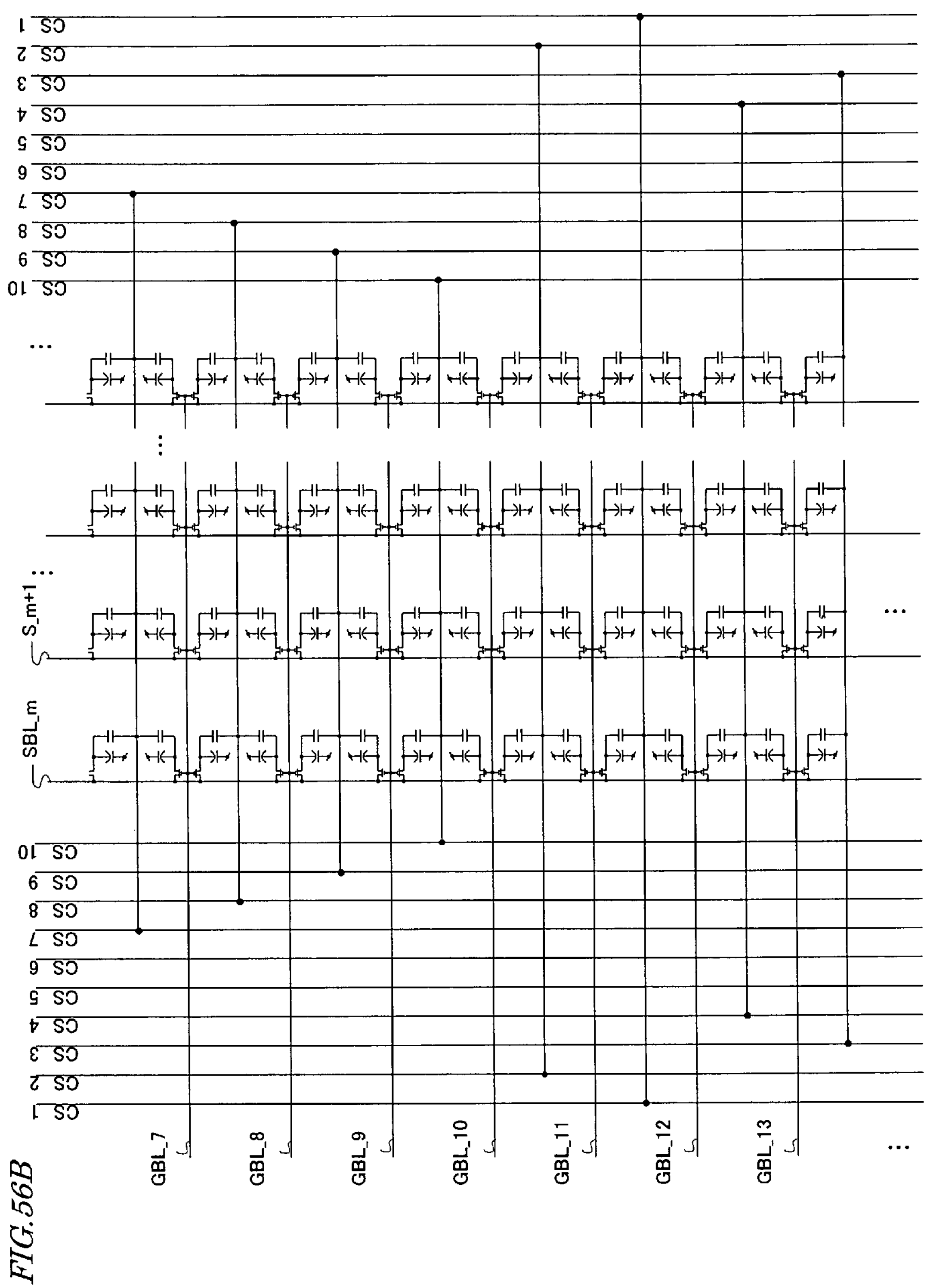
Figure 56C:
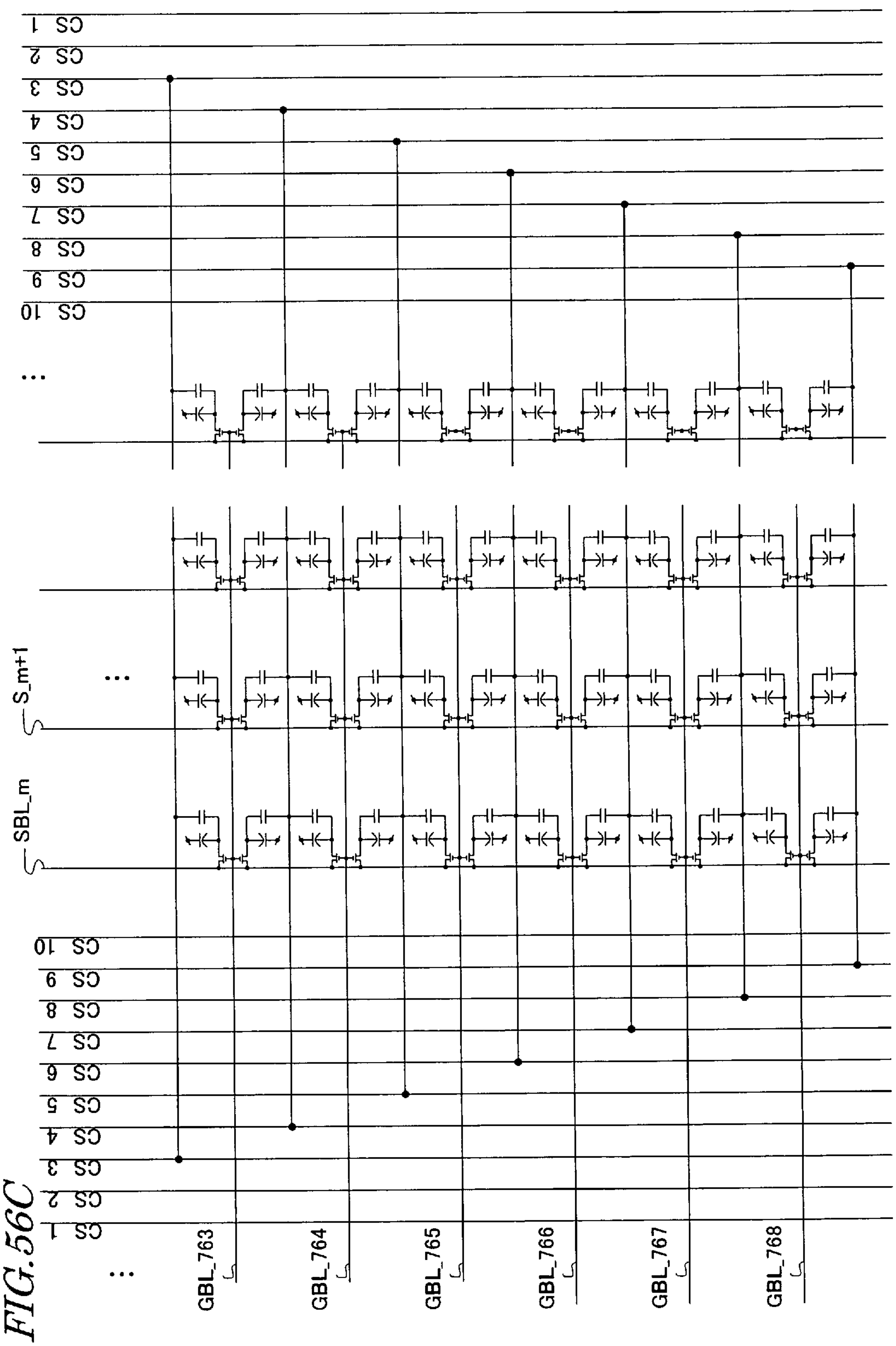

FIGS. 56A, 56B and 56C schematically show the matrix arrangement (that is the connection pattern of CS bus lines) of a liquid crystal display device according to an eleventh preferred embodiment of the present invention in three sheets.

Figure 57A:
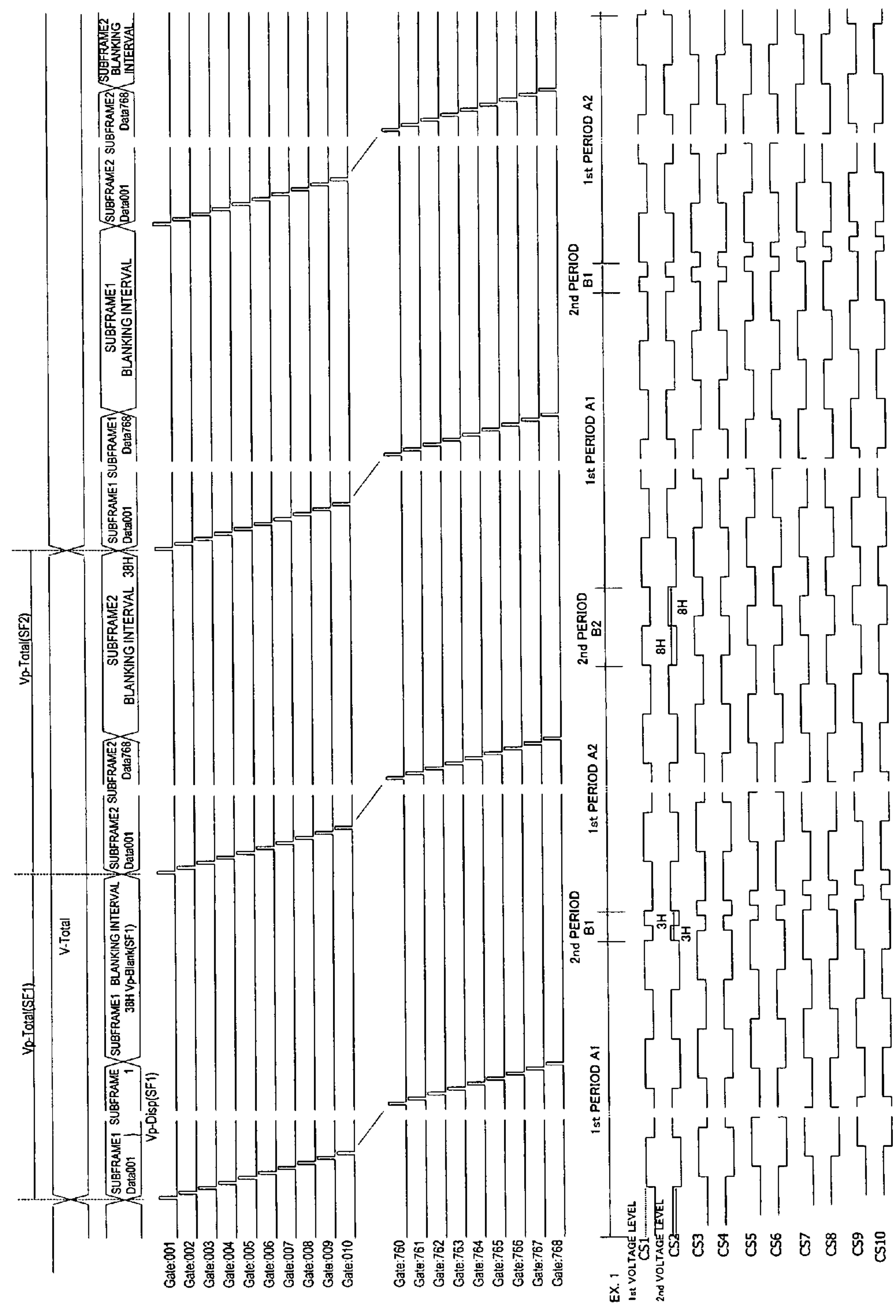

FIG. 57A schematically shows Example #1 of drive waveforms for the liquid crystal display device shown in FIGS. 56A through 56C.

Figure 57B:
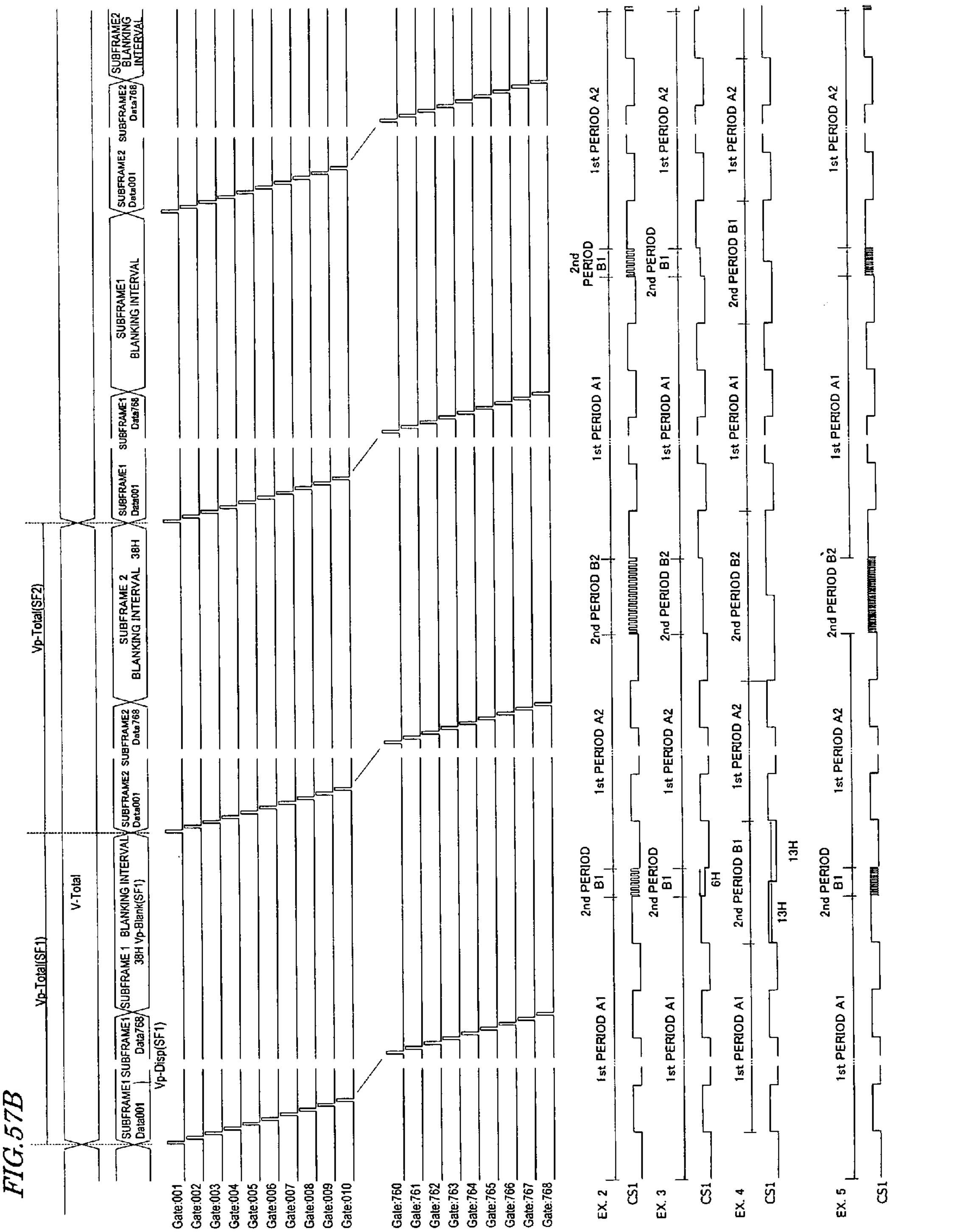

FIG. 57B schematically shows Examples #2 through #5 of drive waveforms for the liquid crystal display device shown in FIGS. 56A through 56C.

Figure 58A:
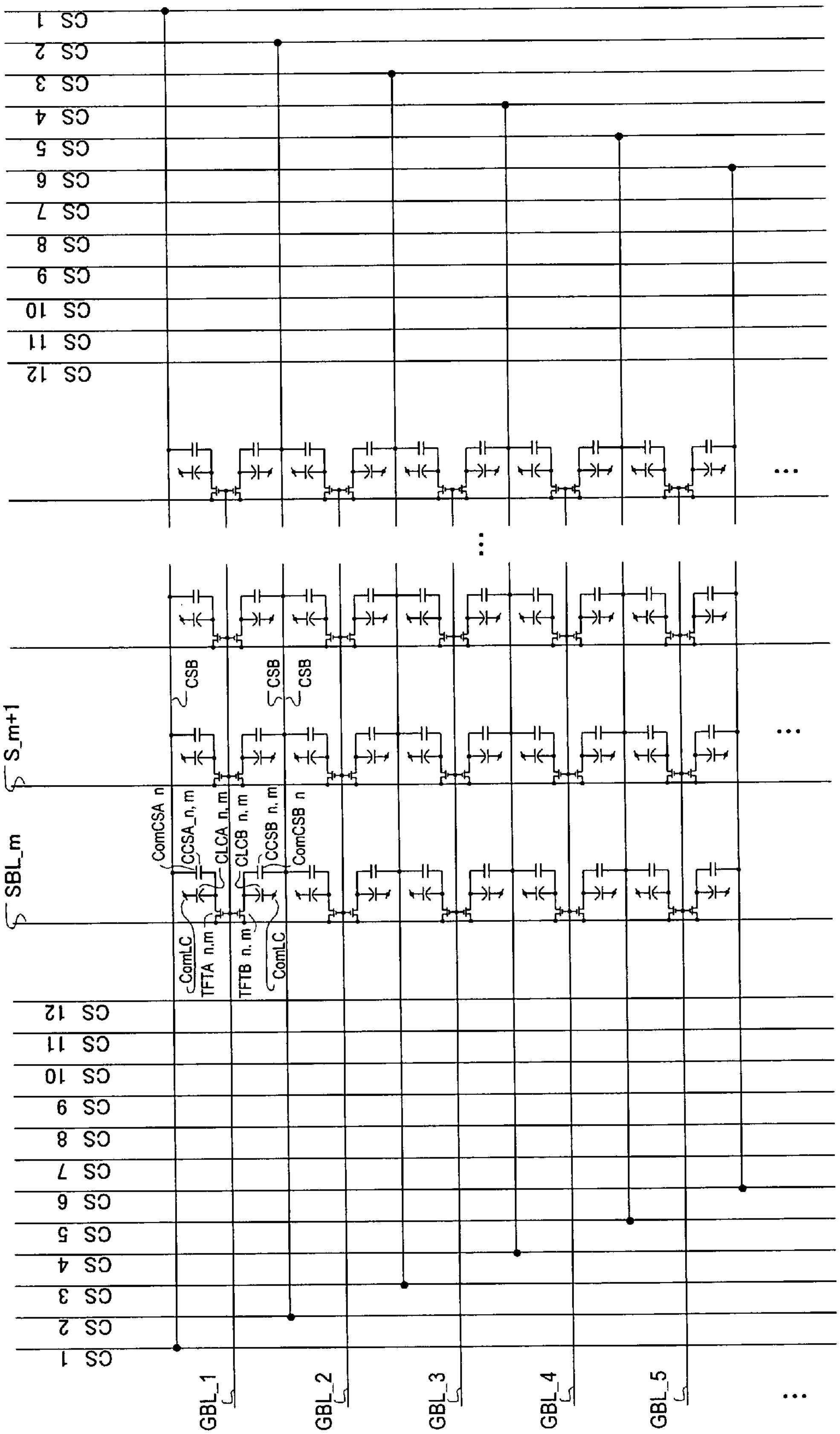
Figure 58B:
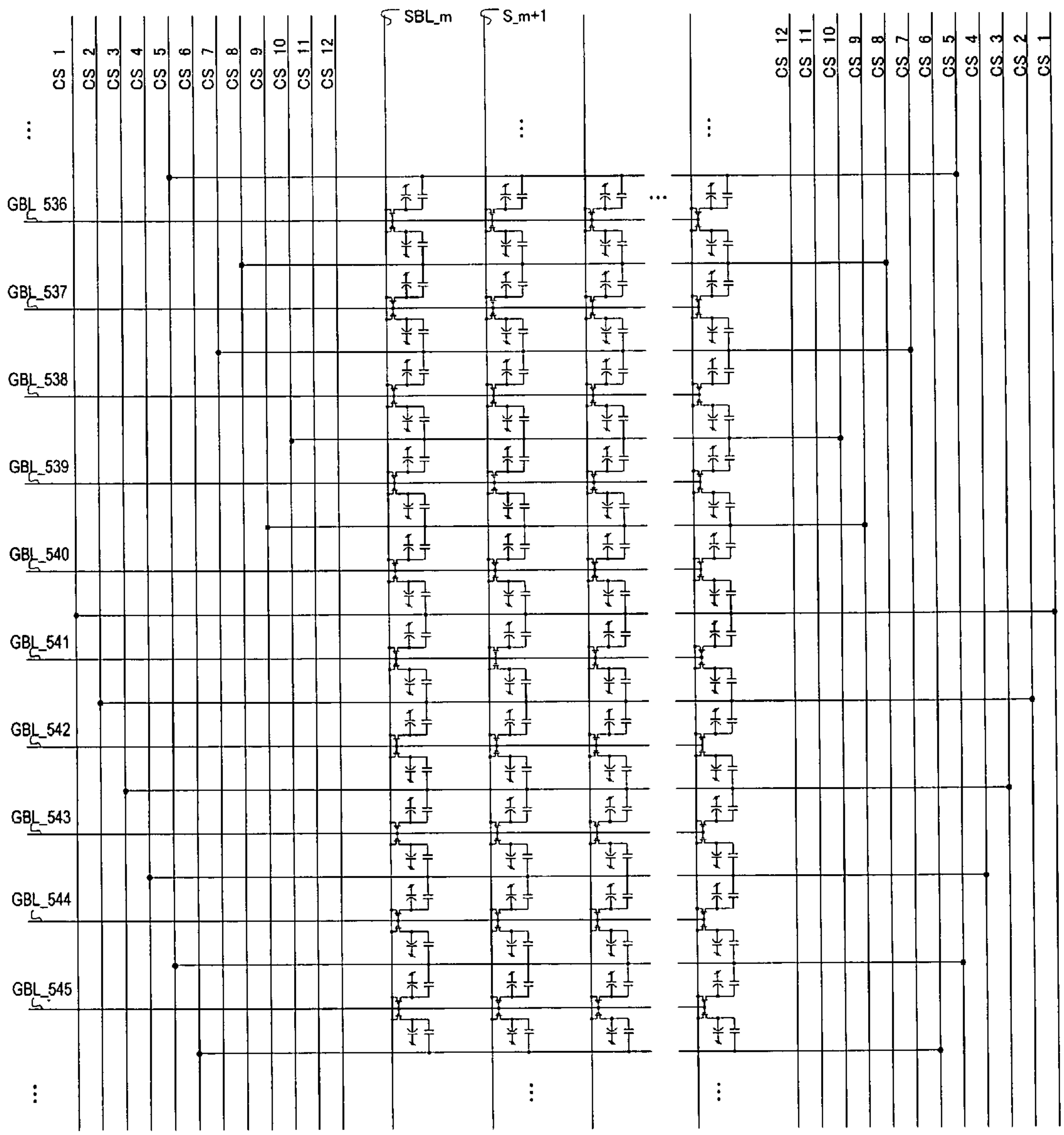
Figure 58C:
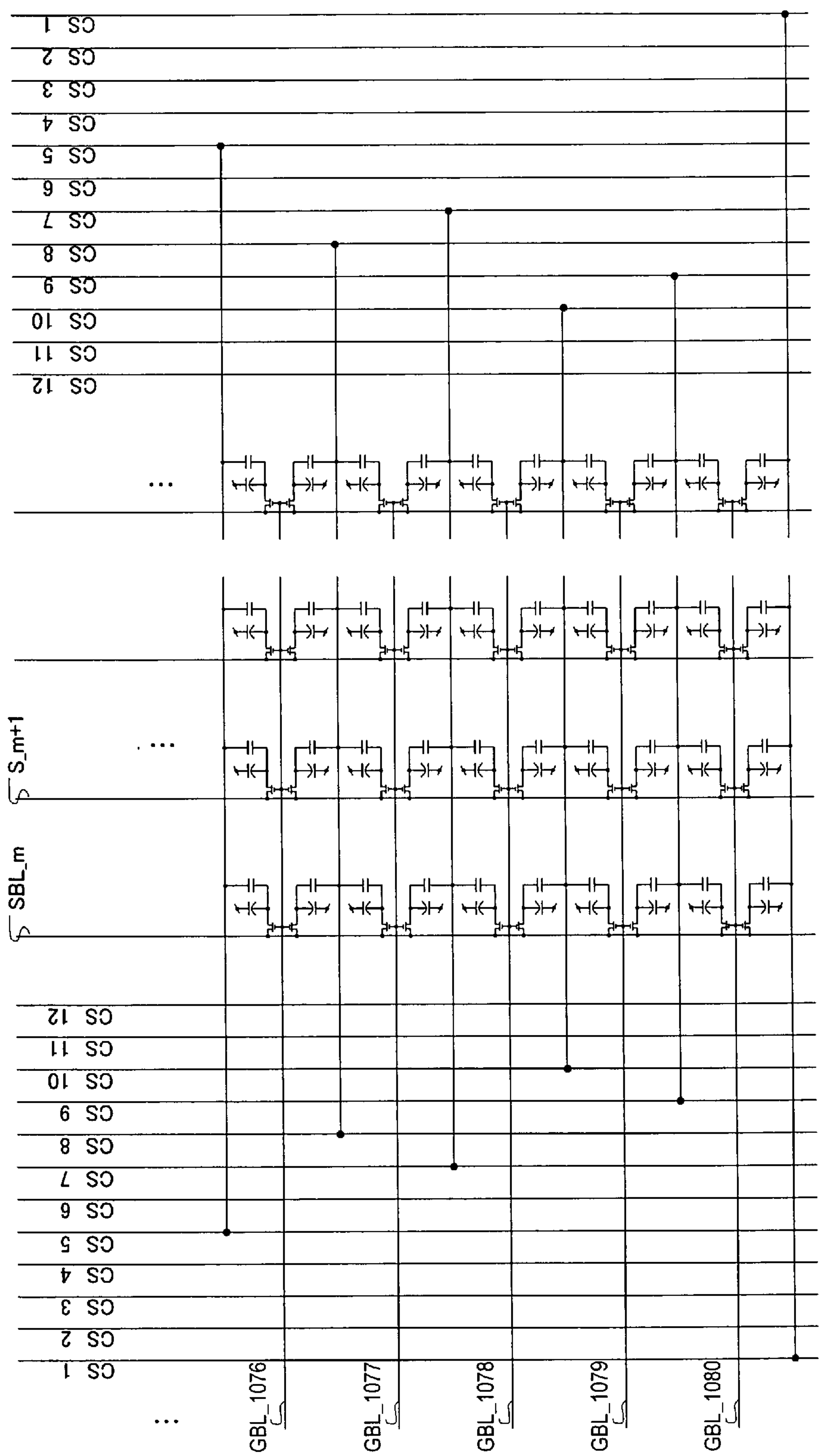

FIGS. 58A, 58B and 58C schematically show the matrix arrangement (that is the connection pattern of CS bus lines) of a liquid crystal display device according to a twelfth preferred embodiment of the present invention in three sheets.

Figure 59A:
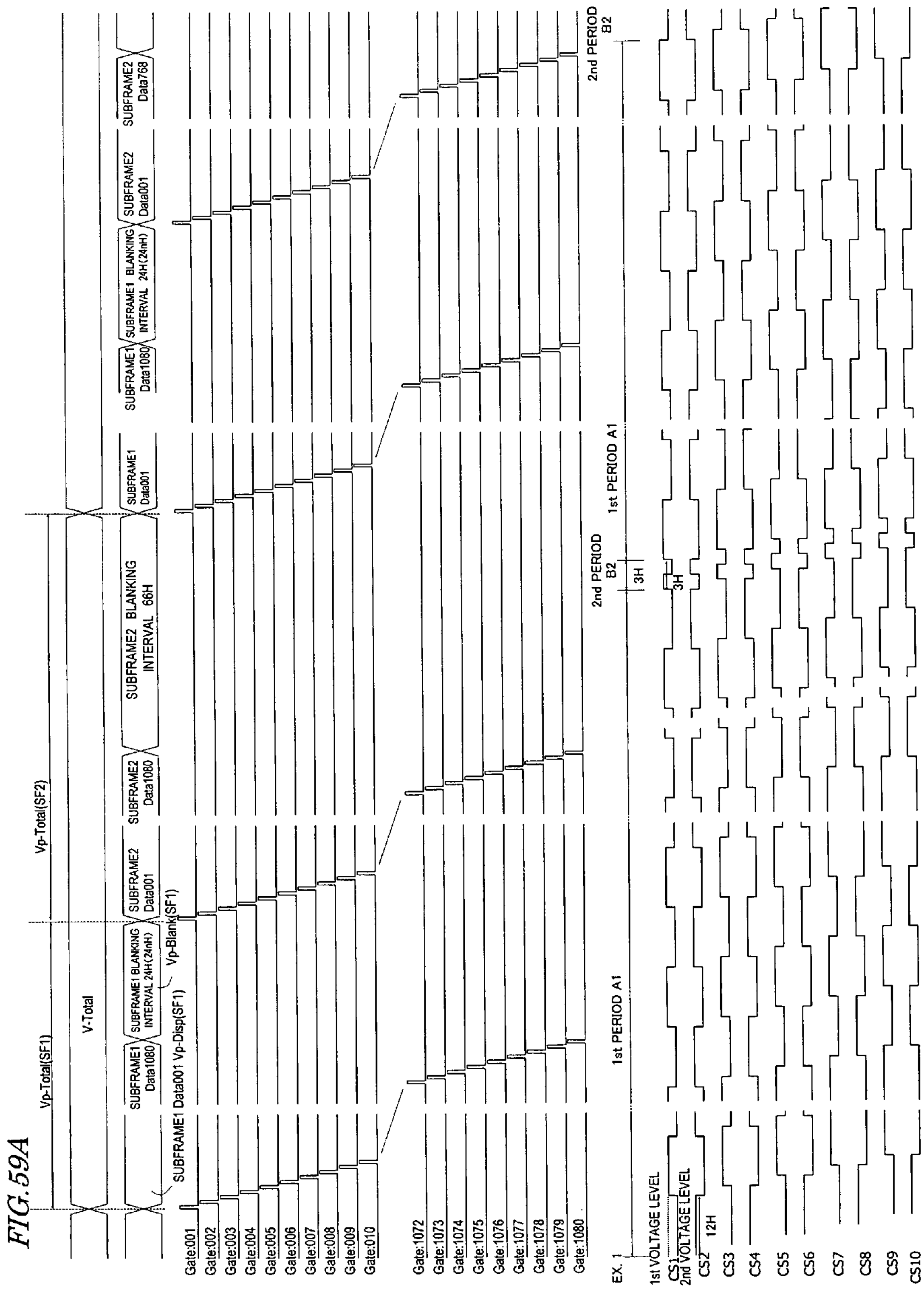

FIG. 59A schematically shows Example #1 of drive waveforms for the liquid crystal display device shown in FIGS. 58A through 58C.

Figure 59B:
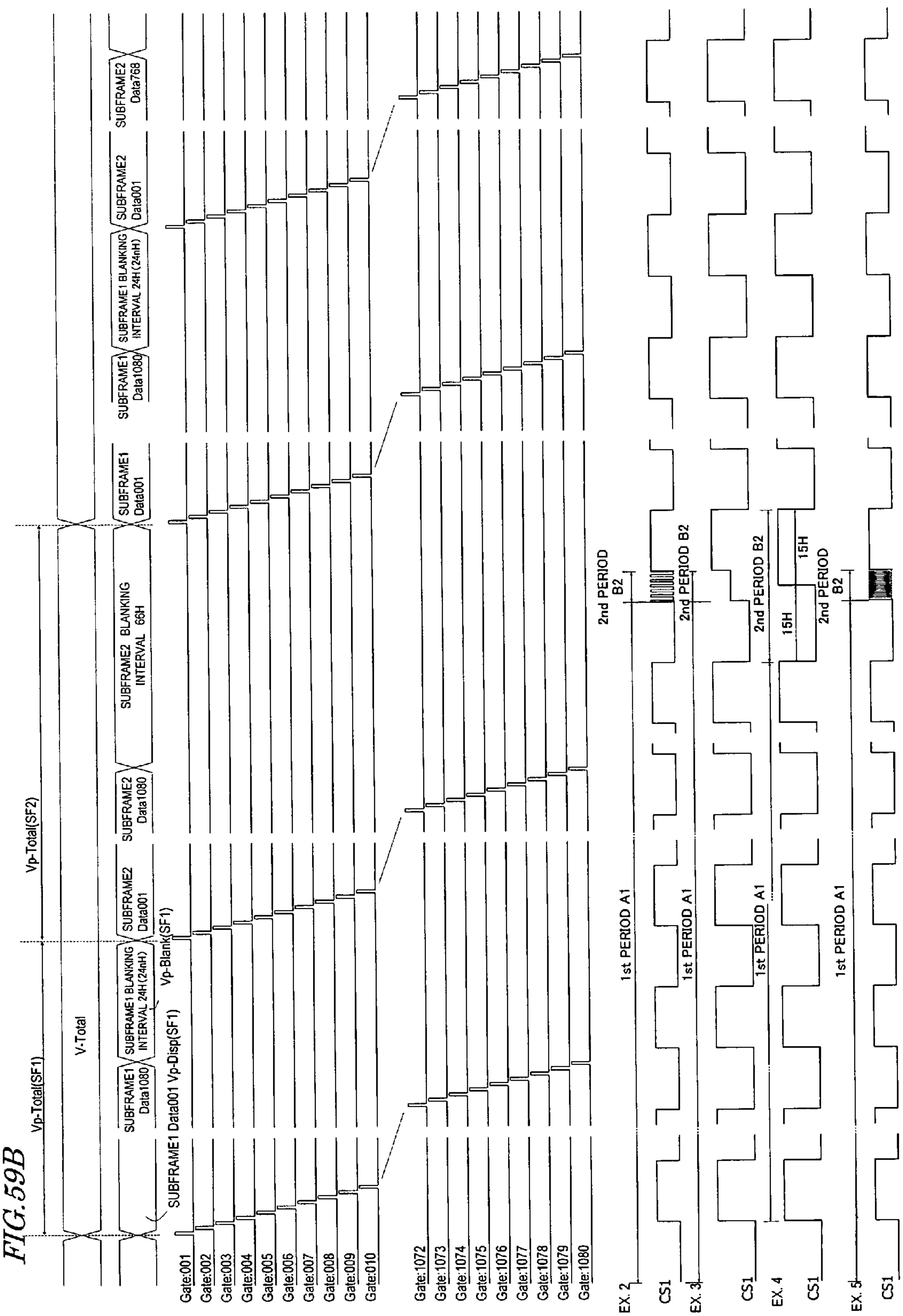

FIG. 59B schematically shows Examples #2 through #5 of drive waveforms for the liquid crystal display device shown in FIGS. 58A through 58C.

Figure 60A:
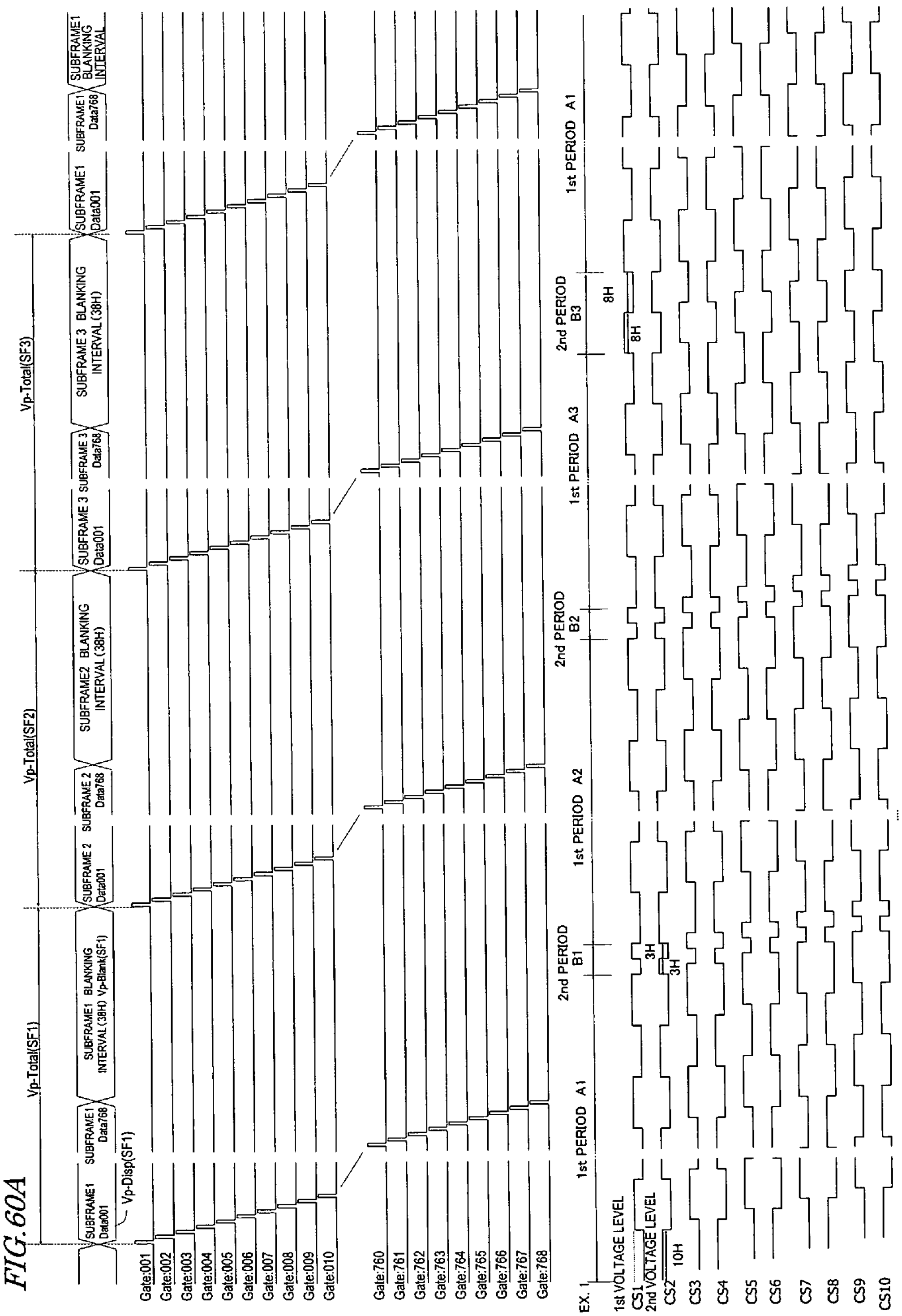

FIG. 60A schematically shows Example #1 of drive waveforms for a liquid crystal display device according to a thirteenth preferred embodiment of the present invention.

Figure 60B:
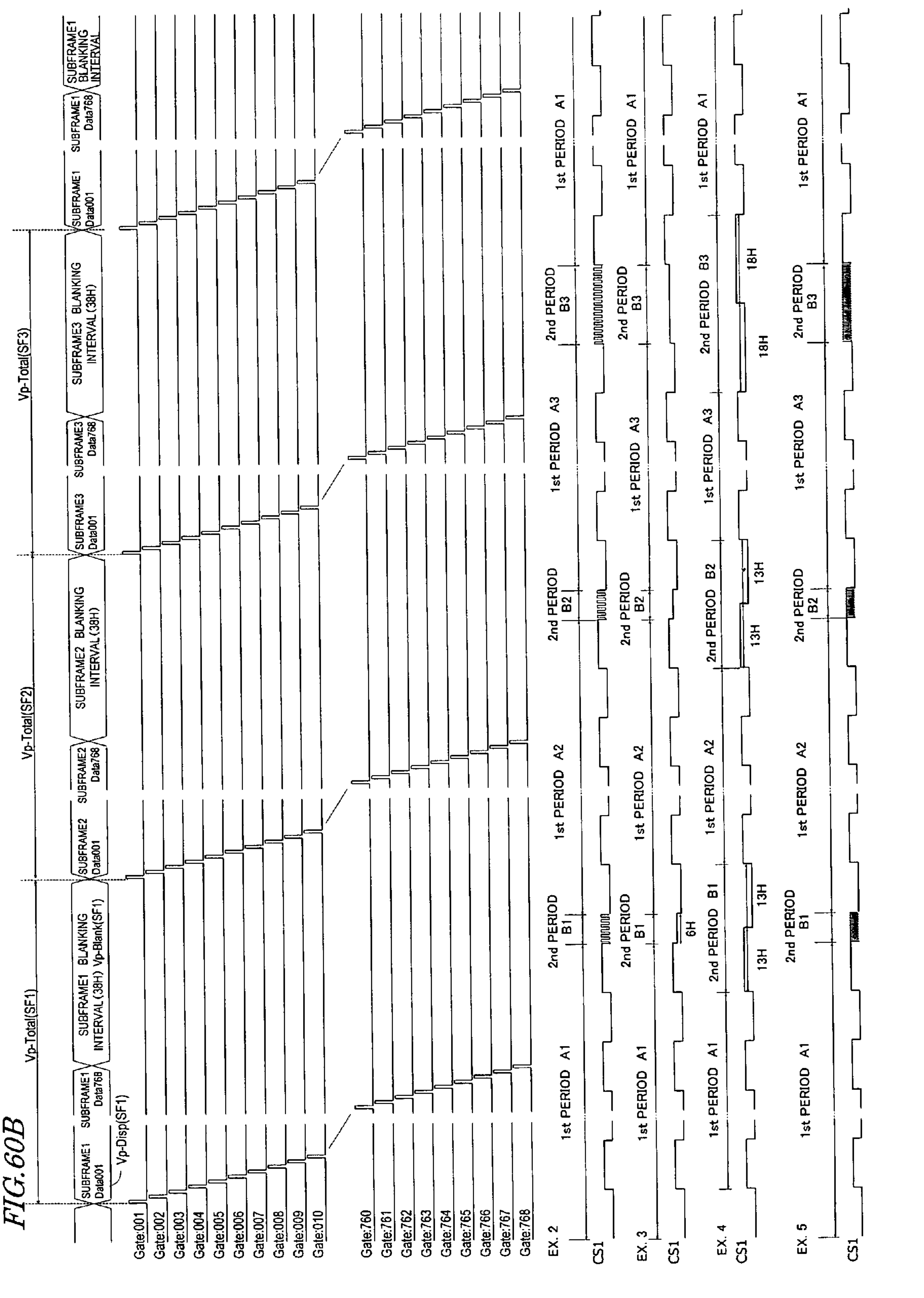

FIG. 60B schematically shows Examples #2 through #5 of drive waveforms for the liquid crystal display device of the thirteenth preferred embodiment of the present invention.

Figure 61A:
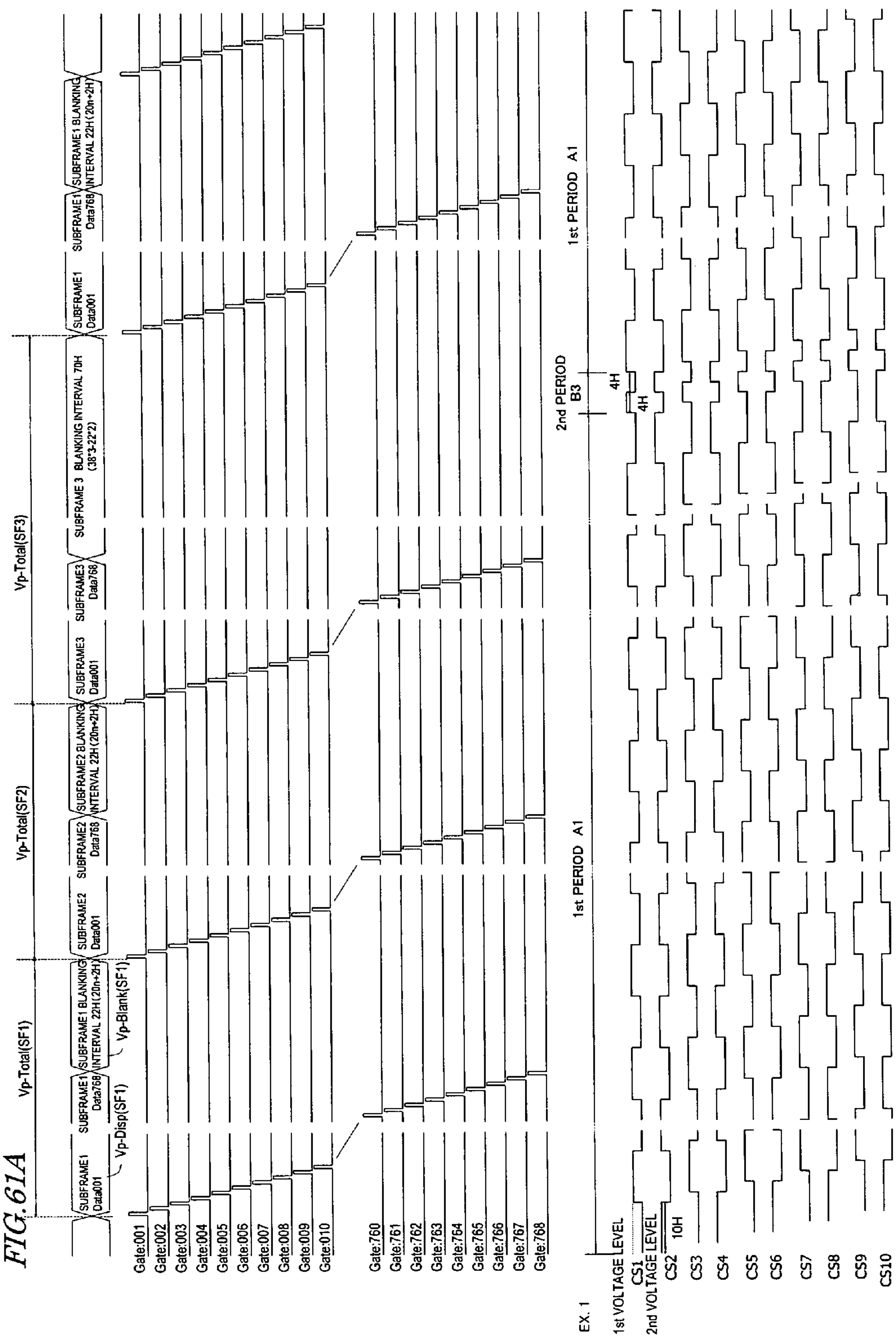

FIG. 61A schematically shows Example #1 of drive waveforms for a liquid crystal display device according to a fourteenth preferred embodiment of the present invention.

Figure 61B:
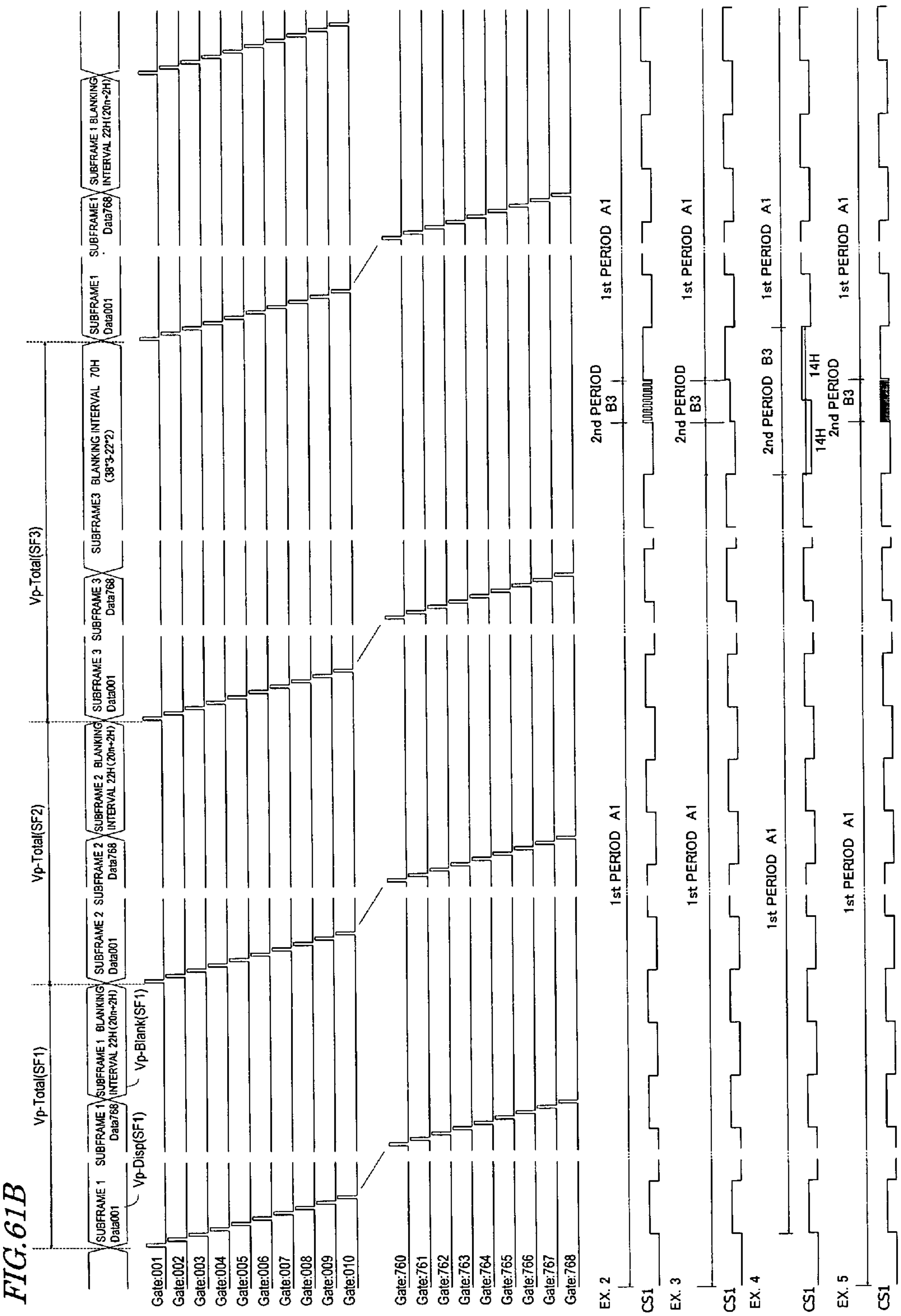

FIG. 61B schematically shows Examples #2 through #5 of drive waveforms for the liquid crystal display device of the fourteenth preferred embodiment of the present invention.

Figure 62:
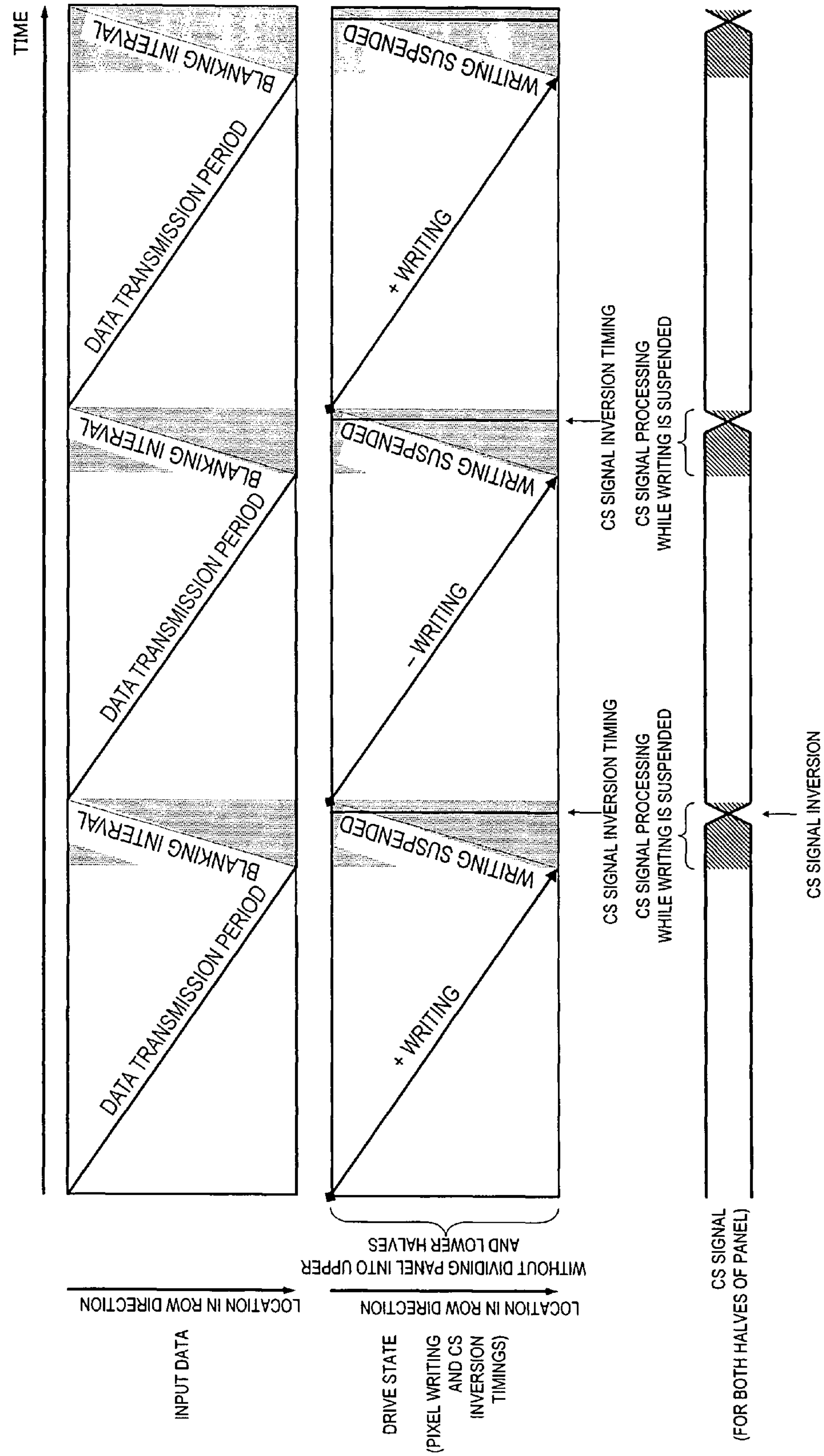

FIG. 62 schematically shows respective signal timings in a situation where the multi-pixel drive is adopted in a normal driving method with no panel division.

Figure 63:
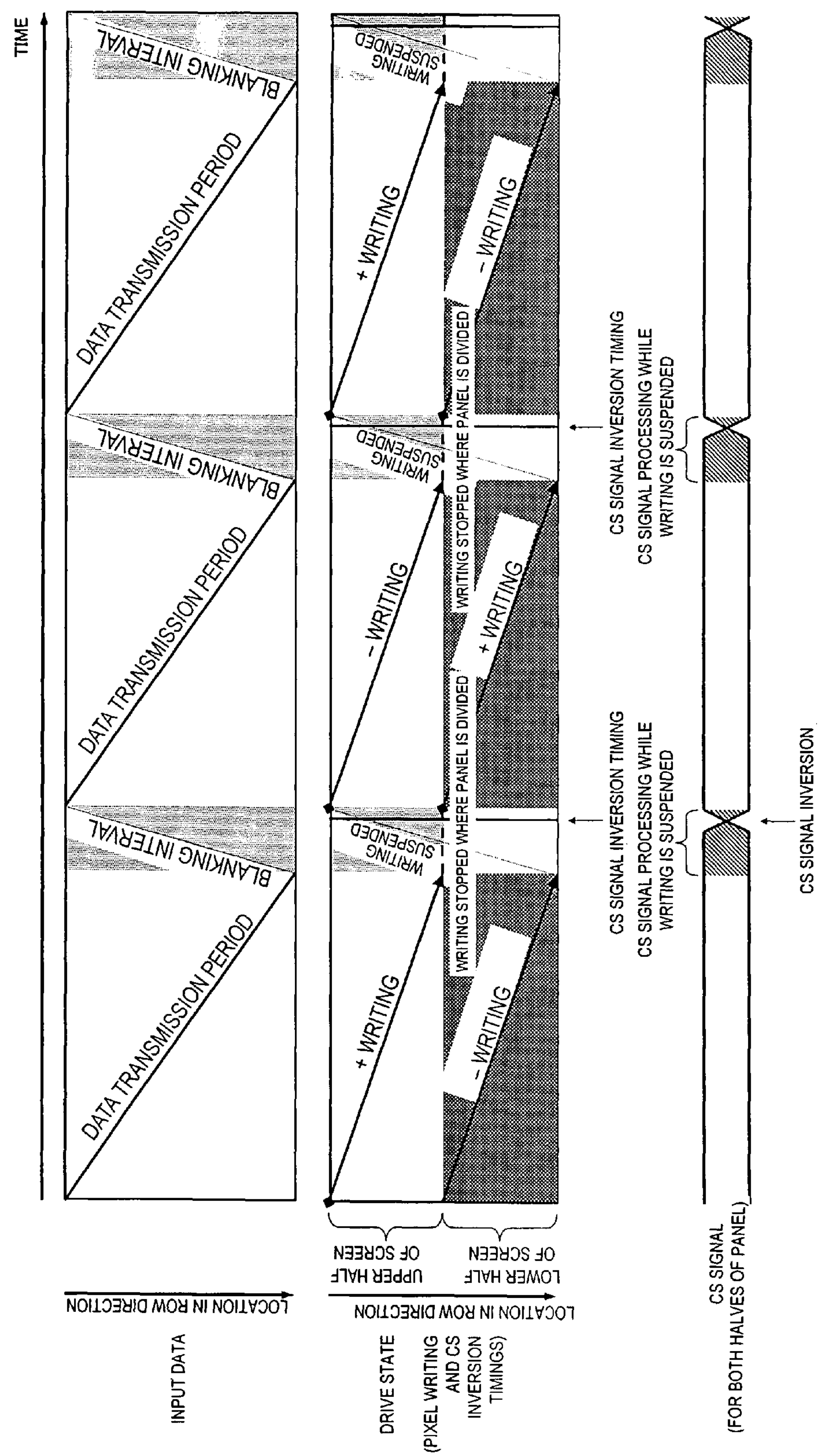

FIG. 63 schematically shows respective signal timings in a situation where the multi-pixel drive is adopted in a panel division drive method.

Figure 64:
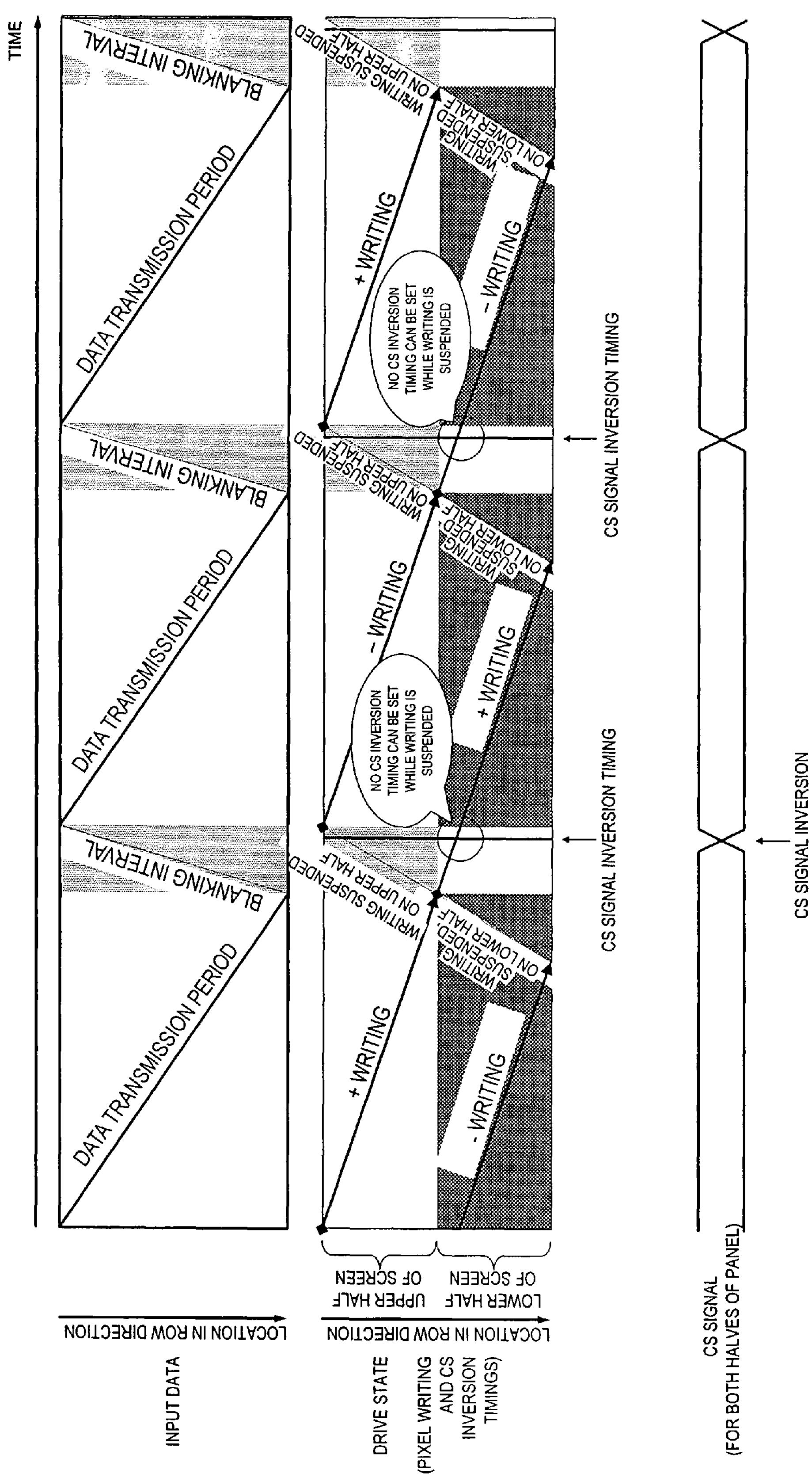

FIG. 64 shows what problems may arise in the situation where the multi-pixel drive is adopted in the panel division drive method.

Figure 65:
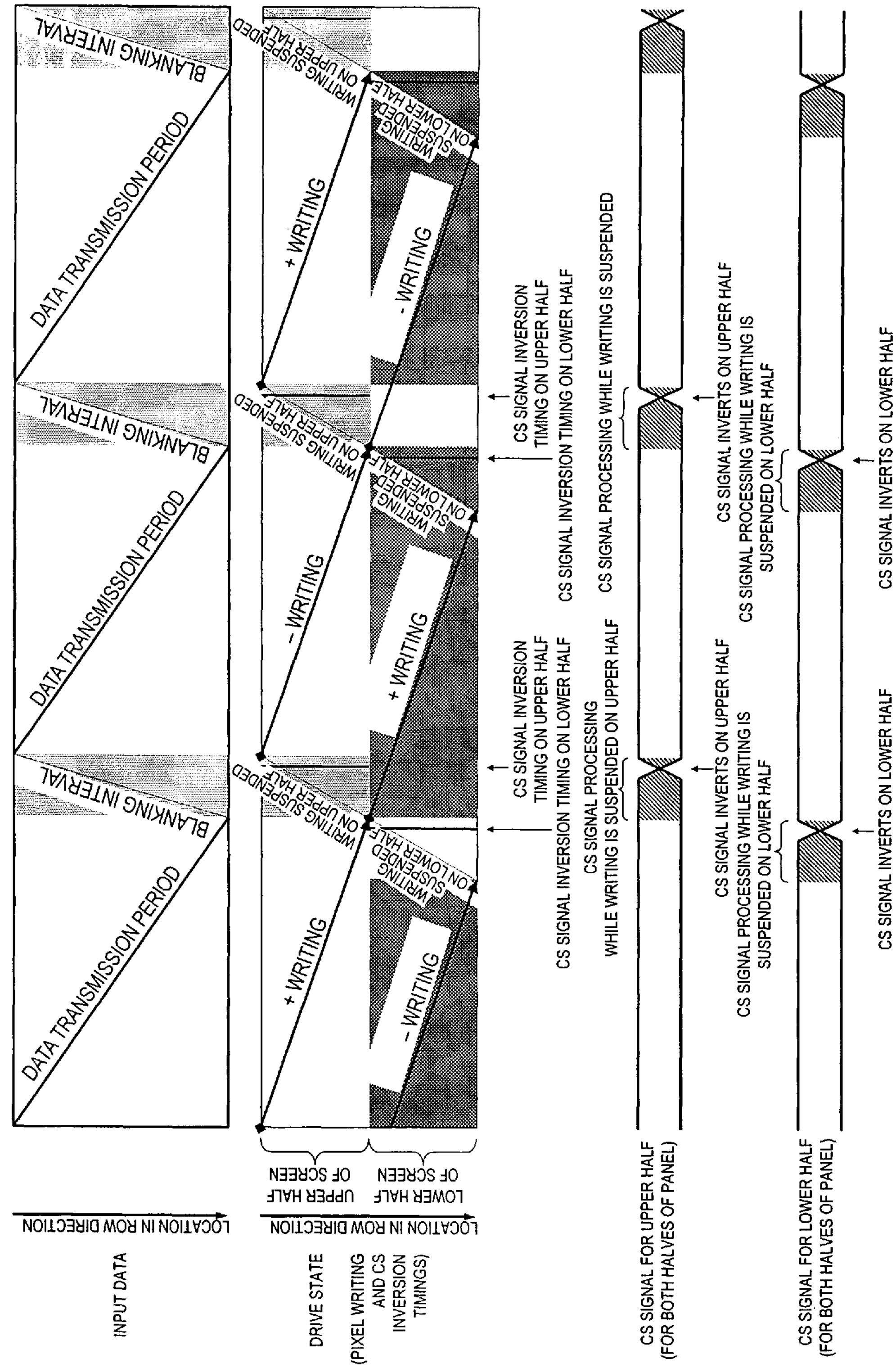

FIG. 65 illustrates a method for driving a liquid crystal display device according to a fifteenth preferred embodiment of the present invention.

Figure 66:
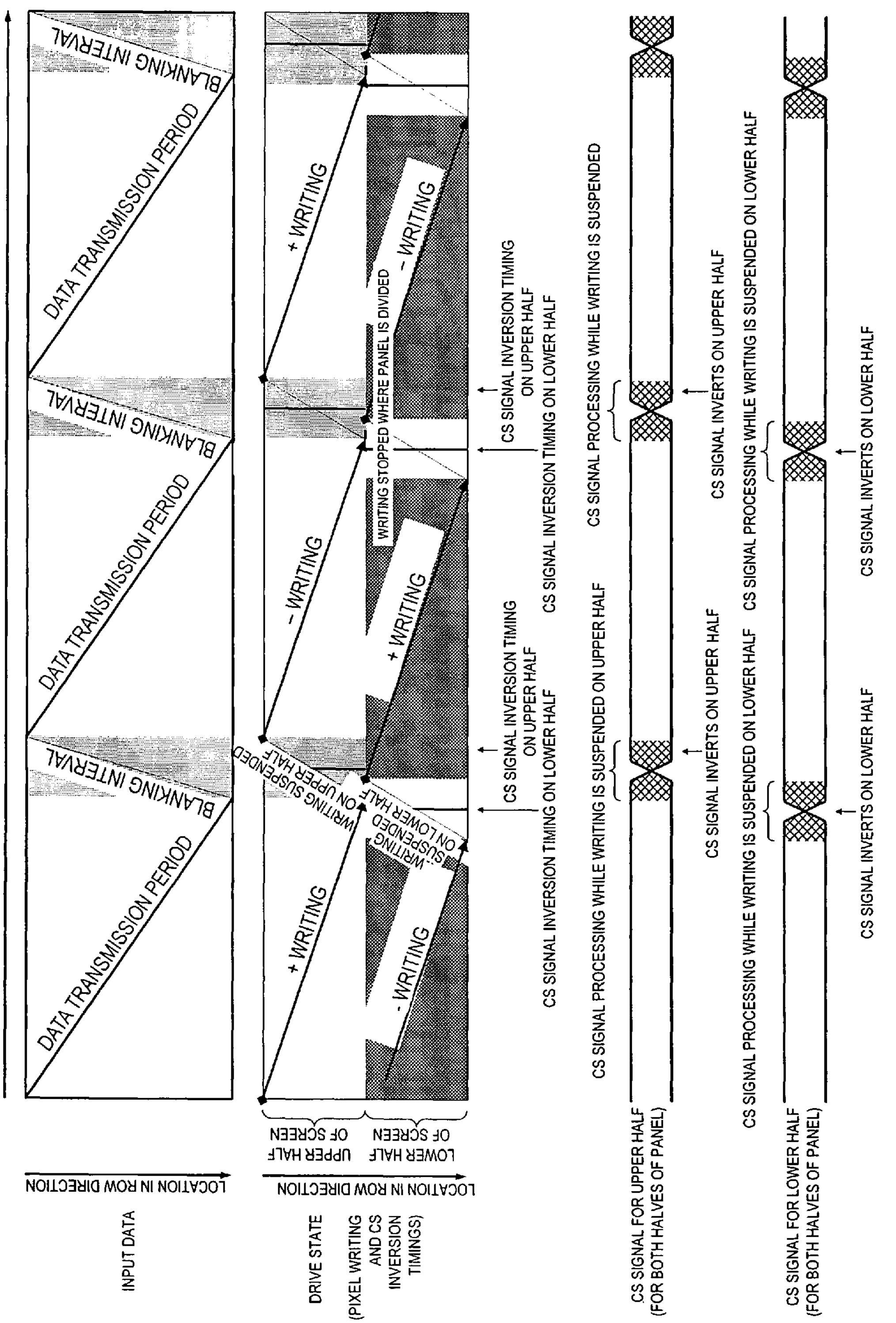

FIG. 66 illustrates another method for driving a liquid crystal display device according to the fifteenth preferred embodiment of the present invention.

Figure 67:
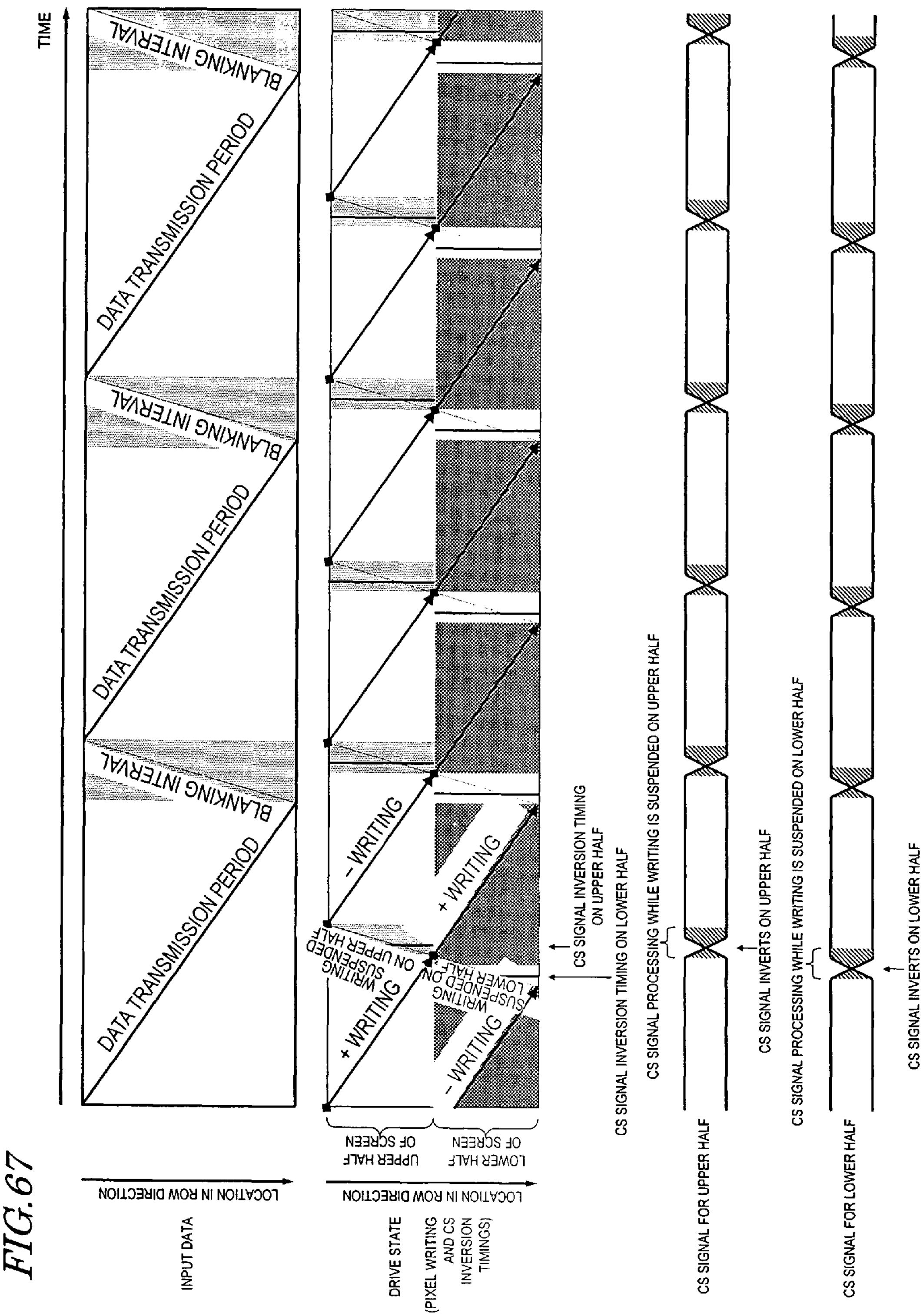

FIG. 67 illustrates a method for driving a liquid crystal display device according to a sixteenth preferred embodiment of the present invention.

Figure 68:
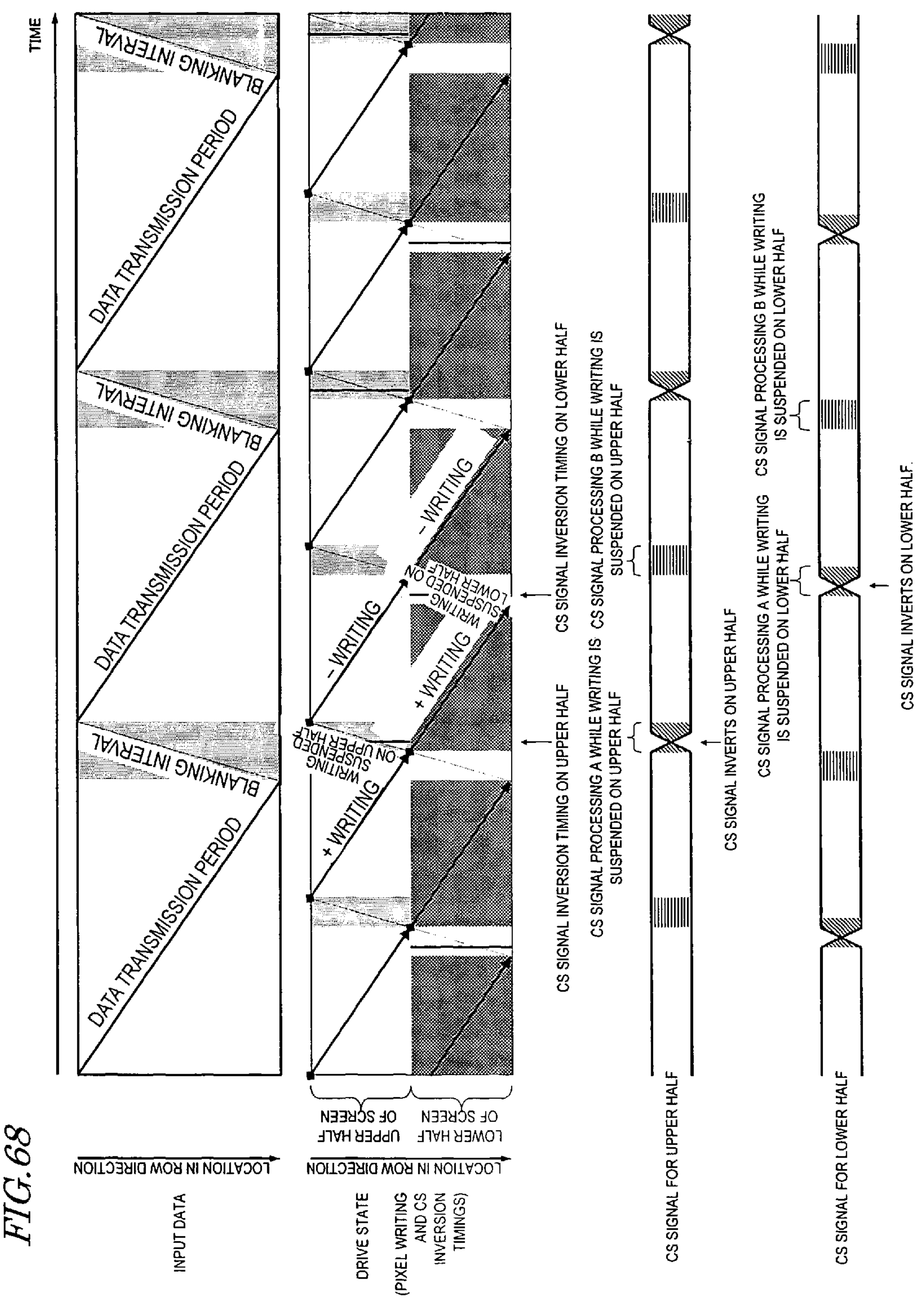

FIG. 68 illustrates another method for driving a liquid crystal display device according to the sixteenth preferred embodiment of the present invention.

Figure 69:
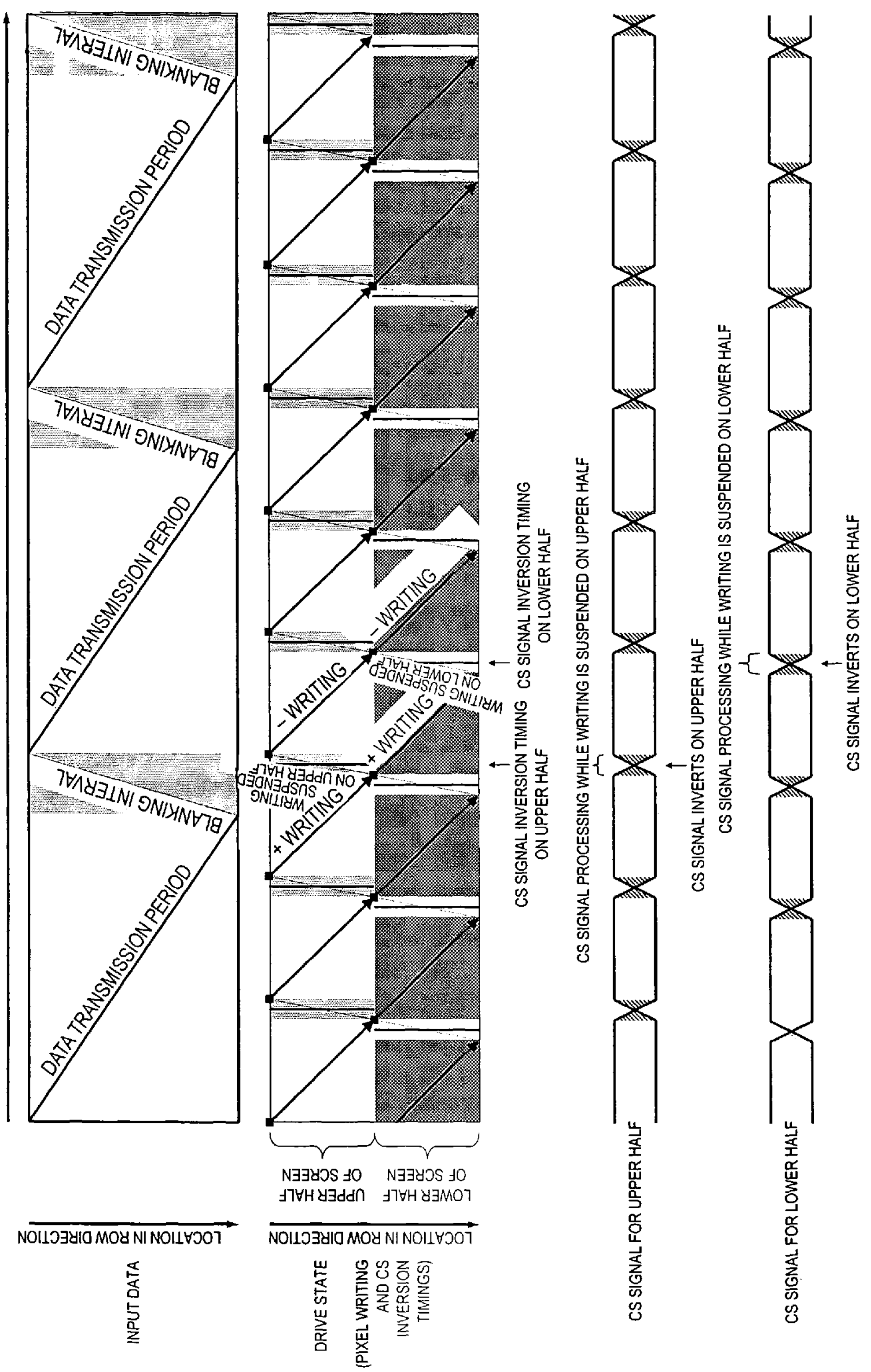

FIG. 69 illustrates a method for driving a liquid crystal display device according to a seventeenth preferred embodiment of the present invention.

Figure 70:
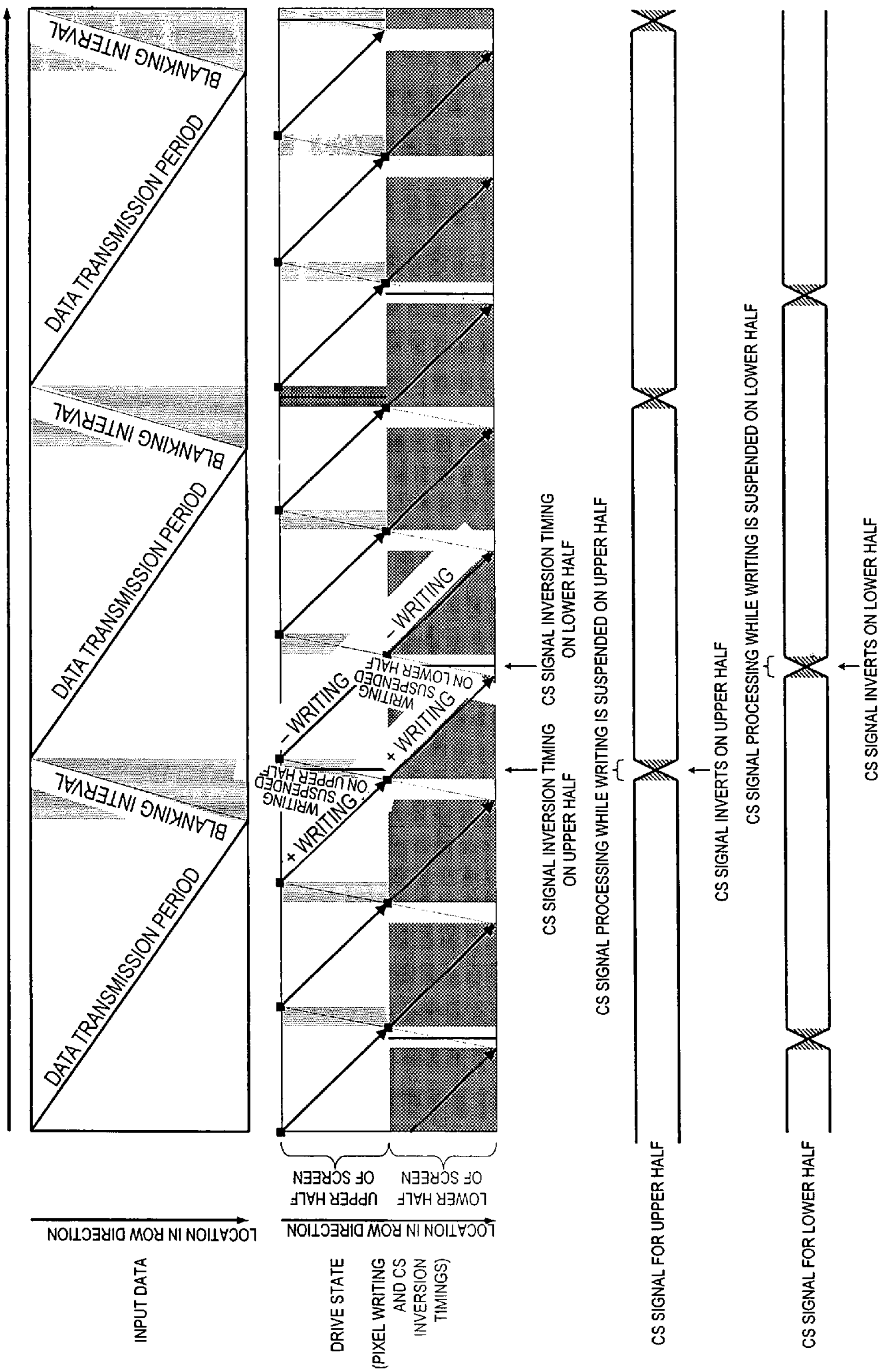

FIG. 70 illustrates another method for driving a liquid crystal display device according to the seventeenth preferred embodiment of the present invention.

Figure 71A:
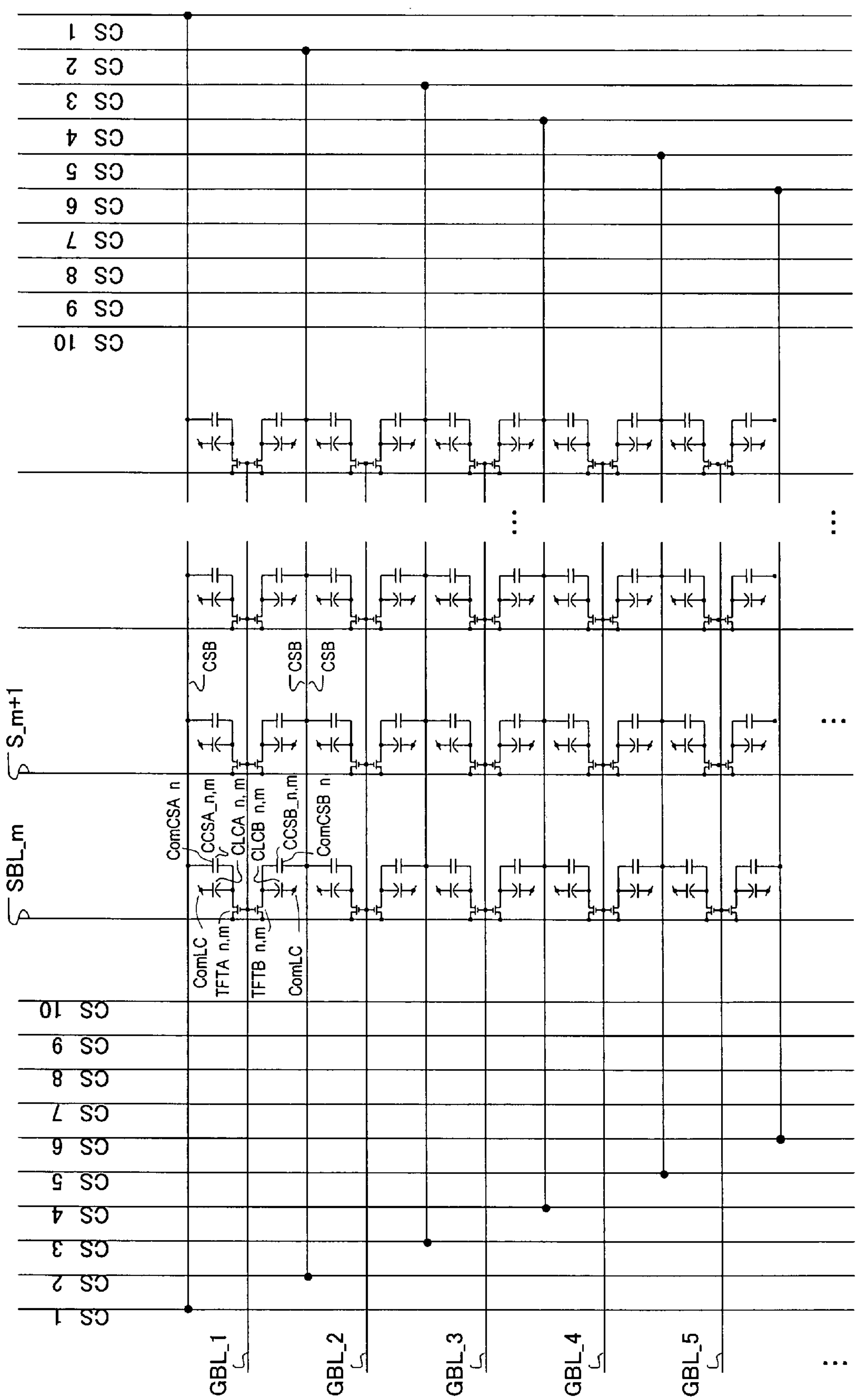
Figure 71B:
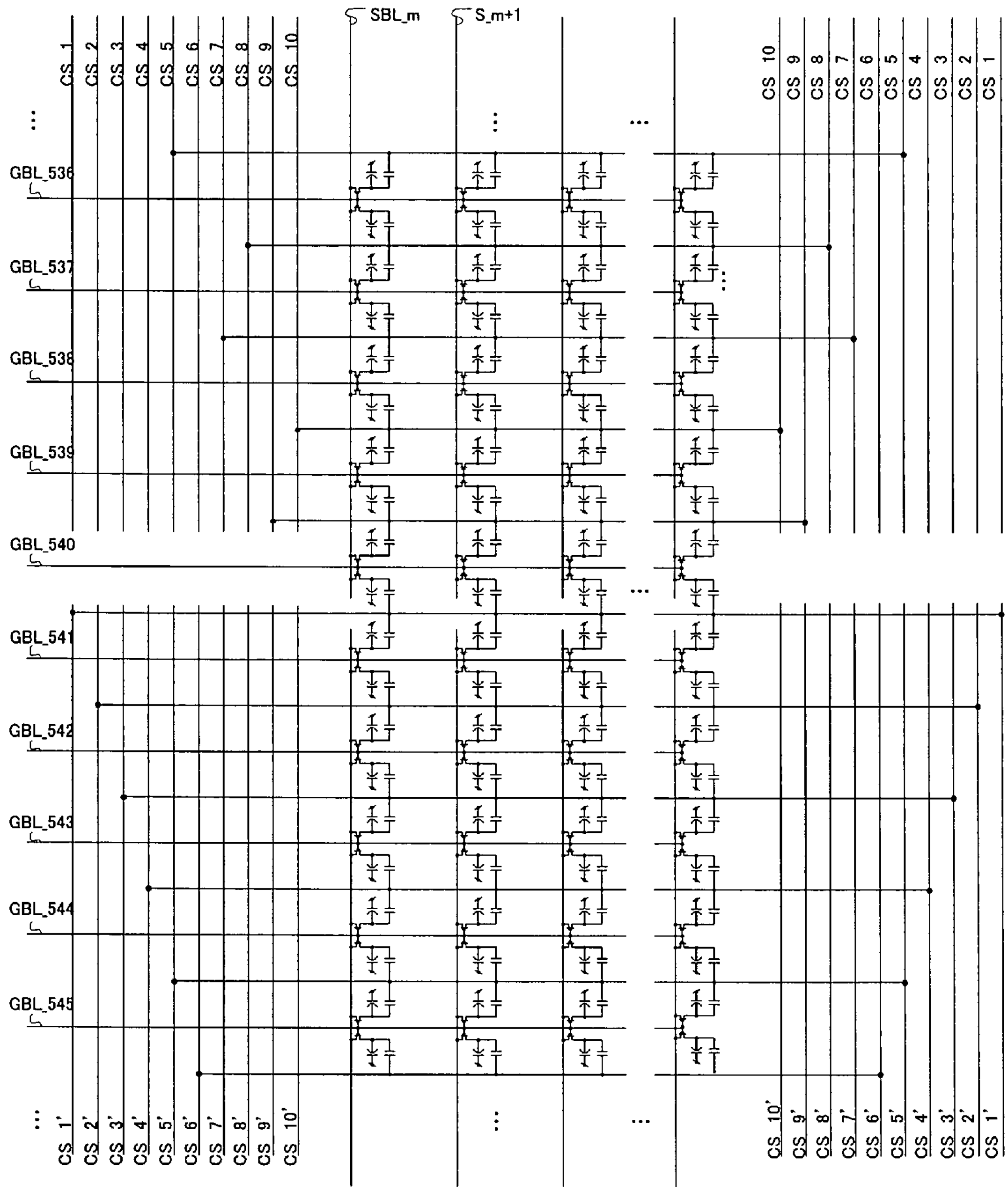
Figure 71C:
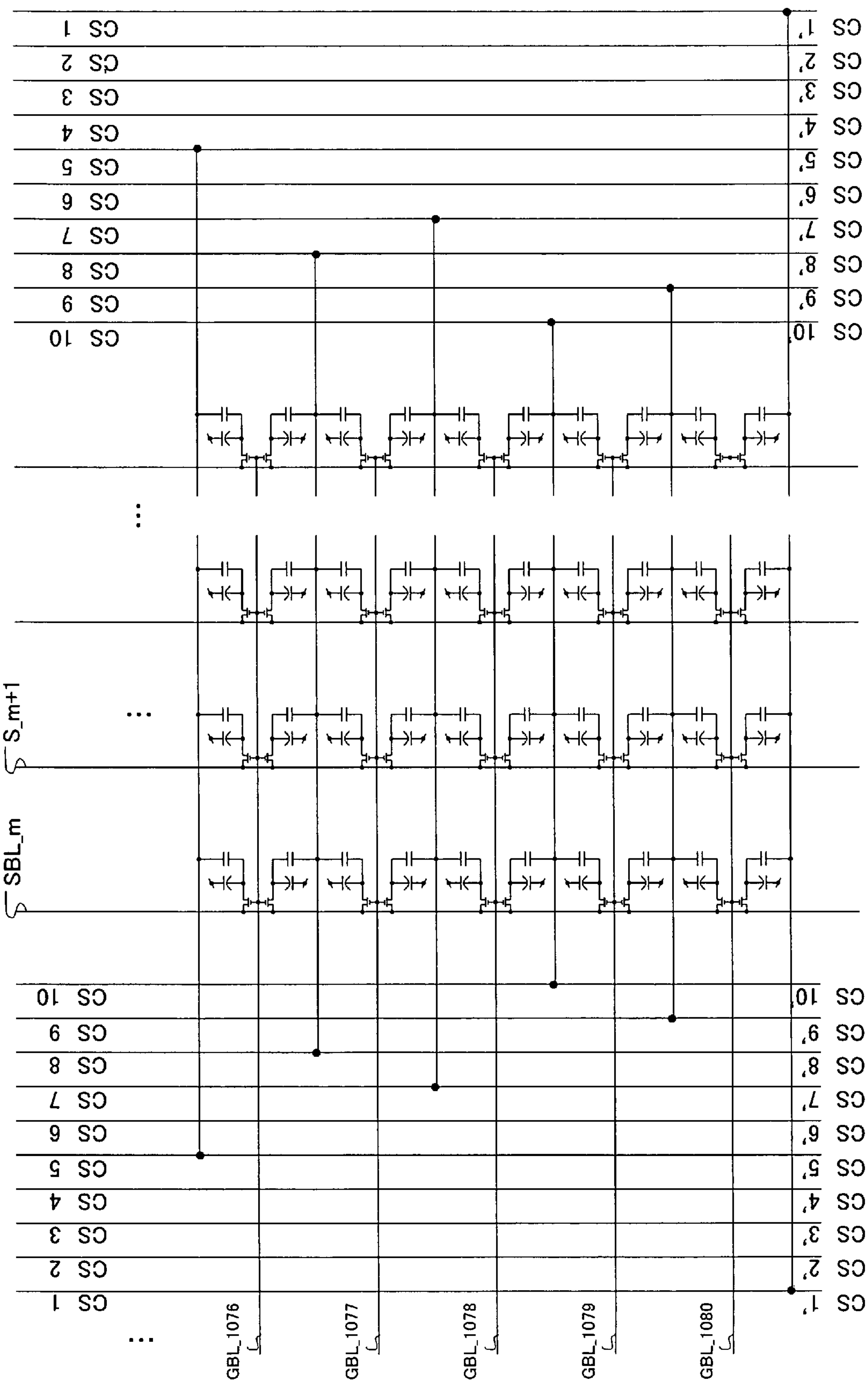

FIGS. 71A, 71B and 71C illustrate a method for driving a liquid crystal display device according to an eighteenth preferred embodiment of the present invention in three sheets.

Figure 72:
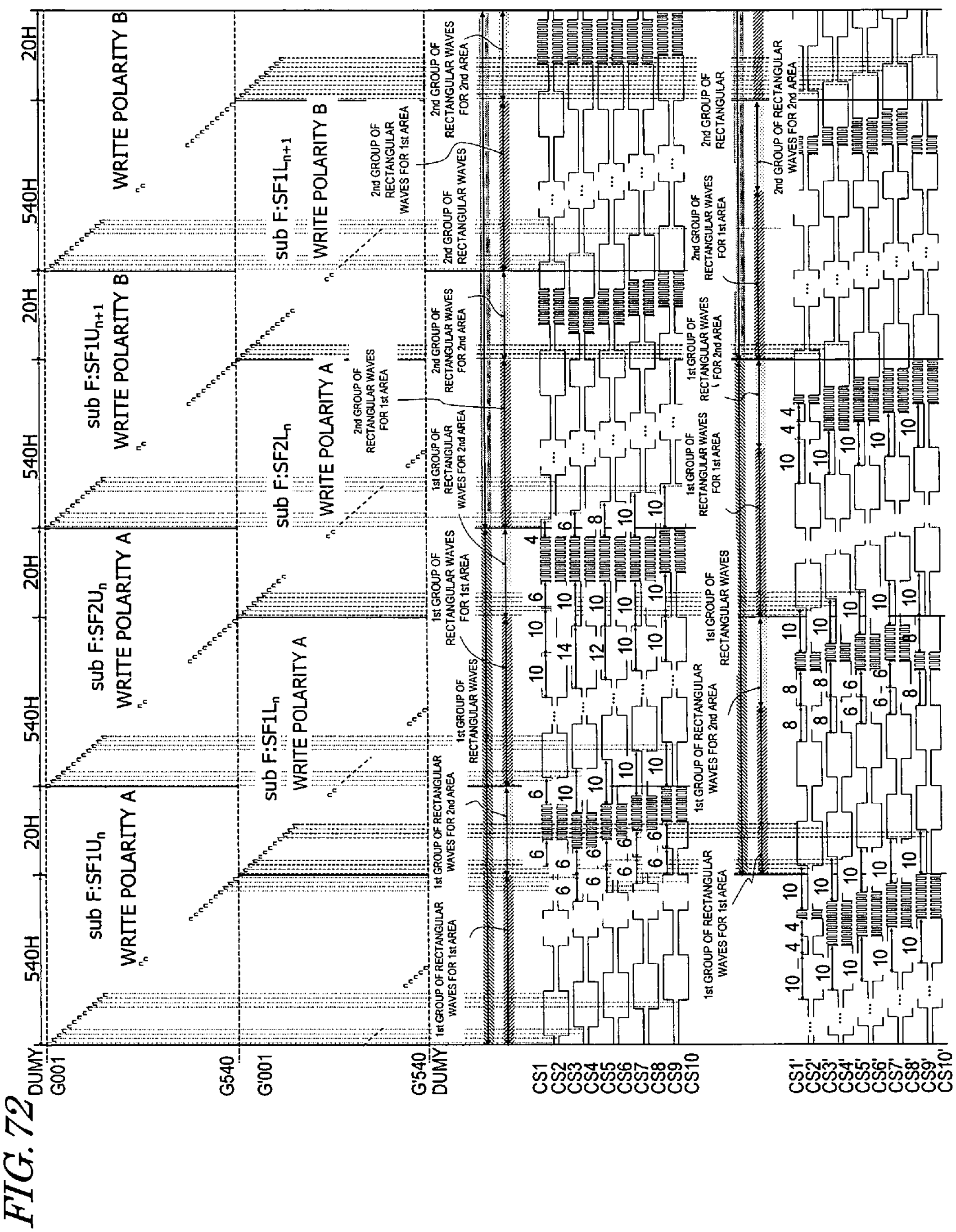

FIG. 72 illustrates another method for driving a liquid crystal display device according to the eighteenth preferred embodiment of the present invention.

Figure 73:
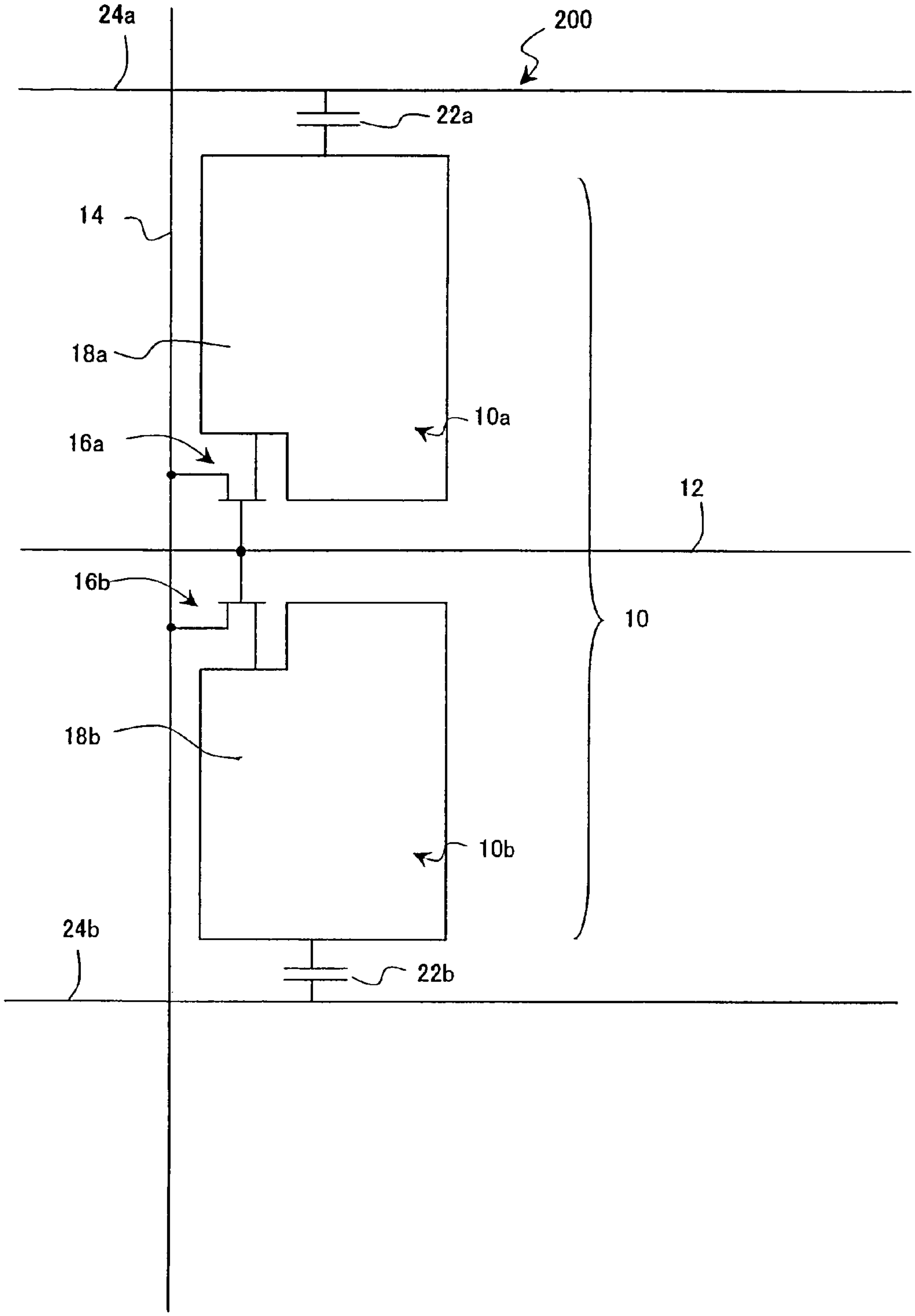

FIG. 73 schematically shows the pixel division structure of the liquid crystal display device 200 disclosed in Patent Document No. 5.

Figure 74:
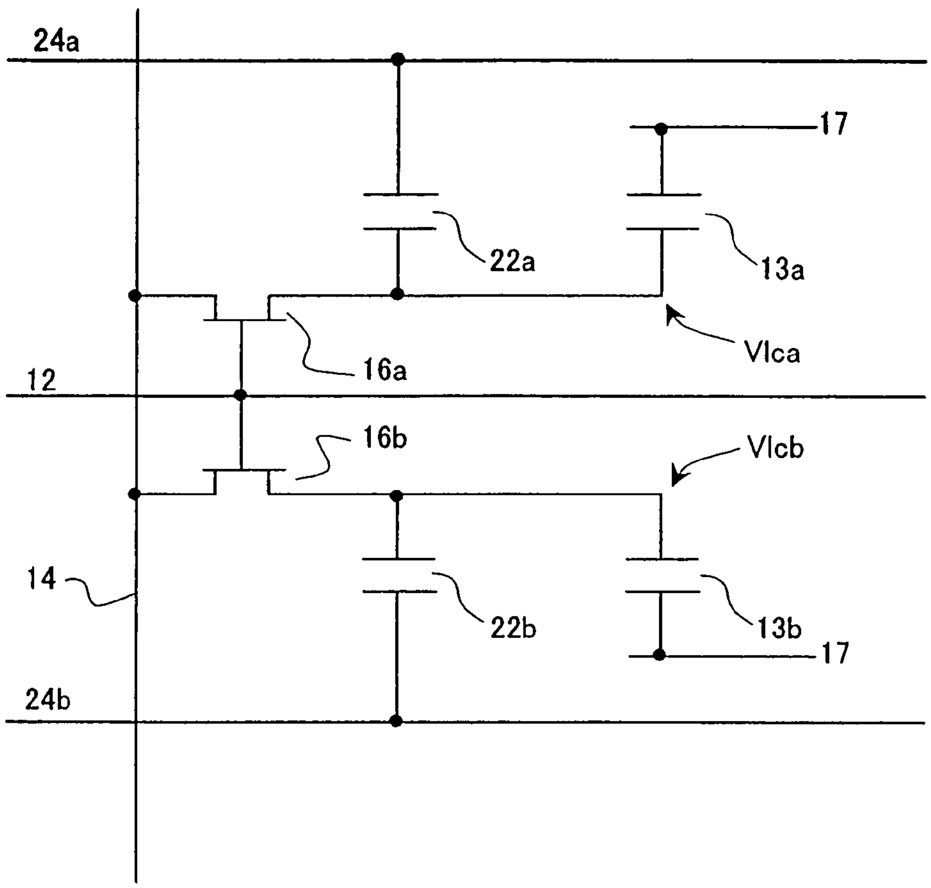

FIG. 74 shows an electrical equivalent circuit corresponding to the pixel structure of the liquid crystal display device 200.

Figure 75:
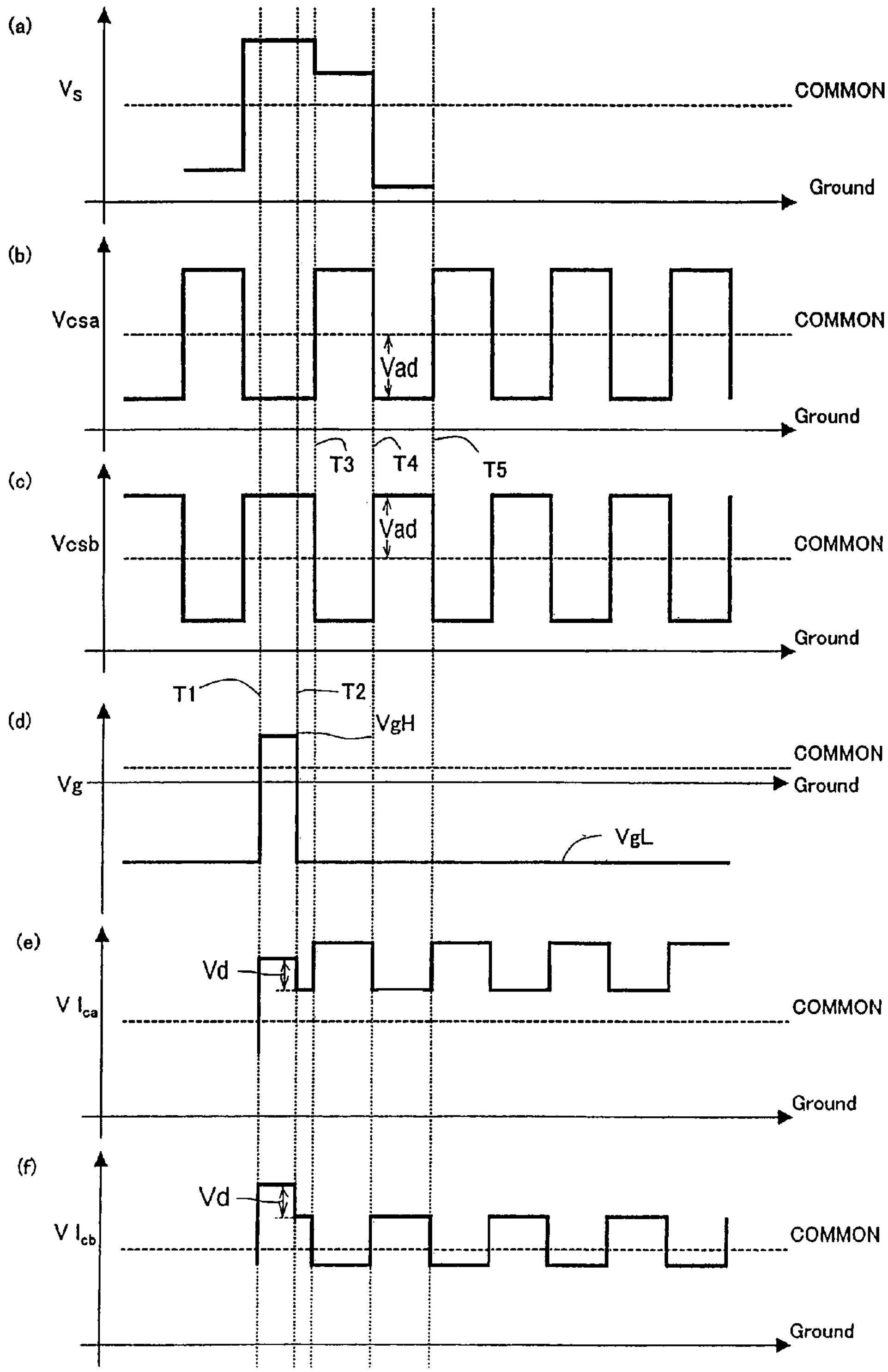

Portions (a) through (f) of FIG. 75 show the waveforms of voltages applied to drive the liquid crystal display device 200.

Figure 76:
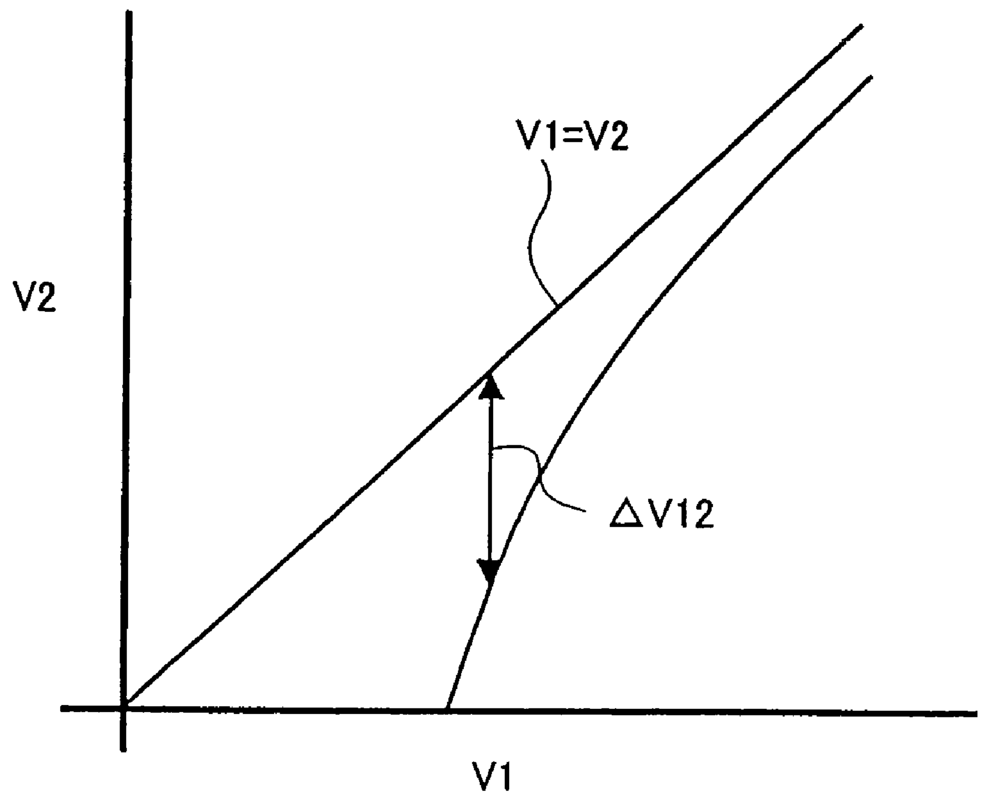

FIG. 76 shows a relation between the voltages applied to the liquid crystal layers of respective subpixels in the liquid crystal display device 200.

DESCRIPTION OF REFERENCE NUMERALS

10 pixel
10*a*, 10*b* subpixel
12 scan line (gate bus line)
14*a*, 14*b* signal line (source bus line)
16*a*, 16*b* TFT
18*a*, 18*b* subpixel electrode
100, 200 liquid crystal display device

BEST MODE FOR CARRYING OUT THE INVENTION

Hereinafter, preferred embodiments of a liquid crystal display device and its driving method according to the present invention will be described with reference to the accompanying drawings. It should be noted that in a liquid crystal display device according to a preferred embodiment of the present invention, the structure of pixels is similar to that disclosed in Patent Document No. 5, but the connection pattern of storage capacitor lines (which are typically CS bus lines) and the waveform of a storage capacitor counter voltage (which will also be referred to herein as a "CS voltage") are different from those disclosed in that document. First of all, it will be described what problem will arise if the oscillating voltage applied to the CS bus lines (i.e., the CS voltage) has a short oscillation period.

Figure 1:
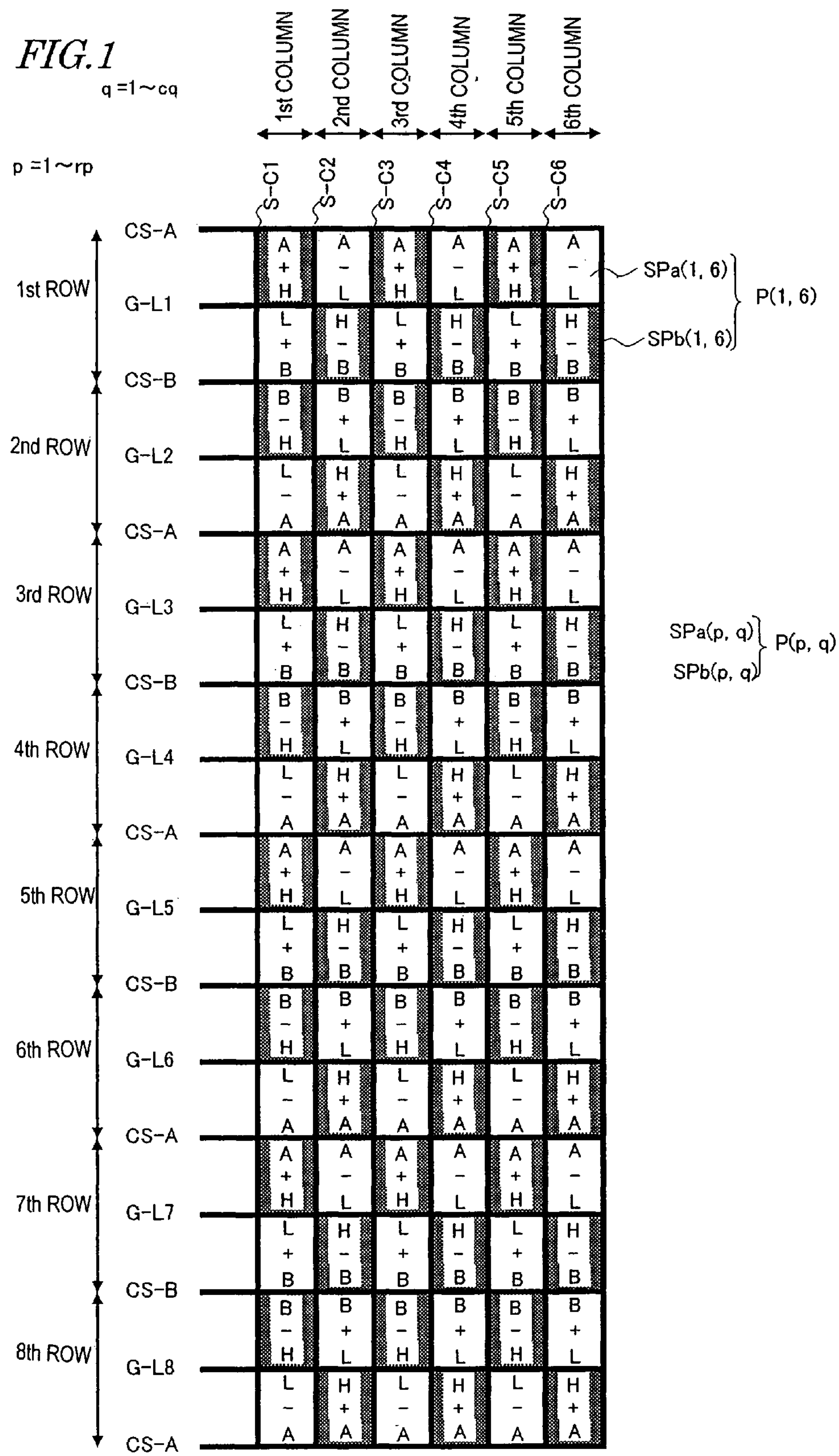
FIG. 1 schematically shows a pixel arrangement for a liquid crystal display device according to a preferred embodiment of the present invention.

In the following description, a liquid crystal display device, having such a pixel arrangement that can be used effectively in a 1H one dot inversion drive as shown in FIG. 1, will be described as an example. In the 1H one dot inversion drive, the potential levels of pixel electrodes and counter electrode are interchanged at regular intervals and the direction of the electric field applied to the liquid crystal layer (i.e., the direction of the electric lines of force) is inverted every vertical scanning period. As a result, flickering on the screen can be reduced. To minimize flickering on the screen, subpixels that have intentionally different luminances are preferably arranged such that their luminance order (i.e., their order of magnitudes of luminances) becomes as random as possible. And an arrangement in which no subpixels ranked at the same position in the luminance order are adjacent to each other in the column direction or in the row direction is most preferable. In other words, it is most preferable to arrange subpixels at the same position in the luminance order in a checkered pattern to improve the quality of display.

As used herein, one "vertical scanning period" is defined as an interval between a point in time when a scan line is selected and a point in time when the next scan line is selected. In a liquid crystal display device, one vertical scanning period is equivalent to one frame period when a non-interlaced drive signal is used but is equivalent to one field period when an interlaced drive signal is used.

Also, within each vertical scanning period, a time lag (i.e., an interval) between a point in time when a scan line is selected and a point in time when the next scan line is selected is defined herein as one horizontal scanning period (1H).

Hereinafter, a specific example of a liquid crystal display device according to the present invention will be described with reference to FIG. 1. The liquid crystal display device shown in FIG. 1 includes a plurality of pixels, which are arranged in columns (1 to cq) and rows (1 to rp) so as to form a matrix pattern (rp, cq). Each pixel P(p, q) (where $1 \leqq p \leqq rp$ and $1 \leqq q \leqq cq$) has two subpixels SPa(p, q) and SPb(p, q). FIG. 1 schematically illustrates a part of the relative arrangement (8 rows×6 columns) of signal lines S-C1, S-C2, S-C3, S-C4, . . . and S-Ccq; scan lines G-L1, G-L2, G-L3, . . . and G-Lrp; storage capacitor lines CS-A and CS-B; pixels P (p, q); and subpixels SPa(p, q) and SPb (p, q) of the respective pixels.

As shown in FIG. 1, each pixel P(p, q) has subpixels SPa(p, q) and SPb(p, q) over and under its associated scan line G-Lp that extends horizontally approximately through the center of the pixel. That is to say, the subpixels SPa(p, q) and SPb(p, q) of each pixel are arranged in the column direction. In each of the subpixels SPa(p, q) and SPb(p, q), one of the two storage capacitor electrodes (not shown) thereof is connected to an adjacent storage capacitor line CS-A or CS-B. Also, a signal line S-Cq to supply a signal voltage (which will also be referred to herein as a "display signal voltage" or a "data signal voltage"), representing an image to be presented, to the pixels P(p, q) runs vertically (in the column direction) between those pixels to supply the signal voltage to the TFTs (not shown) of the subpixels (or pixels) on the right-hand side of that signal line. In the arrangement shown in FIG. 1, one storage capacitor line and one scan line are shared by two subpixels, thus achieving the effect of increasing the aperture ratio of the pixels.

Figure 2:
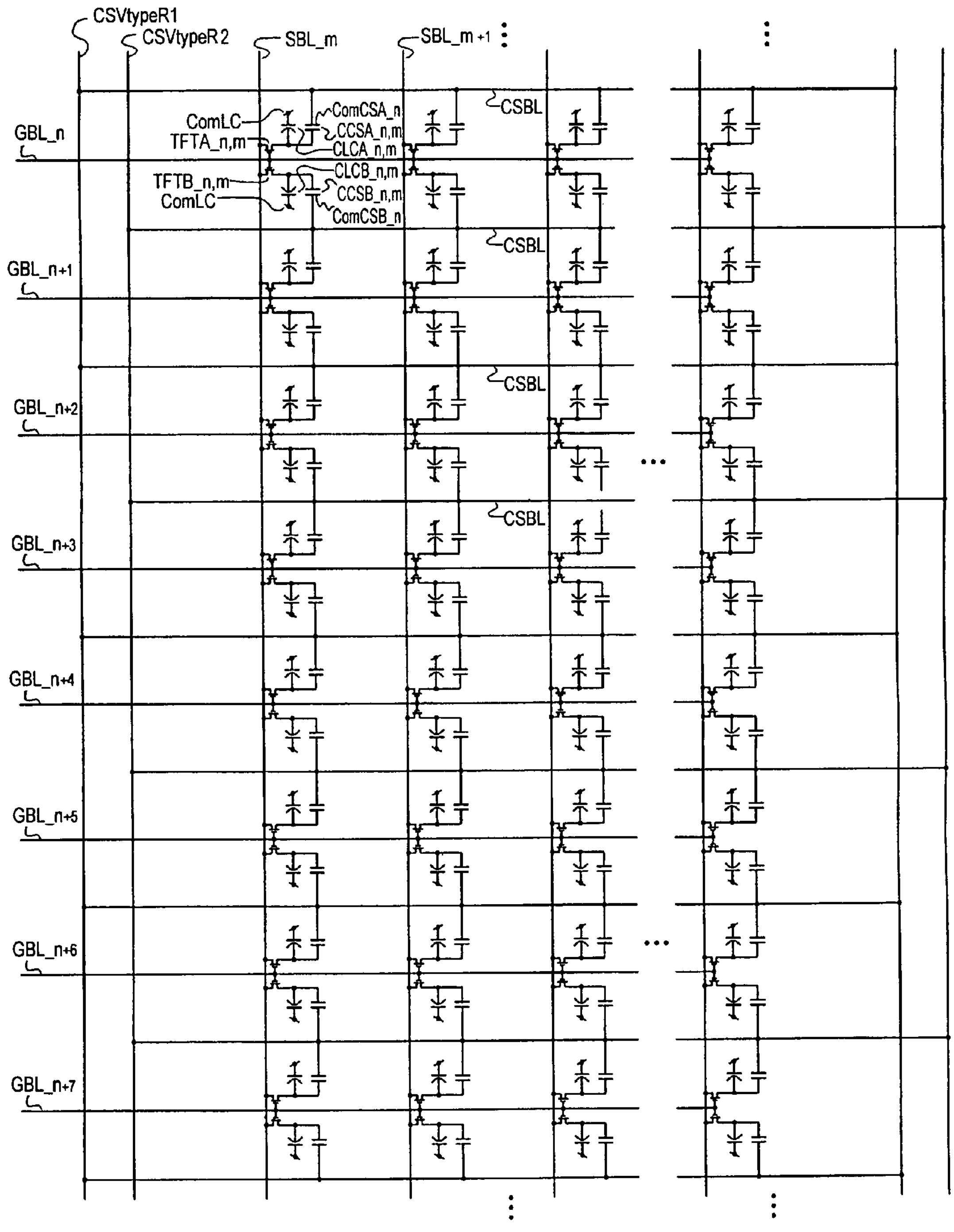
FIG. 2 is an equivalent circuit diagram showing an area of the liquid crystal display device of the preferred embodiment of the present invention.

FIG. 2 is an equivalent circuit diagram of an area of a liquid crystal display device with the pixel arrangement shown in FIG. 1. The liquid crystal display device has pixels that are arranged in columns and rows so as to form a matrix pattern. Each pixel has two subpixels (which are identified herein by the reference signs A and B, respectively). Each subpixel includes a liquid crystal capacitor CLCA_n,m or CLCB_n,m and a storage capacitor CCSA_n,m or CCSB_n,m. Each liquid crystal capacitor is formed by a subpixel electrode, a counter electrode ComLC, and a liquid crystal layer interposed between them. Each storage capacitor is formed by a storage capacitor electrode, an insulating film, and a storage capacitor counter electrode (ComCSA_n or ComCSB_n). The two subpixels are connected to a common signal line (source bus line) SBL_m by way of their associated TFTA_n,m and TFTB_n,m. The ON/OFF states of TFTA_n,m and TFTB_n,m are controlled with a scan signal voltage supplied to a common scan line (gate bus line) GBL_n. When the two TFTs are ON, a display signal voltage is applied to the respective subpixel electrodes and storage capacitor electrodes of the two subpixels through a common signal line. The storage capacitor counter electrode of one of the two subpixels is connected to a storage capacitor trunk (CS trunk) CSVtypeR1 and that of the other subpixel is connected to a storage capacitor trunk (CS trunk) CSVtypeR2 by way of a CS bus line CSBL.

In FIG. 2, attention should be paid to the fact that the subpixels of two pixels, belonging to rows that are adjacent to each other in the column direction, share the same CS bus line electrically. More specifically, the CS bus line CSBL for the subpixels CLCB_n,m of the $n^{th}$ row and the CS bus line CSBL for the subpixels CLCA_n+1,m of a pixel that is adjacent to the former subpixels in the column direction are electrically common.

Figure 3A:
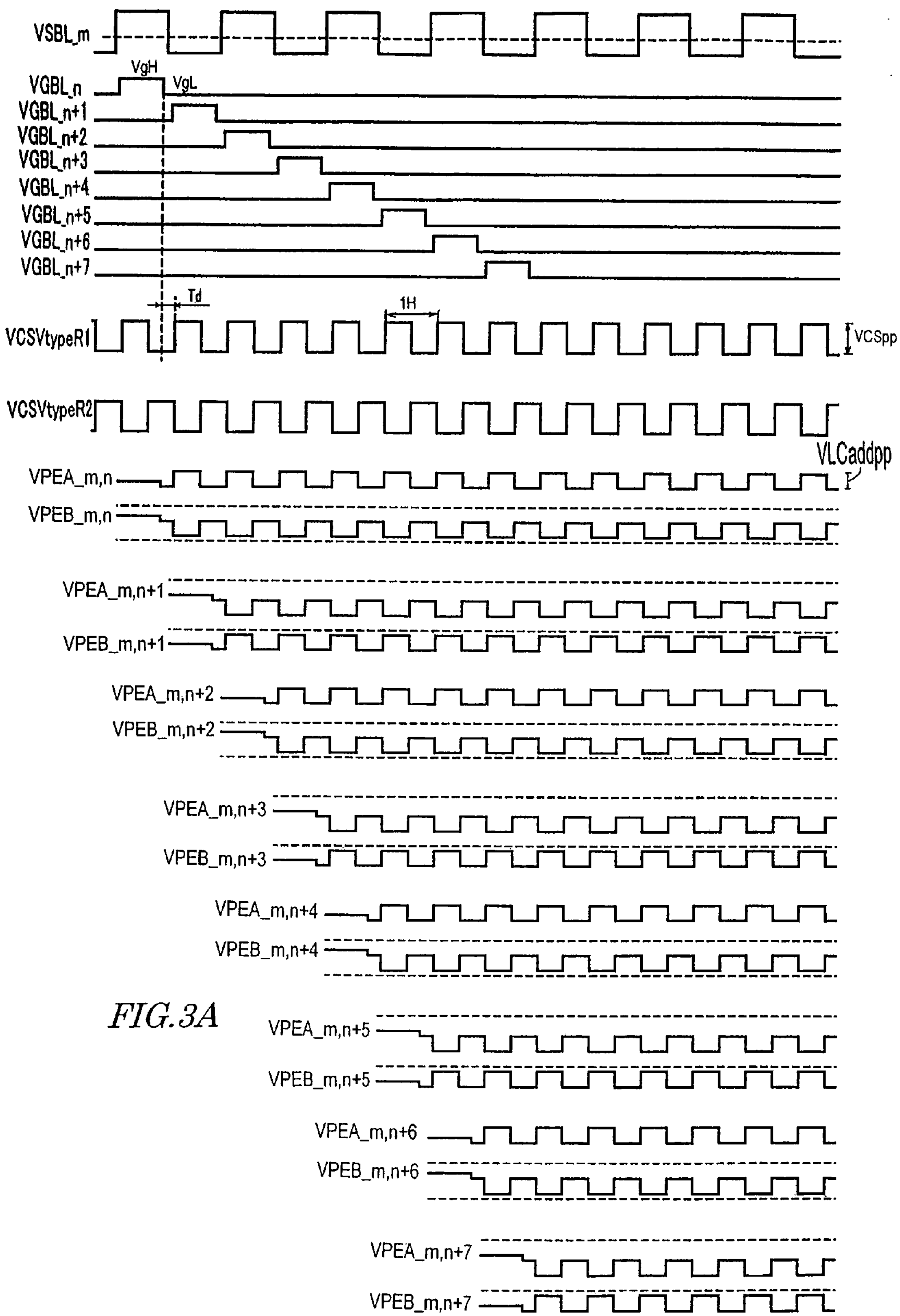
FIG. 3A shows the periods and phases of oscillation of oscillating voltages supplied to CS bus lines with respect to the voltage waveforms on gate bus lines and the voltages applied to subpixel electrodes in the liquid crystal display device shown in FIG. 2.
Figure 3B:
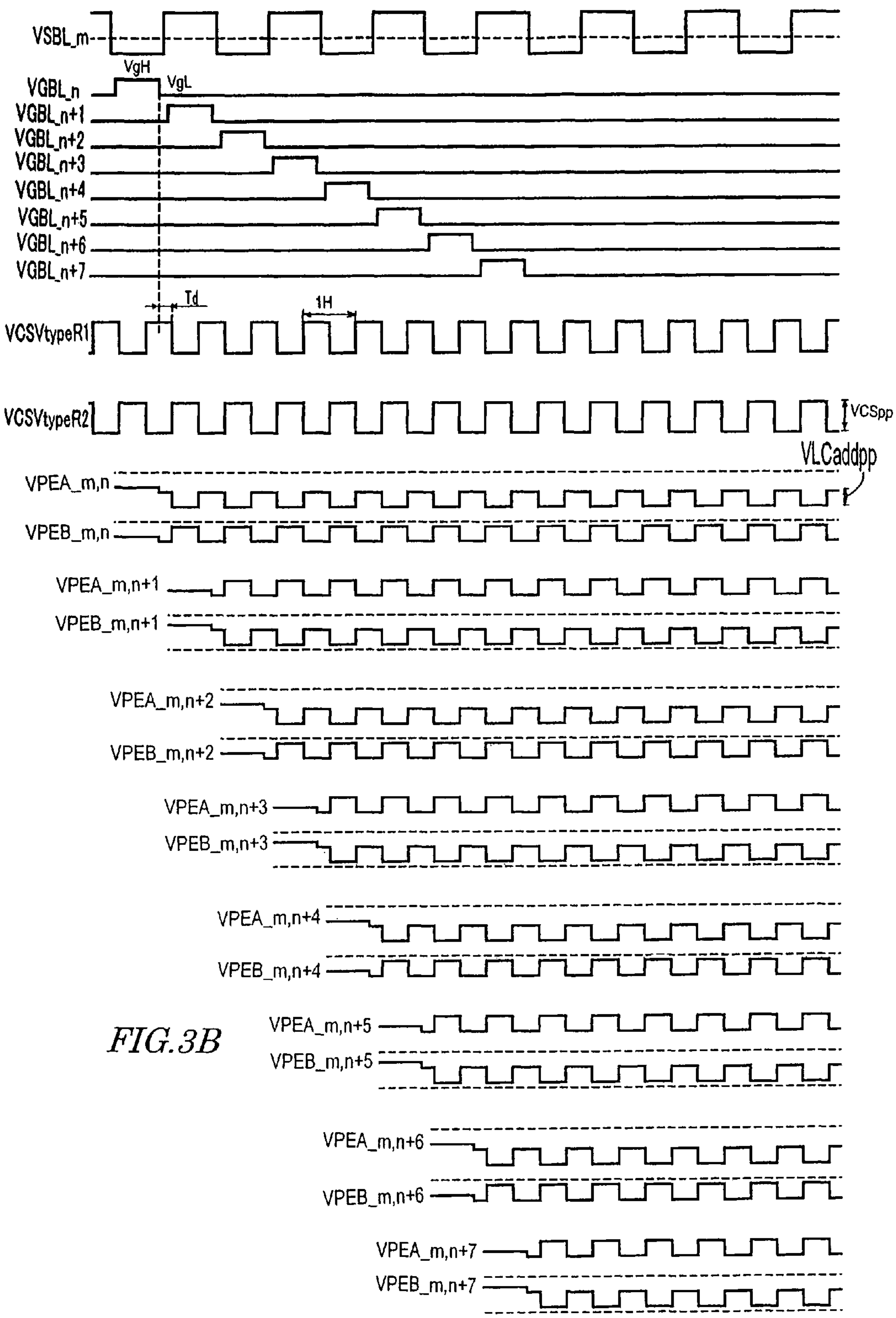
FIG. 3B shows the periods and phases of oscillation of oscillating voltages supplied to CS bus lines with respect to the voltage waveforms on gate bus lines and the voltages applied to subpixel electrodes in the liquid crystal display device shown in FIG. 2 (in which the voltage applied to the liquid crystal layer has its polarity inverted compared to FIG. 3A).

FIGS. 3A and 3B show the oscillation periods and phases of oscillating voltages supplied to the CS bus lines with respect to the voltage waveforms of the gate bus lines as well as the voltages applied to the subpixel electrodes. In general, in a liquid crystal display device, the direction of the electric field applied to the liquid crystal layer of each pixel is inverted at regular intervals (e.g., every vertical scanning period), and therefore, two types of drive voltage waveforms need to be provided for the two directions of the electric field. These two types of drive states are shown in FIGS. 3A and 3B, respectively.

In FIGS. 3A and 3B, VSBL_m denotes the waveform of a display signal voltage (source signal voltage) supplied to the source bus line SBL_m of the $m^{th}$ column, while VGBL_n denotes the waveform of a scan signal voltage (gate signal voltage) supplied to the gate bus line GBL_n of the $n^{th}$ column. VCSVtypeR1 and VCSVtypeR2 denote the waveforms of the oscillating voltages supplied as storage capacitor counter voltages to the CS trunks CSVtypeR1 and CSVtypeR2, respectively. VPEA_m,n and VPEB_m,n denote the voltage waveforms of the liquid crystal capacitors of the respective subpixels.

In FIGS. 3A and 3B, first of all, it should be noted that the oscillation periods of the voltages VCSVtypeR1 and VCSVtypeR2 of CSVtypeR1 and CSVtypeR2 are both as long as one horizontal scanning period (1 H).

Secondly, in FIGS. 3A and 3B, VCSVtypeR1 and VCSVtypeR2 have the following phases. First, looking at the phase difference between the CS trunks, VCSVtypeR2 has a phase delay of 0.5 H with respect to VCSVtypeR1. Next, looking at the voltages on the CS trunks and the gate bus lines, the voltages on the CS trunks and gate bus lines have the following phases. As can be seen from FIGS. 3A and 3B, the time when the gate bus line voltages for respective CS trunks change from VgH to VgL agrees with the centers of respective flat portions of the CS trunk voltages. In other words, the Td value shown in FIGS. 3A and 3B is 0.25 H. However, Td may have any other value as long as Td is greater than 0 H but smaller than 0.5 H.

Although the periods and phases of the voltages on the CS trunks have been described with reference to FIGS. 3A and 3B, the CS trunks do not have to have such voltage waveforms but just need to satisfy one of the following two conditions. The first condition is that the first voltage variation of VCSVtypeR1 after the voltage on its associated arbitrary gate bus line has changed from VgH to VgL should be a voltage increase, while the first voltage variation of after the voltage on its associated arbitrary gate bus line has changed from VgH to VgL should be a voltage decrease. The second condition is that the first voltage variation of VCSVtypeR1 after the voltage on its associated arbitrary gate bus line has changed from VgH to VgL should be a voltage decrease, while the first voltage variation of after the voltage on its associated arbitrary gate bus line has changed from VgH to VgL should be a voltage increase.

Figure 4A:
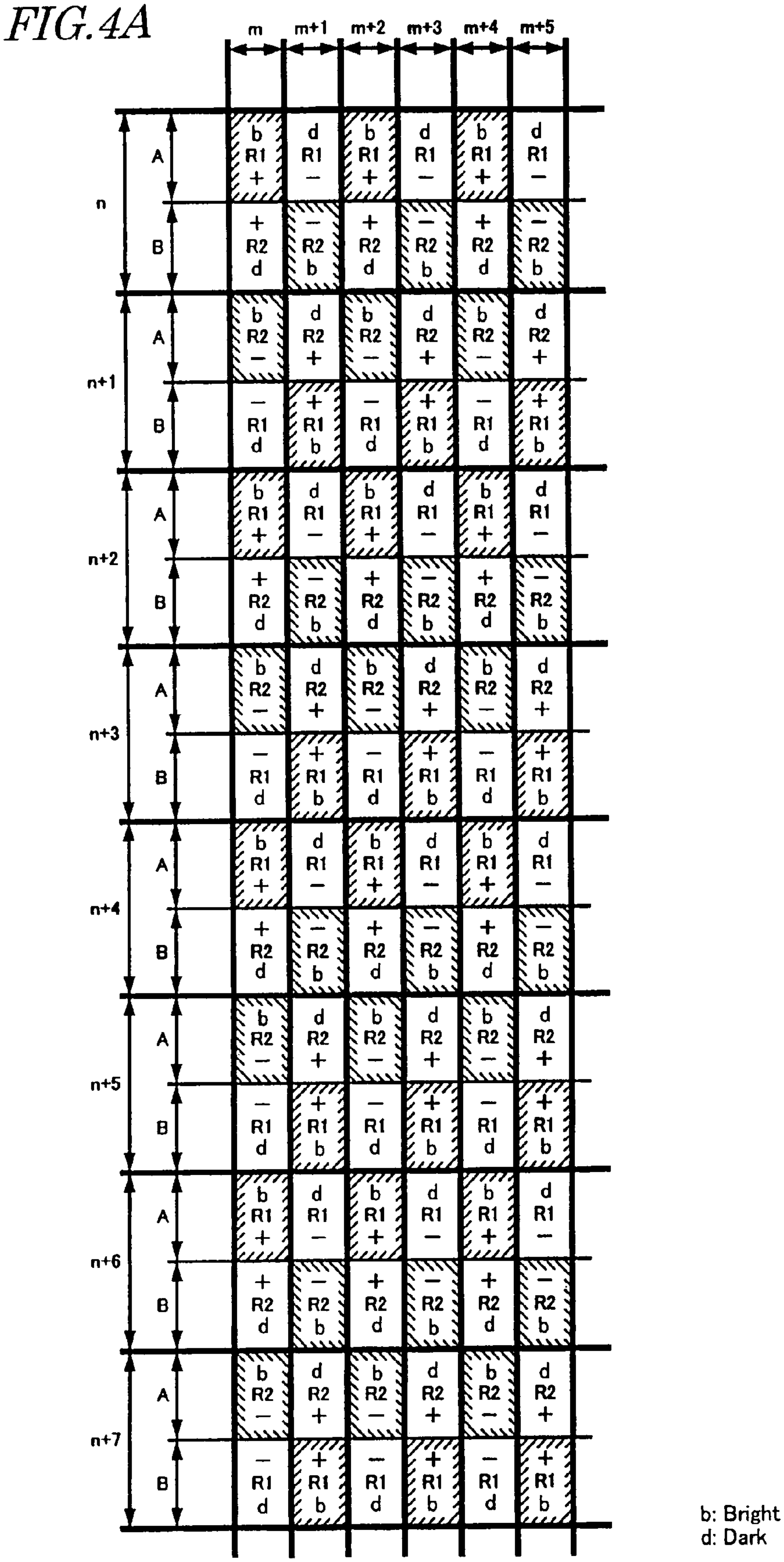
FIG. 4A is a schematic representation showing the drive state of the liquid crystal display device shown in FIG. 2 (in a situation where the voltages shown in FIG. 3A are used).
Figure 4B:
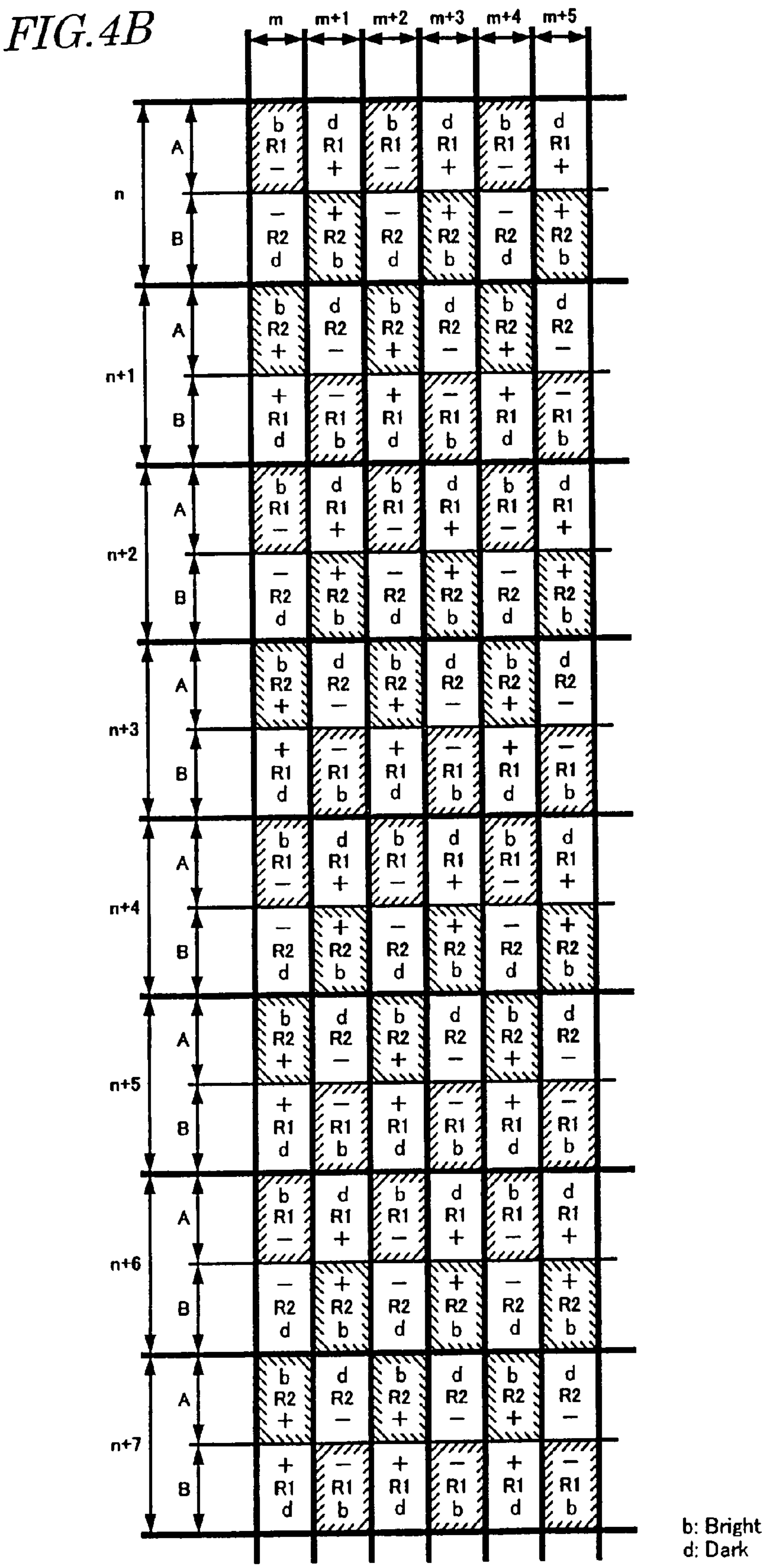
FIG. 4B is a schematic representation showing the drive state of the liquid crystal display device shown in FIG. 2 (in a situation where the voltages shown in FIG. 3B are used).

FIGS. 4A and 4B summarize the drive states of this liquid crystal display device. The drive state of the liquid crystal display device also needs to be one of the two types according to the combination of drive voltage polarities for the respective subpixels as in FIGS. 3A and 3B.

Specifically, the drive state shown in FIG. 4A corresponds to the drive voltage waveforms shown in FIG. 3A, while the drive state shown in FIG. 4B corresponds to the drive voltage waveforms shown in FIG. 3B.

FIGS. 4A and 4B schematically show the drive states of pixels, which are arranged in eight rows (from the $n^{th}$ row through $(n+7)^{th}$ row) and in six columns (from the $m^{th}$ column through the $(m+5)^{th}$ column) among those pixels arranged in matrix. Each pixel has two subpixels with mutually different luminances: a "bright (b)" subpixel and a "dark (d)" subpixel. These drawings are basically the same as FIG. 1.

In FIGS. 4A and 4B, it should be determined whether or not this arrangement satisfies the following five requirements for an area ratio gray scale panel:

(1) Each pixel should consist of a plurality of subpixels with mutually different luminances when displaying a half-tone;

(2) The order of magnitudes of the luminances of those subpixels should always remain the same;

(3) The subpixels with different luminances should be arranged densely;

(4) Pixels of opposite polarities should be arranged densely on a pixel-by-pixel basis in an arbitrary vertical scanning period (which will be referred to herein as a "frame");

(5) In an arbitrary frame, subpixels of the same polarity should be arranged densely such that subpixels ranked at the same position in the luminance order (e.g., subpixels with the highest luminance, among other things) alternate one after another.

Let us see if the first requirement is satisfied. In this example, each pixel consists of two subpixels with mutually different luminances. Specifically, in FIG. 4A, the pixel at the intersection of the $n^{th}$ row and the $m^{th}$ column consists of a high-luminance subpixel labeled as "b (bright)" and a low-luminance subpixel labeled as "d (dark)". Therefore, the first requirement is satisfied.

Next, the second requirement will be discussed. This liquid crystal display device alternately shows two display states having mutually different drive states at regular intervals. Comparing FIGS. 4A and 4B showing the drive states corresponding to the two display states to each other, it can be seen that both high-luminance subpixels and low-luminance subpixels remain in the same locations. That is why the second requirement is also satisfied.

Let's turn to the third requirement next. In FIGS. 4A and 4B, subpixels ranked at two different positions in the luminance order, i.e., subpixels labeled as "b (bright)" and subpixels labeled as "d (dark)", are arranged in a checkered pattern. When this liquid crystal display device was actually operated, no defects such as a decrease in resolution due to the use of those subpixels with different luminances were visible to the naked eye. Thus, the third requirement is satisfied.

Next is the fourth requirement. In FIGS. 4A and 4B, pixels of opposite polarities are arranged on a pixel-by-pixel basis in a checkered pattern. Specifically, in FIG. 4A, the pixel at the intersection of the $(n+2)^{th}$ row and the $(m+2)^{th}$ column is a "+" pixel. From this pixel, the polarities changes every pixel from "+" into "−", and vice versa, both in the row direction and in the column direction alike. Also, in a liquid crystal display device that does not satisfy the fourth requirement, flickering should be seen on the screen when the pixels switch their drive polarities between "+" and "−". When this liquid crystal display device was operated, however, no flickering was seen to the eye. That is why the fourth requirement is also satisfied.

And let's focus on the fifth requirement. In FIGS. 4A and 4B, the drive polarities of subpixels ranked at the same position in the luminance order invert every two rows of subpixels, i.e., every pixel width. Specifically, in the $(n\_B)^{th}$ row in FIG. 4A, the subpixels of the $(m+1)^{th}$, $(m+3)^{th}$, and $(m+5)^{th}$ columns have the luminance order sign "b (bright)" and their polarity inversion sign is "−". In the $(n+1\_A)^{th}$ row right under the $(n\_B)^{th}$ row, the subpixels of the $m^{th}$, $(m+2)^{th}$, and $(m+4)^{th}$ columns have the luminance order sign "b (bright)" and their polarity inversion sign is "−". In the $(n+1\_B)^{th}$ row under the $(n+1\_A)^{th}$ row, the subpixels of the $(m+1)^{th}$, $(m+3)^{th}$, and $(m+5)^{th}$ columns have the luminance order sign "b (bright)" and their polarity inversion sign is "+". And in the $(n+2\_A)^{th}$ row under the $(n+1\_B)^{th}$ row, the subpixels of the $m^{th}$, $(m+2)^{th}$, and $(m+4)^{th}$ columns have the luminance order sign "b (Bright)" and their polarity inversion sign is "+". Also, in a liquid crystal display device that does not satisfy the fifth requirement, flickering should be seen on the screen when the pixels switch their drive polarities between "+" and "−". When this liquid crystal display device was operated, however, no flickering was seen to the eye. That is why the fifth requirement is also satisfied.

When the image presented on this liquid crystal display device was monitored with the amplitude VCSpp of the CS voltage varied, viewing angle characteristics improved. Specifically, as the amplitude VCSpp of the CS voltage was increased from 0 V (which is a voltage to be applied to a liquid crystal display device that does not conduct the multi-pixel display operation), the excessively high contrast ratio on the screen when the image was viewed obliquely could be reduced. Although the viewing angle characteristics seemed to improve slightly differently depending on the specific image to present, the best improvement was achieved when VCSpp was set such that the VLCaddpp value would be 0.5 to 2 times as high as the threshold voltage of the liquid crystal display device in a typical drive mode (in which VCSpp was 0V).

Thus, the liquid crystal display device described above improves the viewing angle characteristics by conducting a multi-pixel display operation with an oscillating voltage applied to the storage capacitor counter electrodes. In this case, one oscillation period of the oscillating voltage applied to the storage capacitor counter electrodes is as long as (or may be even shorter than) one horizontal scanning period. However, if the period of oscillation of the oscillating voltage supplied to the CS bus lines is short, it is rather difficult to perform such a multi-pixel display operation on a large-screen LCD including CS bus lines with high load capacitance and resistance, a high-resolution LCD with a short horizontal scanning period, or a high-speed-drive LCD with shortened vertical and horizontal scanning periods.

This problem will be discussed with reference to FIGS. 5 to 8.

Figure 5:
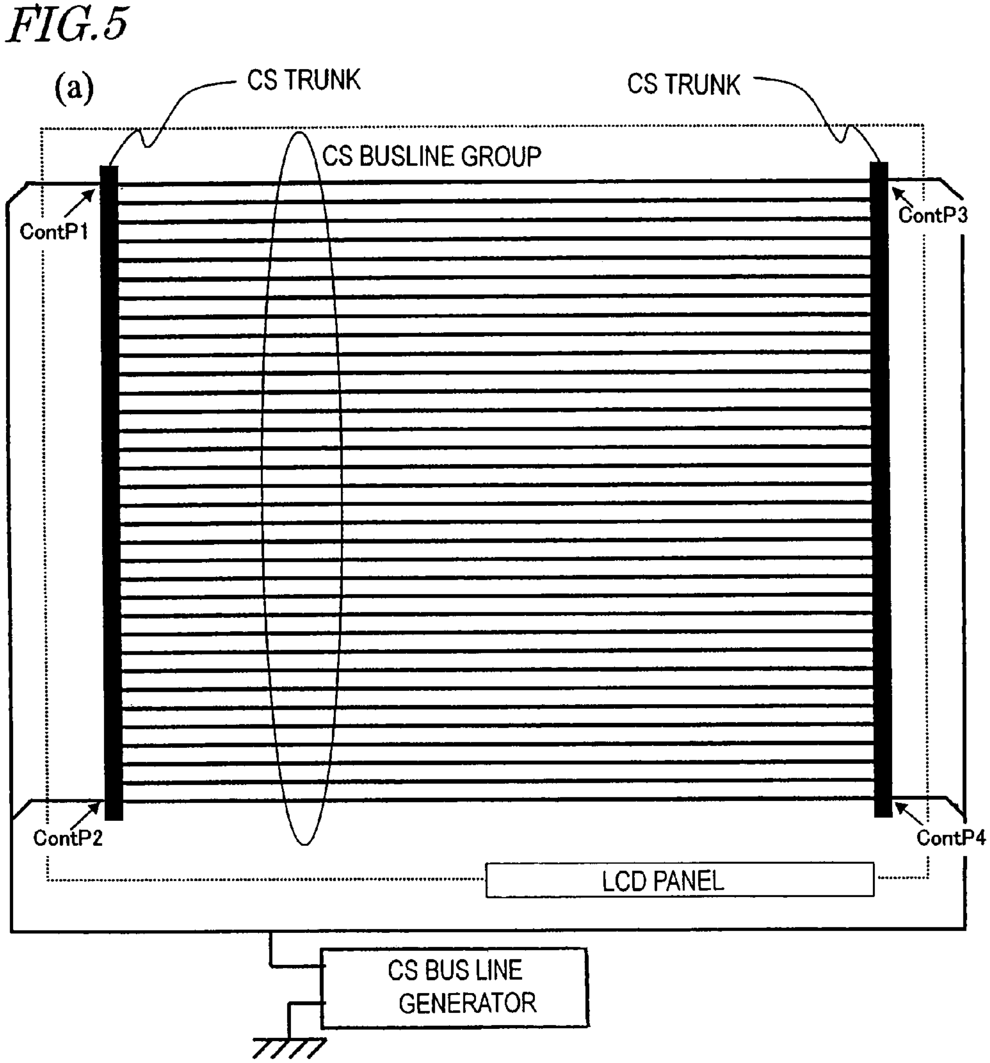
FIG. 5(*a*) is a diagram schematically illustrating a configuration for supplying an oscillating voltage to the CS bus lines of a liquid crystal display device as a preferred embodiment according to the second aspect of the present invention, and FIG. 5(*b*) schematically shows an equivalent circuit that approximates the electrical load impedance thereof.
Figure 5:
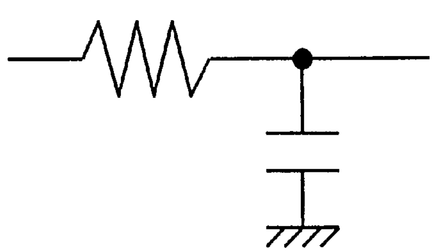

FIG. 5(*a*) is a diagram schematically illustrating a configuration for supplying an oscillating voltage to the CS bus lines of the liquid crystal display device described above. The oscillating voltage is supplied through CS trunks to a plurality of CS bus lines provided for the LCD panel. The oscillating voltage is supplied from a CS bus line voltage generator to the CS trunks via connection points ContP1, ContP2, ContP3 and ContP4. As the size of the LCD panel increases, the distance from the pixel at the center of the display panel to the connection points ContP1 to ContP4 increases so much as to make the load impedance between them non-negligible. The load impedance is mainly produced by the liquid crystal layer capacitance (CLC) and storage capacitance (CCS) of pixels, the resistance RCS of the CS bus lines, and the resistance Rmiki of the CS trunks. This load impedance may be represented, as a first-order approximation, by a low pass filter comprised of those capacitances and resistances as schematically shown in FIG. 5(*b*). The value of this load impedance is a function of location on the LCD panel. That is to say, it is a function of the distance from the connection points ContP1, ContP2, ContP3 and ContP4. Specifically, the load impedance is relatively small near the connection points. But the more distant from the connection points, the higher the load impedance.

That is to say, since the CS bus line voltage generated by the oscillating voltage generator is affected by the CS bus line's load impedance approximated as a CR low pass filter, the waveform of the CS bus line voltage blunts (i.e., loses its sharpness), the degree of which varies from one location in the panel to another.

In the multi-pixel display operation described above, the oscillating voltage is applied to the CS bus lines in order to form one pixel by two or more subpixels and to make the subpixels have mutually different luminances. That is to say, this multi-pixel display liquid crystal display device adopts a configuration and drive method in which a voltage waveform for the respective subpixel electrodes changes with the oscillating voltage on the CS bus lines and in which the effective voltage is varied according to the oscillating voltage waveform of the CS bus lines. That is why if the waveform of CS bus line voltage varies from one location to another, so does the effective voltage of the subpixel electrodes. In other words, if the waveform of the CS bus line voltage blunts differently from one location to another, the display luminance varies location by location, too, thus making the luminance on the screen uneven overall.

To minimize such unevenness in luminance on the display screen by extending the oscillation period of CS bus lines is one of the principal features of the liquid crystal display device of the present invention. This feature will be described in further detail below.

FIGS. 6 and 7 schematically show the waveforms of oscillating voltages to be applied to the subpixel electrodes in a situation where the CS load is kept constant. In FIGS. 6 and 7, the voltage applied to the subpixel electrodes is supposed to be 0 V when the CS bus line voltage is not an oscillating voltage and the oscillation of the subpixel electrode voltage caused by that of the CS bus line voltage is supposed to have an amplitude of 1 V. Portions (a) through (e) of FIG. 6 schematically show the waveforms in a situation where there is no waveform blunting in the CS voltage, i.e., when the CR time constant of the CR low pass filter is 0 H. On the other hand, portions (a) through (e) of FIG. 7 schematically show waveform blunting that occurs when the CR time constant of the CR low pass filter is 0.2 H. FIGS. 6 and 7 schematically show the waveforms of the subpixel electrode voltages when CR time constant of the CR low pass filter are 0 H and 0.2 H, respectively, and when the oscillating voltages on the CS bus lines have different oscillation periods. Portions (a) through (e) in FIGS. 6 and 7 show situations where the oscillation periods of the waveforms are 1 H, 2 H, 4 H, 8 H, respectively.

Comparing FIGS. 6 and 7 to each other, it can be seen that the difference between the waveforms shown in FIGS. 6 and 7 narrows as the oscillation period extends. This tendency is shown quantitatively in FIG. 8.

FIG. 8 shows how the average and effective values of the oscillating voltages, calculated based on the waveforms shown in FIG. 7, change with one oscillation period (where one scale corresponds to one horizontal scanning period 1 H) of the CS bus line voltage. As can be seen from FIG. 8, the difference in average voltage or effective voltage between the situation where the CR time constant is 0 H and the situation where the CR time constant is 0.2 H narrows as the oscillation period of the CS bus line voltage is extended. It can be seen that the influence of waveform blunting can be reduced significantly particularly when one oscillation period of the oscillating voltage on the CS bus lines is eight or more times as long as the CR time constant of the CS bus lines (which is an approximate load impedance of the CS bus lines).

As can be seen, by extending the oscillation period of the oscillating voltage on the CS bus lines, the unevenness in luminance due to waveform blunting on the CS bus lines can be reduced on the screen. The influence of waveform blunting can be reduced significantly particularly when one oscillation period of the oscillating voltage on the CS bus lines is eight or more times as long as the CR time constant of the CS bus lines (which is an approximate load impedance of the CS bus lines).

The present invention provides preferred embodiments of a liquid crystal display device and a driving method thereof that can extend one oscillation period of the oscillating voltages supplied to the CS bus lines. The preferred arrangements for extending one CS voltage oscillation period are roughly classified into the two types, which will be referred to herein as Type I and Type II, respectively.

In a liquid crystal display device according to a preferred embodiment having the arrangement of Type I, subpixels of two pixels, which belong to the same column of the matrix-addressed LCD, which are adjacent to each other in the column direction, and which are ranked at mutually different positions in the luminance order (e.g., a first subpixel and a second subpixel), are associated with CS bus lines that are electrically independent of each other. Specifically, the CS bus lines associated with the first subpixel on the $n^{th}$ row and the second subpixel on the $(n+1)^{th}$ row are electrically independent of each other. As used herein, the pixels belonging to the same column of the matrix-addressed LCD are pixels driven by the same signal line (which is typically a source bus line). Also, the pixels that are adjacent to each other in the column direction in the matrix-addressed LCD are pixels driven by scan lines to be selected at two consecutive points in time among the scan lines (which are typically gate bus lines) that are sequentially selected on the time axis. Furthermore, supposing that there are L pairs of electrically independent CS trunks, one oscillation period of the CS bus line voltage can be L times as long as one horizontal scanning period. As described above, the number of electrically independent CS trunks is preferably more than eight times as large as the value obtained by dividing one horizontal scanning period by a CR time constant that is an approximate maximum load impedance of the CS bus line. More preferably, the number is an even number that is more than eight times as large as that value as will be described later. It should be noted that the number L of the electrically independent CS trunk pairs will sometimes be referred to herein as the number L of electrically independent CS trunks. Even if pairs of electrically equivalent CS trunks are arranged on both sides of the panel, the number of electrically equivalent CS trunks remains the same.

Hereinafter, a liquid crystal display device with Type I arrangement and its driving method according to a preferred embodiment of the present invention will be described with reference to the accompanying drawings.

First, an example of a liquid crystal display device that achieves the area ratio gray scale display by setting one oscillation period of the oscillating voltage on the CS bus lines to be four times as long as one horizontal scanning period will be described with reference to FIGS. 9, 10A, 10B and 11B. The description will be focused on the following three points with reference to drawings. Specifically, the first point is the specific configuration of the liquid crystal display device, which is mainly characterized by the connection pattern between the storage capacitor counter electrodes of the storage capacitors connected to respective subpixels and the CS bus lines. The second point concerns the oscillation period and phase of the CS bus line voltage with respect to the voltage waveforms of the gate bus lines. And the third point is the drive and display states of respective subpixels according to this preferred embodiment.

FIG. 9 schematically shows an equivalent circuit diagram of the liquid crystal display device with Type I arrangement according to a preferred embodiment of the present invention and corresponds to FIG. 2 that has already been referred to. In FIG. 9, any component of the liquid crystal display device, having the same function as the counterpart shown in FIG. 2, is identified by the same reference numeral as that used in FIG. 2 and the description thereof will be omitted herein. Unlike the counterpart shown in FIG. 2, the liquid crystal display device shown in FIG. 9 includes four electrically independent CS trunks CSVtypeA1 to CSVtypeA4. And the connection pattern between these CS trunks and the CS bus lines in FIG. 9 is different from that shown in FIG. 2.

In FIG. 9, first or all, attention should be paid to the point that CS bus lines for two adjacent subpixels of two pixels belonging to two rows that are adjacent in the column direction (e.g., subpixels associated with CLCB_n,m and CLCA_n+1,m) are electrically independent of each other. Specifically, for example, the CS bus line CSBL_B_n for the subpixel CLCB_n,m on the $n^{th}$ row and the CS bus line CSBL_A_n+1 for the subpixel CLCA_n+1 m of the pixel on the next row that is adjacent to the $n^{th}$ row in the column direction are electrically independent of each other.

The second point to emphasize in FIG. 9 is that each CS bus line CSBL is connected to the four CS trunks CSVtypeA1, CSVtypeA2, CSVtypeA3, and CSVtypeA4 at one end of the panel. That is to say, in the liquid crystal display device of this embodiment, there are four types of electrically independent CS trunks.

The third point to keep in mind in FIG. 9 is the state of connection between the CS bus lines and the four CS trunks, i.e., the arrangement of the electrically independent CS bus lines in the column direction. According to the rule of connection between the CS bus lines and the CS trunks in FIG. 9, the bus lines connected to the CS trunks CSVtypeA1, CSVtypeA2, CSVtypeA3, and CSVtypeA4 are as shown in the following Table 1:

10B correspond to FIGS. 3A and 3B that have already been referred to. In FIGS. 10A and 10B, the same waveform as the counterpart shown in FIGS. 3A and 3B is identified by the same reference numeral as that used in FIGS. 3A and 3B and the description thereof will be omitted herein. In general, in a liquid crystal display device, the direction of the electric field applied to the liquid crystal layer of each pixel is inverted at regular intervals, and therefore, two types of drive voltage waveforms need to be provided for the two directions of the electric field. These two types of drive states are shown in FIGS. 10A and 10B, respectively.

In FIGS. 10A and 10B, first of all, attention should be paid to the point that periods of oscillation of the voltages VCSVtypeA1, VCSVtypeA2, VCSVtypeA3 and VCSVtypeA4 of CSVtypeA1, CSVtypeA2, CSVtypeA3, and CSVtypeA4 are all four times as long as one horizontal scanning period (4 H).

The second point to emphasize in FIGS. 10A and 10B is that VCSVtypeA1, VCSVtypeA2, VCSVtypeA3, and VCSVtypeA4 have the following phases. First, looking at the phase difference between the CS trunks, VCSVtypeA2 has a phase delay of 2 H with respect to VCSVtypeA1, VCSVtypeA3 has a phase delay of 3 H with respect to VCSVtypeA1, and VCSVtypeA4 has a phase delay of 1 H with respect to VCSVtypeA1. Next, looking at the voltages on the CS trunks and the gate bus lines, the voltages on the CS trunks and gate bus lines have the following phases. As can be seen from FIGS. 10A and 10B, the time when the gate bus line voltages for respective CS trunks change from VgH to VgL agrees with the centers of respective flat portions of the CS trunk voltages. In other words, the Td value shown in FIGS. 10A and 10B is 1 H. However, Td may have any other value as long as Td is greater than 0 H but smaller than 2 H.

TABLE 1

| CS trunk | CS busline connected to CS trunk_ | | General notation of CS busline listed on left |
|---|---|---|---|
| CSVtypeA1 | CSBL_A_n,<br>CSBL_A_n + 4,<br>CSBL_A_n + 8,<br>CSBL_A_n + 12, | CSBL_B_n + 2,<br>CSBL_B_n + 6,<br>CSBL_B_n + 10,<br>CSBL_B_n + 14,<br>. . . | CSBL_A_n + 4 · k,<br>CSBL_B_n + 2 + 4 · k<br>(k = 0, 1, 2, 3, . . . ) |
| CSVtypeA2 | CSBL_B_n,<br>CSBL_B_n + 4,<br>CSBL_B_n + 8,<br>CSBL_B_n + 12, | CSBL_A_n + 2,<br>CSBL_A_n + 6,<br>CSBL_A_n + 10,<br>CSBL_A_n + 14,<br>. . . | CSBL_B_n + 4 · k,<br>CSBL_A_n + 2 + 4 · k<br>(k = 0, 1, 2, 3, . . . ) |
| CSVtypeA3 | CSBL_A_n + 1,<br>CSBL_A_n + 5,<br>CSBL_A_n + 9,<br>CSBL_A_n + 13, | CSBL_B_n + 3,<br>CSBL_B_n + 7,<br>CSBL_B_n + 11,<br>CSBL_B_n + 15,<br>. . . | CSBL_A_n + 1 + 4 · k,<br>CSBL_B_n + 3 + 4 · k<br>(k = 0, 1, 2, 3, . . . ) |
| CSVtypeA4 | CSBL_B_n + 1,<br>CSBL_B_n + 5,<br>CSBL_B_n + 9,<br>CSBL_B_n + 13, | CSBL_A_n + 3,<br>CSBL_A_n + 7,<br>CSBL_A_n + 11,<br>CSBL_A_n + 15,<br>. . . | CSBL_B_n + 1 + 4 · k,<br>CSBL_A_n + 3 + 4 · k<br>(k = 0, 1, 2, 3, . . . ) |

It should be noted that a set of CS bus lines to be connected to the four trunks shown in this Table 1 is a set of the four different types of electrically independent CS bus lines.

FIGS. 10A and 10B show the periods and phases of oscillation of the CS bus line voltages with respect to the voltage waveforms on the gate bus lines as well as the voltages applied to the respective subpixel electrodes. FIGS. 10A and In this case, the gate bus line associated with the respective CS trunks is the CS trunks and gate bus lines to which CS bus lines, connected to the same subpixel electrode by way of a storage capacitor CS and a TFT, are connected. According to the arrangement shown in FIG. 9, the gate bus lines and CS bus lines associated with each CS trunk in this liquid crystal display device are shown in the following Table 2:

TABLE 2

| CS trunk | Corresponding gate busline | Corresponding CS busline |
|---|---|---|
| CSVtypeA1 | GBL_n, GBL_n + 2, GBL_n + 4, GBL_n + 6, GBL_n + 8, . . . [GBL_n + 2 · k (k = 0, 1, 2, 3, . . . )] | CSBL_A_n, CSBL_B_n + 2, CSBL_A_n + 4, CSBL_B_n + 6, CSBL_A_n + 8, . . . [CSBL_A_n + 4 · k, CSBL_B_n + 2 + 4 · k (k = 0, 1, 2, 3, . . . )] |
| CSVtypeA2 | GBL_n, GBL_n + 2, GBL_n + 4, GBL_n + 6, GBL_n + 8, . . . [GBL_n + 2 · k (k = 0, 1, 2, 3, . . . )] | CSBL_B_n, CSBL_A_n + 2, CSBL_B_n + 4, CSBL_A_n + 6, CSBL_B_n + 8, . . . [CSBL_B_n + 4 · k, CSBL_A_n + 2 + 4 · k (k = 0, 1, 2, 3, . . . )] |
| CSVtypeA3 | GBL_n + 1, GBL_n + 3, GBL_n + 5, GBL_n + 7, GBL_n + 9, . . . [GBL_n + 1 + 2 · k (k = 0, 1, 2, 3, . . . )] | CSBL_A_n + 1, CSBL_B_n + 3, CSBL_A_n + 5, CSBL_B_n + 7, CSBL_A_n + 9, . . . [CSBL_A_n + 1 + 4 · k, CSBL_B_n + 3 + 4 · k (k = 0, 1, 2, 3, . . . )] |
| CSVtypeA4 | GBL_n + 1, GBL_n + 3, GBL_n + 5, GBL_n + 7, GBL_n + 9, . . . [GBL_n + 1 + 2 · k (k = 0, 1, 2, 3, . . . )] | CSBL_B_n + 1, CSBL_A_n + 3, CSBL_B_n + 5, CSBL_A_n + 7, CSBL_B_n + 9, . . . [CSBL_B_n + 1 + 4 · k, CSBL_A_n + 3 + 4 · k (k = 0, 1, 2, 3, . . . )] |

Although the periods and phases of the voltages on the CS trunks have been described with reference to FIGS. 10A and 10B, the CS trunks do not have to have such voltage waveforms but just need to satisfy one of the following two conditions.

The first condition is that the first voltage variation of VCSVtypeA1 after the voltage on its associated gate bus line has changed from VgH to VgL should be a voltage increase, while the first voltage variation of VCSVtypeA2 after the voltage on its associated gate bus line has changed from VgH to VgL should be a voltage decrease. Also, to satisfy the first condition, the first voltage variation of VCSVtypeA3 after the voltage on its associated gate bus line has changed from VgH to VgL should be a voltage decrease, while the first voltage variation of VCSVtypeA4 after the voltage on its associated gate bus line has changed from VgH to VgL should be a voltage increase. This condition is set on the drive voltage waveforms shown in FIG. 10A.

The second condition is that the first voltage variation of VCSVtypeA1 after the voltage on its associated gate bus line has changed from VgH to VgL should be a voltage decrease, while the first voltage variation of VCSVtypeA2 after the voltage on its associated gate bus line has changed from VgH to VgL should be a voltage increase. Also, to satisfy the second condition, the first voltage variation of VCSVtypeA3 after the voltage on its associated gate bus line has changed from VgH to VgL should be a voltage increase, while the first voltage variation of VCSVtypeA4 after the voltage on its associated gate bus line has changed from VgH to VgL should be a voltage decrease. This condition is set on the drive voltage waveforms shown in FIG. 10B.

However, for the following reasons, the waveforms shown in FIGS. 10A and 10B can be used effectively.

In FIGS. 10A and 10B, the period of oscillation is constant, thus making it possible to simplify the signal generator.

Besides, in FIGS. 10A and 10B, the duty ratio of oscillation is also constant, thus making it possible to make the amplitude of oscillation constant and simplify the driver. This is because if the CS bus line voltage is an oscillating voltage, the variation in the voltage applied to the liquid crystal layer will depend on the amplitude and duty ratio of oscillation. That is why by keeping the duty ratio of oscillation constant, the amplitude of oscillation can also be made constant. The duty ratio may be set to one to one, for example.

Furthermore, in FIGS. 10A and 10B, any oscillating voltage is paired with another oscillating voltage, of which the phase is inverse of that of the former voltage (i.e., which has a phase difference of 180 degrees with respect to the former voltage). That is to say, the four types of electrically independent CS trunks consist of two pairs of CS trunks that supply such oscillating voltages, of which the phases are different from each other by 180 degrees. As a result, the amount of current flowing through the counter electrode of the liquid crystal capacitor can be minimized, and therefore, the driver connected to the counter electrodes can be simplified.

FIGS. 11A and 11B summarize the drive states of the liquid crystal display device of this preferred embodiment. The drive state of the liquid crystal display device also needs to be one of the two types according to the combination of drive voltage polarities for the respective subpixels as in FIGS. 10A and 10B. Specifically, the drive state shown in FIG. 11A corresponds to the drive voltage waveforms shown in FIG. 10A, while the drive state shown in FIG. 11B corresponds to the drive voltage waveforms shown in FIG. 10B. FIGS. 11A and 11B correspond to FIGS. 4A and 4B that have already been referred to.

In FIGS. 11A and 11B, it should be determined whether or not this arrangement satisfies the following five requirements for an area ratio gray scale panel:

(1) Each pixel should consist of a plurality of subpixels with mutually different luminances when displaying a halftone;

(2) The order of magnitudes of the luminances of those subpixels should always remain the same;

(3) The subpixels with different luminances should be arranged densely;

(4) Pixels of opposite polarities should be arranged densely on a pixel-by-pixel basis in an arbitrary frame;

(5) In an arbitrary frame, subpixels of the same polarity should be arranged densely such that subpixels ranked at the same position in the luminance order (e.g., subpixels with the highest luminance, among other things) alternate one after another.

Let us see if the first requirement is satisfied. In the example shown in FIGS. 11A and 11B, each pixel consists of two subpixels with mutually different luminances. Specifically, in FIG. 11A, the pixel at the intersection of the $n^{th}$ row and the $m^{th}$ column consists of a high-luminance subpixel labeled as "b (bright)" and a low-luminance subpixel labeled as "d (dark)". Therefore, the first requirement is satisfied.

Next, the second requirement will be discussed. The liquid crystal display device of this preferred embodiment alternately shows two display states having mutually different drive states at regular intervals. Comparing FIGS. 11A and 11B showing the drive states corresponding to the two display states to each other, it can be seen that both high-luminance subpixels and low-luminance subpixels remain in the same locations. That is why the second requirement is also satisfied.

Let's turn to the third requirement next. In FIGS. 11A and 11B, subpixels ranked at two different positions in the luminance order, i.e., subpixels labeled as "b (bright)" and subpixels labeled as "d (dark)", are arranged in a checkered pattern. When the liquid crystal display device of this preferred embodiment was actually operated, no defects such as a decrease in resolution due to the use of those subpixels with different luminances were visible to the naked eye. Thus, the third requirement is satisfied.

Next is the fourth requirement. In FIGS. 11A and 11B, pixels of opposite polarities are arranged on a pixel-by-pixel basis in a checkered pattern. Specifically, in FIG. 11A, the pixel at the intersection of the $(n+2)^{th}$ row and the $(m+2)^{th}$ column is a "+" pixel. From this pixel, the polarities changes every pixel from "+" into "−", and vice versa, both in the row direction and in the column direction alike. Also, in a liquid crystal display device that does not satisfy the fourth requirement, flickering should be seen on the screen when the pixels switch their drive polarities between "+" and "−". When the liquid crystal display device of this preferred embodiment was operated, however, no flickering was seen to the eye. That is why the fourth requirement is also satisfied.

And let's focus on the fifth requirement. In FIGS. 11A and 11B, the drive polarities of subpixels ranked at the same position in the luminance order invert every two rows of subpixels, i.e., every pixel width. Specifically, in the $(n\_B)^{th}$ row in FIG. 11A, the subpixels of the $(m+1)^{th}$, $(m+3)^{th}$, and $(m+5)^{th}$ columns have the luminance order sign "b (bright)" and their polarity inversion sign is "−". In the $(n+1\_A)^{th}$ row right under the $(n\_B)^{th}$ row, the subpixels of the $m^{th}$, $(m+2)^{th}$, and $(m+4)^{th}$ columns have the luminance order sign "b (bright)" and their polarity inversion sign is "−". In the $(n+1\_B)^{th}$ row under the $(n+1\_A)^{th}$ row, the subpixels of the $(m+1)^{th}$, $(m+3)^{th}$, and $(m+5)^{th}$ columns have the luminance order sign "b (bright)" and their polarity inversion sign is "+". And in the $(n+2\_A)^{th}$ row under the $(n+1\_B)^{th}$ row, the subpixels of the $m^{th}$, $(m+2)^{th}$, and $(m+4)^{th}$ columns have the luminance order sign "b (Bright)" and their polarity inversion sign is "+". Also, in a liquid crystal display device that does not satisfy the fifth requirement, flickering should be seen on the screen when the pixels switch their drive polarities between "+" and "−". When this liquid crystal display device was operated, however, no flickering was seen to the eye. That is why the fifth requirement is also satisfied.

When the image presented on the liquid crystal display device of this preferred embodiment was monitored with the amplitude VCSpp of the CS voltage varied, viewing angle characteristics improved. Specifically, as the amplitude VCSpp of the CS voltage was increased from 0 V (which is a voltage to be applied to a typical liquid crystal display device not according to the present invention), the excessively high contrast ratio on the screen when the image was viewed obliquely could be reduced. Although the viewing angle characteristics seemed to improve slightly differently depending on the specific image to present, the best improvement was achieved when VCSpp was set such that the VLCaddpp value would be 0.5 to 2 times as high as the threshold voltage of the liquid crystal display device in a typical drive mode (in which VCSpp was 0V).

To sum up, the liquid crystal display device of this preferred embodiment improves the viewing angle characteristics by conducting an area ratio gray scale display (multipixel display) operation with an oscillating voltage applied to the storage capacitor counter electrodes. In this case, one oscillation period of the oscillating voltage applied to the storage capacitor counter electrodes can be four times as long as one horizontal scanning period. Nevertheless, such an area ratio gray scale display operation can also be performed easily even on a large-screen LCD including CS bus lines with high load capacitance and resistance, a high-resolution LCD with a short horizontal scanning period, or a high-speed-drive LCD with shortened vertical and horizontal scanning periods.

Hereinafter, a liquid crystal display device with Type I arrangement and its operation according to another preferred embodiment of the present invention will be described with reference to FIGS. 12, 13A, 13B, 14A and 14B.

This liquid crystal display device achieves the area ratio gray scale display by setting one oscillation period of the oscillating voltage on the CS bus lines to be twice as long as one horizontal scanning period. The description will be focused on the following three points with reference to drawings. Specifically, the first point is the specific configuration of the liquid crystal display device, which is mainly characterized by the connection pattern between the storage capacitor counter electrodes of the storage capacitors connected to respective subpixels and the CS bus lines. The second point concerns the oscillation period and phase of the CS bus line voltage with respect to the voltage waveforms of the gate bus lines. And the third point is the drive and display states of respective subpixels according to this preferred embodiment.

FIG. 12 schematically shows an equivalent circuit diagram of the liquid crystal display device with Type I arrangement according to another preferred embodiment of the present invention and corresponds to FIG. 9 that has already been referred to for the liquid crystal display device of the previous preferred embodiment. In FIG. 12, any component of the liquid crystal display device, having the same function as the counterpart shown in FIG. 9, is identified by the same reference numeral as that used in FIG. 9 and the description thereof will be omitted herein. Unlike the counterpart shown in FIG. 9, the liquid crystal display device shown in FIG. 12 includes two electrically independent CS trunks CSVtypeB1 and CSVtypeB2. And the connection pattern between these CS trunks and the CS bus lines in FIG. 12 is also different from that shown in FIG. 9.

In FIG. 12, first or all, attention should be paid to the point that CS bus lines for two adjacent subpixels of two pixels belonging to two rows that are adjacent in the column direction are electrically independent of each other. Specifically, for example, the CS bus line CSBL_B_n for the subpixel CLCB_n,m on the $n^{th}$ row and the CS bus line CSBL_A_n+1 for the subpixel CLCA_n+1,m of the pixel on the next row that is adjacent to the $n^{th}$ row in the column direction are electrically independent of each other.

The second point to emphasize in FIG. 12 is that each CS bus line CSBL is connected to the two CS trunks CSVtypeB1 and CSVtypeB2 at one end of the panel. That is to say, in the liquid crystal display device of this embodiment, there are two types of electrically independent CS trunks.

The third point to keep in mind in FIG. 12 is the state of connection between the CS bus lines and the two CS trunks, i.e., the arrangement of the electrically independent CS bus lines in the column direction. According to the rule of connection between the CS bus lines and the CS trunks in FIG. 12, the CS bus lines connected to the CS trunks CSVtypeB1 and CSVtypeB2 are as shown in the following Table 3:

TABLE 3

| CS trunk | CS busline connected to CS trunk | General notation of CS busline listed on left |
|---|---|---|
| CSVtypeB1 | CSBL_A_n, CSBL_A_n + 1, CSBL_A_n + 2, CSBL_A_n + 3, . . . | CSBL_A_n + k, (k = 0, 1, 2, 3, . . . ) |
| CSVtypeB2 | CSBL_B_n, CSBL_B_n + 1, CSBL_B_n + 2, CSBL_B_n + 3, . . . | CSBL_B_n + k, (k = 0, 1, 2, 3, . . . ) |

It should be noted that a set of CS bus lines to be connected to the two trunks shown in this Table 3 is a set of the two different types of electrically independent CS bus lines.

FIGS. 13A and 13B show the periods and phases of oscillation of the CS bus line voltages with respect to the voltage waveforms on the gate bus lines as well as the voltages applied to the respective subpixel electrodes. FIGS. 13A and 13B correspond to FIGS. 10A and 10B that have already been referred to. In FIGS. 13A and 13B, the same waveform as the counterpart shown in FIGS. 10A and 10B is identified by the same reference numeral as that used in FIGS. 10A and 10B and the description thereof will be omitted herein. In general, in a liquid crystal display device, the direction of the electric field applied to the liquid crystal layer of each pixel is inverted at regular intervals, and therefore, two types of drive voltage waveforms need to be provided for the two directions of the electric field. These two types of drive states are shown in FIGS. 13A and 13B, respectively.

In FIGS. 13A and 13B, first of all, attention should be paid to the point that periods of oscillation of the voltages VCSVtypeB1 and VCSVtypeB2 of CSVtypeB1 and CSVtypeB2 are both twice as long as one horizontal scanning period (2 H).

The second point to emphasize in FIGS. 13A and 13B is that VCSVtypeB1 and VCSVtypeB2 have the following phases. First, looking at the phase difference between the CS trunks, VCSVtypeB2 has a phase delay of 1 H with respect to VCSVtypeB1. Next, looking at the voltages on the CS trunks and the gate bus lines, the voltages on the CS trunks and gate bus lines have the following phases. As can be seen from FIGS. 13A and 13B, the time when the gate bus line voltages for respective CS trunks change from VgH to VgL agrees with the centers of respective flat portions of the CS trunk voltages. In other words, the Td value shown in FIGS. 13A and 13B is 0.5 H. However, Td may have any other value as long as Td is greater than 0 H but smaller than 1 H.

In this case, the gate bus line associated with the respective CS trunks is the CS trunks and gate bus lines to which CS bus lines, connected to the same subpixel electrode by way of a storage capacitor CS and a TFT, are connected. According to the arrangement shown in FIGS. 13A and 13B, the gate bus lines and CS bus lines associated with each CS trunk in this liquid crystal display device are shown in the following Table 4:

TABLE 4

| CS trunk | Corresponding gate busline | Corresponding CS busline |
|---|---|---|
| CSVtypeB1 | GBL_n, GBL_n + 1, GBL_n + 2, GBL_n + 3, GBL_n + 4, . . . [GBL_n + k (k = 0, 1, 2, 3, . . . )] | CSBL_A_n, CSBL_A_n + 1, CSBL_A_n + 2, CSBL_A_n + 3, CSBL_A_n + 4, . . . [CSBL_A_n + k (k = 0, 1, 2, 3, . . . )] |
| CSVtypeB2 | GBL_n, GBL_n + 1, GBL_n + 2, GBL_n + 3, GBL_n + 4, . . . [GBL_n + k (k = 0, 1, 2, 3, . . . )] | CSBL_B_n, CSBL_B_n + 1, CSBL_B_n + 2, CSBL_B_n + 3, CSBL_B_n + 4, . . . [CSBL_B_n + k (k = 0, 1, 2, 3, . . . )] |

Although the periods and phases of the voltages on the CS trunks have been described with reference to FIGS. 13A and 13B, the CS trunks do not have to have such voltage waveforms but just need to satisfy one of the following two conditions.

The first condition is that the first voltage variation of VCSVtypeB1 after the voltage on its associated gate bus line has changed from VgH to VgL should be a voltage increase, while the first voltage variation of VCSVtypeB2 after the voltage on its associated gate bus line has changed from VgH to VgL should be a voltage decrease. This condition is set on FIG. 13A.

The second condition is that the first voltage variation of VCSVtypeB1 after the voltage on its associated gate bus line has changed from VgH to VgL should be a voltage decrease, while the first voltage variation of VCSVtypeB2 after the voltage on its associated gate bus line has changed from VgH to VgL should be a voltage increase. This condition is set on FIG. 13B.

FIGS. 14A and 14B summarize the drive states of the liquid crystal display device of this preferred embodiment. The drive state of the liquid crystal display device also needs to be one of the two types according to the combination of drive voltage polarities for the respective subpixels as in FIGS. 13A and 13B. Specifically, the drive state shown in FIG. 14A corresponds to the drive voltage waveforms shown in FIG. 13A, while the drive state shown in FIG. 14B corresponds to the drive voltage waveforms shown in FIG. 13B. FIGS. 14A and 14B correspond to FIGS. 11A and 11B that have already been referred to for the liquid crystal display device of the preferred embodiment described above.

In FIGS. 14A and 14B, it should be determined whether or not this arrangement satisfies the following five requirements for an area ratio gray scale panel:

(1) Each pixel should consist of a plurality of subpixels with mutually different luminances when displaying a halftone;

(2) The order of magnitudes of the luminances of those subpixels should always remain the same;

(3) The subpixels with different luminances should be arranged densely;

(4) Pixels of opposite polarities should be arranged densely on a pixel-by-pixel basis in an arbitrary frame;

(5) In an arbitrary frame, subpixels of the same polarity should be arranged densely such that subpixels ranked at the same position in the luminance order (e.g., subpixels with the highest luminance, among other things) alternate one after another.

Let us see if the first requirement is satisfied. In the example shown in FIGS. 14A and 14B, each pixel consists of two subpixels with mutually different luminances. Specifically, in FIG. 14A, the pixel at the intersection of the $n^{th}$ row and the $m^{th}$ column consists of a high-luminance subpixel labeled as "b (bright)" and a low-luminance subpixel labeled as "d (dark)". Therefore, the first requirement is satisfied.

Next, the second requirement will be discussed. The liquid crystal display device of this preferred embodiment alternately shows two display states having mutually different drive states at regular intervals. Comparing FIGS. 14A and 14B showing the drive states corresponding to the two display states to each other, it can be seen that both high-luminance subpixels and low-luminance subpixels remain in the same locations. That is why the second requirement is also satisfied.

Let's turn to the third requirement next. In FIGS. 14A and 14B, subpixels ranked at two different positions in the luminance order, i.e., subpixels labeled as "b (bright)" and subpixels labeled as "d (dark)", are arranged in a checkered pattern. When the liquid crystal display device of this preferred embodiment was actually operated, no defects such as a decrease in resolution due to the use of those subpixels with different luminances were visible to the naked eye. Thus, the third requirement is satisfied.

Next is the fourth requirement. In FIGS. 14A and 14B, pixels of opposite polarities are arranged on a pixel-by-pixel basis in a checkered pattern. Specifically, in FIG. 14A, the pixel at the intersection of the $(n+2)^{th}$ row and the $(m+2)^{th}$ column is a "+" pixel. From this pixel, the polarities changes every pixel from "+" into "−", and vice versa, both in the row direction and in the column direction alike. Also, in a liquid crystal display device that does not satisfy the fourth requirement, flickering should be seen on the screen when the pixels switch their drive polarities between "+" and "−". When the liquid crystal display device of this preferred embodiment was operated, however, no flickering was seen to the eye. That is why the fourth requirement is also satisfied.

And let's focus on the fifth requirement. In FIGS. 14A and 14B, the drive polarities of subpixels ranked at the same position in the luminance order invert every two rows of subpixels, i.e., every row of pixels. Specifically, in the $(n\_B)^{th}$ row in FIG. 14A, the subpixels of the $(m+1)^{th}$, $(m+3)^{th}$, and $(m+5)^{th}$ columns have the luminance order sign "b (bright)" and their polarity inversion sign is "−". In the $(n+1\_A)^{th}$ row right under the $(n\_B)^{th}$ row, the subpixels of the $m^{th}$, $(m+2)^{th}$, and $(m+4)^{th}$ columns have the luminance order sign "b (bright)" and their polarity inversion sign is "−". In the $(n+1\_B)^{th}$ row under the $(n+1\_A)^{th}$ row, the subpixels of the $(m+1)^{th}$, $(m+3)^{th}$, and $(m+5)^{th}$ columns have the luminance order sign "b (bright)" and their polarity inversion sign is "+". And in the $(n+2\_A)^{th}$ row under the $(n+1\_B)^{th}$ row, the subpixels of the $m^{th}$, $(m+2)^{th}$, and $(m+4)^{th}$ columns have the luminance order sign "b (Bright)" and their polarity inversion sign is "+". Also, in a liquid crystal display device that does not satisfy the fifth requirement, flickering should be seen on the screen when the pixels switch their drive polarities between "+" and "−". When this liquid crystal display device was operated, however, no flickering was seen to the eye. That is why the fifth requirement is also satisfied.

When the present inventors monitored the image on the liquid crystal display device of the preferred embodiment described above with the amplitude VCSpp of the CS voltage varied, we found the viewing angle characteristics improve. Specifically, as the amplitude VCSpp of the CS voltage was increased from 0 V (which is a voltage to be applied to a typical liquid crystal display device that does not perform the area ratio gray scale display operation), the excessively high contrast ratio on the screen when the image was viewed obliquely could be reduced. However, when the VCSpp value was further increased, decrease in contrast ratio on the screen and other problems occurred. That is why the VCSpp value needs to be set within such a range as to improve the viewing angle characteristics sufficiently without causing those problems. Specifically, although the viewing angle characteristics seemed to improve slightly differently depending on the specific image to present, the best improvement was achieved when VCSpp was set such that the VLCaddpp value would be 0.5 to 2 times as high as the threshold voltage of the liquid crystal display device in a typical drive mode (in which VCSpp was 0V).

To sum up, the liquid crystal display device with Type I arrangement improves the viewing angle characteristics by conducting a multi-pixel display operation with an oscillating voltage applied to the storage capacitor counter electrodes. In this case, one oscillation period of the oscillating voltage applied to the storage capacitor counter electrodes can be twice as long as one horizontal scanning period. Nevertheless, such a multi-pixel display operation can also be performed easily even on a large-screen LCD including CS bus lines with high load capacitance and resistance, a high-resolution LCD with a short horizontal scanning period, or a high-speed-drive LCD with shortened vertical and horizontal scanning periods.

In specific examples of the preferred embodiment described above, the number (of types) of electrically independent CS trunks is supposed to be either four or two. However, in a liquid crystal display device with Type I arrangement according to the present invention, the number of (types of) electrically independent CS trunks does not have to be two or four but may be three, five, or six or more. Nonetheless, the number L of electrically independent CS trunks is preferably an even number. This is because if the electrically independent CS trunks consist of CS trunk pairs, each supplying oscillating voltages, of which the phases are different from each other by 180 degrees (i.e., if L is an even number), then the amount of current flowing through the counter electrode of the liquid crystal capacitor can be minimized as described above.

The following Tables 5 and 6 show the relation between the CS trunks and their associated gate bus lines and CS bus lines in a situation where the number L of electrically independent CS trunks is six and in a situation where the number L is eight, respectively. Also, if L is an even number, the relations between the CS trunks and their associated gate bus lines and CS bus lines are roughly classifiable into a situation where L/2 is an odd number (i.e., L=2, 6, 10, 14, and so on) and a situation where L/2 is an even number (i.e., L=4, 8, 12, 16, and so on). A general connection pattern for a situation where L/2 is an odd number will be described just after Table 5, while a general connection pattern for a situation where L/2 is an even number will be described right after Table 6, in which L=8.

TABLE 5

| CS trunk | Corresponding gate busline | Corresponding CS busline |
|---|---|---|
| CSVtypeC1 | GBL_n, GBL_n + 3, GBL_n + 6, GBL_n + 9, GBL_n + 12, . . . [GBL_n + 3 · k (k = 0, 1, 2, 3, . . . )] | CSBL_A_n, CSBL_A_n + 3, CSBL_A_n + 6, CSBL_A_n + 9, CSBL_A_n + 12, . . . [CSBL_A_n + 3 · k, (k = 0, 1, 2, 3, . . . )] |
| CSVtypeC2 | GBL_n, GBL_n + 3, GBL_n + 6, GBL_n + 9, GBL_n + 12, . . . [GBL_n + 3 · k (k = 0, 1, 2, 3, . . . )] | CSBL_B_n, CSBL_B_n + 3, CSBL_B_n + 6, CSBL_B_n + 9, CSBL_B_n + 12, . . . [CSBL_B_n + 3 · k (k = 0, 1, 2, 3, . . . )] |
| CSVtypeC3 | GBL_n + 1, GBL_n + 4, GBL_n + 7, GBL_n + 10, GBL_n + 13, . . . [GBL_n + 1 + 3 · k (k = 0, 1, 2, 3, . . . )] | CSBL_A_n + 1, CSBL_A_n + 4, CSBL_A_n + 7, CSBL_A_n + 10, CSBL_A_n + 13, . . . [CSBL_A_n + 1 + 3 · k (k = 0, 1, 2, 3, . . . )] |
| CSVtypeC4 | GBL_n + 1, GBL_n + 4, GBL_n + 7, GBL_n + 10, GBL_n + 13, . . . [GBL_n + 1 + 3 · k (k = 0, 1, 2, 3, . . . )] | CSBL_B_n + 1, CSBL_B_n + 4, CSBL_B_n + 7, CSBL_B_n + 10, CSBL_B_n + 13, . . . [CSBL_B_n + 1 + 3 · k (k = 0, 1, 2, 3, . . . )] |
| CSVtypeC5 | GBL_n + 2, GBL_n + 5, GBL_n + 8, GBL_n + 11, GBL_n + 14, . . . [GBL_n + 2 + 3 · k (k = 0, 1, 2, 3, . . . )] | CSBL_A_n + 2, CSBL_A_n + 5, CSBL_A_n + 8, CSBL_A_n + 11, CSBL_A_n + 14, . . . [CSBL_A_n + 2 + 3 · k (k = 0, 1, 2, 3, . . . )] |
| CSVtypeC6 | GBL_n + 2, GBL_n + 5, GBL_n + 8, GBL_n + 11, GBL_n + 14, . . . [GBL_n + 2 + 3 · k (k = 0, 1, 2, 3, . . . )] | CSBL_B_n + 2, CSBL_B_n + 5, CSBL_B_n + 8, CSBL_B_n + 11, CSBL_B_n + 14, . . . [CSBL_B_n + 2 + 3 · k (k = 0, 1, 2, 3, . . . )] |

In a situation where a half of the number L of electrically independent storage capacitor trunks is an odd number (i.e., when L=2, 6, 10, and so on), if the storage capacitor line, connected to the storage capacitor counter electrode of the first subpixel of a pixel, located at the intersection between an arbitrary column and an $n^{th}$ row in a matrix of pixels that are arranged in columns and rows, is identified by CSBL_A_n; if the storage capacitor line, connected to the storage capacitor counter electrode of the second subpixel of that pixel, is identified by CSBL_B_n; and if k is a natural number (including zero), then the connection pattern may be defined such that:

CSBL_A_n+(L/2)·k is connected to the first storage capacitor trunk,

CSBL_B_n+(L/2)·k is connected to the second storage capacitor trunk,

CSBL_A_n+1+(L/2)·k is connected to the third storage capacitor trunk,

CSBL_B_n+1+(L/2)·k is connected to the fourth storage capacitor trunk,

CSBL_A_n+2+(L/2)·k is connected to the fifth storage capacitor trunk,

CSBL_B_n+2+(L/2)·k is connected to the sixth storage capacitor trunk, similar connection patterns are repeated after that, and then CSBL_A_n+(L/2)−2+(L/2)·k is connected to the $(L-3)^{th}$ storage capacitor trunk, CSBL_B_n+(L/2)−2+(L/2)·k is connected to the $(L-2)^{th}$ storage capacitor trunk, CSBL_A_n+(L/2)−1+(L/2)·k is connected to the $(L-1)^{th}$ storage capacitor trunk, and CSBL_B_n+(L/2)−1+(L/2)·k is connected to the $L^{th}$ storage capacitor trunk.

TABLE 6

| CS trunk | Corresponding gate busline | Corresponding CS busline |
|---|---|---|
| CSVtypeD1 | GBL_n, GBL_n + 4, GBL_n + 8, GBL_n + 12, GBL_n + 16, . . . [GBL_n + 4 · k (k = 0, 1, 2, 3, . . . )] | CSBL_A_n, CSBL_B_n + 4, CSBL_A_n + 8, CSBL_B_n + 12, CSBL_A_n + 16, . . . [CSBL_A_n + 8 · k, CSBL_B_n + 4 + 8 · k, (k = 0, 1, 2, 3, . . . )] |
| CSVtypeD2 | GBL_n, GBL_n + 4, GBL_n + 8, GBL_n + 12, GBL_n + 16, . . . [GBL_n + 4 · k (k = 0, 1, 2, 3, . . . )] | CSBL_B_n, CSBL_A_n + 4, CSBL_B_n + 8, CSBL_A_n + 12, CSBL_B_n + 16, . . . [CSBL_B_n + 8 · k, CSBL_A_n + 4 + 8 · k (k = 0, 1, 2, 3, . . . )] |
| CSVtypeD3 | GBL_n + 1, GBL_n + 5, GBL_n + 9, GBL_n + 13, GBL_n + 17, . . . [GBL_n + 1 + 4 · k (k = 0, 1, 2, 3, . . . )] | CSBL_A_n + 1, CSBL_B_n + 5, CSBL_A_n + 9, CSBL_B_n + 13, CSBL_A_n + 17, . . . [CSBL_A_n + 1 + 8 · k, CSBL_B_n + 5 + 8 · k, (k = 0, 1, 2, 3, . . . )] |
| CSVtypeD4 | GBL_n + 1, GBL_n + 5, GBL_n + 9, GBL_n + 13, GBL_n + 17, . . . [GBL_n + 1 + 4 · k (k = 0, 1, 2, 3, . . . )] | CSBL_B_n + 1, CSBL_A_n + 5, CSBL_B_n + 9, CSBL_A_n + 13, CSBL_B_n + 17, . . . [CSBL_B_n + 1 + 8 · k, CSBL_A_n + 5 + 8 · k (k = 0, 1, 2, 3, . . . )] |
| CSVtypeD5 | GBL_n + 2, GBL_n + 6, GBL_n + 10, | CSBL_A_n + 2, CSBL_B_n + 6, CSBL_A_n + 10, CSBL_B_n + 14, CSBL_A_n + 18, . . . |

TABLE 6-continued

| CS trunk | Corresponding gate busline | Corresponding CS busline |
|---|---|---|
| | GBL_n + 14, GBL_n + 18, . . . [GBL_n + 2 + 4 · k (k = 0, 1, 2, 3, . . . )] | [CSBL_A_n + 2 + 8 · k, CSBL_B_n + 6 + 8 · k (k = 0, 1, 2, 3, . . . )] |
| CSVtypeD6 | GBL_n + 2, GBL_n + 6, GBL_n + 10, GBL_n + 14, GBL_n + 18, . . . [GBL_n + 2 + 4 · k (k = 0, 1, 2, 3, . . . )] | CSBL_B_n + 2, CSBL_A_n + 6, CSBL_B_n + 10, CSBL_A_n + 14, CSBL_B_n + 18, . . . [CSBL_B_n + 2 + 8 · k, CSBL_A_n + 6 + 8 · k (k = 0, 1, 2, 3, . . . )] |
| CSVtypeD7 | GBL_n + 3, GBL_n + 7, GBL_n + 11, GBL_n + 15, GBL_n + 19, . . . [GBL_n + 3 + 4 · k (k = 0, 1, 2, 3, . . . )] | CSBL_A_n + 3, CSBL_B_n + 7, CSBL_A_n + 11, CSBL_B_n + 15, CSBL_A_n + 19, . . . [CSBL_A_n + 3 + 8 · k, CSBL_B_n + 7 + 8 · k (k = 0, 1, 2, 3, . . . )] |
| CSVtypeC8 | GBL_n + 3, GBL_n + 7, GBL_n + 11, GBL_n + 15, GBL_n + 19, . . . [GBL_n + 3 + 4 · k (k = 0, 1, 2, 3, . . . )] | CSBL_B_n + 3, CSBL_A_n + 7, CSBL_B_n + 11, CSBL_A_n + 15, CSBL_B_n + 19, . . . [CSBL_B_n + 3 + 8 · k, CSBL_A_n + 7 + 8 · k (k = 0, 1, 2, 3, . . . )] |

On the other hand, in a situation where a half of the number L of electrically independent storage capacitor trunks is an even number (i.e., when L=4, 8, 12, and so on), if the storage capacitor line, connected to the storage capacitor counter electrode of the first subpixel of a pixel, located at the intersection between an arbitrary column and an $n^{th}$ row in a matrix of pixels that are arranged in columns and rows, is identified by CSBL_A_n; if the storage capacitor line, connected to the storage capacitor counter electrode of the second subpixel of that pixel, is identified by CSBL_B_n; and if k is a natural number (including zero), then the connection pattern may be defined such that:

CSBL_A_n+L·k and CSBL_B_n+(L/2)+L·k are connected to the first storage capacitor trunk, CSBL_B_n+L·k and CSBL_A_n+(L/2)+L·k are connected to the second storage capacitor trunk, CSBL_A_n+1+L·k and CSBL_B_n+(L/2)+1+L·k are connected to the third storage capacitor trunk, CSBL_B_n+1+L·k and CSBL_A_n+(L/2)+1+L·k are connected to the fourth storage capacitor trunk, CSBL_A_n+2+L·k and CSBL_B_n+(L/2)+2+L·k are connected to the fifth storage capacitor trunk, CSBL_B_n+2+L·k and CSBL_A_n+(L/2)+2+L·k are connected to the sixth storage capacitor trunk, CSBL_A_n+3+L·k and CSBL_B_n+(L/2)+3+L·k are connected to the seventh storage capacitor trunk, CSBL_B_n+3+L·k and CSBL_A_n+(L/2)+3+L·k are connected to the eighth storage capacitor trunk, similar connection patterns are repeated after that, and then CSBL_A_n+(L/2)−2+L·k and CSBL_B_n+L−2+L·k are connected to the $(L-3)^{th}$ storage capacitor trunk, CSBL_B_n+(L/2)−2+L·k and CSBL_A_n+L−2+L·k are connected to the $(L-2)^{th}$ storage capacitor trunk, CSBL_A_n+(L/2)−1+L·k and CSBL_B_n+L−1+L·k are connected to the $(L-1)^{th}$ storage capacitor trunk, and CSBL_B_n+(L/2)−1+L·k and CSBL_A_n+L−1+L·k are connected to the $L^{th}$ storage capacitor trunk.

As described above, according to the present invention, a multi-pixel liquid crystal display device that can significantly reduce the excessive high contrast ratio on the screen at an oblique viewing angle is easily applicable to a large-screen LCD, a high-resolution LCD, or a high-speed-drive LCD with shortened vertical and horizontal scanning periods. The reason is as follows. Specifically, if a multi-pixel LCD that applies an oscillating voltage to the CS bus lines had a big size, then the load capacitance or resistance on CS bus lines would normally increase so much as to blunt the waveform of the CS bus line voltage. Or if the resolution or drive rate of an LCD were increased, then the CS bus line voltage would have a shorter period of oscillation, thus possibly causing a significant effect of waveform blunting. Also, as the effective value of VLCadd would vary noticeably on the monitor screen, the luminance on the screen would become apparently uneven. However, these problems could be overcome by extending one oscillation period of the oscillating voltage applied to the CS bus lines.

In the liquid crystal display device disclosed in Patent Document No. 5, when an electrically common CS bus line is used for two adjacent subpixels of two pixels belonging to two adjacent rows and two types of electrically independent CS trunks are arranged, one oscillation period of the CS bus line voltage is 1 H. On the other hand, in the liquid crystal display device with Type I arrangement according to the present invention, when electrically independent CS bus lines are used for two adjacent subpixels of two pixels belonging to two adjacent rows and two types of electrically independent CS trunks are arranged, one oscillation period of the CS bus line voltage can be 2 H. Meanwhile, if four types of electrically independent CS trunks are arranged, one oscillation period of the CS bus line voltage can be 4 H.

According to the configuration or drive waveforms of the liquid crystal display device with Type I arrangement of the present invention, if electrically independent CS trunks are used for two adjacent subpixels of two pixels belonging to two adjacent rows and if the number of types of the electrically independent CS trunks is L, then one oscillation period of the CS bus line voltage can be L times as long as one horizontal scanning period (i.e., one oscillation period=LH).

Hereinafter, a liquid crystal display device with a Type II arrangement according to another preferred embodiment of the present invention and its driving method will be described.

As described above, the liquid crystal display device with Type I arrangement of the present invention uses L different sets of electrically independent storage capacitor counter electrodes (i.e., the number L of electrically independent CS trunks), thereby extending one oscillation period of the oscillating voltage applied to the storage capacitor counter electrodes to L times as long as one horizontal scanning period (H). As a result, the multi-pixel display operation can also be performed even on a big, high-resolution LCD, of which the storage capacitor counter electrode lines make a heavy electrical load.

However, the storage capacitor counter electrodes associated with the respective subpixels of two pixels that are adjacent to each other in the column direction (i.e., two pixels belonging to two adjacent rows) need to be electrically independent of each other (see FIG. 9, for example). That is to say, since two CS bus lines need to be provided for each pixel, the pixel aperture ratio decreases. More specifically, as shown in FIG. 15(*a*), if CS bus lines for respective subpixels are arranged so as to run through the respective centers of those subpixels, then an opaque layer BM1 needs to be arranged to prevent light from leaking through the gap between the pixels that are adjacent to each other in the column direction. For that reason, the areas covered with the two CS bus lines and the opaque layer BM1 cannot contribute to the display operation, thus causing a decrease in pixel aperture ratio, which is a problem.

On the other hand, in the liquid crystal display device with Type II arrangement of this preferred embodiment, two adjacent subpixels of two different pixels that are adjacent to each other in the column direction have their associated storage capacitor counter electrodes connected to a common CS bus line, which is arranged between those two pixels that are adjacent to each other in the column direction as shown in FIG. 15(*b*), thereby making the CS bus line function as an opaque layer, too. As a result, compared to the arrangement shown in FIG. 15(*a*), not just can the number of CS bus lines be reduced but also can the pixel aperture ratio be increased by removing the opaque layer BM1 that needs to be provided separately in FIG. 15(*b*).

Also, in the liquid crystal display device with Type I arrangement of the preferred embodiment described above, to extend one oscillation period of the oscillating voltage applied to the CS bus lines to L times as long as one horizontal scanning period, not only the number of electrically independent CS trunks but also the number of power supplies to drive the storage capacitor counter electrodes both need to be L. Therefore, to extend one oscillation period of the oscillating voltage applied to the CS bus lines to an arbitrary long one, the number of CS trunks and the number of power supplies to drive the storage capacitor counter electrodes need to be increased accordingly. Thus, in the liquid crystal display device with Type I arrangement of the preferred embodiment described above, there is a certain limit because the number of CS trunks and the number of power supplies to drive the storage capacitor counter electrodes both need to be increased to extend one oscillation period of the oscillating voltage applied to the CS bus lines to a long one.

On the other hand, in the liquid crystal display device with Type II arrangement according to this preferred embodiment of the present invention, if the number of electrically independent CS trunks is L (where L is an even number), one oscillation period of the oscillating voltage can be 2·K·L (where K is a positive integer) times as long as one horizontal scanning period.

Thus, the liquid crystal display device with Type II arrangement according to this preferred embodiment of the present invention can be used as a big, high-resolution LCD more effectively than the counterpart with Type I arrangement of the preferred embodiment described above.

Hereinafter, a specific preferred embodiment of Type II arrangement of the present invention will be described. In the following description, a liquid crystal display device that realizes the drive states shown in FIGS. 16A and 16B will be described as an example. FIGS. 16A and 16B respectively correspond to FIGS. 4A and 4B that have already been referred to. However, in the drive state shown in FIG. 16A, the directions of the electric fields applied to the respective portions of the liquid crystal layer are opposite to those shown in FIG. 4A. The same statement applies to the electric field directions shown in FIGS. 4B and 16B, too. As an example, a configuration for realizing the drive state shown FIG. 16A will be described. To realize the drive state shown FIG. 16B, the polarity of the voltage applied to the source bus lines and that of the storage capacitor voltages may be inverse of those shown in FIG. 16A as already described with reference to FIGS. 3A and 3B. As a result, the first and second subpixels (represented by "b (bright)" or "d (dark)" in the drawings) can be fixed at their original locations with the display polarities ("+" or "−" in the drawings) of the pixels inverted. However, the present invention is in no way limited to this specific preferred embodiment. Alternatively, only the voltage applied to the source bus lines may be inverted. In that case, since the first and second subpixels (represented by "b (bright)" or "d (dark)" in the drawings) will change their locations as the polarities of the pixels are inverted. Consequently, the color bleeding and other problems that could occur during a halftone display operation if the pixel locations are fixed as described above can be settled.

Also, in the liquid crystal display device of this preferred embodiment, two pixels adjacent to each other in the column direction (belonging to the $n^{th}$ row and $(n+1)^{th}$ row, respectively) share a common CS bus line CSBL, which is arranged between the subpixel electrode 18*b* of the pixel on the $n^{th}$ row and the subpixel electrode 18*a* of the pixel on the $(n+1)^{th}$ row to supply a storage capacitor counter voltage (oscillating voltage) to the storage capacitors of the subpixels associated with these subpixel electrodes. This CS bus line CSBL also serves as an opaque layer to block passage of light between the pixels on the $n^{th}$ and $(n+1)^{th}$ rows. Optionally, this CS bus line CSBL may be arranged so as to partially overlap with the subpixel electrodes 18*a* and 18*b* with an insulating film interposed between them.

In each of the liquid crystal display devices to be described as exemplary preferred embodiments, if one oscillation period of the oscillating voltage applied to CS bus lines is longer than one horizontal scanning period and if the number of electrically independent CS trunks is L (where L is an even number), one oscillation period of the oscillating voltage is 2·K·L times as long as one horizontal scanning period (where K is a positive integer). That is to say, in the liquid crystal display device with Type I arrangement of the preferred embodiment of the present invention described above, one oscillation period of the oscillating voltage can be no greater than L times as long as one horizontal scanning period. On the other hand, in the liquid crystal display device with Type II arrangement of this preferred embodiment of the present invention, one oscillation period can be further extended by the factor of 2·K. Besides, K does not depend on the number of electrically independent CS trunks. K is a parameter to be determined by the connection pattern between respective electrically independent CS trunks and CS bus lines and is a half of the number of CS bus lines that are connected to a common CS trunk (i.e., the number of electrically equivalent CS bus lines) among a series of CS bus lines that form one complete cycle of connection with the CS trunks.

In the area ratio gray scale display (i.e., the multi-pixel drive) operation performed by the liquid crystal display device of the present invention, each pixel is split into two subpixels, and mutually different oscillating voltages (i.e., storage capacitor counter voltages) are applied to the storage capacitors connected to the respective subpixels, thereby producing a bright subpixel and dark subpixel. The bright subpixel may be produced if the first change of the oscillating voltages after its TFT has been turned OFF is a voltage increase, for example. Conversely, the dark subpixel may be produced if the first change of the oscillating voltages after its TFT has been turned OFF is a voltage decrease. That is why if CS bus lines for subpixels, of which the oscillating voltage should be increased after their TFTs have been turned OFF, are connected to one common CS trunk and CS bus lines for subpixels, of which the oscillating voltage should be decreased after their TFTs have been turned OFF, are connected to another common CS trunk, then the number of CS trunks can be reduced. K is a parameter that represents how effectively one period can be extended according to the connection pattern between the CS bus lines and CS trunks.

The greater the K value, the longer one period of the oscillating voltage can be. However, K should not be too large. The reason is as follows.

As the K value is increased, the number of subpixels connected to a common CS trunk also increases.

Those subpixels are connected to mutually different TFTs, which are turned OFF at respectively different timings (at intervals that are multiples of 1 H). That is why an interval between a point in time when a TFT associated with one of the subpixels connected to a common CS trunk is turned OFF and a point in time when its oscillating voltage increases (or decreases) for the first time is different from an interval between a point in time when a TFT associated with another subpixel is turned OFF and a point in time when its oscillating voltage increases (or decreases) for the first time. This time difference increases as the K value increases (i.e., as the number of CS bus lines connected to the common CS trunk increases): As a result, a line defect with significantly different luminance could be seen on the screen. To eliminate such a line defect, the time difference is preferably not more than 5% of the number of scan lines (i.e., the number of pixel rows) as a rule. In an XGA, for example, the K value is preferably set such that the time difference is 38 H or less, which is 5% or less of 768 rows. On the other hand, the lower limit of one period of the oscillating voltage should be set so as not to cause uneven luminances due to waveform blunting as has already been described with reference to FIG. 8. For example, in a 45-inch XGA, no waveform blunting problem should occur if one oscillation period is at least as long as 12 H. In view of these considerations, when the present invention is applied to a 45-inch LCD TV monitor, for example, if K is 1 or 2, L is 6, 8, 10 or 12, and if one period of the oscillating voltage is defined within the range of 12 H to 48 H, high-quality display with no uneven luminances is realized. The number L of electrically independent CS trunks should be determined with the number of oscillating voltage sources (or power supplies to drive the storage capacitor counter electrodes), the wiring pattern on the panel (i.e., on the TFT substrate), and other factors taken into consideration.

Hereinafter, a liquid crystal display device with Type II arrangement according to a preferred embodiment of the present invention and its driving method will be described in detail by way of an illustrative example in which K=1 and L=4, 6, 8, 10, or 12 and another example in which K=2 and L=4 or 6. To avoid redundancy of description with the foregoing preferred embodiments, the following description will be focused on the connection patterns between the CS bus lines and the CS trunks.

Pattern in which K=1, L=4, and Oscillation Period=8 H

The matrix arrangement (including the connection pattern of CS bus lines) of the liquid crystal display device with Type II arrangement according to this preferred embodiment is shown in FIG. 17 and the waveforms of signals used to drive this liquid crystal display device are shown in FIG. 18. Also, the connection pattern adopted in FIG. 17 is shown in the following Table 7. By applying an oscillating voltage to the CS bus lines at the timings shown in FIG. 18 in the matrix arrangement shown in FIG. 17, the drive state shown in FIG. 15A is realized.

In FIG. 17, each CS bus line is connected to any of the four CS trunks that are arranged at each of the right and left ends of the paper. Therefore, the number (of types) of electrically independent CS bus lines is four (i.e., L=4). It can also be seen from FIG. 17 that a certain rule is set on the connection pattern between the CS bus lines and CS trunks. The rule is that the same connection pattern should recur regularly every eight CS bus lines in FIG. 17. Therefore, K=1 (=8/(2 L)).

TABLE 7

| L = 4, K = 1 | |
|---|---|
| CS trunk | CS busline connected to CS trunk |
| M1a | CSBL_ (n − 1) B, (n) A<br>CSBL_ (n + 4) B, (n + 5) A |
| M2a | CSBL_ (n) B, (n + 1) A<br>CSBL_ (n + 3) B, (n + 4) A |
| M3a | CSBL_ (n + 1) B, (n + 2) A<br>CSBL_ (n + 6) B, (n + 7) A |
| M4a | CSBL_ (n + 2) B, (n + 3) A<br>CSBL_ (n + 5) B, (n + 6) A |

where n = 1, 9, 17, . . .

As can be seen from this Table 7, the CS bus lines shown in FIG. 17 are classified into the type that satisfies, for any p, the relations:

CSBL_(p)B, (p+1)A and

CSBL_(p+5)B, (p+6)A (such a type will be referred to herein as "Type α") and the type that satisfies, for any p, the relations:

CSBL_(p+1)B, (p+2)A and

CSBL_(p+4)B, (p+5)A (such a type will be referred to herein as "Type β"). Specifically, the CS bus lines connected to the CS trunks M1*a* and M3*a* are Type α, while the CS bus lines connected to the CS trunks M2*a* and M4*a* are Type β.

Eight consecutive CS bus lines that form one complete cycle of connection pattern consist of four Type α bus lines (two connected to M1*a* and two connected to M3*a*) and four Type β bus lines (two connected to M2*a* and two connected to M4*a*).

If the parameters L and K mentioned above are used, it can be seen that a set of CS bus lines, which are represented, for any p, by:

CSBL_(p+2·(K−1))B, (p+2·(K−1)+1)A and

CSBL_(p+2·(K−1)+K·L+1)B, (p+2·(K−1)+K·L+2)A or

CSBL_(p+2·(K−1)+1)B, (p+2·(K−1)+2)A

CSBL_(p+2·(K−1)+K·L)B, (p+2·(K−1)+K·L+1)A should include electrically equivalent CS bus lines, where p=1, 3, 5, etc. or p=0, 2, 4, etc. This condition is set because there are no CS bus lines belonging to both Type α and Type β.

It can be seen from FIG. 18 that in this case, the oscillating voltage applied to the CS bus lines has an oscillation period of 8 H, i.e., 2·K·L times as long as one horizontal scanning period.

Pattern in which K=1, L=6, and Oscillation Period=12 H

Next, a connection pattern for a situation where the number (of types) of electrically independent CS trunks is six is shown in FIG. 19 and the drive waveforms in that situation are shown in FIG. 20. Also, the connection pattern shown in FIG. 19 is summarized in the following Table 8:

In FIG. 20, each CS bus line is connected to any of the six CS trunks that are arranged at each of the right and left ends of the paper. Therefore, the number (of types) of electrically independent CS bus lines is six (i.e., L=6).

It can also be seen from FIG. 19 that a certain rule is set on the connection pattern between the CS bus lines and CS trunks. The rule is that the same connection pattern should recur regularly every 12 CS bus lines in FIG. 19. Therefore, K=1 (=12/(2 L)).

TABLE 8

| L = 6, K = 1 | |
|---|---|
| CS trunk | CS busline connected to CS trunk |
| M1b | CSBL_ (n − 1) B, (n) A<br>CSBL_ (n + 6) B, (n + 7) A |
| M2b | CSBL_ (n) B, (n + 1) A<br>CSBL_ (n + 5) B, (n + 6) A |
| M3b | CSBL_ (n + 1) B, (n + 2) A<br>CSBL_ (n + 8) B, (n + 9) A |
| M4b | CSBL_ (n + 2) B, (n + 3) A<br>CSBL_ (n + 7) B, (n + 8) A |
| M5b | CSBL_ (n + 3) B, (n + 4) A<br>CSBL_ (n + 10) B, (n + 11) A |
| M6b | CSBL_ (n + 4) B, (n + 5) A<br>CSBL_ (n + 9) B, (n + 10) A |

where n = 1, 13, 25, . . .

As can be seen from Table 8, the CS bus lines are connected in FIG. 19 such that one of the following two sets of CS bus lines:

CSBL_(p)B, (p+1)A and

CSBL_(p+7)B, (p+8)A or

CSBL_(p+1)B, (p+2)A

CSBL_(p+6)B, (p+7)A where p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

CSBL_(p+2·(K−1))B, (p+2·(K−1)+1)A and

CSBL_(p+2·(K−1)+K·L+1)B, (p+2·(K−1)+K·L+2)A or

CSBL_(p+2·(K−1)+1)B, (p+2·(K−1)+2)A and

CSBL_(p+2·(K−1)+K·L)B, (p+2·(K−1)+K·L+1)A should include electrically equivalent CS bus lines, where p=1, 3, 5, etc. or p=0, 2, 4, etc.

It can be seen from FIG. 20 that in this case, the oscillating voltage applied to the CS bus lines has an oscillation period of 12 H, i.e., 2·K·L times as long as one horizontal scanning period.

Pattern in which K=1, L=8, and Oscillation Period=16 H

Next, a connection pattern for a situation where the number (of types) of electrically independent CS bus lines is eight is shown in FIG. 21 and the drive waveforms in that situation are shown in FIG. 22. Also, the connection pattern shown in FIG. 21 is summarized in the following Table 9.

In FIG. 21, each CS bus line is connected to any of the eight CS trunks that are arranged at the left end of the paper. Therefore, the number (of types) of electrically independent CS bus lines is eight (i.e., L=8).

It can also be seen from FIG. 21 that a certain rule is set on the connection pattern between the CS bus lines and CS trunks. The rule is that the same connection pattern should recur regularly every 16 CS bus lines in FIG. 21. Therefore, K=1 (=16/(2 L)).

TABLE 9

| L = 8, K = 1 | |
|---|---|
| CS trunk | CS busline connected to CS trunk |
| M1c | CSBL_ (n − 1) B, (n) A<br>CSBL_ (n + 8) B, (n + 9) A |
| M2c | CSBL_ (n) B, (n + 1) A<br>CSBL_ (n + 7) B, (n + 8) A |
| M3c | CSBL_ (n + 1) B, (n + 2) A<br>CSBL_ (n + 10) B, (n + 11) A |
| M4c | CSBL_ (n + 2) B, (n + 3) A<br>CSBL_ (n + 9) B, (n + 10) A |
| M5c | CSBL_ (n + 3) B, (n + 4) A<br>CSBL_ (n + 12) B, (n + 13) A |
| M6c | CSBL_ (n + 4) B, (n + 5) A<br>CSBL_ (n + 11) B, (n + 12) A |
| M7c | CSBL_ (n + 5) B, (n + 6) A<br>CSBL_ (n + 14) B, (n + 15) A |
| M8c | CSBL_ (n + 6) B, (n + 7) A<br>CSBL_ (n + 13) B, (n + 14) A |

where n = 1, 17, 33, . . .

As can be seen from Table 9, the CS bus lines are connected in FIG. 21 such that one of the following two sets of CS bus lines:

CSBL_(p)B, (p+1)A and

CSBL_(p+9)B, (p+10)A or

CSBL_(p+1)B, (p+2)A and

CSBL_(p+8)B, (p+9)A where p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

CSBL_(p+2·(K−1))B, (p+2·(K−1)+1)A and

CSBL_(p+2·(K−1)+K·L+1)B, (p+2·(K−1)+K·L+2)A or

CSBL_(p+2·(K−1)+1)B, (p+2·(K−1)+2)A and

CSBL_(p+2·(K−1)+K·L)B, (p+2·(K−1)+K·L+1)A should include electrically equivalent CS bus lines, where p=1, 3, 5, etc. or p=0, 2, 4, etc.

It can be seen from FIG. 22 that in this case, the oscillating voltage applied to the CS bus lines has an oscillation period of 16 H, i.e., 2·K·L times as long as one horizontal scanning period.

Pattern in which K=1, L=10, and Oscillation Period=20 H

Next, a connection pattern for a situation where the number (of types) of electrically independent CS bus lines is 10 is shown in FIG. 23 and the drive waveforms in that situation are shown in FIG. 24. Also, the connection pattern shown in FIG. 23 is summarized in the following Table 10.

In FIG. 23, each CS bus line is connected to any of the 10 CS trunks that are arranged at both the right and left ends of the paper. Therefore, the number (of types) of electrically independent CS bus lines is 10 (i.e., L=10). It can also be seen from FIG. 23 that a certain rule is set on the connection pattern between the CS bus lines and CS trunks. The rule is that the same connection pattern should recur regularly every 20 CS bus lines in FIG. 23. Therefore, K=1 (=20/(2 L)).

TABLE 10

| L = 10, K = 1 | |
|---|---|
| CS trunk | CS busline connected to CS trunk |
| M1d | CSBL_ (n − 1) B, (n) A<br>CSBL_ (n + 10) B, (n + 11) A |
| M2d | CSBL_ (n) B, (n + 1) A<br>CSBL_ (n + 9) B, (n + 10) A |
| M3d | CSBL_ (n + 1) B, (n + 2) A<br>CSBL_ (n + 12) B, (n + 13) A |
| M4d | CSBL_ (n + 2) B, (n + 3) A<br>CSBL_ (n + 11) B, (n + 12) A |
| M5d | CSBL_ (n + 3) B, (n + 4) A<br>CSBL_ (n + 14) B, (n + 15) A |
| M6d | CSBL_ (n + 4) B, (n + 5) A<br>CSBL_ (n + 13) B, (n + 14) A |
| M7d | CSBL_ (n + 5) B, (n + 6) A<br>CSBL_ (n + 16) B, (n + 17) A |
| M8d | CSBL_ (n + 6) B, (n + 7) A<br>CSBL_ (n + 15) B, (n + 16) A |
| M9d | CSBL_ (n + 7) B, (n + 6) A<br>CSBL_ (n + 18) B, (n + 19) A |
| M10d | CSBL_ (n + 8) B, (n + 7) A<br>CSBL_ (n + 17) B, (n + 18) A |

where n = 1, 21, 41, . . .

As can be seen from Table 10, the CS bus lines are connected in FIG. 23 such that one of the following two sets of CS bus lines:

CSBL_(p)B, (p+1)A and

CSBL_(p+11)B, (p+12)A or

CSBL_(p+1)B, (p+2)A and

CSBL_(p+10)B, (p+11)A where either p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

CSBL_(p+2·(K−1))B, (p+2·(K−1)+1)A and

CSBL_(p+2·(K−1)+K·L+1)B, (p+2·(K−1)+K·L+2)A or

CSBL_(p+2·(K−1)+1)B, (p+2·(K−1)+2)A and

CSBL_(p+2·(K−1)+K·L)B, (p+2·(K−1)+K·L+1)A should include electrically equivalent CS bus lines, where p=1, 3, 5, etc. or p=0, 2, 4, etc.

It can be seen from FIG. 24 that in this case, the oscillating voltage applied to the CS bus lines has an oscillation period of 20 H, i.e., 2·K·L times as long as one horizontal scanning period.

Pattern in which K=1, L=12, and Oscillation Period=24 H

Next, a connection pattern for a situation where the number (of types) of electrically independent CS bus lines is 12 is shown in FIG. 25 and the drive waveforms in that situation are shown in FIG. 26. Also, the connection pattern shown in FIG. 25 is summarized in the following Table 11.

In FIG. 25, each CS bus line is connected to any of the 12 CS trunks that are arranged at the left end of the paper. Therefore, the number (of types) of electrically independent CS bus lines is 12 (i.e., L=12). It can also be seen from FIG. 25 that a certain rule is set on the connection pattern between the CS bus lines and CS trunks.

The rule is that the same connection pattern should recur regularly every 24 CS bus lines in FIG. 25. Therefore, K=1 (=24/(2 L)).

TABLE 11

| L = 12, K = 1 | |
|---|---|
| CS trunk | CS busline connected to CS trunk |
| M1e | CSBL_ (n − 1) B, (n) A<br>CSBL_ (n + 12) B, (n + 13) A |
| M2e | CSBL_ (n) B, (n + 1) A<br>CSBL_ (n + 11) B, (n + 12) A |
| M3e | CSBL_ (n + 1) B, (n + 2) A<br>CSBL_ (n + 14) B, (n + 15) A |
| M4e | CSBL_ (n + 2) B, (n + 3) A<br>CSBL_ (n + 13) B, (n + 14) A |
| M5e | CSBL_ (n + 3) B, (n + 4) A<br>CSBL_ (n + 16) B, (n + 17) A |
| M6e | CSBL_ (n + 4) B, (n + 5) A<br>CSBL_ (n + 15) B, (n + 16) A |
| M7e | CSBL_ (n + 5) B, (n + 6) A<br>CSBL_ (n + 18) B, (n + 19) A |
| M8e | CSBL_ (n + 6) B, (n + 7) A<br>CSBL_ (n + 17) B, (n + 18) A |
| M9e | CSBL_ (n + 7) B, (n + 6) A<br>CSBL_ (n + 20) B, (n + 21) A |
| M10e | CSBL_ (n + 8) B, (n + 7) A<br>CSBL_ (n + 19) B, (n + 20) A |
| M11e | CSBL_ (n + 9) B, (n + 10) A<br>CSBL_ (n + 22) B, (n + 23) A |
| M12e | CSBL_ (n + 10) B, (n + 11) A<br>CSBL_ (n + 21) B, (n + 22) A |

where n = 1, 25, 49, . . .

As can be seen from Table 11, the CS bus lines are connected in FIG. 25 such that one of the following two sets of CS bus lines:

CSBL_(p)B, (p+1)A and

CSBL_(p+13)B, (p+14)A or

CSBL_(p+1)B, (p+2)A and

CSBL_(p+12)B, (p+13)A where either p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

CSBL_(p+2·(K−1))B, (p+2·(K−1)+1)A and

CSBL_(p+2·(K−1)+K·L+1)B, (p+2·(K−1)+K·L+2)A or

CSBL_(p+2·(K−1)+1)B, (p+2·(K−1)+2)A and

CSBL_(p+2·(K−1)+K·L)B, (p+2·(K−1)+K·L+1)A should include electrically equivalent CS bus lines, where p=1, 3, 5, etc. or p=0, 2, 4, etc.

It can be seen from FIG. 26 that in this case, the oscillating voltage applied to the CS bus lines has an oscillation period of 24 H, i.e., 2·K·L times as long as one horizontal scanning period.

In each of the specific examples described above, the parameter K is supposed to be one. Hereinafter, examples in which the parameter K is two will be described.

Pattern in which K=2, L=4, and Oscillation Period=16 H

Next, a connection pattern for a situation where the parameter K is two and the number (of types) of electrically independent CS bus lines is four is shown in FIG. 27 and the drive waveforms in that situation are shown in FIG. 28. Also, the connection pattern shown in FIG. 27 is summarized in the following Table 12.

In FIG. 27, each CS bus line is connected to any of the four CS trunks that are arranged at each of the right and left ends of the paper. Therefore, the number (of types) of electrically independent CS bus lines is four (i.e., L=4). It can also be seen from FIG. 27 that a certain rule is set on the connection pattern between the CS bus lines and CS trunks. The rule is that the same connection pattern should recur regularly every 16 CS bus lines in FIG. 27. Therefore, K=2 (=16/(2 L)).

TABLE 12

| L = 4, K = 2 | |
|---|---|
| CS trunk | CS busline connected to CS trunk |
| M1f | CSBL_ (n − 1) B, (n) A<br>CSBL_ (n + 1) B, (n + 2) A<br>CSBL_ (n + 8) B, (n + 9) A<br>CSBL_ (n + 10) B (n + 11) A |
| M2f | CSBL_ (n) B, (n + 1) A<br>CSBL_ (n + 2) B, (n + 3) A<br>CSBL_ (n + 7) B, (n + 8) A<br>CSBL_ (n + 9) B (n + 10) A |
| M3f | CSBL_ (n + 3) B, (n + 4) A<br>CSBL_ (n + 5) B, (n + 6) A<br>CSBL_ (n + 12) B, (n + 13) A<br>CSBL_ (n + 14) B (n + 15) A |
| M4f | CSBL_ (n + 4) B, (n + 5) A<br>CSBL_ (n + 6) B, (n + 7) A<br>CSBL_ (n + 11) B, (n + 12) A<br>CSBL_ (n + 13) B (n + 14) A |

where n = 1, 17, 33, . . .

As can be seen from Table 12, the CS bus lines are connected in FIG. 27 such that one of the following two sets of CS bus lines:

CSBL_(p)B, (p+1)A,

CSBL_(p+2)B, (p+3)A and

CSBL_(p+9)B, (p+10)A,

CSBL_(p+11)B, (p+12)A or

CSBL_(p+1)B, (p+2)A,

CSBL_(p+3)B, (p+4)A and

CSBL_(p+8)B, (p+9)A,

CSBL_(p+10)B, (p+11)A where p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

CSBL_(p+2·(1−1))B, (p+2·(1−1)+1)A

CSBL_(p+2·(K−1))B, (p+2·(K−1)+1)A and

CSBL_(p+2·(1−1)+K·L+1)B, (p+2·(1−1)+K·L+2)A

CSBL_(p+2·(K−1)+K·L+1)B, (p+2·(K−1)+K·L+2)A or

CSBL_(p+2·(1−1)+1)B, (p+2·(1−1)+2)A

CSBL_(p+2·(K−1)+1)B, (p+2·(K−1)+2)A and

CSBL_(p+2·(1−1)+K·L)B, (p+2·(1−1)+K·L+1)A

CSBL_(p+2·(K−1)+K·L)B, (p+2·(K−1)+K·L+1)A should include electrically equivalent CS bus lines, where p=1, 3, 5, etc. or p=0, 2, 4, etc.

It can be seen from FIG. 28 that in this case, the oscillating voltage applied to the CS bus lines has an oscillation period of 16 H, i.e., 2·K·L times as long as one horizontal scanning period.

Pattern in which K=2, L=4, and Oscillation Period=16 H

Next, a connection pattern for a situation where the parameter K is two and the number (of types) of electrically independent CS bus lines is six is shown in FIG. 29 and the drive waveforms in that situation are shown in FIG. 30. Also, the connection pattern shown in FIG. 29 is summarized in the following Table 13.

In FIG. 29, each CS bus line is connected to any of the six CS trunks that are arranged at each of the right and left ends of the paper. Therefore, the number (of types) of electrically independent CS bus lines is six (i.e., L=6). It can also be seen from FIG. 29 that a certain rule is set on the connection pattern between the CS bus lines and CS trunks. The rule is that the same connection pattern should recur regularly every 24 CS bus lines in FIG. 29. Therefore, K=2 (=24/(2 L)).

TABLE 13

| L = 6, K = 2 | |
|---|---|
| CS trunk | CS busline connected to CS trunk |
| M1g | CSBL__ (n − 1) B, (n) A<br>CSBL__ (n + 1) B, (n + 2) A<br>CSBL__ (n + 12) B, (n + 13) A<br>CSBL__ (n + 14) B (n + 15) A |
| M2g | CSBL__ (n) B, (n + 1) A<br>CSBL__ (n + 2) B, (n + 3) A<br>CSBL__ (n + 11) B, (n + 12) A<br>CSBL__ (n + 13) B (n + 14) A |
| M3g | CSBL__ (n + 3) B, (n + 4) A<br>CSBL__ (n + 5) B, (n + 6) A<br>CSBL__ (n + 16) B, (n + 17) A<br>CSBL__ (n + 18) B (n + 19) A |
| M4g | CSBL__ (n + 4) B, (n + 5) A<br>CSBL__ (n + 6) B, (n + 7) A<br>CSBL__ (n + 15) B, (n + 16) A<br>CSBL__ (n + 17) B (n + 18) A |
| N5g | CSBL__ (n + 7) B, (n + 8) A<br>CSBL__ (n + 9) B, (n + 10) A<br>CSBL__ (n + 20) B, (n + 21) A<br>CSBL__ (n + 22) B (n + 23) A |
| N6g | CSBL__ (n + 8) B, (n + 9) A<br>CSBL__ (n + 10) B, (n + 11) A<br>CSBL__ (n + 19) B, (n + 20) A<br>CSBL__ (n + 21) B (n + 22) A |

where n = 1, 25, 49, . . .

As can be seen from Table 13, the CS bus lines are connected in FIG. 29 such that one of the following two sets of CS bus lines:

CSBL_(p)B, (p+1)A,

CSBL_(p+2)B, (p+3)A and

CSBL_(p+13)B, (p+14)A,

CSBL_(p+15)B, (p+16)A or

CSBL_(p+1)B, (p+2)A,

CSBL_(p+3)B, (p+4)A and

CSBL_(p+12)B, (p+13)A,

CSBL_(p+14)B, (p+15)A where p=1, 3, 5, etc. or p=0, 2, 4, etc.

consists of electrically equivalent CS bus lines.

If the parameters L and K mentioned above are used, it can be seen that a set of CS bus lines, which are represented, for any p, by:

CSBL_(p+2·(1−1))B, (p+2·(1−1)+1)A

CSBL_(p+2·(K−1))B, (p+2·(K−1)+1)A and

CSBL_(p+2·(1−1)+K·L+1)B, (p+2·(1−1)+K·L+2)A

CSBL_(p+2·(K−1)+K·L+1)B, (p+2·(K−1)+K·L+2)A or

CSBL_(p+2·(1−1)+1)B, (p+2·(1−1)+2)A

CSBL_(p+2·(K−1)+1)B, (p+2·(K−1)+2)A and

CSBL_(p+2·(1−1)+K·L)B, (p+2·(1−1)+K·L+1)A

CSBL_(p+2·(K−1)+K·L)B, (p+2·(K−1)+K·L+1)A should include electrically equivalent CS bus lines, where p=1, 3, 5, etc. or p=0, 2, 4, etc.

It can be seen from FIG. 30 that in this case, the oscillating voltage applied to the CS bus lines has an oscillation period of 24 H, i.e., 2·K·L times as long as one horizontal scanning period.

In the preferred embodiments described above, situations where the parameter K is one and the parameter L=4, 6, 8, 10 or 12 and situations where the parameter K is two and the parameter L=4 or 6 have been set forth. However, Type II arrangement of the present invention is never limited to those specific preferred embodiments.

Specifically, K may be any positive integer, i.e., K=1, 2, 3, 4, 5, 6, 7, 8, 9, and so on, and L may be an even number, i.e., L=2, 4, 6, 8, 10, 12, 14, 16, 18, and so on. In addition, K and L may be defined independently from the their own ranges.

In those cases, the connection patterns between the CS trunks and the CS bus lines may follow the rule described above.

Specifically, if the parameters K and L are K and L, respectively (i.e., if K=K and L=L), CS bus lines connected to the same trunk, i.e., electrically equivalent CS bus lines, should be:

CSBL_(p+2·(1−1))B, (p+2·(1−1)+1)A,

CSBL_(p+2·(2−1))B, (p+2·(2−1)+1)A,

CSBL_(p+2·(3−1))B, (p+2·(3−1)+1)A,

. . .

CSBL_(p+2·(K−1))B, (p+2·(K−1)+1)A and

CSBL_(p+2·(1−1)+K·L+1)B, (p+2·(1−1)+K·L+2)A,

CSBL_(p+2·(2−1)+K·L+1)B, (p+2·(2−1)+K·L+2)A,

CSBL_(p+2·(3−1)+K·L+1)B, (p+2·(3−1)+K·L+2)A,

. . .

CSBL_(p+2·(K−1)+K·L+1)B, (p+2·(3−1)+K·L+2)A;

or

CSBL_(p+2·(1−1)+1)B, (p+2·(1−1)+2)A,

CSBL_(p+2·(2−1)+1)B, (p+2·(2−1)+2)A,

CSBL_(p+2·(3−1)+1)B, (p+2·(3−1)+2)A,

. . .

CSBL_(p+2·(K−1)+1)B, (p+2·(K−1)+2)A and

CSBL_(p+2·(1−1)+K·L)B, (p+2·(1−1)+K·L+1)A,

CSBL_(p+2·(2−1)+K·L)B, (p+2·(2−1)+K·L+1)A,

CSBL_(p+2·(3−1)+K·L)B, (p+2·(3−1)+K·L+1)A,

. . .

CSBL_(p+2·(K−1)+K·L)B, (p+2·(K−1)+K·L+1)A, where p=1, 3, 5, etc. or p=0, 2, 4, etc.

Furthermore, if the parameters K and L are K and L, respectively (i.e., if K=K and L=L), the oscillating voltage applied to the CS bus lines may have an oscillation period that is 2·K·L times as long as one horizontal scanning period.

In the foregoing description, the first subpixel of one of two adjacent picture elements and the second subpixel of the other picture element share a common CS bus line.

However, the common CS bus line may be naturally split into two or more electrically equivalent CS bus lines.

The liquid crystal display device with Type I or Type II arrangement of the preferred embodiment described above can extend one oscillation period of the oscillating voltage applied to the CS bus lines (storage capacitor lines), and therefore, can apply the area ratio gray scale display technology disclosed in Patent Document No. 5 to either a large-screen LCD panel or a high-resolution LCD panel, among other things. In addition, the liquid crystal display device with Type II arrangement can supply an oscillating voltage through a common CS bus line to subpixels of two pixels that are adjacent to each other in the column direction. That is why by arranging the CS bus line between the pixels that are adjacent to each other in the column direction, the CS bus line can also be used as an opaque layer (which is typically implemented as a black matrix (BM)). As a result, the number of CS bus lines required by the Type II liquid crystal display device can be smaller than that of the Type I liquid crystal display device. On top of that, since the opaque layer that should be provided separately for the liquid crystal display device with Type I arrangement can be removed, the pixel aperture ratio can be increased as well.

FIGS. 31(*a*), 31(*b*) and 31(*c*) show three representative Type I arrangements TypeI-1, TypeI-2 and TypeI-3, while FIGS. 32(*a*), 32(*b*) and 32(*c*) show three representative Type II arrangements TypeII-1, TypeII-2 and TypeII-3. In these drawings, gate bus lines are identified by the reference sign G and are numbered 001, 002 and so on. Each row of pixels (which will also be referred to herein as "dots") is associated with a gate bus line G and each gate bus line number such as 001 also shows the number of its associated row of pixels. On the other hand, columns of pixels are numbered a, b and c. Therefore, pixels of the first row are identified by 1-*a*, 1-*b*, 1-*c* and so on, and pixels of the first column are identified by 1-*a*, 2-*a*, 3-*a* and so on.

Furthermore, each CS bus line is identified by its type, i.e., the type of the CS trunk connected thereto. Specifically, a CS bus line identified by CS1 is connected to a first CS trunk CS1 and a CS bus line identified by CS2 is connected to a second CS trunk CS2. In each of the six arrangements shown in FIGS. 31 and 32, there are 10 different types of CS trunks (or CS voltages) and CS bus lines are arranged cyclically and sequentially connected to CS1 through CS10, respectively, from the top toward the bottom of the paper.

Each pixel includes two subpixels. One of these two subpixels, associated with a CS bus line that is connected to the storage capacitor counter electrode of its storage capacitor and that is identified by the smaller number, is identified by A and the other subpixel B. For example, the pixel 1-*a* on the first row shown in FIG. 31 includes a subpixel 1-*a*-A with a storage capacitor connected to the CS trunk CS1 and a subpixel 1-*a*-B with a storage capacitor connected to the CS trunk CS2. Also, the darker one of the two subpixels of each pixel is hatched. As described above, each of the six arrangements shown in FIGS. 31 and 32 can eliminate flickers when subjected to 1 H one dot inversion drive.

As described above, when an arrangement for extending one oscillation period of the oscillating voltage applied to the storage capacitor counter electrode by providing a plurality of electrically independent CS trunks is adopted as in the Type I or Type II liquid crystal display device, waveform blunting of the oscillating voltage can be reduced. However, the resultant display quality could be debased for another reason. The reason will be described below.

The display quality is debased due to disagreement between one period of the oscillating voltage (CS voltage) applied to the CS bus line and one vertical scanning period. Thus, the vertical scanning period will be described first. In the following description, one vertical scanning period is supposed to be as long as one frame period for the sake of simplicity.

One vertical scanning period V-Total of a video signal supplied to a display device is made up of an effective scanning period V-Disp in which video is presented and a vertical blanking interval V-Blank in which no video is presented. The effective scanning period for presenting video is determined by the display area (or the number of effective pixels) of an LCD panel. On the other hand, the vertical blanking interval is an interval for signal processing, and therefore, is not always constant but changes from one manufacturer of TV receivers to another. For instance, if the display area has 768 rows of pixels (in an XGA), the effective scanning period is fixed at 768×one horizontal scanning period (H) (which will be identified herein by "768 H"). However, in one case, one vertical blanking interval may be 35 H and one vertical scanning period V-Total may be 803 H. In another case, one vertical blanking interval may be 36 H and one vertical scanning period V-Total may be 804 H. Furthermore, the length of one vertical blanking interval may even alternate between an odd number and an even number (e.g., 803 H and 804 H) every vertical scanning period.

The CS voltage oscillates within its amplitude during one frame period (=one vertical blanking interval+one effective scanning period). However, since one vertical blanking interval does not have a fixed length, the next frame period may sometimes begin before one cycle of oscillation is complete. That is why the CS voltage may have a disturbed period of oscillation in the transition period between signal processing of the first frame and that of the second frame. For example, in both the Type I arrangement shown in FIG. 33A and the Type II arrangement shown in FIG. 33B, the CS voltage waveform has a disturbed period in the transition between the first and second frames. When this phenomenon was observed on video, it was discovered that bright rows of pixels and dark rows of pixels alternated with each other periodically to debase the display quality significantly. For example, as shown in FIG. 34, dark and bright states may alternate every five rows of pixels (i.e., every ten CS bus lines or every CS trunks of ten phases). On the other hand, in the Type II liquid crystal display device shown in FIG. 38, dark and bright states may alternate every ten rows of pixels.

This phenomenon will be described in further detail.

Suppose a liquid crystal display device has one vertical scanning period V-Total of 803 H, one effective scanning period V-Disp of 768 H, one vertical blanking interval V-Blank of 35 H, ten types of CS voltages (which will be sometimes referred to herein as "CS voltages of ten phases") that switch between a first voltage level (which is High level in this example) and a second voltage level (which is Low level in this example), and has its frame polarity inverted by 1 H dot inversion technique. FIGS. 35A and 35B show an equivalent circuit of this liquid crystal display device with a pattern of connections to CS trunks. Also, FIG. 36 shows the timing relation between the CS voltages and the gate voltages (i.e., voltages on gate bus lines; which will also be referred to herein as "gate signals").

The connection pattern shown in FIGS. 35A and 35B corresponds to the TypeI-1 arrangement shown in FIG. 31(*a*). In this pattern, the subpixels 1-*a*-A, 1-*b*-A, 1-*c*-A, etc. on the first row of pixels and the subpixels 6-*a*-A, 6-*b*-A, 6-*c*-A, etc. on the sixth row of pixels are connected to the CS trunk CS1. The subpixels 1-*a*-B, 1-*b*-B, 1-*c*-B, etc. on the first row of pixels and the subpixels 6-*a*-B, 6-*b*-B, 6-*c*-B, etc. on the sixth row of pixels are connected to the CS trunk CS2. The subpixels 2-*a*-A, 2-*b*-A, 2-*c*-A, etc. on the second row of pixels and the subpixels 7-*a*-A, 7-*b*-A, 7-*c*-A, etc. on the seventh row of pixels are connected to the CS trunk CS3.

As shown in FIG. 36, after data has been written on the first row of pixels to turn OFF the TFTs that are connected to the gate bus line associated with the first row of pixels, the CS voltage changes its voltage levels for the first time (i.e., rises from the second voltage level to the first voltage level in this example). After that, the CS voltage will switch its levels between the first and second voltage levels every 5 H period (i.e., one period of oscillation is 10 H and the duty ratio is one to one). In the same way, after the TFTs connected to a gate bus line that is associated with the second, third or any other row of pixels have been turned OFF, their associated CS voltage will rise or fall and then the first and second voltage levels will switch every 5 H period.

If the first switch of CS voltages after (e.g., 1 H after) the TFTs have been turned OFF in one frame is a rise from the second voltage level to the first voltage level, then the polarity will invert in the next frame (which is called "frame inversion drive"). Thus, in the latter frame, the first switch of CS voltages at the same timing as in the former frame, i.e., after (e.g., 1 H after) the TFTs have been turned OFF, will be a fall from the first voltage level to the second voltage level. The CS voltages switch between the first and second voltage levels every 5 H period. That is why supposing the first voltage level 5 H+ the second voltage level 5 H=10 H is one period, V-Total=803 H is 80 periods plus 3 H. And if the first switch of the CS voltages in one frame is a rise from the second voltage level to the first voltage level, then the last period (in 803 H periods) will finish with the first voltage level. In the next frame, the first voltage level should change into the second voltage level. Thus, the first voltage level of the previous frame changes into the second voltage level. At this time, however, the CS voltages do not switch every 5 H but change in the order of the second voltage level (5 H), the first voltage level (3 H) and then the second voltage level (5 H) as shown in FIG. 37.

In this case, the subpixels 1-*a*-A, 1-*b*-A, 1-*c*-A, etc. on the first row of pixels G:001 and the subpixels 6-*a*-A, 6-*b*-A, 6-*c*-A, etc. on the sixth row of pixels G:006 are connected to the same CS trunk CS1. As for the subpixels 1-*a*-A, 1-*c*-A, etc. on the first row of pixels, the first change of CS voltages after the TFTs on the first row of pixels have been turned OFF is a rise from the second voltage level to the first voltage level. As a result, those subpixels will look bright. Meanwhile, the subpixels on the sixth row of pixels are also connected to the same CS trunk CS1. And the first change of CS voltages after the TFTs on the sixth row of pixels have been turned OFF is a fall from the first voltage level to the second voltage level. As a result, those subpixels 6-*a*-A, 6-*c*-A, etc. on the sixth row will also be bright (see FIG. 37).

In this case, the subpixels 1-*a*-A, 1-*c*-A, etc. on the first row of pixels will become bright subpixels by taking advantage of the rise from the second voltage level of the oscillating voltage of CS1 to the first voltage level thereof, while the subpixels 6-*a*-A, 6-*c*-A, etc. on the sixth row of pixels will also become bright subpixels by taking advantage of the fall from the first voltage level to the second voltage level.

Consequently, comparing the effective values of voltages applied to the subpixels 1-*a*-A, 1-*c*-A, etc. on the first row of pixels to those of voltages applied to the subpixels 6-*a*-A, 6-*c*-A, etc. on the sixth row of pixels in one frame (i.e., the areas of the hatched portions of FIG. 37) in a situation where V-Total=803 H, it can be seen that the overall area of the subpixels 6-*a*-A, 6-*c*-A, etc. on the sixth row of pixels is greater than that of the subpixels 1-*a*-A, 1-*c*-A, etc. by the area of the portion with the darker shadow (with a width of 2 H (=5 H−3 H)). That is to say, the subpixels 6-*a*-A, 6-*c*-A, etc. have the higher luminance.

As can be seen, even if the subpixels are connected to the same CS trunk every five rows of pixels (i.e., $1^{st}$, $6^{th}$, $11^{th}$, $16^{th}$, $21^{st}$, $26^{th}$ rows and so on), the bright subpixels on the $6^{th}$, $16^{th}$ and $26^{th}$ rows will look brighter than the counterparts on the $1^{st}$, $11^{th}$ and $21^{st}$ rows. The same statement applies to every CS trunk CS1, CS3, CS5, CS7 or CS9 that is connected to the bright subpixels. That is why when video is viewed on this display device, the first through fifth rows of pixels will look dark, the sixth through tenth rows of pixels will look bright, and the eleventh through fifteenth rows of pixels will look dark as shown in FIG. 34. That is to say, bright and dark stripes will alternate with each other every five rows of pixels. In the foregoing example, the bright subpixels contribute more greatly to the display operation than the dark subpixels do. That is why the bright subpixels have been described mainly and the description of the dark subpixels is omitted herein.

Next, another specific example will be described.

Suppose a liquid crystal display device has V-Total of 803 H, V-Disp of 768 H, V-Blank of 35 H, CS voltages of ten phases that switch between a first voltage level and a second voltage level, and has its frame polarity inverted by 1 H dot inversion technique. FIGS. 39A through 39C show an equivalent circuit of this liquid crystal display device with a pattern of connections to CS trunks.

The connection pattern shown in FIGS. 39A through 39C corresponds to the TypeII-1 arrangement shown in FIG. 32(*a*). In this pattern, the subpixels 1-*a*-A, 1-*b*-A, 1-*c*-A, etc. on the first row of pixels, the subpixels 11-*a*-B, 11-*b*-B, 11-*c*-B, etc. on the eleventh row of pixels, and the subpixels 12-*a*-A, 12-*b*-A, 12-*c*-A, etc. on the twelfth row of pixels are connected to the CS trunk CS1. The subpixels 1-*a*-B, 1-*b*-B, 1-*c*-B, etc. on the first row of pixels, the subpixels 2-*a*-A, 2-*b*-A, 2-*c*-A, etc. on the second row of pixels, the subpixels 10-*a*-B, 10-*b*-B, 10-*c*-B, etc. on the tenth row of pixels and the subpixels 11-*a*-A, 11-*b*-A, 11-*c*-A, etc. on the eleventh row of pixels are connected to the CS trunk CS2. And the subpixels 2-*a*-B, 2-*b*-B, 2-*c*-B, etc. on the second row of pixels, the subpixels 3-*a*-A, 3-*b*-A, 3-*c*-A, etc. on the third row of pixels, the subpixels 13-*a*-B, 13-*b*-B, 13-*c*-B, etc. on the thirteenth row of pixels and the subpixels 14-*a*-A, 14-*b*-A, 14-*c*-A, etc. on the fourteenth row of pixels are connected to the CS trunk CS3.

As shown in FIG. 40, after data has been written on the first row of pixels to turn OFF the TFTs that are connected to the gate bus line associated with the first row of pixels, the CS voltage changes its voltage levels for the first time (i.e., rises from the second voltage level to the first voltage level in this example). After that, the CS voltage will switch its levels between the first and second voltage levels every 10 H period (i.e., one period of oscillation is 20 H and the duty ratio is one to one). In the same way, after the TFTs connected to a gate bus line that is associated with the second, third or any other row of pixels have been turned OFF, their associated CS voltage will rise or fall and then the first and second voltage levels will switch every 10 H period.

If the first switch of CS voltages after (e.g., 2 H after) the TFTs have been turned OFF in one frame is a rise from the second voltage level to the first voltage level, then the polarity will invert in the next frame (which is called "frame inversion drive"). Thus, in the latter frame, the first switch of CS voltages at the same timing as in the former frame, i.e., after (e.g., 2 H after) the TFTs have been turned OFF, will be a fall from the first voltage level to the second voltage level. The CS voltages switch between the first and second voltage levels every 10 H period. That is why supposing the first voltage level 10 H+ the second voltage level 10 H=20 H is one period, V-Total=803 H is 40 periods plus 3 H. And if the first switch of the CS voltages in one frame is a rise from the second voltage level to the first voltage level, then the last period (in 803 H periods) will finish with the first voltage level. In the next frame, the first voltage level should change into the second voltage level. Thus, the first voltage level of the previous frame changes into the second voltage level. At this time, however, the CS voltages do not switch every 10 H but change in the order of the second voltage level (10 H), the first voltage level (3 H) and then the second voltage level (10 H) as shown in FIG. 41B.

In this case, the subpixels 1-*a*-A, 1-*b*-A, 1-*c*-A, etc. on the first row of pixels G:001, the subpixels 11-*a*-B, 11-*b*-B, 11-*c*-B, etc. on the eleventh row of pixels G:011 and the subpixels 12-*a*-A, 12-*b*-A, 12-*c*-A, etc. on the twelfth row of pixels G:012 are connected to the same CS trunk CS1 (see FIG. 38 and FIGS. 39A through 39C). As for the subpixels 1-*a*-A, 1-*c*-A, etc. on the first row of pixels, the first change of CS voltages after the TFTs on the first row of pixels have been turned OFF is a rise from the second voltage level to the first voltage level. As a result, those subpixels will look bright. Meanwhile, the subpixels on the eleventh row of pixels and the subpixels on the twelfth row of pixels are also connected to the same CS trunk CS1. And the first change of CS voltages after the TFTs on the twelfth row of pixels have been turned OFF is a fall from the first voltage level to the second voltage level. As a result, the subpixels 12-*a*-A, 12-*c*-A, etc. on the twelfth row of pixels will also look bright but the subpixels 11-*a*-B, 11-*c*-B, etc. on the eleventh row of pixels will look dark.

In this case, the subpixels 1-*a*-A, 1-*c*-A, etc. on the first row of pixels will become bright subpixels by taking advantage of the rise from the second voltage level of the oscillating voltage of CS1 to the first voltage level thereof, while the subpixels 12-*a*-A, 12-*c*-A, etc. on the twelfth row of pixels will also become bright subpixels by taking advantage of the fall from the first voltage level to the second voltage level.

Consequently, comparing the effective values of voltages applied to the subpixels 1-*a*-A, 1-*c*-A, etc. on the first row of pixels to those of voltages applied to the subpixels 12-*a*-A, 12-*c*-A, etc. on the twelfth row of pixels in one frame (i.e., the areas of the hatched portions of FIG. 41C) in a situation where V-Total=803 H, it can be seen that the overall area of the subpixels 12-*a*-A, 12-*c*-A, etc. on the twelfth row of pixels is greater than that of the subpixels 1-*a*-A, 1-*c*-A, etc. by the area of the portion with the darker shadow (with a width of 7 H (=10 H−3 H)). That is to say, the subpixels 12-*a*-A, 12-*c*-A, etc. have the higher luminance.

As can be seen, even if the subpixels are connected to the same CS trunk just about every ten rows of pixels (i.e., $1^{st}$, $12^{th}$, $21^{st}$, $32^{nd}$, $41^{st}$ and $52^{nd}$ rows and so on), the bright subpixels on the $12^{th}$, $32^{nd}$ and $52^{nd}$ rows will look brighter than the counterparts on the $1^{st}$, $21^{st}$ and $31^{st}$ rows. The same statement applies to every CS trunk. That is why when video is viewed on this display device, the first through tenth rows of pixels will look dark, the eleventh through twentieth rows of pixels will look bright, and the twenty-first through thirtieth rows of pixels will look dark as shown in FIG. 38. That is to say, bright and dark stripes will alternate with each other every ten rows of pixels. In the foregoing example, the bright subpixels contribute more greatly to the display operation than the dark subpixels do. That is why the bright subpixels have been described mainly and the description of the dark subpixels is omitted herein.

In the example shown in FIG. 41C, the effective value of the voltage applied to respective subpixels on the $1^{st}$, $3^{rd}$, $5^{th}$, $7^{th}$ and other odd-numbered rows of pixels is different from that of the voltage applied to their counterparts on the $2^{nd}$, $4^{th}$, $6^{th}$, $8^{th}$ and other even-numbered rows of pixels by the luminance represented by the portions with horizontal stripes (with a width of 1 H) in FIG. 41C. However, as this bright/dark state transition occurs every row of pixels, the difference is very difficult to sense on the overall screen, thus causing almost no problem in practice.

A liquid crystal display device and its driving method according to the preferred embodiment to be described below can overcome these problems.

Specifically, in the liquid crystal display device of this preferred embodiment, a CS voltage supplied through each of multiple CS bus lines (CS trunks) has a first period (A) with a first waveform and a second period (B) with a second waveform within one vertical scanning period (V-Total) of an input video signal. The sum of the first and second periods is equal to one vertical scanning period (V-Total=A+B). The first waveform oscillates between first and second voltage levels in a first cycle time $P_A$, which is an integral number of times as long as, and at least twice as long as, one horizontal scanning period (H). And the second waveform is defined such that the CS voltage has a predetermined effective value every predetermined number of consecutive vertical scanning periods, the number being equal to or smaller than 20. For example, if 10 different types of CS voltages are supplied through CS trunks of 10 phases, the effective value of every CS voltage is defined to be a predetermined constant value.

As can be seen from the above-described reason why those stripes are seen on the screen, if the connection pattern is designed such that the storage capacitor counter voltages on mutually different rows of pixels that are connected to the same CS trunk have a predetermined effective value, no stripes will be produced. In this case, during an effective scanning period (V-Disp), the CS voltage needs to oscillate between first and second voltage levels in a constant cycle time. In a vertical blanking interval (V-Blank) in which no video is presented, however, the CS voltage does not have to oscillate between first and second voltage levels in a constant cycle time. But if the CS voltage has a predetermined effective value every predetermined number of consecutive vertical scanning periods, the number being equal to or smaller than 20, then the image on the entire display screen can be uniform. If the predetermined number exceeded 20, the effects that should be achieved by setting the effective value of the CS voltage to be a predetermined constant value could not be achieved fully (i.e., the CS voltage would not be averaged sufficiently with time) and stripes could be visible on the screen.

The first period is associated with the effective scanning period and the second period is associated with the vertical blanking interval. However, the phases of these two periods do not agree with each other and the lengths thereof are not (and need not be) exactly equal to each other, either. As described above, one vertical scanning period is defined herein as an interval between a point in time when one scan line is selected and a point in time when the next scan line is selected. That is to say, a time period in which a gate voltage applied to a gate bus line is high is one vertical scanning period. On the other hand, when a predetermined amount of time (of 0 H to 2 H, for example) passes after the TFTs connected to the associated gate bus line have been turned OFF, the CS signal changes from a first voltage level into a second voltage level, or vice versa (i.e., either rises or falls), and then repeatedly alternates between the first and second voltage levels. That is to say, when those TFTs are turned ON, the CS voltage already has a waveform that oscillates in a first cycle time $P_A$. That is why its phase (represented by the start point of one period) shifts from the start point of one vertical scanning period accordingly. These points will be described in detail later by way of specific examples.

The predetermined effective value of the storage capacitor counter voltage, which becomes constant through a predetermined number of (and 20 or less) consecutive vertical scanning periods, may be set equal to, but does not have to be equal to, either the average or effective value between the first and second voltage levels of the first waveform. The predetermined effective value does not have to be equal to either the average or effective value of the second waveform, either. Also, although the first waveform is an oscillating wave, the second waveform may or may not be an oscillating wave. Furthermore, even if the second waveform is an oscillating wave, its voltage levels (which will be referred to herein as "third and fourth voltage levels") do not have to be equal to the first and second voltage levels of the first waveform, either. Nevertheless, if both of the first and second waveforms are rectangular waves that oscillate between the first and second voltage levels and have a duty ratio of one to one, then the driver can be simplified. The oscillating wave does not have to be a rectangular wave but may also be a sine wave, a triangular wave or any other wave. Furthermore, if the second waveform is not an oscillating wave, then a waveform that has not only the first and second voltage levels but also a fifth voltage level, which is different from any of the first through fourth voltage levels mentioned above, is used.

The number of periods, through which the effective value of the CS voltage is a predetermined constant value, is preferably four or less. This is because the reason why the voltages applied through the same CS trunk to the storage capacitor counter electrodes on mutually different rows of pixels have different effective values is that one vertical scanning period is not an integral number of times as long as one period of oscillation of the CS voltage and that the vertical blanking interval in one vertical scanning period is not fixed as described above. The vertical blanking interval is not fixed. However, if there are at least four vertical scanning periods (i.e., four frame periods), the effective value of the CS voltage can be a predetermined constant value according to virtually every driving method currently available. For example, according to a driving method, one vertical blanking interval changes its lengths every vertical scanning period (i.e., is an odd number of times as long as one horizontal scanning period in one vertical scanning period but is an even number of times as long as one horizontal scanning period in the next vertical scanning period). Even so, if there are four vertical scanning periods, which are twice as long as one cycle time in which the vertical blanking intervals are switched (i.e., two vertical scanning periods), the effective value can be a predetermined constant value. And if one vertical blanking interval is fixed to be either an odd number of times, or an even number of times, as long as one horizontal scanning period, the effective value can also be a predetermined constant value as long as there are at least two vertical scanning periods.

One period of oscillation of the first waveform (i.e., the first cycle time $P_A$) is an integral number of times as long as, and at least twice as long as, one horizontal scanning period (H). If the Type I arrangement, including an even number L of electrically independent CS trunks, is adopted, the first cycle time $P_A$ can be L times (=L·H) as long as one horizontal scanning period. On the other hand, if the Type II arrangement is adopted, the first cycle time $P_A$ can be 2·K·L times as long as one horizontal scanning period, where K is a positive integer. In this case, a part of the first cycle time at the first voltage level is preferably as long as the other part of the first cycle time at the second voltage level.

Suppose the rest of one vertical scanning period other than the first period in which the CS voltage has the first waveform (i.e., the second period in which the CS voltage has the second waveform) is an even number of times as long as one horizontal scanning period. If a part of the second waveform of the second period at the first voltage level is as long as another part of the second waveform at the second voltage level, then the effective value of the second waveform can be fixed at the average between the first and second voltage levels. This can be done no matter whether the frame inversion drive is adopted or not.

If the frame inversion drive is adopted and if the second period is an odd number of times as long as one horizontal scanning period, a part of the second period of a vertical scanning period at the first voltage level may be shorter than another part of the second period at the second voltage level by one horizontal scanning period. In that case, if a part of the second period of the next vertical scanning period at the first voltage level is shorter than another part of the second period at the second voltage level by one horizontal scanning period, then the second waveforms of two consecutive vertical scanning periods can have a constant effective value.

Furthermore, if the frame inversion drive is adopted, the first period may be a half-integral number of times (i.e., an (integer+a half) number of times) as long as the first cycle time.

For example, if the display area has a number N of pixel rows, an effective display period (V-Disp) is N times as long as one horizontal scanning period (if V-Disp=N·H), and the first cycle time is identified by $P_A$, the first period (A) is defined so as to satisfy $A=[\mathrm{Int}\{(N\cdot H-P_A/2)/P_A\}+1/2]\cdot P_A+M\cdot P_A$, where Int(x) is an integral part of an arbitrary real number x and M is an integer that is equal to or greater than zero.

Alternatively, if one vertical scanning period (V-Total) is Q times as long as one horizontal scanning period (if V-Total=Q·H) where Q is a positive integer and if the first cycle time is identified by $P_A$, the first period (A) may be defined so as to satisfy $A=[\mathrm{Int}\{(Q\cdot H-P_A/2)/P_A\}+1/2]\cdot P_A$, where Int(x) is an integral part of an arbitrary real number x.

Still alternatively, if one vertical scanning period (V-Total) is Q times as long as one horizontal scanning period (if V-Total=Q·H) where Q is a positive integer and if the first cycle time is identified by $P_A$, then the first period (A) may also be defined so as to satisfy $A=[\mathrm{Int}\{(Q\cdot H-3\cdot P_A/2)/P_A\}+\frac{1}{2}]\cdot P_A$, where Int(x) is an integral part of an arbitrary real number x.

The first period may be appropriately defined so as to satisfy one of these three equations according to the connection pattern (i.e., either Type I or Type II) of the CS bus lines. As described above, the first cycle time $P_A$ is equal to L·H in Type I but is equal to 2·K·L·H in Type II. That is why depending on the number N of rows of pixels and the number L of storage capacitor trunks in the liquid crystal display device, the first and second periods (A) and (B) may be determined by one of the equations described above using the effective display period (V-Disp) and/or the vertical scanning period (V-Total). The second period (B) can be calculated by subtracting the first period (A) from one vertical scanning period (V-Total).

Suppose the waveform of the CS voltage during the second period, i.e., the second waveform, oscillates between the third and fourth voltage levels. In that case, the average of the third and fourth voltage levels is preferably set equal to that of the first and second voltage levels. And it is most preferable to set the third and fourth voltage levels equal to the first and second voltage levels, respectively, to simplify the circuit configuration.

In this case, if B/H is an even number, the waveform is preferably defined such that the period at the third voltage level is as long as the period at the fourth voltage level. On the other hand, if B/H is an odd number, a part of a vertical scanning period at the third voltage level is preferably shorter than another part of the period at the fourth voltage level by one horizontal scanning period. Likewise, in the second period of the next vertical scanning period, part of the second period at the third voltage level is also preferably shorter than the other part of the second period at the fourth voltage level by one horizontal scanning period.

The Q value (i.e., how many times one vertical scanning period (V-Total) is longer than one horizontal scanning period) can be obtained by counting the number of times the gate voltage becomes high since the gate voltage for the gate bus line associated with the first row (i.e., the first gate start pulse) has been asserted and until the gate voltage for the gate bus line associated with the first row is asserted next time. In this case, Q is preferably calculated on a video signal that was supplied two frames ago. This is because if Q should be calculated on the video signal representing the current frame that is going to be presented, a frame memory would be needed, thus complicating the circuit configuration and increasing the cost excessively. Also, if Q is calculated on a video signal that was supplied one frame ago, then the situation where even- and odd-numbered frames have different vertical scanning periods cannot be coped with. However, if Q is calculated on a video signal that was supplied two frames ago, then there is no need to provide a frame memory and almost all methods of setting a vertical scanning period can be coped with.

Hereinafter, preferred embodiments of a liquid crystal display device and its driving method according to the present invention will be described in further detail by way of specific examples.

Embodiment 1

First, an exemplary method for driving a Type I liquid crystal display device will be described with reference to FIGS. 42A through 42D. The liquid crystal display device of this example may be the TypeI-1 LCD shown in FIG. 31(*a*), for example.

In this example, a video signal with a V-Total of 803 H, a V-Blank of 35 H, and a V-Disp of 768 H is received, CS voltages of ten phases are supplied, the first waveform (in the first period) of the CS voltage oscillates between first and second voltage levels in an oscillation period of 10 H (which is the first cycle time $P_A$), and the frame inversion drive is carried out by the 1 H dot inversion technique. FIG. 42A shows the gate voltages supplied to a gate bus line G:001 for the first row and a gate bus line G:766 for the $766^{th}$ row, the CS voltage and the voltage applied to pixels (only the voltage applied to bright subpixels is shown). In FIGS. 42B to 42D, the gate voltage is omitted and only the CS voltage and the voltage applied to pixels are shown.

After a display signal voltage has been written on pixels on the first row (i.e., after their associated TFTs have been turned OFF), the CS voltage CS1 on the CS bus line CS1 that is connected to the first row of pixels changes from the second voltage level into the first voltage level. In the following description, a CS voltage and its associated CS trunk will be identified by the same reference numeral. This CS voltage CS1 has been at the second voltage level for at least 5 H when the second voltage level changes into the first voltage level. And once the CS voltage has changed its voltage levels, the CS voltage will repeatedly change its levels from the first voltage level into the second voltage level, and vice versa, every 5 H (which corresponds to the first waveform). That is to say, the start point of the first waveform of the CS voltage (i.e., the start point of the first period) is set earlier than the point in time when the TFT connected to the gate bus line for the associated row of pixels is turned OFF by at least a half of one cycle time of the first waveform (i.e., the first cycle time $P_A$). The same statement will also apply to the second through eighth preferred embodiments to be described below.

Hereinafter, it will be described why the CS voltage has been at the second voltage level for at least 5 H when the CS voltage changes its levels for the first time after the TFT has been turned OFF. In this preferred embodiment, a number of independent CS voltages of multiple phases are used to extend one cycle time in which the CS voltage changes its levels (i.e., one period of oscillation) and thereby supply equivalent CS voltages with no waveform blunting to respective rows of pixels. To supply those equivalent CS voltages to respective rows of pixels that are connected to the same CS trunk, a period of time of at least 5 H (which is a half or more as long as the first cycle time $P_A$) is guaranteed before the CS voltage changes its levels for the first time after the TFTs have been turned OFF.

The last one of the rows of effective pixels that are connected to this CS trunk CS1 is a row of pixels to be selected by the $766^{th}$ gate bus line G:766. And once the CS voltage changes its levels from the first voltage level into the second voltage level after the display signal voltage has been written on the $766^{th}$ row of pixels, there is no need to change the voltage levels every 5 H (i.e., in an oscillation period of 10 H) in the 38 H period (which is the second period or period B in which the first and second voltage levels are allocated equally) before the display signal voltage of the next frame starts being written on the pixels of the $1^{st}$ row again. However, to equalize the CS voltage levels of all rows of pixels with each other, the CS voltage needs to have been at the first voltage level for 5 H when the CS voltage changes its levels from the first voltage level into the second voltage level after the display signal voltage has been written on the pixels of the first row in the next frame.

That is why as shown in FIG. 42, the CS voltage CS1 has been at the second voltage level for 5 H when the CS voltage changes its levels from the second voltage level into the first voltage level after the display signal voltage has been written on the first row of pixels. After that, the CS voltage CS1 will switch its levels between the first and second voltage levels every 5 H. And after the display signal voltage has been written on the 766$^{th}$ row of pixels and before the display signal voltage of the next frame starts being written on the first row of pixels, the CS voltage CS1 changes its levels at least once from the second voltage level into the first voltage level.

In the remaining 38 H period (=803 H−765 H, which is the second period) after the voltage levels have been switched every 5 H for the 765 H period (which is the first period), the second waveform, of which a part at the first voltage level is as long as the other part at the second voltage level, is supposed to be adopted. As for this 38 H period (i.e., the second period), the sum of the periods at the first voltage level just needs to be as long as that of the periods at the second voltage level, and the cycle time is not particularly limited. Specifically, each of the periods at the first and second voltage levels may be 19 H as shown in the upper portion of FIG. 42. Alternatively, periods in which the first and second voltage levels switch every 5 H may be combined with periods in which the first and second voltage levels switch every H as shown in the lower portion of FIG. 42. Still alternatively, an oscillating waveform in which these two voltage levels alternate at an interval of less than 1 H may even be adopted. Furthermore, a waveform with a fifth voltage level, which is different from the first and second voltage levels, may also be adopted.

By supplying these CS voltages, the stripes shown in FIG. 34 can be eliminated and good display performance is realized.

In the example illustrated in FIG. 42, V-Total=803 H. However, if V-Total=809 H (V-Blank=44 H), the second waveform after the 765 H oscillation period (i.e., the first period) is over may have a first voltage level period of 22 H and a second voltage level period of 22 H.

In this preferred embodiment, the second period is an even number of times as long as one horizontal scanning period H (i.e., 38 H or 44 H). Therefore, the effective value of the second waveform of the CS voltages may be defined to be a predetermined constant value during one vertical scanning period (e.g., the average of the first and second voltage levels in this example). Since the first period is 765 H and since the effective value of the first waveform of the CS voltages is not equal to the average of the first and second voltage levels but is a constant value, the effective value of the CS voltages can be a constant value in the overall vertical scanning period. Consequently, the stripes shown in FIG. 34 are not visible on the screen.

Embodiment 2

Next, another exemplary method for driving a Type I liquid crystal display device will be described with reference to FIGS. 43 and 44. The liquid crystal display device of this example may be the TypeI-1 LCD shown in FIG. 31(*a*), for example.

In this example, a video signal with a V-Total of 804 H, a V-Blank of 36 H, and a V-Disp of 768 H is received, CS voltages of ten phases are supplied, the first waveform (in the first period) of the CS voltage oscillates between first and second voltage levels in an oscillation period of 10 H (which is the first cycle time $P_A$), and the frame inversion drive is carried out by the 1 H dot inversion technique.

The CS voltages have almost the same waveforms as the first preferred embodiment described above. However, as V-Total increases by 1 H, the first period remains 765 H but the second period increases by 1 H to 39 H. If the second period of 39 H is evenly split into two periods to be allocated to the first and second voltage levels, respectively, then each of those two periods becomes 19.5 H. However, as it is difficult, and would raise the price of the circuit excessively, to allocate the 0.5 H period according to the current signal processing technology, the 39 H period is actually split into a 19 H period and a 20 H period. In this case, if those two periods always came up in the order of 19 H and 20 H as shown in FIG. 43, then a number of rows of pixels that are connected to the same CS trunk CS1 would be classified into a group of rows of pixels that are always bright for 19 H (including the 1$^{st}$, 11$^{th}$, 21$^{st}$ and other rows of pixels) and another group of rows of pixels that are always bright for 20 H (including the 6$^{th}$, . . . 756$^{th}$, and 766$^{th}$ rows of pixels). As for the voltages applied to those pixels, a difference would be made in the applied voltage in the shadowed periods, thus causing a luminance difference and producing bright and dark stripes such as those shown in FIG. 34.

In this manner, if the second period is an odd number of times as long as one horizontal scanning period H, then the first and second voltage level periods are defined to be 19 H and 20 H, respectively, for one frame and to be 19 H and 20 H again, respectively, for the next frame as shown in FIG. 44. That is to say, in any pair of two consecutive frames, the first voltage level period is set shorter than the second voltage level period by 1 H. In that case, the 6$^{th}$, . . . 756$^{th}$ and 766$^{th}$ rows of pixels will be brighter than the 1$^{st}$, 11$^{th}$, 21$^{st}$ and other rows of pixels in one frame, but the 1$^{st}$, 11$^{th}$, 21$^{st}$ and other rows of pixels will be brighter than the 6$^{th}$, . . . 756$^{th}$ and 766$^{th}$ rows of pixels in the next frame. Consequently, in these two consecutive frames, the luminance levels can be equalized with each other on the 1$^{st}$, 6$^{th}$, 11$^{th}$, 16$^{th}$ . . . 756$^{th}$ and 766$^{th}$ rows of pixels, thus eliminating the stripes.

In this preferred embodiment, the second period is 39 H, which is an odd number of times as long as one horizontal scanning period H, and therefore, it is difficult to set the effective value of the second waveform of the CS voltages equal to a predetermined constant value within one vertical scanning period. That is why the effective value is set to be a predetermined constant value every two consecutive vertical scanning periods. Naturally, it is possible to set the effective value equal to a constant value every more than two consecutive frame periods. However, if the interval were 20 or more frame periods, then the effect of equalizing the effective values could not be achieved fully. For that reason, the effective value is preferably made constant in as short an interval as possible. Specifically, the interval is preferably four frame periods or less. In this example, two frame periods are the shortest and most preferable interval.

In the liquid crystal display device of the first preferred embodiment described above, the second period is an even number of times as long as one horizontal scanning period, and therefore, the effective value of the second waveform can be set equal to a predetermined constant value every vertical scanning period. Alternatively, the effective value may be set equal to a predetermined value every two or more consecutive vertical scanning periods as is done in this preferred embodiment.

Embodiment 3

Next, still another exemplary method for driving a Type I liquid crystal display device will be described with reference to FIGS. 45A and 45B. The liquid crystal display device of this example may be the TypeI-1 LCD shown in FIG. 31(*a*), for example.

In this example, a video signal with a V-Total of 804 H, a V-Blank of 36 H, and a V-Disp of 768 H and a video signal with a V-Total of 803 H, a V-Blank of 35 H, and a V-Disp of 768 H are received alternately every other frame, CS voltages of ten phases are supplied, the first waveform (in the first period) of the CS voltage oscillates between first and second voltage levels in an oscillation period of 10 H (which is the first cycle time $P_A$), and the frame inversion drive is carried out by the 1 H dot inversion technique.

The CS voltages have almost the same waveforms as the preferred embodiments described above. However, when V-Total is 804 H, the first period is 765 H but the second period is 39 H. If the second period is evenly split into two periods to be allocated to the first and second voltage levels, respectively, then each of those two periods becomes 19.5 H. As already described for the second preferred embodiment, it is difficult, and would raise the price of the circuit excessively, to allocate the 0.5 H period according to the current signal processing technology. That is why the 39 H period is actually split into a 19 H period and a 20 H period. On the other hand, when V-Total is 803 H, the first period remains the same but the second period is 38 H. Thus, the second period can be evenly split of two periods of 19 H each.

In this case, if one frame has a V-Total of 804 H, the CS voltage in the second period (i.e., the second waveform) has a first voltage level period of 19 H and a second voltage level period of 20 H as shown in FIG. 45A. As V-Total=803 H in the next frame, the second waveform has a first voltage level period of 19 H and a second voltage level period of 19 H. As V-Total=804 H again in the third frame, the second waveform has a first voltage level period of 20 H and a second voltage level period of 19 H. And in the frame that follows, V-Total=803 H again, and therefore, the second waveform has a first voltage level period of 19 H and a second voltage level period of 19 H.

If the second period alternately becomes an even number of times, and an odd number of times, as long as one horizontal scanning period every vertical scanning period as described above, the stripes can be eliminated and good display performance is realized by setting the effective value of the second waveform of the CS voltage equal to a predetermined constant value every four consecutive frame periods. Alternatively, the effective value of the second waveform may also be set equal to a predetermined constant value every more than four frame periods. And the second waveform is not limited to that waveform, either. Optionally, the second waveform may be defined such that the first and second voltage levels switch every horizontal scanning period H as shown in FIG. 45B, for example.

Embodiment 4

Next, an exemplary method for driving a Type II liquid crystal display device will be described with reference to FIGS. 46A through 46D. The liquid crystal display device of this example may be the TypeII-1 LCD shown in FIG. 32(*a*), for example.

In this example, a video signal with a V-Total of 804 H, a V-Blank of 36 H, and a V-Disp of 768 H is received, CS voltages of ten phases are supplied, the first waveform (in the first period) of the CS voltage oscillates between first and second voltage levels in an oscillation period of 20 H (which is the first cycle time $P_A$), and the frame inversion drive is carried out by the 1 H dot inversion technique.

After a display signal voltage has been written on pixels on the first row (i.e., after their associated TFTs have been turned OFF), the CS voltage CS1 on the CS bus line CS1 that is connected to the first row of pixels changes from the second voltage level into the first voltage level. This CS voltage CS1 has been at the second voltage level for at least 10 H when the second voltage level changes into the first voltage level. And once the CS voltage has changed its voltage levels, the CS voltage will repeatedly change its levels from the first voltage level into the second voltage level, and vice versa, every 10 H.

In this case, the CS voltage has been at the second voltage level for at least 10 H (i.e., for at least a half of one oscillation period) when the CS voltage changes its voltage levels in order to supply equivalent CS voltages to the respective rows of pixels that are connected to the same CS trunk as already described for the first preferred embodiment.

The last one of the rows of effective pixels that are connected to this CS trunk CS1 is a row of pixels to be selected by the 761$^{st}$ gate bus line G:761. And once the CS voltage changes its levels from the second voltage level into the first voltage level after the display signal voltage has been written on the 761$^{st}$ row of pixels, there is no need to change the voltage levels every 10 H (i.e., in an oscillation period of 20 H) in the remaining 44 H period (i.e., the second period) before the display signal voltage of the next frame starts being written on the pixels of the 1$^{st}$ row again. However, to equalize the CS voltage levels of all rows of pixels with each other, the CS voltage needs to have been at the first voltage level for 10 H when the CS voltage changes its levels from the first voltage level into the second voltage level after the display signal voltage has been written on the pixels of the first row in the next frame.

That is why as shown in FIG. 46A, the CS voltage CS1 has been at the second voltage level for 10 H when the CS voltage changes its levels from the second voltage level into the first voltage level after the display signal voltage has been written on the first row of pixels. After that, the CS voltage CS1 will switch its levels between the first and second voltage levels every 10 H. And after the display signal voltage has been written on the 761$^{st}$ row of pixels and before the display signal voltage of the next frame starts being written on the first row of pixels, the CS voltage CS1 changes its levels at least once from the second voltage level into the first voltage level.

In the remaining 34 H period (=804 H−770 H, which is the second period) after the voltage levels have been switched every 10 H for the 770 H period (which is the first period), the second waveform, of which a part at the first voltage level is as long as the other part at the second voltage level, is supposed to be adopted. As for this 34 H period (i.e., the second period), the sum of the periods at the first voltage level just needs to be as long as that of the periods at the second voltage level, and the cycle time is not particularly limited. Specifically, each of the periods at the first and second voltage levels may be 17 H as shown in FIG. 46A. Alternatively, the first and second voltage levels may switch every H as shown in FIG. 46C. Still alternatively, an oscillating waveform in which these two voltage levels alternate at an interval of less than 1 H may even be adopted. Furthermore, a waveform with a fifth voltage level, which is different from the first and second voltage levels, may also be adopted as shown in FIG. 46D.

By supplying these CS voltages, the stripes shown in FIG. 38 can be eliminated and good display performance is realized.

In the examples illustrated in FIGS. 46A through 46D, V-Total=804 H. However, if V-Total=810 H (V-Blank=40 H), the second waveform after the 770 H oscillation period (i.e., the first period) is over may have a first voltage level period of 20 H and a second voltage level period of 20 H.

In this preferred embodiment, the second period is an even number of times as long as one horizontal scanning period H as in the liquid crystal display device of the first preferred embodiment described above. Therefore, the effective value of the second waveform of the CS voltages may be defined to be a predetermined constant value during one vertical scanning period (e.g., the average of the first and second voltage levels in this example). Also, the first period is 770 H and the effective value of the first waveform of the CS voltages may be equal to the average of the first and second voltage levels, too.

Embodiment 5

Next, another exemplary method for driving a Type II liquid crystal display device will be described with reference to FIGS. 47A through 47D and FIG. 48. The liquid crystal display device of this example may be the TypeII-1 LCD shown in FIG. 32(*a*), for example.

In this example, a video signal with a V-Total of 803 H, a V-Blank of 35 H, and a V-Disp of 768 H is received, CS voltages of ten phases are supplied, the first waveform (in the first period) of the CS voltage oscillates between first and second voltage levels in an oscillation period of 20 H (which is the first cycle time $P_A$), and the frame inversion drive is carried out by the 1 H dot inversion technique.

The CS voltages have almost the same waveforms as the fourth preferred embodiment described above. However, as V-Total decreases by 1 H, the first period remains 770 H but the second period decreases by 1 H to 33 H. If the second period of 33 H is evenly split into two periods to be allocated to the first and second voltage levels, respectively, then each of those two periods becomes 16.5 H. However, as it is difficult, and would raise the price of the circuit excessively, to allocate the 0.5 H period according to the current signal processing technology, the 33 H period is actually split into a 17 H period and a 16 H period. In this case, if those two periods always came up in the order of 16 H and 17 H as shown in FIG. 47B, then a number of rows of pixels that are connected to the same CS trunk CS1 would be classified into a group of rows of pixels that are always bright for 16 H (including the 1st, 21st, 41st and other rows of pixels) and another group of rows of pixels that are always bright for 17 H (including the 12th, 32nd, 52nd and other rows of pixels). As for the voltages applied to those pixels, a difference would be made in the applied voltage in the shadowed periods, thus causing a luminance difference and producing bright and dark stripes such as those shown in FIG. 38. In this case, there is also a difference in applied voltage between the 1st, 3rd, 5th, 7th and 9th rows of pixels and the 2nd, 4th, 6th, 8th and 10th rows of pixels as indicated by the horizontal stripes (with a width of 1 H) in FIG. 47C. However, as the bright and dark states alternate every row of pixels, the display quality is hardly affected. On the other hand, the even split of the second period into the first and second voltage level periods occurs every 10 rows of pixels, thus producing quite visible unevenness in brightness on the screen.

Therefore, if the second period to be evenly split into the first and second voltage level periods is an odd number of times as long as one horizontal scanning period H, then the first and second voltage level periods are defined to be 16 H and 17 H, respectively, for one frame and to be 16 H and 17 H again, respectively, for the next frame as shown in FIG. 48. That is to say, in any pair of two consecutive frames, the first voltage level period is set shorter than the second voltage level period by 1 H. In that case, the 12th, 32nd, 52nd and other rows of pixels will be brighter than the 1st, 21st, 41st and other rows of pixels in one frame, but the 1st, 21st, 41st and other rows of pixels will be brighter than the 12th, 32nd, 52nd and other rows of pixels in the next frame. Consequently, in these two consecutive frames, the luminance levels can be equalized with each other on the 1st, 12th, 21st, 32nd, 41st, 52nd and other rows of pixels, thus eliminating the stripes. Optionally, the second waveform may be defined such that the first and second voltage levels switch every horizontal scanning period H as shown in FIG. 47D.

In this preferred embodiment, the second period is 33 H, which is an odd number of times as long as one horizontal scanning period H, and therefore, it is difficult to set the effective value of the second waveform of the CS voltages equal to a predetermined constant value within one vertical scanning period. That is why the effective value is set to be a predetermined constant value every two consecutive vertical scanning periods. Naturally, it is possible to set the effective value equal to a constant value every more than two consecutive frame periods. However, if the interval were 20 or more frame periods, then the effect of equalizing the effective values could not be achieved fully. For that reason, the effective value is preferably made constant in as short an interval as possible. Specifically, the interval is preferably four frame periods or less. In this example, two frame periods are the shortest and most preferable interval.

In the liquid crystal display device of the fourth preferred embodiment described above, the second period is an even number of times as long as one horizontal scanning period, and therefore, the effective value of the second waveform can be set equal to a predetermined constant value every vertical scanning period. Alternatively, the effective value may be set equal to a predetermined value every two or more consecutive vertical scanning periods as is done in this preferred embodiment.

Embodiment 6

Next, still another exemplary method for driving a Type II liquid crystal display device will be described with reference to FIGS. 49A through 49D. The liquid crystal display device of this example may be the TypeII-1 LCD shown in FIG. 32(*a*), for example.

In this example, a video signal with a V-Total of 804 H, a V-Blank of 36 H, and a V-Disp of 768 H and a video signal with a V-Total of 803 H, a V-Blank of 35 H, and a V-Disp of 768 H are received alternately every other frame, CS voltages of ten phases are supplied, the first waveform (in the first period) of the CS voltage oscillates between first and second voltage levels in an oscillation period of 20 H (which is the first cycle time $P_A$), and the frame inversion drive is carried out by the 1 H dot inversion technique.

The CS voltages have almost the same waveforms as the fourth and fifth preferred embodiments described above.

However, when V-Total is 804 H, the first period is 770 H and the second period is 34 H. Thus, the second period may be evenly split into first and second voltage level periods of 17 H each. On the other hand, when V-Total is 803 H, the first period remains 770 H but the second period is 33 H. If the second period is evenly split into two periods to be allocated to the first and second voltage levels, respectively, then each of those two periods becomes 16.5 H. As it is difficult, and would raise the price of the circuit excessively, to allocate the 0.5 H period according to the current signal processing technology, the 33 H period is actually split into a 17 H period and a 16 H period.

In this case, if one frame has a V-Total of 804 H, the CS voltage in the second period (i.e., the second waveform) has a first voltage level period of 17 H and a second voltage level period of 17 H as shown in FIG. 49A. As V-Total=803 H in the next frame, the second waveform has a first voltage level period of 16 H and a second voltage level period of 17 H as shown in FIG. 49A. As V-Total=804 H again in the third frame, the second waveform has a first voltage level period of 17 H and a second voltage level period of 17 H. And in the frame that follows, V-Total=803 H again, and therefore, the second waveform has a first voltage level period of 17 H and a second voltage level period of 16 H as shown in FIG. 49B.

In FIGS. 49A and 49B, there is also a difference in applied voltage between the $1^{st}$, $3^{rd}$, $5^{th}$, $7^{th}$ and $9^{th}$ rows of pixels and the $2^{nd}$, $4^{th}$, $6^{th}$, $8^{th}$ and $10^{th}$ rows of pixels as indicated by the horizontal stripes (with a width of 1 H). However, as the bright and dark states alternate every row of pixels, the display quality is hardly affected.

If the second period alternately becomes an even number of times, and an odd number of times, as long as one horizontal scanning period every vertical scanning period as described above, the stripes can be eliminated and good display performance is realized by setting the effective value of the second waveform of the CS voltage equal to a predetermined constant value every four consecutive frame periods. Alternatively, the effective value of the second waveform may also be set equal to a predetermined constant value every more than four frame periods. And the second waveform is not limited to that waveform, either. Optionally, the second waveform may be defined such that the first and second voltage levels switch every horizontal scanning period H as shown in FIGS. 49C and 49D, for example.

Embodiment 7

Next, still another exemplary method for driving a Type I liquid crystal display device will be described with reference to FIGS. 50 and 51. The liquid crystal display device of this example may be the TypeI-1 LCD shown in FIG. 31(*a*), for example.

In the first, second and third preferred embodiments of the Type I liquid crystal display device described above, the CS voltages are supposed to have a first period with a periodic oscillation of 765 H out of a V-Total of 803 H or 804 H and a second period of 38 H for the first preferred embodiment, 39 H for the second preferred embodiment, and 39 H and 38 H that alternate frame by frame for the third preferred embodiment.

However, the length of the first period is not limited to these specific examples. Alternatively, 795 H out of a V-Total of 803 H may be the first period in which the wave oscillates in a cycle time of 10 H, and the remaining 8 H or 9 H period may be the second period as shown in FIG. 50.

In this manner, the more regular one period of oscillation of the CS voltage (i.e., the longer the first period), the more significantly the display quality and reliability can be improved.

If the pixels form a number N of pixel rows, an effective display period (V-Disp) is N times as long as one horizontal scanning period (if V-Disp=N·H), and one period of oscillation of the first waveform of the CS voltages has a first cycle time $P_A$, then the first period (A) satisfies $A=[\mathrm{Int}\{(N\cdot H—P_A/2)/P_A\}+½]\cdot P_A+M\cdot P_A$, where Int(x) is an integral part of an arbitrary real number x and M is an integer that is equal to or greater than zero.

Supposing N=768 and $P_A$=10 H, Int{(768 H−5 H)/10 H}=76. As a result, A=765 H+M·10 H.

In this case, when M=0, A=765 H. And when M=3, A=795 H. Since the first period (A) is naturally shorter than V-Total, M can be at most equal to three. That is why in this example, the length of the first period may be appropriately controlled within the range of 765 H to 795 H but is most preferably equal to 795 H.

This CS voltage may be generated in response to a CS timing signal that has been generated by the CS controller shown in FIG. 51.

The liquid crystal display device 100 shown in FIG. 51 includes an LCD panel 20, a controller 30, and the CS controller 40. The controller 30 receives a composite video signal, including a video signal and a sync signal, from an external device and supplies a gate start pulse GPS and a gate clock signal GCK to the LCD panel 20 and the CS controller 40. The CS controller 40 supplies a CS timing signal to the LCD panel 20 by performing the processing steps to be described below. In response to the CS timing signal, the LCD panel 20 generates a CS voltage, oscillating between predetermined voltage levels, based on the externally supplied voltage.

The CS controller 40 performs the following processing steps.

First of all, the CS controller 40 calculates an integer Q, the product (Q·H) of which and one horizontal scanning period H is equal to one vertical scanning period (V-Total) of an input video signal. That is to say, the CS controller 40 calculates how many times one vertical scanning period is longer than one horizontal scanning period. The Q value can be obtained by counting the number of times the gate voltage becomes high since the gate voltage for the gate bus line associated with the first row (i.e., the first gate start pulse) has been asserted and until the gate voltage for the gate bus line associated with the first row is asserted next time. This counting may be performed by a known counter, for example. In this case, Q is preferably calculated on a video signal that was supplied two frames ago. This is because if Q should be calculated on the video signal representing the current frame that is going to be presented, a frame memory would be needed, thus complicating the circuit configuration and increasing the cost excessively.

Next, the CS controller 40 calculates A that satisfies A==[Int{(Q−L/2)/L}+½]·L·H (where Int(x) is an integral part of an arbitrary real number x). In this case, as Q=803 (or 804) and L=10 ($P_A$=10 H), A=795 H.

Alternatively, if the number N of pixel rows on the display area is already known (e.g., stored in a memory), then the CS controller 40 may calculate A that satisfies A=[Int{(N−L/2)/L}+½]·L·H+M·L·H (where Int(x) is an integral part of an arbitrary real number x and M is an integer that is equal to or greater than zero) when one horizontal scanning period is identified by H and an effective display period (V-Disp) is N·H. It should be noted that the longest A (=795 H) is preferably calculated.

The processing step of calculating A may be performed by a known arithmetic and logic unit, for example. L (and M) may be stored in a memory, for instance. M is preferably defined such that the length A of the first period is maximized but does not exceed V-Total. Naturally, Q, N, L, K and M may be stored in a memory in advance. Optionally, the calculations may also be done by means of software.

Next, B that satisfies Q·H−A=B is calculated. That is to say, the length of the second period is figured out.

The waveform of the CS voltage during the second period (i.e., the second waveform) is defined such that the average (effective value) during the second period is equal to that of the first and second voltage levels. If the second waveform is an oscillating wave, then the second waveform may oscillate between third and fourth voltage levels and the average of the third and fourth voltage levels may be equal to that of the first and second voltage levels. However, if the third and fourth voltage levels are equal to the first and second voltage levels, respectively, then the circuit configuration can be simplified. On the other hand, if the second waveform is not an oscillating wave, then the circuit will be expensive but a fifth voltage level, which is equal to the average of the first and second voltage levels, may be used.

Also, if the second waveform is an oscillating wave with a cycle time of 2 H or more and if B/H is an even number, then the period at the first voltage level may be defined to be as long as the period at the second voltage level. On the other hand, if B/H is an odd number, the period at the first voltage level may be shorter than the period at the second voltage level by one horizontal scanning period in one vertical scanning period. And in the second period of the next vertical scanning period, the period at the first voltage level may also be shorter than the period at the third voltage level by one horizontal scanning period. Specific examples have already been described with respect to the first through third preferred embodiments and this seventh preferred embodiment.

Embodiment 8

Next, still another exemplary method for driving a Type II liquid crystal display device will be described with reference to FIG. 52. The liquid crystal display device of this example may be the TypeII-1 LCD shown in FIG. 32(*a*), for example.

In the fourth, fifth and sixth preferred embodiments of the Type II liquid crystal display device described above, the CS voltages are supposed to have a first period with a periodic oscillation of 770 H out of a V-Total of 804 H or 803 H and a second period of 34 H for the fourth preferred embodiment, 33 H for the fifth preferred embodiment, and 34 H and 33 H that alternate frame by frame for the sixth preferred embodiment.

However, the length of the first period is not limited to these specific examples. Alternatively, 790 H out of a V-Total of 804 H may be the first period in which the wave oscillates in a cycle time of 20 H, and the remaining 14 H or 13 H period may be the second period as shown in FIG. 52.

In this manner, the more regular one period of oscillation of the CS voltage (i.e., the longer the first period), the more significantly the display quality and reliability can be improved.

If the pixels form a number N of pixel rows, an effective display period (V-Disp) is N times as long as one horizontal scanning period (if V-Disp=N·H), and one period of oscillation of the first waveform of the CS voltages has a first cycle time $P_A$, then the first period (A) satisfies $A=[\mathrm{Int}\{(N\cdot H-P_A/2)/P_A\}+½]\cdot P_A+M\cdot P_A$, where Int(x) is an integral part of an arbitrary real number x and M is an integer that is equal to or greater than zero.

Supposing N=768 and $P_A$=20 H, Int{(768 H−10 H)/20 H}=37. As a result, A=750 H+M·20 H.

In this case, when M=0, A=750 H. And when M=2, A=790 H. Since the first period (A) is naturally shorter than V-Total, M can be at most equal to two. That is why in this example, the length of the first period may be appropriately controlled within the range of 750 H to 790 H but is most preferably equal to 790 H.

As in the seventh preferred embodiment, the CS voltage described above may be generated in response to a CS timing signal that has been generated by the CS controller shown in FIG. 51.

First of all, an integer Q, the product (Q·H) of which and one horizontal scanning period H is equal to one vertical scanning period (V-Total) of an input video signal, is calculated.

Next, A that satisfies $A=[\mathrm{Int}\{(Q-K\cdot L)/(2\cdot K\cdot L)\}+½]\cdot 2\cdot K\cdot L\cdot H$ (where Int(x) is an integral part of an arbitrary real number x and K is a positive integer) is calculated. In this case, as Q=804 (or 803), L=10 and K=1 ($P_A$=20 H), A=790 H.

Alternatively, if the number N of pixel rows on the display area is already known (e.g., stored in a memory), then A that satisfies $A=[\mathrm{Int}\{(N-K\cdot L)/(2\cdot K\cdot L)\}+½]\cdot 2\cdot K\cdot L\cdot H+2\cdot M\cdot K\cdot L\cdot H$ (where Int(x) is an integral part of an arbitrary real number x, K is a positive integer, and M is an integer that is equal to or greater than zero) may be calculated when one horizontal scanning period is identified by H and an effective display period (V-Disp) is N·H. It should be noted that the longest A (=790 H) is preferably calculated.

Next, B that satisfies Q·H−A=B is calculated. That is to say, the length of the second period is figured out.

The waveform of the CS voltage during the second period (i.e., the second waveform) may be defined as already described for the seventh preferred embodiment. Specific examples have already been described with respect to the fourth through sixth preferred embodiments and this eighth preferred embodiment.

Embodiment 9

Next, still another exemplary method for driving a Type I liquid crystal display device will be described with reference to FIG. 53. The liquid crystal display device of this example may be the TypeI-1 LCD shown in FIG. 31(*a*), for example.

In the first through eighth preferred embodiments described above, the start point of the first waveform (i.e., the start point of the first period) of the CS voltage is set earlier than the point in time when the TFTs connected to the gate bus line of the associated row of pixels are turned OFF by at least a half period of the first waveform (i.e., a half of the first cycle time $P_A$). This timing is adopted to supply equivalent CS voltages to all of the rows of pixels that are connected to the same CS trunk. However, the start point of the first waveform of the CS voltage may also be set later than the point in time when the TFTs connected to the gate bus line of the associated row of pixels are turned OFF. A preferred CS voltage waveform in that situation will be described below.

For example, in the seventh preferred embodiment described above, 795 H out of V-Total of 803 H is defined as the first period and the remaining 8 H period as the second period. In that case, that second period of the CS voltage is evenly split into two 4 H periods to be allocated to the first and second voltage levels, respectively. That is why if the start point of the first period is ahead of the point in time when the TFTs on the associated row of pixels are turned OFF by at least a half of the first cycle time $P_A$ as shown in FIG. 50, equivalent CS voltages can be supplied to respective rows of pixels that are connected to the same CS trunk.

However, if the first period is started later (e.g., 1 H later) than the point in time when the TFTs on the associated row of pixels are turned OFF, then the voltage level of the CS voltage that changes after the TFTs connected to Gate:001 for the first row of pixels have been turned OFF will be maintained for 4 H, which is different from the other rows of pixels. This is because the second period is evenly split into two 4 H periods that are allocated to the first and second voltage levels.

To overcome this problem, the liquid crystal display device of this preferred embodiment sets those portions of the second period allocated to the first and second voltage levels to be equal to greater than a half of the first cycle time $P_A$ but equal to or smaller than the first cycle time $P_A$.

Specifically, if V-Total=803 H, the first period may be 785 H, the second period may be the remaining 18 H, and that second period may be evenly split into two 9 H periods to be allocated to the first and second voltage levels, respectively, as shown in FIG. 53. If the CS voltage waveform is defined in this manner, equivalent CS voltages can be supplied to the respective rows of pixels that are connected to the same CS trunk, no matter whether the first period of the CS voltage is started before the associated TFTs are turned OFF as in the CS signal #1 shown in the upper portion of FIG. 53 (and as already described for the seventh preferred embodiment) or after the associated TFTs have been turned OFF as in the CS signal #2 shown in the lower portion of FIG. 53.

To set the second period as described above, if one vertical scanning period (V-Total) is Q times as long as one horizontal scanning period (i.e., if V-Total=Q·H) and if the first cycle time is identified by $P_A$, the first period A should satisfy: $A=[\mathrm{Int}\{(Q \cdot H-3 \cdot P_A/2)/P_A\}+½] \cdot P_A$, where Int(x) is an integral part of an arbitrary real number x.

Supposing Q=803 and $P_A$=10 H, Int{(803 H−15 H)/10 H}=78. As a result, A=785 H.

As in the seventh preferred embodiment, the CS voltage described above may be generated in response to a CS timing signal that has been generated by the CS controller shown in FIG. 51.

First of all, an integer Q, the product (Q·H) of which and one horizontal scanning period H is equal to one vertical scanning period (V-Total) of an input video signal, is calculated.

Next, A that satisfies $A=[\mathrm{Int}\{(Q-3 \cdot L/2)/L\}+½] \cdot L$ (where Int(x) is an integral part of an arbitrary real number x) is calculated. In this case, as Q=803, L=10 ($P_A$=10 H), A=785 H.

Next, B that satisfies Q·H−A=B is calculated. That is to say, the length of the second period is figured out.

The waveform of the CS voltage during the second period (i.e., the second waveform) may be defined as already described for the seventh preferred embodiment. Specific examples have already been described with respect to the first through third preferred embodiments, the seventh preferred embodiment and this ninth preferred embodiment. By setting the first period of the CS voltage as long as possible and by maintaining the respective voltage levels for $P_A/2$ to $P_A$ during the second period as described above, equivalent CS voltages can be supplied to the respective rows of pixels that are connected to the same CS trunk, no matter whether the first period of the CS voltage is started before or after the associated TFTs are turned OFF. As a result, a display device with high reliability can be provided without debasing the display quality.

Embodiment 10

Next, still another exemplary method for driving a Type II liquid crystal display device will be described with reference to FIG. 54. The liquid crystal display device of this example may be the TypeII-1 LCD shown in FIG. 32(*a*), for example.

In the liquid crystal display device of the eighth preferred embodiment described above, 790 H out of V-Total of 804 H is defined as the first period and the remaining 14 H period as the second period. In that case, that second period of the CS voltage is evenly split into two 7 H periods to be allocated to the first and second voltage levels, respectively. That is why if the start point of the first period is ahead of the point in time when the TFTs on the associated row of pixels are turned OFF by at least a half of the first cycle time $P_A$ as shown in FIG. 52, equivalent CS voltages can be supplied to respective rows of pixels that are connected to the same CS trunk.

However, if the first period is started later (e.g., 1 H later) than the point in time when the TFTs on the associated row of pixels are turned OFF, then the voltage level of the CS voltage that changes after the TFTs connected to Gate:001 for the first row of pixels have been turned OFF will be maintained for 7 H, which is different from the other rows of pixels. This is because the second period is evenly split into two 7 H periods that are allocated to the first and second voltage levels.

To overcome this problem, the liquid crystal display device of this preferred embodiment sets those portions of the second period allocated to the first and second voltage levels to be equal to greater than a half of the first cycle time $P_A$ but equal to or smaller than the first cycle time $P_A$.

Specifically, if V-Total=824 H, the first period may be 790 H, the second period may be the remaining 34 H, and that second period may be evenly split into two 17 H periods to be allocated to the first and second voltage levels, respectively, as shown in FIG. 54. If the CS voltage waveform is defined in this manner, equivalent CS voltages can be supplied to the respective rows of pixels that are connected to the same CS trunk, no matter whether the first period of the CS voltage is started before the associated TFTs are turned OFF as in the CS signal #1 shown in the upper portion of FIG. 54 (and as already described for the eighth preferred embodiment) or after the associated TFTs have been turned OFF as in the CS signal #2 shown in the lower portion of FIG. 54.

To set the second period as described above, if one vertical scanning period (V-Total) is Q times as long as one horizontal scanning period (i.e., if V-Total=Q·H) and if the first cycle time is identified by $P_A$, the first period A should satisfy: $A=[\mathrm{Int}\{(Q \cdot H-3 \cdot P_A/2)/P_A\}+½] \cdot P_A$, where Int(x) is an integral part of an arbitrary real number x.

Supposing Q=824 and $P_A$=20 H, Int{(824 H−30 H)/20 H}=39. As a result, A=790 H.

As in the seventh preferred embodiment, the CS voltage described above may be generated in response to a CS timing signal that has been generated by the CS controller shown in FIG. 51.

First of all, an integer Q, the product (Q·H) of which and one horizontal scanning period H is equal to one vertical scanning period (V-Total) of an input video signal, is calculated.

Next, A that satisfies $A=[\mathrm{Int}\{(Q-3 \cdot K \cdot L)/(2 \cdot K \cdot L)\}+½] \cdot 2 \cdot K \cdot L \cdot H$ (where Int(x) is an integral part of an arbitrary real number x and K is a positive integer) is calculated. In this case, as Q=824, L=10 and K=1 ($P_A$=20 H), A=790 H.

Next, B that satisfies Q·H−A=B is calculated. That is to say, the length of the second period is figured out.

The waveform of the CS voltage during the second period (i.e., the second waveform) may be defined as already described for the eighth preferred embodiment. Specific examples have already been described with respect to the fourth through sixth preferred embodiments, the eighth preferred embodiment and this tenth preferred embodiment.

By setting the first period of the CS voltage as long as possible and by maintaining the respective voltage levels for $P_A/2$ to $P_A$ during the second period as described above, equivalent CS voltages can be supplied to the respective rows of pixels that are connected to the same CS trunk, no matter whether the first period of the CS voltage is started before or after the associated TFTs are turned OFF. As a result, a display device with high reliability can be provided without debasing the display quality.

In the examples described above, one vertical scanning period in a liquid crystal display device (i.e., an interval between a point in time when a scan line is selected and a point in time when the same scan line is selected next time) is supposed to be equal to one vertical scanning period (i.e., a time unit including display data for a single picture (or frame)) of an input video signal for the display device.

For example, an NTSC signal is an interlaced signal, of which a single frame consists of a field including display data on the odd-numbered rows of a single picture (frame) and a field including display data on the even-numbered rows thereof. The NTSC signal has a frame frequency of 30 Hz, a frame period of 1/30 second, a field frequency of 60 Hz and a field period of 1/60 second. Even when presenting pictures based on this NTSC signal, an LCD usually adopts a non-interlaced drive (also called a "progressive drive") in which a display signal is supplied to every pixel during each field period. That is why one vertical scanning period of an input video signal for an LCD is 1/60 second, which is as long as one field period of an NTSC signal. An input video signal for an LCD is generated based on (e.g., by interpolating) an NTSC signal representing each field.

A so-called "higher-speed drive" is a method for improving the moving picture display performance of LCDs. Specifically, this is a driving method in which a display signal is written on each pixel of an LCD at a frequency that is k times (where k is an integer that is equal to or greater than two) as high as the vertical scanning frequency (which is the inverse number of one vertical scanning period) of an input video signal for the LCD. According to this driving method, one vertical scanning period of the LCD is set to be k times as short as that of the input video signal.

Hereinafter, a multi-pixel drive method that can be used effectively in such a higher-speed drive method will be described. In the following description, one vertical scanning period of an LCD (that is an interval between a point in time when a scan line is selected and a point in time when the same scan line is selected next time) needs to be distinguished from that of an input video signal for the LCD. For that purpose, one vertical scanning period of an input video signal will also be identified by V-Total as in the foregoing description but that of an LCD by $V_P$-Total. Also, supposing one horizontal scanning period of an input video signal, which is calculated by dividing one vertical scanning period V-Total of an input video signal by the number N of pixel rows in the display area (e.g., N=768 in an XGA), is identified by H', one horizontal scanning period H of an LCD being driven at a rate that is k times as high as that of an input video signal is given by H'/k and $V_P$-Total=V-Total/k=N·H=N·H'/k is satisfied. That is to say, in the drive method described above, H'=H (i.e., V-Total=$V_P$-Total).

Also, an effective display period and a vertical blanking interval that make up one vertical scanning period $V_P$-Total of an LCD will be identified herein by $V_P$-Disp and $V_P$-Blank, respectively. Furthermore, one vertical scanning period V-Total of an input video signal will be referred to herein as a "frame" and one vertical scanning period $V_P$-Total of an LCD as a "subframe".

Hereinafter, an example of a preferred higher-speed drive method will be described with reference to FIG. 55.

FIG. 55 schematically shows the levels of display luminances (which typically correspond to the effective values of display signal voltages supplied to the signal lines of an LCD) in a situation where one frame (V-Total) of an input video signal is 1/60 seconds and where input video is displayed at the minimum luminance (black), a low luminance, an intermediate luminance, a high luminance and the maximum luminance (white) for two consecutive frames. Specifically, FIG. 55(*a*) shows a conventional driving method, while FIG. 55(*b*) shows an exemplary higher-speed drive method.

As shown in FIG. 55(*a*), according to the normal driving method, display signal voltages are applied such that a display luminance corresponding to the luminance of an input video signal is obtained in each frame. On the other hand, according to the higher-speed drive method shown in FIG. 55(*b*), each frame is divided into two subframes (with a duration of 1/120 seconds), a display signal voltage is applied one subframe after another, and the display luminance is controlled on a subframe-by-subframe basis. In the conventional driving method, one frame (V-Total) corresponds to one vertical scanning period ($V_P$-Total) of an LCD. On the other hand, in the higher-speed drive method described above, one subframe (V-Total/2) corresponds to one vertical scanning period ($V_P$-Total) of an LCD.

In the higher-speed drive method of this example, each pair of display luminances of two subframes in a single frame (i.e., each pair of display signal voltages) is defined so as to satisfy the following conditions.

The first condition is that the average of the display luminances of two subframes should agree with the luminance of the input video signal. In the conventional driving method shown in FIG. 55(*a*), the display luminance of each frame and the luminance of the input video signal have one-to-one correspondence. According to the higher-speed drive method shown in FIG. 55(*b*), however, it is the average of the display luminances of two subframes in each frame that corresponds to the luminance of the input video signal. That is to say, the luminances are set such that the integrated value of the display luminances of two subframes is equal to the luminance of the input video signal.

The second condition is that the display luminances of respective subframes should be set such that the difference in display luminance between two subframes in each frame varies from one frame to another. Specifically, as is adopted in this example, the display luminances of respective subframes are preferably set such that the difference in display luminance between two subframes is maximized. For example, at the low luminance and intermediate luminance shown in FIG. 55(*b*), the former one of two subframes has the lowest luminance (black) and the latter one has a display luminance that is twice as high as the luminance of the input video signal. At each of the high and maximum luminances shown in FIG. 55(*b*), the latter subframe has the maximum luminance, and therefore, the difference in luminance between the frames is represented by the display luminance value of the former subframe. In the example shown in FIG. 55(*b*), the former one of the two subframes is supposed to have a low luminance. Conversely, the latter one of the two subframes may have a low luminance, too. Nevertheless, the former one of two subframes preferably has a low luminance because the disordered video that would appear right after the previous subframe has started to be written in a situation where the video signal causes some disturbance due to a variation in the length of one vertical scanning period V-Total of the input video signal would become less sensible in that case.

In this example, one frame is supposed to be split into two subframes. Alternatively, a single frame may be divided into three or more subframes, too. In that case, the second condition may be stated as follows.

Supposing one frame consists of three or more subframes, the luminances may be set such that either the central subframe of the frame or a subframe that is closest to the center has the maximum luminance and that the luminances decrease sequentially outward from that subframe. In that case, the display luminances of the other subframes are preferably set such that the three or more subframes that form the single frame have the maximum difference in display luminance. It should be noted that in the foregoing description, the location of each subframe in a frame is defined on the time axis. For example, two subframes that are located before and after the central subframe are subframes that are anterior to, and posterior to, that subframe on the time axis. However, there is no need to set the display luminances of those two subframes symmetrically with respect to the central subframe.

If the display luminances of subframes are controlled so as to satisfy this second condition, then a low-luminance display state will be inserted between the frames. That is why the quality of moving pictures displayed by a so-called "impulse drive" technique will improve. In the prior art, if such a low-luminance display state (which is typically a black display state) were inserted to carry out an impulse drive, then the display luminance and the contrast ratio would normally decrease. According to the driving method adopted in this example, however, the display luminances of respective subframes are set such that the first condition described above is satisfied, and therefore, the display luminance or the contrast ratio never decreases. An example of a preferred higher-speed drive method is disclosed in Japanese Patent Application No. 2004-332509 filed by the applicant of the present application (which corresponds to Japanese Patent Application Laid-Open Publication No. 2005-173573 and United States Patent Application Publication No. US20050162360A1), for example, the entire disclosure of which is hereby incorporated by reference.

The display signal voltages supplied to the signal lines of an LCD such that the display luminances schematically shown in FIG. 55(*b*) are obtained in respective subframes are typically gray scale voltages corresponding to the luminance of the input video signal but are not limited to such voltages. Any other voltage may be applied as long as the display luminances schematically shown in FIG. 55(*b*) are obtained.

For example, if the response of liquid crystal molecules is slow, overshoot (OS) drive (which is sometimes also called "overdrive drive") may be carried out. The OS drive can increase the response at half scale tones, among other things. For instance, even if a gray scale voltage associated with the intermediate luminance were applied to a pixel that displays the low luminance in FIG. 55(*b*), the intended intermediate luminance could not be reached within the frame period (which typically has a duration of 16.7 ms) as long as the response of liquid crystal molecules is slow. For that reason, in view of such a response characteristic of liquid crystal molecules, a voltage that is higher than the gray scale voltage associated with the intermediate luminance to be displayed is applied such that the intended intermediate luminance can be reached within the frame period. Such a driving method in which a voltage that is higher than the gray scale voltage associated with the luminance to be displayed is applied such that the intended display luminance (i.e., target luminance) can be reached within the frame period in which the luminances have been changed is called "OS drive". Naturally, if the target luminance of the current frame is lower than that of the previous frame, a voltage that is lower than the voltage associated with the target luminance may be applied.

In the OS drive method, the display signal voltage supplied to each signal line depends not only on the luminance to display (i.e., target luminance) that is determined by the luminance of the input video signal but also on the luminance displayed in the previous frame. That is why when the OS drive is carried out, display signal voltages, each of which is determined in advance by the respective luminances of the previous and current frames, are stored in a lookup table (LUT) and a predetermined display signal voltage is selected from the LUT on a frame-by-frame basis. In this case, the display signal voltage is typically set between the lowest gray scale voltage (which is also called a "black voltage") associated with the lowest luminance and the highest gray scale voltage (which is also called a "white voltage") associated with the highest luminance. However, a voltage higher than the highest gray scale voltage may also be used.

If the OS drive and the higher-speed drive described above are adopted in combination, the display signal voltages applied to the previous and current subframes just need to be defined so as to satisfy the two conditions described above with respect to respective display signal voltages that are selected for various combinations of luminances of the previous and current frames. Those sets of display signal voltages that are selected on a subframe-by-subframe basis may also be stored in the LUT as in the example described above.

The higher-speed drive method shown in FIG. 55(*b*) also satisfies the condition that the direction of the voltage applied to the liquid crystal layer (which is typically represented by the polarity of a potential at a pixel electrode with respect to a potential at a counter electrode) should invert one frame after another. The signs shown in FIG. 55 indicate the polarities of the voltages applied to the liquid crystal layer.

According to the higher-speed drive method shown in FIG. 55(*b*), the two subframes of each frame may have either the same polarity (+, +)→(−, −) or mutually different polarities (+, −)→(−, +).

Attention should be paid to the fact that the polarity always inverts one frame after another according to the conventional drive method shown in FIG. 55(*a*) but the polarity does not always invert every subframe in the higher-speed drive method shown in FIG. 55(*b*). As shown in FIG. 55(*b*), the polarity may not invert within a frame but may invert between two frames. In either case, looking on a subframe basis, the polarity remains the same in two consecutive subframes and then inverts in the next subframe. A sequence of the polarities of voltages applied to such a liquid crystal layer (which will be referred to herein as "write polarities") never happened in the conventional driving method. More specifically, this sequence includes a situation where one frame (or one vertical scanning period) of an input video signal includes two or more subframes, the subframes of the same frame have the same write polarity but two consecutive frames have different sets of write polarities (e.g., (+, +)→(−, −) or (+, +, +)→(−, −, −)) and a situation where the subframes of the same frame have different write polarities and two consecutive frames also have different sets of write polarities (e.g., (+, −)→(−, +) or (+, −, +)→(−, +, −)).

This sequence of polarities is unique to the higher-speed drive. Hereinafter, oscillating voltages (CS voltages) that are preferably applied to combine the multi-pixel drive described above with the higher-speed drive will be described. In the following description of preferred embodiments, a preferred multi-pixel drive method to combine with a higher-speed drive in which k=2 or 3 will be described. In this case, the "higher-speed drive" is not limited to the example described above but may also be applied to a drive method in which one vertical scanning period is simply extended by a factor of k or any other known higher-speed drive method. Even in the higher-speed drive, if the subframes of the same frame have different write polarities but if the two consecutive frames have the same set of write polarities (e.g., (+, −)→(+, −) or (+, −, +, −)→(+, −, +, −)), one vertical scanning period (V-Total) of the input video signal just needs to be replaced with one vertical scanning period (i.e., a subframe period, which is calculated by dividing $V_P$-Total by k) of the LCD, and the description thereof will be omitted herein.

In a liquid crystal display device according to the preferred embodiment to be described below, to which the higher-speed drive method is applicable effectively, one vertical scanning period (V-Total) of an input video signal is divided into at least two subframes, in each of which a display signal voltage is written on each pixel. Two consecutive vertical scanning periods of the input video signal include a sequence in which the display signal voltage is written at the same polarity in two consecutive subframes and then has its polarity inverted in the next subframe. A storage capacitor counter voltage supplied through each storage capacitor trunk has, in each subframe, a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal. And between two subframes in which the polarity is inverted, the first waveforms of the storage capacitor counter voltages have a phase difference of 180 degrees. In one preferred embodiment, every vertical scanning period of the input video signal, the display signal voltage inverts its polarity and the first waveform of the storage capacitor voltage has its phase shifted by 180 degrees. In another preferred embodiment, every vertical scanning period of the input video signal, the display signal voltage inverts its polarity. And every subframe in each vertical scanning period of the input video signal, the display signal voltage inverts its polarity and the first waveform of the storage capacitor counter voltage has its phase shifted by 180 degrees.

Hereinafter, a liquid crystal display device and its driving method according to such a preferred embodiment that is effectively applicable to the higher-speed drive method will be described by way of specific examples.

Embodiment 11

A method for driving a Type II LCD with 768 rows of pixels (with an XGA arrangement) will be described with reference to FIGS. 56A through 56C and FIGS. 57A and 57B. FIGS. 56A through 56C schematically show the matrix arrangement (or the connection pattern of CS bus lines) of the Type II LCD with an XGA. In this example, 10 types (10 phases) of CS voltages CS1 through CS10 are used (where K=1 and L=10). It should be noted that CS1 through CS10 will also be used as reference numerals to identify the CS voltages (i.e., storage capacitor counter voltages), CS trunks and CS bus lines as in the preferred embodiments described above.

FIGS. 57A and 57B schematically show drive waveforms for the LCD shown in FIGS. 56A through 56C.

In the driving method to be described below, when a video signal, of which one vertical scanning period (or frame) V-Total is 806 H', one effective display period V-Disp is 768 H' and one vertical blanking interval V-Blank is 38 H', is input, one frame of the video signal is supposed to be split into two subframes. In this example, V-Total=16.7 ms. Also, in the example to be described below, the polarities of the voltages applied to the liquid crystal layer are supposed to follow the sequence shown in the upper row of FIG. 55(*b*) (in which the polarity remains the same within a single frame, e.g., (+, +) →(−, −)) and frame inversion is supposed to be carried out as 1 H dot inversion. However, the sequence shown in the lower row of FIG. 55(*b*) (in which two subframes within each frame have mutually different polarities, e.g., (+, −)→(−, +)) is similarly applicable as well.

Since a video signal, one frame of which is 806 H' (i.e., 1 H'=16.7 ms/806), is written at 2× rate, one horizontal scanning period 1 H becomes 1 H'/2 for the LCD. In this case, the vertical scanning period, effective display period and vertical blanking interval of the subframe SF1 are identified by $V_P$-Total (SF1), $V_P$-Disp (SF1) and $V_P$-Blank (SF1), respectively, while the vertical scanning period, effective display period and vertical blanking interval of the subframe SF2 are identified by $V_P$-Total (SF2), $V_P$-Disp (SF2) and $V_P$-Blank (SF2), respectively, as shown in FIGS. 57A and 57B.

If one vertical scanning period $V_P$-Total (SF1) of the subframe SF1 is 768 H+38 H and if one vertical scanning period $V_P$-Total (SF2) of the subframe SF2 is also 768 H+38 H, then not only 1612 H=806 H' (i.e., V-Total=$V_P$-Total (SF1)+$V_P$-Total (SF2)) but also $V_P$-Total (SF1)=$V_P$-Total (SF2) are satisfied. In this example, one vertical blanking interval of 38 H' of the video signal is equally split into two vertical blanking intervals of the two subframes of 38 H apiece.

In the subframe SF1, if "+" (i.e., positive polarity) is written on the first pixel of the first row of pixels (i.e., Gate:001 shown in FIGS. 57A and 57B, which is one of multiple rows of pixels connected to the gate bus line GBL_1 shown in FIG. 56A), then the CS voltage CS1 on the CS bus line connected to that pixel rises from the second voltage level to the first voltage level after the TFTs on the first pixel row have been turned OFF.

As shown in Example #1 of FIG. 57A, CS1 changes its voltage levels every 10 H over the first 800 H period (the first period of SF1 will be identified herein by A1) and then has the first voltage level and the second voltage level once apiece for two 3 H sub-periods of the remaining 6 H period (the second period of SF1 will be identified herein by B1). That is to say, the first waveform of the CS voltage is an oscillating waveform with a cycle time $P_A$ of 20 H and a duty ratio of 1:1 and the second waveform thereof is an oscillating waveform with a cycle time of 6 H and a duty ratio of 1:1. The length A1 (of 800 H) of the first period can be given by A1=Int(Q·H/$P_A$)·PA (where Q=806 in this example).

As in the subframe SF1, + is also written on the subframe SF2. Thus, the CS voltage CS1 on the CS bus line connected to the first pixel on the first pixel row is defined so as to rise from the second voltage level to the first voltage level after the TFTs on the first pixel row have been turned OFF. In the next subframe SF1 belonging to the next frame, the opposite polarity "−" (i.e., negative polarity) is written (which is called "frame inversion"). That is why as shown in Example #1, the CS voltage CS1 of the subframe SF2 oscillates over the first 790 H period (the first period of SF2 will be identified herein by A2) and then has the first voltage level and the second voltage level once apiece for two 8 H sub-periods of the remaining 16 H period (the second period of SF2 will be identified herein by B2). That is to say, the first waveform of the CS voltage is an oscillating waveform with a cycle time $P_A$ of 20 H and a duty ratio of 1:1 and the second waveform thereof is an oscillating waveform with a cycle time of 16 H and a duty ratio of 1:1. The length A2 (of 790 H) of the first period can be given by A2=[Int{(Q·H−$P_A$/2)/$P_A$}+½]·$P_A$ (where Q=806 in this example). The nine other CS voltages CS2 through CS10, except the CS voltage CS1, can be obtained by shifting the phase of CS1 as described above.

By adopting the CS voltages such as those shown in Example #1 of FIG. 57A, even in the higher-speed drive that has a sequence in which two consecutive subframes have the same polarity and then the next subframe has the inverted polarity, the CS voltage supplied to every pixel line can have the same effective value in each subframe. As a result, a good image with almost no unevenness can be displayed.

Furthermore, if a CS voltage that satisfies A1−A2=$P_A/2$ and B2−B1=$P_A/2$ is used, the two subframes SF1 and SF2 can have the same length in each and every frame. That is to say, A1+B1=A2+B2 and $V_P$-Total (SF1)=$V_P$-Total (SF2) are satisfied. As a result, a good image with virtually no unevenness can be displayed.

It should be noted that the second waveform of the CS voltage in the respective second periods B1 and B2 of the two subframes is not limited to the example described above.

Alternatively, if the respective second periods B1 and B2 of the subframes SF1 and SF2 are 6 H and 16 H as in Example #1 described above, the respective second waveforms of the CS voltages in those second periods B1 and B2 may be oscillating waveforms in which the first and second voltage levels switch at intervals of 0.5 H (i.e., which have an oscillation period of 1 H) as in Example #2 shown in FIG. 57B. Still alternatively, the second waveform may even have a period that is shorter than 1 H. For instance, as in Example #5, the respective second waveforms of the CS voltages in those second periods B1 and B2 may also be oscillating waveforms in which the first and second voltage levels switch at intervals of 0.25 H (i.e., which have an oscillation period of 0.5 H). If one oscillation period of the second waveform of the CS voltage is less than 1 H in this manner, the same CS voltage can be used, no matter whether the respective second periods B1 and B2 are an even number of times, or an odd number of times, as long as one horizontal scanning period H.

Furthermore, in a situation where the respective second periods B1 and B2 of the subframes SF1 and SF2 are 6 H and 16 H, the respective second waveforms of the CS voltages in those second periods B1 and B2 may be fixed at the average of the first and second voltage levels, not oscillating waveforms, as in Example #3 shown in FIG. 57B. If the CS voltage value during the second period is fixed in this manner, the same CS voltage can always be used as in Example #2 described above, no matter whether the respective second periods B1 and B2 are an even number of times, or an odd number of times, as long as one horizontal scanning period H. According to Example #3, however, a third voltage level needs to be newly set besides the first and second voltage levels, and therefore, the circuit should be more expensive than the situation where the scheme of Example #2 is adopted.

Furthermore, the CS voltages shown as Example #4 in FIG. 57B may also be used. In Examples #1 through #3 described above, the first period A1 of the subframe SF1 of the CS voltage begins 8 H before the TFTs on the first row of pixels are turned ON. In this Example #4, however, the first period A1 of the CS voltage with a length of 780 H begins when the TFTs on the second row of pixels are turned OFF. In the first period A1, the first waveform of the CS voltage CS1 is an oscillating waveform with a cycle time of 20 H and a duty ratio of 1:1. After that, there is a second period B1 with a length of 26 H and the second waveform of the CS voltage is an oscillating waveform with a cycle time of 26 H and a duty ratio of 1:1. In the subframe SF2 that follows it, the first period A2 has a length of 770 H and the first waveform is an oscillating waveform with a cycle time of 20 H and a duty ratio of 1:1. The second period B2 that follows it has a length of 36 H and the second waveform is an oscillating waveform with a cycle time of 36 H and a duty ratio of 1:1.

In this Example #4, the CS voltage also satisfies A1−A2=$P_A/2$ and B2−B1=$P_A/2$, and the two subframes SF1 and SF2 can have the same length in each and every frame. As a result, a good image with no unevenness can be displayed.

Embodiment 12

A method for driving a Type II LCD with 1,080 rows of pixels (with a Full HD arrangement) will be described with reference to FIGS. 58A through 58C and FIGS. 59A and 59B. FIGS. 58A through 58C schematically show the matrix arrangement (or the connection pattern of CS bus lines) of the Type II LCD with a full HD. In this example, 12 types (12 phases) of CS voltages CS1 through CS12 are used (where K=1 and L=12).

FIGS. 59A and 59B schematically show drive waveforms for the LCD shown in FIGS. 58A through 58C.

In the driving method to be described below, when a video signal, of which one vertical scanning period (or frame) V-Total is 1,125 H', one effective display period V-Disp is 1,080 H' and one vertical blanking interval V-Blank is 45 H', is input, one frame of the video signal is supposed to be split into two subframes. In this example, V-Total=16.7 ms. Also, in the example to be described below, the polarities of the voltages applied to the liquid crystal layer are supposed to follow the sequence shown in the upper row of FIG. 55(*b*) (in which the polarity remains the same within a single frame, e.g., (+, +)→(−, −)) and frame inversion is supposed to be carried out as 1 H dot inversion.

Since a video signal, one frame of which is 1,125 H' (i.e., 1 H'=16.7 ms/1,125), is written at 2× rate, one horizontal scanning period 1 H becomes 1 H'/2 for the LCD. If one vertical scanning period $V_P$-Total (SF2) of the subframe SF1 is 1,080 H+24 H and if one vertical scanning period $V_P$-Total (SF2) of the subframe SF2 is 1,080 H+66 H, then 2250 H=1125 H' (i.e., V-Total=$V_P$-Total (SF1)+$V_P$-Total (SF2)) is satisfied. In this example, one vertical blanking interval of 45 H' of the video signal is divided into 24 H and 66 H to be allocated to the respective vertical blanking intervals of the subframes SF1 and SF2. The respective first periods A1 and A2 of the subframes have the same length and each first period is as long as its associated effective display period $V_P$-Disp (SF1) or $V_P$-Disp (SF2). It should be noted, however, that $V_P$-Total (SF1)=$V_P$-Total (SF2) is not satisfied in this example.

In this case, the same polarity is written on both of the subframes SF1 and SF2 and the length of 1,080 H of $V_P$-Disp is an integral number of times as long as one oscillation period (of 24 H) of the CS voltage. That is why supposing the blanking interval $V_P$-Blank (SF1) between the subframes SF1 and SF2 is n times as long as 24 H, oscillation in which the first and second voltage levels switch at intervals of 12 H (i.e., in a cycle time of 24 H) just needs to be repeated, no matter how long the second period B1 of the subframe SF1 may be. In other words, there is no need to distinguish the first and second periods A1 and B1 from each other as for the subframe SF1. For that reason, in FIGS. 59A and 59B, the second period B1 of the subframe SF1 is not shown but the sum of the first and second periods of SF1 and the first period of SF2 is shown as the "first period A1".

In the next subframe SF1 that follows the subframe SF2 and that belongs to the next frame, the opposite polarity "−" is written (which is called "frame inversion"). That is why if $V_P$-Total (SF1)=1,080 H+24 H and $V_P$-Total (SF1)=1,080 H+66 H, the CS voltage CS1 oscillates over the first 2,244 H period (that is the sum of the first and second periods A1 and B1 of SF1 and the first period A2 of SF2) and then has the first voltage level and the second voltage level once apiece for two 3 H sub-periods of the remaining 6 H period (the second period of SF2 will be identified herein by B2).

That is to say, the first waveform of the CS voltage over one frame is an oscillating waveform with a cycle time $P_A$ of 24 H and a duty ratio of 1:1 and the second waveform thereof is an oscillating waveform with a cycle time of 6 H and a duty ratio of 1:1. It should be noted that 2,244 H, which is the sum of the periods with the first waveform (i.e., the first and second periods A1 and B1 of SF1 and the first period A2 of SF2) can be calculated by $[\mathrm{Int}\{(Q\cdot H-P_A/2)/P_A\}+\frac{1}{2}]$ PA (where Q=2, 250 H).

By adopting the CS voltages such as those shown in Example #1 of FIG. 59A, even in the higher-speed drive that has a sequence in which two consecutive subframes have the same polarity and then the next subframe has the inverted polarity, the CS voltage supplied to every pixel line can have the same effective value in each subframe. As a result, a good image with almost no unevenness can be displayed.

It should be noted that the second waveform of the CS voltage in the second period B2 is not limited to the example described above.

For example, as in Example #2 shown in FIG. 59B, the second waveform of the CS voltage may be an oscillating waveform in which the first and second voltage levels switch at intervals of 0.5 H (i.e., which have an oscillation period of 1 H). Still alternatively, the second waveform may even have a period that is shorter than 1 H. For instance, as in Example #5, the second waveform of the CS voltage in the second period may also be an oscillating waveform in which the first and second voltage levels switch at intervals of 0.25 H (i.e., which have an oscillation period of 0.5 H). If one oscillation period of the second waveform of the CS voltage is less than 1 H in this manner, the same CS voltage can always be used, no matter whether the second period is an even number of times, or an odd number of times, as long as one horizontal scanning period H.

Alternatively, the second waveform of the CS voltage in the second period B2 may be fixed at the average of the first and second voltage levels, not an oscillating waveform, as in Example #3 shown in FIG. 59B. If the CS voltage value during the second period B2 is fixed in this manner, the same CS voltage can always be used as in Example #2 described above, no matter whether the second period B2 is an even number of times, or an odd number of times, as long as one horizontal scanning period H. According to Example #3, however, a third voltage level needs to be newly set besides the first and second voltage levels, and therefore, the circuit should be more expensive than the situation where the scheme of Example #2 is adopted.

Still alternatively, the CS voltage shown as Example #4 may also be used. In Examples #1 through #3 described above, the first period A1 of the CS voltage begins 10 H before the TFTs on the first row of pixels are turned ON. In this Example #4, however, the first period A1 of the CS voltage with a length of 2,220 H begins when the TFTs on the second row of pixels are turned OFF. In the first period A1, the first waveform of the CS voltage CS1 is an oscillating waveform with a cycle time of 24 H and a duty ratio of 1:1. After that, there is a second period B2 with a length of 30 H and the second waveform of the CS voltage is an oscillating waveform with a cycle time of 30 H and a duty ratio of 1:1.

If the same polarity is written on both of the subframes SF1 and SF2 as described above, then the blanking interval between the respective effective display periods of the subframes SF1 and SF2 (i.e., the blanking interval of SF1) may be split for the blanking interval of the video signal such that the sum of the effective display period and the blanking interval (i.e., the first and second periods A1 and B1) of the subframe SF1 is equal to $P_A\cdot n$. On the other hand, if opposite polarities are written on the subframes SF1 and SF2, then the blanking interval between the respective effective display periods of the subframes SF1 and SF2 (i.e., the blanking interval of SF1) may be split such that the sum of the effective display period and the blanking interval (i.e., the first and second periods A1 and B1) of the subframe SF1 is equal to $P_A\cdot(n+\frac{1}{2})$.

Embodiment 13

A method for driving a Type II LCD with 768 rows of pixels (with an XGA arrangement) will be described with reference to FIGS. 60A and 60B. In this example, 10 types (10 phases) of CS voltages CS1 through CS10 are used (where K=1 and L=10).

FIGS. 60A and 60B schematically show drive waveforms. In the driving method to be described below, when a video signal, of which one vertical scanning period (or frame) V-Total is 806 H', one effective display period V-Disp is 768 H' and one vertical blanking interval V-Blank is 38 H', is input, one frame of the video signal is supposed to be divided into three subframes. In this example, the polarities of the voltages applied to the liquid crystal layer are supposed to follow the sequence in which the polarity remains the same within a single frame, e.g., (+, +, +)→(−, −, −), and frame inversion is supposed to be carried out as 1 H dot inversion.

Since a video signal, one frame of which is 806 H' (i.e., 1 H'=16.7 ms/806), is written at 3× rate, one horizontal scanning period 1 H becomes 1 H'/3 for the LCD. If one vertical scanning period $V_P$-Total (SF1) of the subframe SF1 is 768 H+38 H, if one vertical scanning period $V_P$-Total (SF2) of the subframe SF2 is also 768 H+38 H, and if one vertical scanning period $V_P$-Total (SF3) of the subframe SF3 is also 768 H+38 H, then not only 2,418 H=806 H' (i.e., V-Total=$V_P$-Total (SF1)+$V_P$-Total (SF2)+$V_P$-Total (SF3)) but also $V_P$-Total (SF1)=$V_P$-Total (SF2)=$V_P$-Total (SF3) are satisfied as shown in FIGS. 60A and 60B. In this example, one vertical blanking interval of 38 H' of the video signal is equally divided into three vertical blanking intervals of 38 H apiece for the three subframes.

The same polarity is written on all of the subframes SF1, SF2 and SF3 belonging to the same frame. That is why as in Example #1, the CS voltage CS1 changes its voltage levels every 10 H over the first 800 H period (the first period A1 of SF1) and then has the first voltage level and the second voltage level once apiece for two 3 H sub-periods of the remaining 6 H period (the second period B1 of SF1). Subsequently, the CS voltage CS1 again changes its voltage levels every 10 H over the next 800 H period (the first period A2 of SF2) and then has the first voltage level and the second voltage level once apiece for two 3 H sub-periods of the remaining 6 H period (the second period B2 of SF2).

On the other hand, opposite polarities are written on the subframe SF3 and the next subframe SF1 belonging to a different frame. That is why the CS voltage oscillates over the first 790 H period (the first period A3 of SF3) and then has the first voltage level and the second voltage level once apiece for two 8 H sub-periods of the remaining 16 H period (the second period B3 of SF3). That is to say, the first waveform of the CS voltage of the subframe SF3 is an oscillating waveform with a cycle time $P_A$ of 20 H and a duty ratio of 1:1 and the second waveform thereof is an oscillating waveform with a cycle time of 16 H and a duty ratio of 1:1. The length A3 (of 790 H) of the first period can be given by $A3=[\mathrm{Int}\{(Q\cdot H-P_A/2)/P_A\}+\frac{1}{2}]\cdot P_A$ (where Q=806 in this example).

By adopting the CS voltages such as those shown in Example #1 of FIG. 60A, even in a 3× drive that has a sequence in which two consecutive subframes have the same polarity and then the next subframe has the inverted polarity, the CS voltage supplied to every pixel line can have the same effective value in each subframe. As a result, a good image with almost no unevenness can be displayed.

It should be noted that the second waveform of the CS voltage in the respective second periods B1, B2 and B3 of the three subframes is not limited to the example described above.

For example, the respective second waveforms of the CS voltages in those second periods B1, B2 and B3 may be oscillating waveforms in which the first and second voltage levels switch at intervals of 0.5 H (i.e., which have an oscillation period of 1 H) as in Example #2 shown in FIG. 60B. Alternatively, the second waveform may even have a period that is shorter than 1 H. For instance, as in Example #5, the respective second waveforms of the CS voltages in those second periods B1, B2 and B3 may also be oscillating waveforms in which the first and second voltage levels switch at intervals of 0.25 H (i.e., which have an oscillation period of 0.5 H). If one oscillation period of the second waveform of the CS voltage is less than 1 H in this manner, the same CS voltage can always be used, no matter whether the respective second periods are an even number of times, or an odd number of times, as long as one horizontal scanning period H.

Still alternatively, the respective second waveforms of the CS voltages in those second periods B1, B2 and B3 may be fixed at the average of the first and second voltage levels, not oscillating waveforms, as in Example #3 shown in FIG. 60B. If the CS voltage value during the second period is fixed in this manner, the same CS voltage can always be used as in Example #2 described above, no matter whether the respective second periods B1, B2 and B3 are an even number of times, or an odd number of times, as long as one horizontal scanning period H. According to Example #3, however, a third voltage level needs to be newly set besides the first and second voltage levels, and therefore, the circuit should be more expensive than the situation where the scheme of Example #2 is adopted.

Furthermore, the CS voltages shown as Example #4 may also be used. In Examples #1 through #3 described above, the first period A1 of the subframe SF1 of the CS voltage begins 8 H before the TFTs on the first row of pixels are turned ON. In this Example #4, however, the first period A1 of the CS voltage with a length of 780 H begins when the TFTs on the second row of pixels are turned OFF. In the first period A1, the first waveform of the CS voltage CS1 is an oscillating waveform with a cycle time of 20 H and a duty ratio of 1:1. After that, there is a second period B1 with a length of 26 H and the second waveform of the CS voltage is an oscillating waveform with a cycle time of 26 H and a duty ratio of 1:1. The subframe SF2 that follows it has the first period A2 having a length of 780 H (which is an oscillating waveform with a cycle time of 20 H and a duty ratio of 1:1) and the second period B2 having a length of 26 H (which is an oscillating waveform with a cycle time of 26 H and a duty ratio of 1:1). Then, the subframe SF2 is followed by the subframe SF3. The subframe SF3 has the first period A3 having a length of 770 H (which is an oscillating waveform with a cycle time of 20 H and a duty ratio of 1:1) and the second period B3 having a length of 36 H (which is an oscillating waveform with a cycle time of 36 H and a duty ratio of 1:1). Then, the subframe SF3 is followed by the subframe SF1.

Embodiment 14

Another method for driving a Type II LCD with 768 rows of pixels (with an XGA arrangement) will be described with reference to FIGS. 61A and 61B, which schematically show drive waveforms. In the driving method to be described below, when a video signal, of which one vertical scanning period (or frame) V-Total is 806 H', one effective display period V-Disp is 768 H' and one vertical blanking interval V-Blank is 38 H', is input, one frame of the video signal is supposed to be divided into three subframes. In this example, the polarities of the voltages applied to the liquid crystal layer are supposed to follow the sequence in which the polarity inverts within a frame, e.g., (+, −, +)→(−, +, −), and frame inversion is supposed to be carried out as 1 H dot inversion (i.e., corresponding to the sequence shown on the lower row in FIG. 55(*b*)).

If the subframes SF1, SF2 and SF3 are written with their polarities inverted as shown in FIGS. 61A and 61B and if one frame is divided into $V_P$-Total (SF1) of 768 H+22 H, $V_P$-Total (SF2) of 768 H+22 H and $V_P$-Total (SF3) of 768 H+70 H, then 2,418 H=806 H' (i.e., V-Total=$V_P$-Total (SF1)+$V_P$-Total (SF2)+$V_P$-Total (SF3)) is satisfied. In this example, one vertical blanking interval of 38 H' of the video signal is divided into three vertical blanking intervals of 22 H, 22 H and 70 H for the subframes SF1, SF2 and SF3, respectively.

The subframes SF1, SF2 and SF3 are combined together with their polarities inverted and the CS voltage has 10 phases and is Type II. That is why if part of the blanking interval is allocated such that $V_P$-Total (SF1) and +$V_P$-Total (SF2) are both equal to 790 H ($P_A \cdot (n+½)$) and if the rest of the blanking interval is allocated to the subframe SF3, then the CS voltage has an oscillating waveform in which the first and second levels just switch every 10 H through the first period of the subframe SF3 (i.e., which has a cycle time of 20 H). Thus, there is no need to consider equalizing processing in the boundary between the subframes SF1 and SF2 or SF2 and SF3 and no second period has to be provided for SF1 and SF2, either. For that reason, in FIGS. 61A and 61B, the second period of the subframe SF1 or SF2 is shown but the sum of the first and second periods of SF1, the first and second periods of SF2 and the first period of SF3 is shown as the "first period A1".

If $V_P$-Total (SF1)=768 H+22 H, $V_P$-Total (SF2)=768 H+22 H and $V_P$-Total (SF3)=768 H+70 H, then the first period A1 of 2,410 H, which just oscillates every 10 H, may be followed by a second period B3 with a length of 8 H in which the first and second voltage levels switch every 4 H, as in Example #1.

By adopting the CS voltages such as those shown in Example #1 of FIG. 61A, even in the higher-speed drive that has a sequence in which three consecutive subframes have their polarities inverted alternately and then the next subframe also has its polarity inverted, the CS voltage supplied to every pixel line can have the same effective value in each subframe. As a result, a good image with almost no unevenness can be displayed.

It should be noted that the second waveform of the CS voltage in the second period B3 is not limited to the example described above.

For example, as in Example #2 shown in FIG. 61B, the second waveform of the CS voltage may be an oscillating waveform in which the first and second voltage levels switch at intervals of 0.5 H (i.e., which have an oscillation period of 1 H). Alternatively, the second waveform may even have a period that is shorter than 1 H. For instance, as in Example #5, the second waveform of the CS voltage in the second period may also be an oscillating waveform in which the first and second voltage levels switch at intervals of 0.25 H (i.e., which have an oscillation period of 0.5 H). If one oscillation period of the second waveform of the CS voltage is less than 1 H in this manner, the same CS voltage can always be used, no matter whether the second period is an even number of times, or an odd number of times, as long as one horizontal scanning period H.

Alternatively, the second waveform of the CS voltage in the second period B3 may be fixed at the average of the first and second voltage levels, not an oscillating waveform, as in Example #3 shown in FIG. 61B. If the CS voltage value during the second period B3 is fixed in this manner, the same CS voltage can always be used as in Example #2 described above, no matter whether the second period B3 is an even number of times, or an odd number of times, as long as one horizontal scanning period H. According to Example #3, however, a third voltage level needs to be newly set besides the first and second voltage levels, and therefore, the circuit should be more expensive than the situation where the scheme of Example #2 is adopted.

Still alternatively, the CS voltage shown as Example #4 may also be used. In Examples #1 through #3 described above, the first period A1 of the CS voltage begins 10 H before the TFTs on the first row of pixels are turned ON. In this Example #4, however, the first period A1 of the CS voltage with a length of 2,390 H begins when the TFTs on the second row of pixels are turned OFF. In the first period A1, the first waveform of the CS voltage CS1 is an oscillating waveform with a cycle time of 20 H and a duty ratio of 1:1. After that, there is a second period B2 with a length of 28 H and the second waveform of the CS voltage is an oscillating waveform with a cycle time of 28 H and a duty ratio of 1:1 (i.e., oscillates every 14 H).

If the same polarity is written on both of the subframes SF1 and SF2 (or SF2 and SF3) as described above, then the blanking interval between the respective effective display periods of the subframes SF1 and SF2 (or SF2 and SF3) (i.e., the blanking interval of SF1 or SF2) may be split for the blanking interval of the video signal such that the sum of the effective display period and the blanking interval (i.e., the first and second periods A1 and B1) of the subframe SF1 or SF2 is equal to $P_A \cdot n$. On the other hand, if opposite polarities are written on the subframes SF1 and SF2 (or SF2 and SF3), then the blanking interval between the respective effective display periods of the subframes SF1 and SF2 (or SF2 and SF3) (i.e., the blanking interval of SF1 or SF2) may be split such that the sum of the effective display period and the blanking interval (i.e., the first and second periods A1 and B1) of the subframe SF1 or SF2 is equal to $P_A \cdot (n+\frac{1}{2})$.

Panel Division Drive Method

Hereinafter, a method for driving an LCD with its display area divided into a plurality of areas (which will be sometimes referred to herein as a "panel division drive method") will be described. Typically, the LCD is driven with its display area divided into upper and lower areas. According to the panel division drive method, the time for writing a display signal voltage on each pixel can be increased by the same number of times as that of division. For example, if the display area is divided into two, the time can be doubled.

The advantages of the panel division drive method over a normal driving method will be described.

FIG. 62 schematically shows respective signal timings in a situation where the multi-pixel drive is adopted in a normal driving method with no panel division. In the upper two portions of FIG. 62, the abscissa represents the time and the ordinate represents the location in the row direction on the display panel. In the middle portion of FIG. 62, the arrow indicates how the display signal voltage is written on pixels sequentially from the upper left corner of the display panel toward the lower right corner thereof (i.e., writing is done line-sequentially), and the gradient of the arrow indicates the write rate. Also, this is an example of frame inversion in which the polarity inverts every vertical scanning period (i.e., every frame) of the input video signal (input data). As can be seen from FIG. 62, according to the normal driving method, the transmission rate of input data is as high as the write rate on pixels, which is why one vertical scanning period of the input video signal is as long as that of the LCD.

If the multi-pixel drive is adopted, the polarity of the CS voltage needs to be inverted while nothing is being written on pixels (i.e., while the scanning signal (gate signal) is OFF). With no panel division, this condition can be satisfied by inverting the polarity of the CS voltage at the time indicated by the solid line within each hatched vertical scanning period in FIG. 62.

As LCDs increase their sizes and definition, however, it has become more and more difficult to drive such LCDs by the conventional method shown in FIG. 62. That is why such a method for driving a display device with its display area divided into upper and lower areas was proposed.

The method of driving with the display area divided into upper and lower areas and its problems will be described with reference to FIG. 63.

According to the driving method shown in FIG. 63, just a half of one frame of the received data needs to be written within the time for receiving that frame, and therefore, the time for writing is doubled, which is why the gradient of the arrows in the middle portion of FIG. 63 is a half as steep as that of the oblique lines in the upper portion of FIG. 63.

To carry out the multi-pixel drive, the CS voltage needs to have its polarity inverted while nothing is being written on pixels. This requirement is also satisfied by inverting the polarity at the times indicated by the vertical bold lines in the middle portion of FIG. 63.

The driving method shown in FIG. 63, however, newly causes a different kind of problem. Specifically, if a moving picture is presented by the driving method shown in FIG. 63, the presented picture will look as if the picture were split at the panel division junction (i.e., on the boundary between the upper and lower divisions). This problem arises because one frame data once stops being written at the panel division junction (i.e., at the intermediate portion on the screen).

To overcome this problem, a driving method in which writing is not stopped at the intermediate portion on the screen is disclosed in U.S. Pat. No. 6,229,516. However, the present inventors discovered and confirmed via experiments that if that driving method and the multi-pixel drive shown in FIG. 62 or 63 were combined, a further problem would arise.

The problem is that one of the requirements of the multi-pixel drive that the CS voltage needs to have its polarity inverted while nothing is being written on pixels cannot be satisfied when that combination is adopted.

This problem will be described with reference to FIG. 64. If the polarity of the CS voltage is inverted at the times specified by the vertical bold lines in the middle portion of FIG. 64, then the arrows indicating writing on pixels cross the bold lines specifying the times to invert the polarity of the CS voltage at the encircled spots in FIG. 64. Furthermore, no matter how much the bold lines specifying the times to invert the polarity of the CS voltage are shifted, the bold lines cannot be shifted without crossing the arrows indicating writing on pixels. Consequently, that requirement of the multi-pixel drive cannot be satisfied.

Hereinafter, a preferred embodiment of a liquid crystal display device that can overcome such a problem and its driving method will be described.

Just like the liquid crystal display devices of the preferred embodiments described above, the liquid crystal display device to be described below also includes a plurality of electrically independent storage capacitor trunks to carry out the multi-pixel drive. The pixels include pixels belonging to a first display area (e.g., upper area) and pixels belonging to a second display area (e.g., lower area). The first and second display areas can be scanned independently of each other. The storage capacitor trunks include a first group of storage capacitor trunks belonging to the first display area and a second group of storage capacitor trunks belonging to the second display area.

In this case, the display area of a storage capacitor trunk can be determined depending on what display area a pixel with a subpixel, of which the storage capacitor counter electrode is electrically connected to the storage capacitor trunk, belongs to. It should be noted that a storage capacitor trunk that is electrically connected to the storage capacitor counter electrodes of multiple pixels belonging to mutually different display areas is supposed to belong to none of the display areas. Optionally, a storage capacitor trunk that is electrically connected to both pixels belonging to the first display area and pixels belonging to the second display area may be further included as will be described later. In that case, among the pixels connected to the storage capacitor trunk, only pixels on one pixel row (i.e., a pixel row located closest to the other display area) belong to a different display area (e.g., the first display area) and all the other pixels belong to the same display area (e.g., the second display area). Then, the storage capacitor trunk that is electrically connected to the pixels belonging to the two different display areas can be regarded as belonging to the display area to which all pixels but those on an exceptional pixel row belong to (i.e., the second display area).

In one preferred embodiment, a voltage applied to an arbitrary one of the storage capacitor trunks of the first group and a voltage applied to an arbitrary one of the storage capacitor trunks of the second group are voltages with the same waveform but different phases.

In another preferred embodiment, a phase difference between the waveform of the voltage applied to the arbitrary one of the storage capacitor trunks of the first group and that of the voltage applied to the arbitrary one of the storage capacitor trunks of the second group is greater than one horizontal scanning period but smaller than one vertical scanning period (V-Total) of a video signal.

For example, as shown in FIG. 72, the storage capacitor counter voltage supplied through each of the storage capacitor trunks is generated by repeatedly combining first and second groups of rectangular waves a number of times. Each of those two groups of rectangular waves consists of multiple rectangular waves that are represented by first and second voltage levels and that have multiple cycle times. Each of the first group of rectangular waves (WI) and the second group of rectangular waves (WII) has a first period (WIA or WIIA) and a second period (WIB or WIIB). In the first period (WIA or WIIA), write scanning is performed on each pixel. The first period (WIA or WIIA) of the storage capacitor counter voltage supplied to the first storage capacitor trunk is a period in which the first display area is scanned. The first period (WIA or WIIA) of the storage capacitor counter voltage supplied to the second storage capacitor trunk is a period in which the second display area is scanned. The polarity of a display signal voltage written on the respective pixels being scanned during the first period of the first group of rectangular waves is different from that of a display signal voltage written on the respective pixels being scanned during the first period of the second group of rectangular waves. The waveform of the second group of rectangular waves during the first period is produced by changing the first voltage level of the waveform of the first group of rectangular waves during the first period into the second voltage level thereof and the second voltage level into the first voltage level. And a time at which the first and second groups of rectangular waves of a first storage capacitor counter voltage supplied through a first storage capacitor trunk are combined together is different from a time at which the first and second groups of rectangular waves of a second storage capacitor counter voltage supplied through a second storage capacitor trunk are combined together.

Also, as shown in FIG. 72, in an LCD, one vertical scanning period (V-Total) of an input video signal is divided into at least two subframes, in each of which a display signal voltage is written on each pixel. Two consecutive vertical scanning periods of the input video signal include a sequence in which the display signal voltage is written at the same polarity in two consecutive subframes and then has its polarity inverted in the next subframe. A storage capacitor counter voltage supplied through each storage capacitor trunk has, in each subframe, a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal. And between two subframes in which the polarity is inverted, the first waveforms of the storage capacitor counter voltages have a phase difference of 180 degrees. If the panel division structure is adopted in such an LCD, the storage capacitor trunks include a first storage capacitor trunk belonging to the first display area and a second storage capacitor trunk belonging to the second display area. And the phases of the respective first waveforms of the first and second storage capacitor counter voltages supplied through the first and second storage capacitor trunks shift by 180 degrees at mutually different times.

As described above, a time at which the first and second groups of rectangular waves of a first storage capacitor counter voltage supplied through a first storage capacitor trunk are combined together may be different from a time at which the first and second groups of rectangular waves of a second storage capacitor counter voltage supplied through a second storage capacitor trunk are combined together. Or the phases of the respective first waveforms of the first and second storage capacitor counter voltages supplied through the first and second storage capacitor trunks may shift by 180 degrees at mutually different times. In that case, it will sometimes be just stated that the CS voltage has its polarity inverted at mutually different times.

By inverting the polarity of the CS voltage at mutually different times in the respective divided display areas as described above, the picture on the boundary between the two split portions will never have discontinuity while a moving picture is being presented, and one of the requirements of the multi-pixel drive that the polarity of the CS voltage needs to be inverted while nothing is being written on pixels can also be satisfied.

Typically, in each display area, the first and second groups of rectangular waves are combined together all at the same time and the phases of the respective first waveforms of the storage capacitor counter voltages shift by 180 degrees all at the same time.

In one preferred embodiment, if a vertical scanning period on the first display area is $V_P$-Total (SFU) and if a vertical scanning period on the second display area is $V_P$-Total (SFL), one vertical scanning period (V-Total) of an input video signal satisfies V-Total=$V_P$-Total (SFU)=$V_P$-Total (SFL).

In another preferred embodiment, each of the first and second groups of rectangular waves is as long as one vertical scanning period (V-Total) of the input video signal.

In still another preferred embodiment, one vertical scanning period (V-Total) of the input video signal is represented as the sum of a first subframe ($V_P$-Total (SF1)) and a second subframe ($V_P$-Total (SF2)). Supposing one vertical scanning period on the first display area in the first subframe is identified by $V_P$-Total (SFU1), one vertical scanning period on the second display area in the first subframe is identified by $V_P$-Total (SFL1), one vertical scanning period on the first display area in the second subframe is identified by $V_P$-Total (SFU2), and one vertical scanning period on the second display area in the first subframe is identified by $V_P$-Total (SFL2), $V_P$-Total (SF1)=$V_P$-Total (SFU1)=$V_P$-Total (SFL1) and $V_P$-Total (SF2)=$V_P$-Total (SFU2)=$V_P$-Total (SFL2) are satisfied, the first group of rectangular waves is as long as $V_P$-Total (SF1) and the second group of rectangular waves is as long as $V_P$-Total (SF2).

Naturally, the higher-speed drive method such as that shown in FIG. 72 does not have to be adopted.

In an alternative LCD, every vertical scanning period (V-Total) of an input video signal has a sequence in which the display signal voltage has its polarity inverted. A storage capacitor counter voltage supplied through each storage capacitor trunk has, in each vertical scanning period (V-Total), a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal. As the polarity inverts, the first waveform of the storage capacitor counter voltage has a phase difference of 180 degrees. If the panel division structure is adopted in such an LCD, the phases of the respective first waveforms of the first and second storage capacitor counter voltages supplied through the first and second storage capacitor trunks may shift by 180 degrees at mutually different times. Even so, in a first group of storage capacitor counter voltages supplied through the first group of storage capacitor trunks, the phases of the respective first waveforms preferably shift by 180 degrees all at the same time. In a second group of storage capacitor counter voltages supplied through the second group of storage capacitor trunks, the phases of the respective first waveforms preferably also shift by 180 degrees all at the same time.

Hereinafter, preferred embodiments of the panel division drive method will be described with reference to the accompanying drawings.

Embodiment 15

The driving method shown in FIG. 65 is characterized by inverting the polarity of the CS voltage at mutually different times in the upper and lower halves of the screen.

By adopting such a technique, the picture displayed on the boundary between the upper and lower areas of an LCD will never have discontinuity while a moving picture is being presented, and one of the requirements of the multi-pixel drive that the polarity of the CS voltage needs to be inverted while nothing is being written on pixels can also be satisfied. To split the display panel for the multi-pixel drive into two (i.e., the upper and lower halves) in this manner, CS bus lines also need to be classified into upper and lower groups. In that case, the CS bus line on the centerline on the screen needs to be included in either the upper or lower half of the screen. That is to say, the number of CS bus lines included in the upper half of the screen is different by one from that of CS bus lines included in the lower half thereof.

The degree of discontinuity of a moving picture on the junction portion on the screen, which has been pointed out as a problem with reference to FIG. 64, depends on how long writing is suspended on that portion. It would be ideal if writing were not suspended at all at the junction portion on the screen as shown in FIG. 65. However, if the suspension lasts for just a short time, then it may cause no visual problem in some cases. The present inventors discovered via experiments that if the suspension lasted for no longer than approximately 20% of the overall write time, no visual problem was sensed.

Even if writing is suspended on the centerline of the screen within an interval of such a permissible length, it is also effective to control the CS voltage polarity inversion timings such that the polarity of the CS voltage inverts at mutually different times on the upper and lower halves of the screen as shown in FIG. 66. This is because the polarity of the CS voltage that should be inverted while writing is suspended on the upper and lower halves of the screen can be inverted at approximately the same time, and the drive states can be substantially equalized with each other, on the upper and lower halves of the screen.

Embodiment 16

The driving method of the fifteenth preferred embodiment described above is an example of a panel division drive at an equal display rate (i.e., one period in which data is input to the display device is as long as one period in which the liquid crystal display device is driven). And the effect to be achieved in that case by the panel division drive (i.e., the time for writing on the liquid crystal display device can be doubled compared to a normal driving method) is taken advantage of in driving a high-definition panel with a huge screen.

The panel division drive can also be used to drive a liquid crystal display device at higher rates (with the drive frequency increased). An example of applying the driving method in which the screen is split into upper and lower halves to a 2× drive will be described.

FIG. 67 shows an exemplary driving method in which both the pixel write rate and the pixel polarity inversion rate are doubled. On the other hand, FIG. 68 shows an example in which the polarity of each pixel is inverted at an equal rate as in the conventional method (i.e., the polarity is inverted every frame of the input video signal) but only the pixel write rate is doubled.

According to either of the two driving methods shown in FIGS. 67 and 68, the CS voltage inverts its polarity every time a pixel inverts its polarity and both the 2× drive and the multi-pixel drive are realized at the same time.

Embodiment 17

Next, an example of applying the driving method in which the screen is split into upper and lower halves to a 3× drive will be described.

FIG. 69 shows an exemplary driving method in which both the pixel write rate and the pixel polarity inversion rate are tripled. On the other hand, FIG. 70 shows an example in which the polarity of each pixel is inverted at an equal rate as in the conventional method (i.e., the polarity is inverted every frame of the input video signal) but only the pixel write rate is tripled.

According to either of the two driving methods shown in FIGS. 69 and 70, the CS voltage inverts its polarity every time a pixel inverts its polarity and both the 3× drive and the multi-pixel drive are realized at the same time.

Embodiment 18

Hereinafter, a preferred embodiment for a multi-pixel drive in which the method of driving an LCD with its display area split into upper and lower halves and the 2× drive are combined will be described.

A method for driving a Type II LCD with 1,080 rows of pixels (with a Full HD arrangement) will be described with reference to FIGS. 71A through 71C and FIG. 72. FIGS. 71A through 71C schematically show the matrix arrangement (or the connection pattern of CS bus lines) of the Type II LCD with a full HD. In this example, 10 types (10 phases) of CS voltages CS1 through CS10 are used (where K=1 and L=10).

FIG. 72 schematically shows drive waveforms for the LCD shown in FIGS. 71A through 71C.

In the driving method to be described below, when a video signal, of which one vertical scanning period (or frame) V-Total is 1,120 H', one effective display period V-Disp is 1,080 H' and one vertical blanking interval V-Blank is 40 H', is input, one frame of the video signal is supposed to be split into two subframes and the screen is also supposed to be split into upper and lower halves. In this example, V-Total=16.7 ms. Also, in the example to be described below, the polarities of the voltages applied to the liquid crystal layer are supposed to follow the sequence shown in the upper row of FIG. 55(*b*) (in which the polarity remains the same within a single frame, e.g., (+, +)→(−, −)) and frame inversion is supposed to be carried out as 1 H dot inversion.

In the following description, "U" will be used as a reference sign indicating that the member belongs to the upper half (i.e., the upper display area) of the screen that has been split into two, while "L" will be used as a reference sign indicating that the member belongs to the lower half (i.e., the lower display area) of the screen. The upper display area includes 540 pixel rows that are connected to the $1^{st}$ gate bus line GBL_1 shown in FIG. 71A through the $540^{th}$ gate bus line GBL_540 shown in FIG. 71B. On the other hand, the lower display area includes 540 pixel rows that are connected to the $541^{st}$ gate bus line GBL_541 shown in FIG. 71B through the $1,080^{th}$ gate bus line GBL_1080 shown in FIG. 71C. In FIG. 72, the upper display area is identified by G001 through G540 and the lower display area is identified by G'001 through G'540. The pixel row connected to the $540^{th}$ gate bus line GBL_540 shown in FIG. 71B belongs to the upper display area and one of the two subpixels of each pixel on that row has its storage capacitor counter electrode electrically connected to the storage capacitor trunk CS9, belonging to the upper display area, by way of a storage capacitor line. However, the other subpixel of that pixel has its storage capacitor counter electrode electrically connected to the storage capacitor trunk CS1' that is electrically connected to the storage capacitor counter electrode of another pixel belonging to the lower display area.

As can be seen, in this Type II LCD, if its screen is divided into multiple display areas, each pixel on one of the pixel rows that belongs to one of the display areas but that is located closest to another display area will include a subpixel that has a storage capacitor counter electrode electrically connected to a storage capacitor trunk belonging to its own display area and a subpixel that has a storage capacitor counter electrode electrically connected to a storage capacitor trunk that is electrically connected to the storage capacitor counter electrode of another pixel belonging to the adjacent display area. Such a storage capacitor trunk that is electrically connected to the storage capacitor counter electrodes of two pixels belonging to mutually different display areas does not belong to any of those two display areas. However, the storage capacitor trunk that is electrically connected to both of the two pixels belonging to the two different display areas can be regarded as belonging to the display area (e.g., the second display area in this example) to which all pixels but the exceptional pixel row G540 belong. That is to say, CS1' can be treated as a storage capacitor trunk substantially belonging to the lower display area.

On the other hand, in the Type I LCD, the storage capacitor counter electrodes of two subpixels in one pixel belonging to one display area are connected to storage capacitor trunks belonging to the same display area.

As a video signal, one frame of which is 1,120 H' (i.e., 1 H'=16.7 ms/1,120) is written at 2× rate and the LCD is driven with its display area split into upper and lower halves, one horizontal scanning period 1 H of the LCD becomes equal to (1 H'/2)·2, i.e., 1 H=1 H'.

As shown in FIG. 72, one vertical scanning period $V_P$-Total (SF1U), $V_P$-Total (SF2U), $V_P$-Total (SF1L) or $V_P$-Total (SF2L) of each of the subframes SF1U, SF2U, SF1L and SF2L is supposed to be 540 H+20 H. That is to say, one vertical blanking interval V-Blank of the input video signal is split into two 20 H periods to be allocated to the two subframes.

After the TFTs associated with the second row of pixels have been turned OFF, the CS voltage of the subframe SF1U oscillates every 10 H (i.e., in a cycle time of 20 H) over the first period of 540 H, has the first and second voltage levels for 6 H apiece in 12 H out of the last 20 H period (i.e., the second period) and then oscillates every less than 1 H (e.g., 0.5 H) for the remaining 8 H period (in a cycle time of 1 H). By providing the period in which the CS voltage oscillates every less than 1 H, even if the second period of the subframe SF1U is an odd number of times as long as one horizontal scanning period H, there is no need to perform any special type of processing anymore.

After the TFTs associated with the second row of pixels have been turned OFF, the CS voltage of the subframe SF2U oscillates every 10 H (i.e., in a cycle time of 20 H) over the first period of 550 H, and then oscillates every less than 1 H (e.g., 0.5 H) for the remaining 10 H second period (in a cycle time of 1 H). By providing the period in which the CS voltage oscillates every less than 1 H, even if the second period of the subframe SF2U is an odd number of times as long as one horizontal scanning period H, there is no need to perform any special type of processing anymore. In this case, CS1 through CS6 are irregular 10 H oscillations. Specifically, CS1 and CS2 oscillate every 10 H over the first period of 540 H, oscillate every 0.5 H for 6 H out of the last 10 H period, and then maintain a constant level for the remaining 4 H period. CS3 and CS4 may also oscillate every 10 H over the first period of 540 H, oscillate every 0.5 H for 4 H out of the last 10 H period, and then maintain a constant level for the remaining 6 H period. Instead, a 4 H period just before the voltages start to oscillate every 0.5 H is combined with the previous 10 H period to make it a 14 H period. CS5 and CS6 may also oscillate every 10 H over the first period of 540 H, oscillate every 0.5 H for 2 H out of the last 10 H period, and then maintain a constant level for the remaining 8 H period. Instead, a 2 H period just before the voltages start to oscillate every 0.5 H is combined with the previous 10 H period to make it a 12 H period.

After the TFTs associated with the second row of pixels have been turned OFF and 10 H before the CS voltages are changed, the CS voltage of the subframe SF1L oscillates every 10 H over a period of 540 H, has the first and second voltage levels for 8 H apiece in 16 H out of the last 20 H period (6 H apiece for CS5' through CS8') and then oscillates every less than 1 H (e.g., 0.5 H) for the remaining 4 H period. By providing the period in which the CS voltage oscillates every less than 1 H, even if the second period of the subframe SF1L is an odd number of times as long as one horizontal scanning period H, there is no need to perform any special type of processing anymore.

After the TFTs associated with the second row of pixels have been turned OFF and 10 H before the CS voltages are changed, the CS voltage of the subframe SF2L oscillates every 10 H over a period of 550 H, and then oscillates every less than 1 H (e.g., 0.5 H) for the remaining 10 H period. By providing the period in which the CS voltage oscillates every less than 1 H, even if the second period of the subframe SF1L is an odd number of times as long as one horizontal scanning period H, there is no need to perform any special type of processing anymore. In this case, CS1' and CS2' have the first and second voltage levels for 4 H apiece in 8 H out of the last 10 H period and then oscillate every less than 1 H (e.g., 0.5 H) for the remaining 2 H period.

By using the CS voltages shown in FIG. 72, even in a multi-pixel drive in which the method of driving with the display area split into the upper and lower halves and the 2× drive are combined, the CS voltages supplied to all pixel lines can have the same effective value in every subframe. As a result, a quality image with no unevenness can be displayed. Naturally, the effect of the driving method with the display area split into the upper and lower halves and that of the 2× drive can be achieved as well.

INDUSTRIAL APPLICABILITY

The present invention provides a large-screen or high-definition liquid crystal display device with its display quality improved significantly by reducing the viewing angle dependence of the γ characteristic. The liquid crystal display device of the present invention can be used effectively for a TV receiver with a large screen of 30 inches or more.

The invention claimed is:

1. A liquid crystal display device comprising a plurality of pixels that are arranged in columns and rows so as to form a matrix pattern, each said pixel including a liquid crystal layer and a plurality of electrodes for applying a voltage to the liquid crystal layer, wherein each said pixel includes a first subpixel and a second subpixel, having liquid crystal layers to which mutually different voltages are applicable, and wherein each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them; and wherein the counter electrode is a single electrode provided in common for the first and second subpixels, while the storage capacitor counter electrodes of the first and second subpixels are electrically independent of each other, and wherein the device further includes a plurality of electrically independent storage capacitor trunks, and wherein each said storage capacitor trunk is electrically connected to the respective storage capacitor counter electrodes of either the first subpixels or the second subpixels of the pixels through storage capacitor lines, and wherein the pixels include pixels belonging to a first display area and pixels belonging to a second display area, the first and second display areas being able to be scanned independently of each other, and wherein the storage capacitor trunks include a first storage capacitor trunk belonging to the first display area and a second storage capacitor trunk belonging to the second display area.

2. The device of claim 1, wherein the storage capacitor trunks further include a storage capacitor trunk that is electrically connected to both the pixels belonging to the first display area and the pixels belonging to the second display area.

3. The device of claim 1, wherein a voltage applied to an arbitrary one of the storage capacitor trunks of a first group and a voltage applied to an arbitrary one of the storage capacitor trunks of a second group are voltages with the same waveform but different phases.

4. The device of claim 3, wherein a phase difference between the waveform of the voltage applied to the arbitrary one of the storage capacitor trunks of the first group and that of the voltage applied to the arbitrary one of the storage capacitor trunks of the second group is greater than one horizontal scanning period but smaller than one vertical scanning period (V-Total) of a video signal.

5. A liquid crystal display device comprising a plurality of pixels that are arranged in columns and rows so as to form a matrix pattern, each said pixel including a liquid crystal layer and a plurality of electrodes for applying a voltage to the liquid crystal layer, wherein each said pixel includes a first subpixel and a second subpixel, having liquid crystal layers to which mutually different voltages are applicable, and wherein each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them; and wherein the counter electrode is a single electrode provided in common for the first and second subpixels, while the storage capacitor counter electrodes of the first and second subpixels are electrically independent of each other, and wherein the device further includes a plurality of electrically independent storage capacitor trunks, and wherein each said storage capacitor trunk is electrically connected to the respective storage capacitor counter electrodes of either the first subpixels or the second subpixels of the pixels through storage capacitor lines, the storage capacitor counter voltage supplied through each of the storage capacitor trunks being generated by repeatedly combining first and second groups of rectangular waves a number of times, each of those two groups of rectangular waves consisting of multiple rectangular waves that are represented by first and second voltage levels and that have multiple cycle times, and wherein each of the first group of rectangular waves (WI) and the second group of rectangular waves (WII) has a first period (WIA or WIIA) and a second period (WIB or WIIB), write scanning being performed on each pixel in the first period (WIA or WIIA), and wherein the pixels include pixels belonging to a first display area and pixels belonging to a second display area, the first and second display areas being able to be scanned independently of each other, and wherein the storage capacitor trunks include a first storage capacitor trunk belonging to the first display area and a second storage capacitor trunk belonging to the second display area, and wherein the first period (WIA or WIIA) of the storage capacitor counter voltage supplied to the first storage capacitor trunk is a period in which the first display area is scanned, the first period (WIA or WIIA) of the storage capacitor counter voltage supplied to the second storage capacitor trunk is a period in which the second display area is scanned, and the polarity of a display signal voltage written on the respective pixels being scanned during the first period of the first group of rectangular waves is different from that of a display signal voltage written on the respective pixels being scanned during the first period of the second group of rectangular waves, and wherein the waveform of the second group of rectangular waves during the first period is produced by changing the first voltage level of the waveform of the first group of rectangular waves during the first period into the second voltage level thereof and the second voltage level into the first voltage level, and wherein a time at which the first and second groups of rectangular waves of a first storage capacitor counter voltage supplied through a first storage capacitor trunk are combined together is different from a time at which the first and second groups of rectangular waves of a second storage capacitor counter voltage supplied through a second storage capacitor trunk are combined together.

6. The device of claim 5, wherein in a first group of storage capacitor counter voltages supplied through the first group of storage capacitor trunks, the first and second groups of rectangular waves are combined together all at the same time, and in a second group of storage capacitor counter voltages supplied through the second group of storage capacitor trunks, the first and second groups of rectangular waves are also combined together all at the same time.

7. The device of claim 5, wherein if a vertical scanning period on the first display area is $V_P$-Total (SFU) and if a vertical scanning period on the second display area is $V_P$-Total (SFL), one vertical scanning period (V-Total) of an input video signal satisfies V-Total=$V_P$-Total (SFU) =$V_P$-Total (SFL).

8. The device of claim 7, wherein each of the first and second groups of rectangular waves is as long as one vertical scanning period (V-Total) of the input video signal.

9. The device of claim 5, wherein the liquid crystal display device presents a first subframe ($V_P$-Total (SF1)) and a second subframe ($V_P$-Total (SF2)) during one vertical scanning period (V-Total) of the input video signal, and wherein supposing one vertical scanning period on the first display area in the first subframe is identified by $V_P$-Total (SFU1), one vertical scanning period on the second display area in the first subframe is identified by $V_P$-Total (SFL1), one vertical scanning period on the first display area in the second subframe is identified by $V_P$-Total (SFU2), and one vertical scanning period on the second display area in the second subframe is identified by $V_P$-Total (SFL2), $V_P$-Total (SF1)=$V_P$-Total (SFU1)=$V_P$-Total (SFL1) and $V_P$-Total (SF2)=$_P$Total (SFU2)=$V_P$-Total (SFL2) are satisfied, and wherein the first group of rectangular waves is as long as $V_P$-Total (SF1) and the second group of rectangular waves is as long as $V_P$-Total (SF2).

10. The device of one of claim 5, wherein the liquid crystal display device presents a first subframe ($V_P$-Total (SF1)) and a second subframe ($V_P$-Total (SF2)) during one vertical scanning period (V-Total) of the input video signal, and wherein supposing one vertical scanning period on the first display area in the first subframe is identified by $V_P$-Total (SFU1), one vertical scanning period on the second display area in the first subframe is identified by $V_P$-Total (SFL1), one vertical scanning period on the first display area in the second subframe is identified by $V_P$-Total (SFU2), and one vertical scanning period on the second display area in the second subframe is identified by $V_P$-Total (SFL2), $V_P$-Total (SF1)=$V_P$-Total (SFU1)=$V_P$-Total (SFL1) and $V_P$-Total (SF2)=$V_P$-Total (SFU2)=$V_P$-Total (SFL2) are satisfied, and wherein each of the first and second groups of rectangular waves is as long as V-Total and includes two first periods.

11. A liquid crystal display device comprising a plurality of pixels that are arranged in columns and rows so as to form a matrix pattern, each said pixel including a liquid crystal layer and a plurality of electrodes for applying a voltage to the liquid crystal layer, wherein each said pixel includes a first subpixel and a second subpixel, having liquid crystal layers to which mutually different voltages are applicable, and wherein each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them; and wherein the counter electrode is a single electrode provided in common for the first and second subpixels, while the storage capacitor counter electrodes of the first and second subpixels are electrically independent of each other, and wherein the device further includes a plurality of electrically independent storage capacitor trunks, and wherein each said storage capacitor trunk is electrically connected to the respective storage capacitor counter electrodes of either the first subpixels or the second subpixels of the pixels through storage capacitor lines, and wherein the pixels include pixels belonging to a first display area and pixels belonging to a second display area, the first and second display areas being able to be scanned independently of each other, and wherein the storage capacitor trunks include a first storage capacitor trunk belonging to the first display area and a second storage capacitor trunk belonging to the second display area, and wherein a first storage capacitor voltage is supplied to the first storage capacitor trunk and a second storage capacitor voltage is supplied to the second storage capacitor trunk, and wherein the liquid crystal display device presents a first subframe ($V_P$-Total (SF1)) and a second subframe ($V_P$-Total (SF2)) during one vertical scanning period (V-Total) of an input video signal, each of the first and second storage capacitor voltages having a first period (A) with a first waveform and a second period (B) with a second waveform in each of the first and second subframes ($V_P$-Total (SF1)) and ($V_P$-Total (SF2)), the sum of the first and second periods being as long as either the first subframe ($V_P$-Total (SF1)) or the second subframe ($V_P$-Total (SF2)), and wherein the first waveform oscillates between first and second voltage levels in a first cycle time $P_A$, which is an integral number of times as long as, and at least twice as long as, one horizontal scanning period (H), and wherein the second waveform is defined so as to have a predetermined effective value every vertical scanning period (V-Total).

12. The device of claim 11, wherein the second waveform includes a waveform that oscillates between the first and second levels in a cycle time that is equal to or shorter than one horizontal scanning period (1 H).

13. The device of claim 12, wherein the second waveform includes a waveform that oscillates between the first and second levels in a cycle time that is an integral number of times as short as one horizontal scanning period.

14. The device of claim 5, wherein if the luminance of the input video signal represents a half scale tone, then the display signal voltages applied to the pixel in the first and second subframes, respectively, are defined such that the average of the display luminances of the first and second subframes is equal to the luminance of the input video signal and that the respective display luminances of the first and second subframes are different from the luminance of the input video signal to mutually different degrees.

15. The device of claim 14, wherein in each vertical scanning period of the input video signal, the first subframe is anterior to the second subframe, and the display luminance of the first subframe is smaller than that of the second subframe.

16. A liquid crystal display device comprising a plurality of pixels that are arranged in columns and rows so as to form a matrix pattern, each said pixel including a liquid crystal layer and a plurality of electrodes for applying a voltage to the liquid crystal layer, wherein each said pixel includes a first subpixel and a second subpixel, having liquid crystal layers to which mutually different voltages are applicable, and wherein each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them; and wherein the counter electrode is a single electrode provided in common for the first and second subpixels, while the storage capacitor counter electrodes of the first and second subpixels are electrically independent of each other, and wherein the device further includes a plurality of electrically independent storage capacitor trunks, and wherein each said storage capacitor trunk is electrically connected to the respective storage capacitor counter electrodes of either the first subpixels or the second subpixels of the pixels through storage capacitor lines, and wherein one vertical scanning period (V-Total) of an input video signal is divided into at least two subframes, in each of which a display signal voltage is written on each pixel, two consecutive vertical scanning periods of the input video signal including a sequence in which the display signal voltage is written at the same polarity in two consecutive subframes and then has its polarity inverted in the next subframe, and wherein a storage capacitor counter voltage supplied through each storage capacitor trunk has, in each subframe, a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal, and between two subframes in which the polarity is inverted, the first waveforms of the storage capacitor counter voltages have a phase difference of 180 degrees, wherein the pixels include pixels belonging to a first display area and pixels belonging to a second display area, the first and second display areas being able to be scanned independently of each other, the storage capacitor trunks including a first storage capacitor trunk belonging to the first display area and a second storage capacitor trunk belonging to the second display area, and wherein the phases of the respective first waveforms of the first and second storage capacitor counter voltages supplied through the first and second storage capacitor trunks shift by 180 degrees at mutually different times.

17. The device of claim 16, wherein the phases of the first waveforms of the first group of storage capacitor counter voltages supplied through the first group of storage capacitor trunks change 180 degrees all at the same time, and the phases of the first waveforms of the second group of storage capacitor counter voltages supplied through the second group of storage capacitor trunks also change 180 degrees all at the same time.

18. The device of claim 16, wherein if a vertical scanning period on the first display area is $V_P$-Total (SFU) and if a vertical scanning period on the second display area is $V_P$-Total (SFL), one vertical scanning period (V-Total) of an input video signal satisfies V-Total=$V_P$-Total (SFU)=$V_P$-Total (SFL).

19. A liquid crystal display device comprising a plurality of pixels that are arranged in columns and rows so as to form a matrix pattern, each said pixel including a liquid crystal layer and a plurality of electrodes for applying a voltage to the liquid crystal layer, wherein each said pixel includes a first subpixel and a second subpixel, having liquid crystal layers to which mutually different voltages are applicable, and wherein each of the first and second subpixels includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them; and wherein the counter electrode is a single electrode provided in common for the first and second subpixels, while the storage capacitor counter electrodes of the first and second subpixels are electrically independent of each other, and wherein the device further includes a plurality of electrically independent storage capacitor trunks, and wherein each said storage capacitor trunk is electrically connected to the respective storage capacitor counter electrodes of either the first subpixels or the second subpixels of the pixels through storage capacitor lines, and wherein every vertical scanning period (V-Total) of an input video signal has a sequence in which the display signal voltage has its polarity inverted, and wherein a storage capacitor counter voltage supplied through each storage capacitor trunk has, in each vertical scanning period (V-Total), a first waveform, oscillating in a first cycle time $P_A$, which is an integral number of times as long as, and at least twice as long as, one horizontal scanning period (H), and a second waveform, defined such that the effective value of the storage capacitor counter voltage has a predetermined constant value every predetermined number of consecutive vertical scanning periods of the input video signal, and as the polarity inverts, the first waveform of the storage capacitor counter voltage has a phase difference of 180 degrees, and wherein the pixels include pixels belonging to a first display area and pixels belonging to a second display area, the first and second display areas being able to be scanned independently of each other, and wherein the storage capacitor trunks include a first storage capacitor trunk belonging to the first display area and a second storage capacitor trunk belonging to the second display area, and wherein the phases of the respective first waveforms of the first and second storage capacitor counter voltages supplied through the first and second storage capacitor trunks shift by 180 degrees at mutually different times.

20. The device of claim 19, wherein the phases of the first waveforms of the first group of storage capacitor counter voltages supplied through the first group of storage capacitor trunks change 180 degrees all at the same time, and the phases of the first waveforms of the second group of storage capacitor counter voltages supplied through the second group of storage capacitor trunks also change 180 degrees all at the same time.

* * * * *